US012574600B2

(12) United States Patent
Cielak et al.

(10) Patent No.: US 12,574,600 B2
(45) Date of Patent: Mar. 10, 2026

(54) USER INTERFACES FOR INTERACTING WITH CHANNELS THAT PROVIDE CONTENT THAT PLAYS IN A MEDIA BROWSING APPLICATION

(71) Applicant: Apple Inc., Cupertino, CA (US)

(72) Inventors: Matthew J. Cielak, Seattle, WA (US); Michael Evashevski, San Francisco, CA (US); Drew R. Domm, Oakland, CA (US); Fredric Vinna, San Francisco, CA (US); Fernando A. Albuquerque, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/336,569

(22) Filed: Jun. 16, 2023

(65) Prior Publication Data

US 2023/0328327 A1 Oct. 12, 2023

Related U.S. Application Data

(63) Continuation of application No. 16/584,790, filed on Sep. 26, 2019, now Pat. No. 11,683,565.

(Continued)

(51) Int. Cl.
*H04N 21/472* (2011.01)
*G06F 3/0485* (2022.01)
(Continued)

(52) U.S. Cl.
CPC ..... *H04N 21/47202* (2013.01); *G06F 3/0485* (2013.01); *H04N 21/42216* (2013.01);
(Continued)

(58) Field of Classification Search
CPC ....... H04N 21/47202; H04N 21/42216; H04N 21/47208; H04N 21/4821; H04N 21/4828; G06F 3/0485
See application file for complete search history.

(56) References Cited

U.S. PATENT DOCUMENTS

| 2,718,550 A | 9/1955 | Hoyt et al. |
| 4,672,677 A | 6/1987 | Yamakawa |
| (Continued) | | |

FOREIGN PATENT DOCUMENTS

| AU | 2009255409 B2 | 7/2012 |
| AU | 2016100476 A4 | 5/2016 |
| (Continued) | | |

OTHER PUBLICATIONS

Corrected Notice of Allowance received for U.S. Appl. No. 17/210,352, mailed on Sep. 20, 2023, 5 pages.

(Continued)

*Primary Examiner* — Randy A Flynn

(74) *Attorney, Agent, or Firm* — Kubota & Basol LLP

(57) ABSTRACT

In some embodiments, an electronic device presents a plurality of representations of content items that are available on a respective channel in response to successfully subscribing the respective channel. In some embodiments, an electronic device plays content that is provided by a channel in a unified media browsing application. In some embodiments, an electronic device presents information about subscribing to a channel based on content consumption activity of the user on the electronic device in accordance with some embodiments of the disclosure.

36 Claims, 104 Drawing Sheets

Related U.S. Application Data

(60) Provisional application No. 62/822,952, filed on Mar. 24, 2019.

(51) Int. Cl.
    *H04N 21/422*       (2011.01)
    *H04N 21/482*       (2011.01)

(52) U.S. Cl.
    CPC ... *H04N 21/47208* (2013.01); *H04N 21/4821* (2013.01); *H04N 21/4828* (2013.01)

(56) References Cited

U.S. PATENT DOCUMENTS

| | | | |
|---|---|---|---|
| 5,029,223 | A | 7/1991 | Fujisaki |
| 5,483,261 | A | 1/1996 | Yasutake |
| 5,488,204 | A | 1/1996 | Mead et al. |
| 5,537,153 | A | 7/1996 | Shigihara |
| 5,585,866 | A | 12/1996 | Miller et al. |
| 5,596,373 | A | 1/1997 | White et al. |
| 5,621,456 | A | 4/1997 | Florin et al. |
| 5,677,708 | A | 10/1997 | Matthews et al. |
| 5,818,439 | A | 10/1998 | Nagasaka et al. |
| 5,825,352 | A | 10/1998 | Bisset et al. |
| 5,835,079 | A | 11/1998 | Shieh |
| 5,880,411 | A | 3/1999 | Gillespie et al. |
| 5,886,690 | A | 3/1999 | Pond et al. |
| 5,926,230 | A | 7/1999 | Niijima et al. |
| 6,021,320 | A | 2/2000 | Bickford et al. |
| 6,028,600 | A | 2/2000 | Rosin et al. |
| 6,049,333 | A | 4/2000 | Lajoie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,405,371 | B1 | 6/2002 | Oosterhout et al. |
| 6,487,722 | B1 | 11/2002 | Okura et al. |
| 6,570,557 | B1 | 5/2003 | Westerman et al. |
| 6,628,304 | B2 | 9/2003 | Mitchell et al. |
| 6,677,932 | B1 | 1/2004 | Westerman |
| 6,690,387 | B2 | 2/2004 | Zimmerman et al. |
| 6,745,391 | B1 | 6/2004 | Macrae et al. |
| 6,909,837 | B1 | 6/2005 | Unger |
| 6,928,433 | B2 | 8/2005 | Goodman et al. |
| 7,015,894 | B2 | 3/2006 | Morohoshi |
| 7,039,879 | B2 | 5/2006 | Bergsten et al. |
| 7,103,906 | B1 | 9/2006 | Katz et al. |
| 7,134,089 | B2 | 11/2006 | Celik et al. |
| 7,184,064 | B2 | 2/2007 | Zimmerman et al. |
| 7,213,255 | B2 | 5/2007 | Markel et al. |
| 7,293,275 | B1 | 11/2007 | Krieger et al. |
| 7,324,953 | B1 | 1/2008 | Murphy |
| 7,330,192 | B2 | 2/2008 | Brunner et al. |
| 7,596,761 | B2 | 9/2009 | Lemay et al. |
| 7,614,008 | B2 | 11/2009 | Ording |
| 7,631,278 | B2 | 12/2009 | Miksovsky et al. |
| 7,633,076 | B2 | 12/2009 | Huppi et al. |
| 7,636,897 | B2 | 12/2009 | Koralski et al. |
| 7,649,526 | B2 | 1/2010 | Ording et al. |
| 7,650,569 | B1 | 1/2010 | Allen et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,665,022 | B1 | 2/2010 | Bednarz, Jr. |
| 7,694,231 | B2 | 4/2010 | Kocienda et al. |
| 7,712,051 | B2 | 5/2010 | Chadzelek et al. |
| 7,783,892 | B2 | 8/2010 | Russell et al. |
| 7,810,043 | B2 | 10/2010 | Ostojic et al. |
| 7,814,023 | B1 | 10/2010 | Rao et al. |
| 7,827,483 | B2 | 11/2010 | Unbedacht et al. |
| 7,836,475 | B2 | 11/2010 | Angiolillo et al. |
| 7,844,914 | B2 | 11/2010 | Andre et al. |
| 7,849,487 | B1 | 12/2010 | Vosseller |
| 7,856,605 | B2 | 12/2010 | Ording et al. |
| 7,917,477 | B2 | 3/2011 | Hutson et al. |
| 7,956,846 | B2 | 6/2011 | Ording et al. |
| 7,957,762 | B2 | 6/2011 | Herz et al. |
| 7,970,379 | B2 | 6/2011 | White et al. |
| 8,006,002 | B2 | 8/2011 | Kalayjian et al. |
| 8,026,805 | B1 | 9/2011 | Rowe |
| 8,082,523 | B2 | 12/2011 | Forstall et al. |
| 8,094,132 | B1 | 1/2012 | Frischling et al. |
| 8,115,731 | B2 | 2/2012 | Varanda |
| 8,145,617 | B1 | 3/2012 | Verstak et al. |
| 8,170,931 | B2 | 5/2012 | Ross et al. |
| 8,205,240 | B2 | 6/2012 | Ansari et al. |
| 8,239,784 | B2 | 8/2012 | Hotelling et al. |
| 8,279,180 | B2 | 10/2012 | Hotelling et al. |
| 8,291,452 | B1 | 10/2012 | Yong et al. |
| 8,299,889 | B2 | 10/2012 | Kumar et al. |
| 8,301,484 | B1 | 10/2012 | Kumar |
| 8,312,484 | B1 | 11/2012 | Mccarty et al. |
| 8,312,486 | B1 | 11/2012 | Briggs et al. |
| 8,316,394 | B2 | 11/2012 | Yates |
| 8,325,160 | B2 | 12/2012 | St. Pierre et al. |
| 8,346,798 | B2 | 1/2013 | Spiegelman et al. |
| 8,370,874 | B1 | 2/2013 | Chang et al. |
| 8,381,135 | B2 | 2/2013 | Hotelling et al. |
| 8,386,588 | B1 | 2/2013 | Cooley |
| 8,407,737 | B1 | 3/2013 | Ellis |
| 8,416,217 | B1 | 4/2013 | Eriksson et al. |
| 8,418,202 | B2 | 4/2013 | Ahmad-taylor |
| 8,424,048 | B1 | 4/2013 | Lyren et al. |
| 8,479,122 | B2 | 7/2013 | Hotelling et al. |
| 8,495,499 | B1 | 7/2013 | Denise |
| 8,509,599 | B2 | 8/2013 | Itakura |
| 8,516,063 | B2 | 8/2013 | Fletcher |
| 8,516,525 | B1 | 8/2013 | Jerding et al. |
| 8,560,398 | B1 | 10/2013 | Few et al. |
| 8,584,165 | B1 | 11/2013 | Kane et al. |
| 8,607,163 | B2 | 12/2013 | Plummer |
| 8,607,268 | B2 | 12/2013 | Migos |
| 8,613,015 | B2 | 12/2013 | Gordon et al. |
| 8,613,023 | B2 | 12/2013 | Narahara et al. |
| 8,625,974 | B1 | 1/2014 | Pinson |
| 8,674,958 | B1 | 3/2014 | Kravets et al. |
| 8,683,362 | B2 | 3/2014 | Shiplacoff et al. |
| 8,683,517 | B2 | 3/2014 | Carpenter et al. |
| 8,730,190 | B2 | 5/2014 | Moloney |
| 8,742,885 | B2 | 6/2014 | Brodersen et al. |
| 8,754,862 | B2 | 6/2014 | Zaliva |
| 8,762,852 | B2 | 6/2014 | Davis et al. |
| 8,769,408 | B2 | 7/2014 | Madden et al. |
| 8,782,706 | B2 | 7/2014 | Ellis |
| 8,850,471 | B2 | 9/2014 | Kilar et al. |
| 8,850,490 | B1 | 9/2014 | Thomas et al. |
| 8,869,207 | B1 | 10/2014 | Earle |
| 8,887,202 | B2 | 11/2014 | Hunter et al. |
| 8,930,839 | B2 | 1/2015 | He et al. |
| 8,952,987 | B2 | 2/2015 | Momeyer et al. |
| 8,963,847 | B2 | 2/2015 | Hunt |
| 8,983,950 | B2 | 3/2015 | Askey et al. |
| 8,988,356 | B2 | 3/2015 | Tseng |
| 8,990,857 | B2 | 3/2015 | Yong et al. |
| 9,007,322 | B1 | 4/2015 | Young |
| 9,066,146 | B2 | 6/2015 | Suh et al. |
| 9,081,421 | B1 | 7/2015 | Lai et al. |
| 9,092,057 | B2 | 7/2015 | Varela et al. |
| 9,116,569 | B2 | 8/2015 | Stacy et al. |
| 9,118,967 | B2 | 8/2015 | Sirpal et al. |
| 9,129,656 | B2 | 9/2015 | Prather et al. |
| 9,141,200 | B2 | 9/2015 | Bernstein et al. |
| 9,196,309 | B2 | 11/2015 | Schultz et al. |
| 9,214,290 | B2 | 12/2015 | Xie et al. |
| 9,215,273 | B2 | 12/2015 | Jonnala et al. |
| 9,219,634 | B1 | 12/2015 | Morse et al. |
| 9,235,317 | B2 | 1/2016 | Matas et al. |
| 9,241,121 | B2 | 1/2016 | Rudolph |
| 9,244,600 | B2 | 1/2016 | Mcintosh et al. |
| 9,247,014 | B1 | 1/2016 | Rao |
| 9,247,174 | B2 | 1/2016 | Sirpal et al. |
| 9,285,977 | B1 | 3/2016 | Greenberg et al. |
| 9,319,727 | B2 | 4/2016 | Phipps et al. |
| 9,348,458 | B2 | 5/2016 | Hotelling et al. |
| 9,357,250 | B1 | 5/2016 | Newman et al. |

(56) References Cited

U.S. PATENT DOCUMENTS

| | | | |
|---|---|---|---|
| 9,380,343 B2 | 6/2016 | Webster et al. | |
| 9,414,108 B2 | 8/2016 | Sirpal et al. | |
| 9,454,288 B2 | 9/2016 | Raffle et al. | |
| 9,509,798 B1 | 11/2016 | Thomas et al. | |
| 9,514,476 B2 | 12/2016 | Kay et al. | |
| 9,532,111 B1 | 12/2016 | Christie et al. | |
| 9,538,310 B2 | 1/2017 | Fjeldsoe-nielsen et al. | |
| 9,542,060 B1 | 1/2017 | Brenner et al. | |
| 9,560,399 B2 | 1/2017 | Kaya et al. | |
| 9,575,944 B2 | 2/2017 | Neil et al. | |
| 9,591,339 B1 | 3/2017 | Christie et al. | |
| 9,600,159 B2 | 3/2017 | Lawson et al. | |
| 9,602,566 B1 | 3/2017 | Lewis et al. | |
| 9,639,241 B2 | 5/2017 | Penha et al. | |
| 9,652,118 B2 | 5/2017 | Hill et al. | |
| 9,652,448 B2 | 5/2017 | Pasquero et al. | |
| 9,658,740 B2 | 5/2017 | Chaudhri | |
| 9,774,917 B1 | 9/2017 | Christie et al. | |
| 9,792,018 B2 | 10/2017 | Van Os et al. | |
| 9,807,462 B2 | 10/2017 | Wood | |
| 9,864,508 B2 | 1/2018 | Dixon et al. | |
| 9,864,509 B2 | 1/2018 | Howard et al. | |
| 9,871,905 B1 | 1/2018 | Habiger et al. | |
| 9,913,142 B2 | 3/2018 | Folse et al. | |
| 9,933,937 B2 | 4/2018 | Lemay et al. | |
| 9,940,454 B2 | 4/2018 | Richardson et al. | |
| 9,973,800 B2 | 5/2018 | Yellin et al. | |
| 9,992,025 B2 | 6/2018 | Mahaffey et al. | |
| 10,019,142 B2 | 7/2018 | Van Os et al. | |
| 10,025,499 B2 | 7/2018 | Howard et al. | |
| 10,079,872 B1 * | 9/2018 | Thomas | H04L 67/306 |
| 10,091,558 B2 | 10/2018 | Christie et al. | |
| 10,114,631 B2 | 10/2018 | Shin | |
| 10,116,996 B1 | 10/2018 | Christie et al. | |
| 10,126,904 B2 | 11/2018 | Agnetta et al. | |
| 10,168,871 B2 | 1/2019 | Wallters et al. | |
| 10,200,761 B1 | 2/2019 | Christie et al. | |
| 10,205,985 B2 | 2/2019 | Lue-sang et al. | |
| 10,209,866 B2 | 2/2019 | Johnston et al. | |
| 10,237,599 B1 | 3/2019 | Gravino et al. | |
| 10,275,148 B2 | 4/2019 | Matas et al. | |
| 10,282,088 B2 | 5/2019 | Kim et al. | |
| 10,289,660 B2 | 5/2019 | Karunamuni et al. | |
| 10,303,422 B1 | 5/2019 | Woo et al. | |
| 10,405,015 B2 | 9/2019 | Kite et al. | |
| 10,521,188 B1 | 12/2019 | Christie et al. | |
| 10,551,995 B1 | 2/2020 | Ho et al. | |
| 10,552,470 B2 | 2/2020 | Todd et al. | |
| 10,564,823 B1 | 2/2020 | Dennis et al. | |
| 10,601,808 B1 | 3/2020 | Nijim et al. | |
| 10,606,539 B2 | 3/2020 | Bernstein et al. | |
| 10,616,155 B2 | 4/2020 | Choi et al. | |
| 10,631,042 B2 | 4/2020 | Zerr et al. | |
| 10,650,052 B2 | 5/2020 | Van Os et al. | |
| 10,795,490 B2 | 10/2020 | Chaudhri et al. | |
| 10,827,007 B2 | 11/2020 | Kode et al. | |
| 11,062,358 B1 | 7/2021 | Lewis et al. | |
| 11,461,397 B2 | 10/2022 | Van Os et al. | |
| 11,706,263 B2 | 7/2023 | Warrick et al. | |
| 11,843,838 B2 | 12/2023 | Ellingford et al. | |
| 11,863,837 B2 | 1/2024 | Payne | |
| 11,962,836 B2 | 4/2024 | Domm et al. | |
| 2002/0015024 A1 | 2/2002 | Westerman et al. | |
| 2002/0026637 A1 | 2/2002 | Markel et al. | |
| 2002/0029170 A1 | 3/2002 | Gasser et al. | |
| 2002/0042920 A1 | 4/2002 | Thomas et al. | |
| 2002/0060750 A1 | 5/2002 | Istvan et al. | |
| 2002/0085045 A1 | 7/2002 | Vong et al. | |
| 2002/0100063 A1 | 7/2002 | Herigstad et al. | |
| 2002/0112239 A1 | 8/2002 | Goldman | |
| 2002/0113816 A1 | 8/2002 | Mitchell et al. | |
| 2002/0144269 A1 | 10/2002 | Connelly | |
| 2002/0171686 A1 | 11/2002 | Kamen et al. | |
| 2002/0178446 A1 | 11/2002 | Sie et al. | |
| 2003/0001907 A1 | 1/2003 | Bergsten et al. | |
| 2003/0005445 A1 | 1/2003 | Schein et al. | |
| 2003/0009757 A1 | 1/2003 | Kikinis | |
| 2003/0011641 A1 | 1/2003 | Totman et al. | |
| 2003/0013483 A1 | 1/2003 | Ausems et al. | |
| 2003/0044162 A1 | 3/2003 | Angel | |
| 2003/0088872 A1 | 5/2003 | Maissel et al. | |
| 2003/0093790 A1 | 5/2003 | Logan et al. | |
| 2003/0126600 A1 | 7/2003 | Heuvelman | |
| 2003/0149628 A1 | 8/2003 | Abbosh et al. | |
| 2003/0158950 A1 | 8/2003 | Sako | |
| 2003/0167471 A1 | 9/2003 | Roth et al. | |
| 2003/0177075 A1 | 9/2003 | Burke | |
| 2003/0177498 A1 | 9/2003 | Ellis et al. | |
| 2003/0192060 A1 | 10/2003 | Levy | |
| 2003/0221191 A1 | 11/2003 | Khusheim | |
| 2003/0228130 A1 | 12/2003 | Tanikawa et al. | |
| 2003/0234804 A1 | 12/2003 | Parker et al. | |
| 2004/0019497 A1 | 1/2004 | Volk et al. | |
| 2004/0046801 A1 | 3/2004 | Lin et al. | |
| 2004/0070573 A1 | 4/2004 | Graham | |
| 2004/0088328 A1 | 5/2004 | Cook et al. | |
| 2004/0090463 A1 | 5/2004 | Celik et al. | |
| 2004/0093262 A1 | 5/2004 | Weston et al. | |
| 2004/0133909 A1 | 7/2004 | Ma | |
| 2004/0139401 A1 | 7/2004 | Unbedacht et al. | |
| 2004/0161151 A1 | 8/2004 | Iwayama et al. | |
| 2004/0168184 A1 | 8/2004 | Steenkamp et al. | |
| 2004/0193421 A1 | 9/2004 | Blass | |
| 2004/0252120 A1 | 12/2004 | Hunleth et al. | |
| 2004/0254883 A1 | 12/2004 | Kondrk et al. | |
| 2004/0254958 A1 | 12/2004 | Volk | |
| 2004/0267715 A1 | 12/2004 | Polson et al. | |
| 2004/0268417 A1 | 12/2004 | Gray et al. | |
| 2005/0012599 A1 | 1/2005 | Dematteo | |
| 2005/0024545 A1 | 2/2005 | Borden | |
| 2005/0055710 A1 | 3/2005 | Aoki et al. | |
| 2005/0063670 A1 | 3/2005 | Arai | |
| 2005/0071761 A1 | 3/2005 | Kontio | |
| 2005/0071785 A1 | 3/2005 | Chadzelek et al. | |
| 2005/0076363 A1 | 4/2005 | Dukes et al. | |
| 2005/0091254 A1 | 4/2005 | Stabb et al. | |
| 2005/0091597 A1 | 4/2005 | Ackley | |
| 2005/0134625 A1 | 6/2005 | Kubota | |
| 2005/0162398 A1 | 7/2005 | Eliasson et al. | |
| 2005/0162402 A1 | 7/2005 | Watanachote | |
| 2005/0186988 A1 | 8/2005 | Lim et al. | |
| 2005/0190059 A1 | 9/2005 | Wehrenberg | |
| 2005/0223335 A1 | 10/2005 | Ichikawa | |
| 2005/0235316 A1 | 10/2005 | Ahmad-taylor | |
| 2005/0257166 A1 | 11/2005 | Tu | |
| 2005/0283358 A1 | 12/2005 | Stephanick et al. | |
| 2006/0017692 A1 | 1/2006 | Wehrenberg et al. | |
| 2006/0020904 A1 | 1/2006 | Aaltonen et al. | |
| 2006/0026521 A1 | 2/2006 | Hotelling et al. | |
| 2006/0029374 A1 | 2/2006 | Park | |
| 2006/0031872 A1 | 2/2006 | Hsiao et al. | |
| 2006/0033724 A1 | 2/2006 | Chaudhri et al. | |
| 2006/0053449 A1 | 3/2006 | Gutta | |
| 2006/0053470 A1 | 3/2006 | Colter et al. | |
| 2006/0069998 A1 | 3/2006 | Artman et al. | |
| 2006/0071905 A1 | 4/2006 | Varanda | |
| 2006/0080352 A1 | 4/2006 | Boubez et al. | |
| 2006/0097991 A1 | 5/2006 | Hotelling et al. | |
| 2006/0107304 A1 | 5/2006 | Cleron et al. | |
| 2006/0112346 A1 | 5/2006 | Miksovsky et al. | |
| 2006/0112352 A1 | 5/2006 | Tseng et al. | |
| 2006/0117267 A1 | 6/2006 | Koralski et al. | |
| 2006/0120624 A1 | 6/2006 | Jojic et al. | |
| 2006/0195479 A1 | 8/2006 | Spiegelman et al. | |
| 2006/0195512 A1 | 8/2006 | Rogers et al. | |
| 2006/0197753 A1 | 9/2006 | Hotelling | |
| 2006/0200842 A1 | 9/2006 | Chapman et al. | |
| 2006/0224987 A1 | 10/2006 | Caffarelli | |
| 2006/0236847 A1 | 10/2006 | Withop | |
| 2006/0248113 A1 | 11/2006 | Leffert et al. | |
| 2006/0265637 A1 | 11/2006 | Marriott et al. | |
| 2006/0271968 A1 | 11/2006 | Zellner | |
| 2006/0282856 A1 | 12/2006 | Errico et al. | |
| 2006/0288848 A1 | 12/2006 | Gould et al. | |

(56) References Cited

U.S. PATENT DOCUMENTS

| | | |
|---|---|---|
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0011702 A1 | 1/2007 | Vaysman |
| 2007/0024594 A1 | 2/2007 | Sakata et al. |
| 2007/0028267 A1 | 2/2007 | Ostojic et al. |
| 2007/0038957 A1 | 2/2007 | White |
| 2007/0073596 A1 | 3/2007 | Alexander et al. |
| 2007/0092204 A1 | 4/2007 | Wagner et al. |
| 2007/0094602 A1 | 4/2007 | Murabayashi |
| 2007/0150802 A1 | 6/2007 | Wan et al. |
| 2007/0150918 A1 | 6/2007 | Carpenter et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0168413 A1 | 7/2007 | Barletta et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0220580 A1 | 9/2007 | Putterman et al. |
| 2007/0229465 A1 | 10/2007 | Sakai et al. |
| 2007/0233880 A1 | 10/2007 | Nieh et al. |
| 2007/0244902 A1 | 10/2007 | Seide et al. |
| 2007/0248317 A1 | 10/2007 | Bahn |
| 2008/0046928 A1 | 2/2008 | Poling et al. |
| 2008/0046931 A1 | 2/2008 | Corbett et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0127281 A1 | 5/2008 | Van Flandern et al. |
| 2008/0155475 A1 | 6/2008 | Duhig |
| 2008/0163053 A1 | 7/2008 | Hwang et al. |
| 2008/0189740 A1 | 8/2008 | Carpenter et al. |
| 2008/0189742 A1 | 8/2008 | Ellis et al. |
| 2008/0208844 A1 | 8/2008 | Jenkins |
| 2008/0216020 A1 | 9/2008 | Plummer |
| 2008/0222677 A1 | 9/2008 | Woo et al. |
| 2008/0235331 A1 | 9/2008 | Melamed et al. |
| 2008/0235588 A1 | 9/2008 | Gonze et al. |
| 2008/0243817 A1 | 10/2008 | Chan et al. |
| 2008/0250312 A1 | 10/2008 | Curtis |
| 2008/0260252 A1 | 10/2008 | Borgaonkar et al. |
| 2008/0270886 A1 | 10/2008 | Gossweiler et al. |
| 2008/0276278 A1 | 11/2008 | Krieger et al. |
| 2008/0276279 A1 | 11/2008 | Gossweiler et al. |
| 2008/0301260 A1 | 12/2008 | Goldeen et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0055873 A1 | 2/2009 | Kim et al. |
| 2009/0063521 A1 | 3/2009 | Bull et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0106110 A1 | 4/2009 | Stannard et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0164944 A1 | 6/2009 | Webster et al. |
| 2009/0165054 A1 | 6/2009 | Rudolph |
| 2009/0174679 A1 | 7/2009 | Westerman |
| 2009/0177301 A1 | 7/2009 | Hayes |
| 2009/0177989 A1 | 7/2009 | Ma et al. |
| 2009/0178083 A1 | 7/2009 | Carr et al. |
| 2009/0228491 A1 | 9/2009 | Malik |
| 2009/0228807 A1 | 9/2009 | Lemay |
| 2009/0228919 A1 | 9/2009 | Zott et al. |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0278916 A1 | 11/2009 | Ito |
| 2009/0282444 A1 | 11/2009 | Laksono et al. |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0003007 A1 | 1/2010 | Itakura |
| 2010/0009629 A1 | 1/2010 | Jung et al. |
| 2010/0009719 A1 | 1/2010 | Oh et al. |
| 2010/0017713 A1 | 1/2010 | Igarashi |
| 2010/0031162 A1 | 2/2010 | Wiser et al. |
| 2010/0046608 A1 | 2/2010 | Mccrossan et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1 | 4/2010 | Matsushima et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115060 A1 | 5/2010 | Julia et al. |
| 2010/0115592 A1 | 5/2010 | Belz et al. |
| 2010/0121714 A1 | 5/2010 | Bryant et al. |
| 2010/0146422 A1 | 6/2010 | Seong et al. |
| 2010/0146442 A1 | 6/2010 | Nagasaka et al. |
| 2010/0153881 A1 | 6/2010 | Dinn |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0175079 A1 | 7/2010 | Braun et al. |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0211884 A1 | 8/2010 | Kashyap et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0257005 A1 | 10/2010 | Phenner et al. |
| 2010/0269145 A1 | 10/2010 | Ingrassia et al. |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0299606 A1 | 11/2010 | Morita |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0033168 A1 | 2/2011 | Iyer |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055762 A1 | 3/2011 | Jung et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0099519 A1 | 4/2011 | Ma et al. |
| 2011/0107220 A1 | 5/2011 | Perlman |
| 2011/0119710 A1 | 5/2011 | Jang et al. |
| 2011/0119715 A1 | 5/2011 | Chang et al. |
| 2011/0122315 A1 | 5/2011 | Schweiger et al. |
| 2011/0126102 A1 | 5/2011 | Archer |
| 2011/0131607 A1 | 6/2011 | Thomas et al. |
| 2011/0154194 A1 | 6/2011 | Mathai et al. |
| 2011/0154305 A1 | 6/2011 | Leroux et al. |

(56) References Cited

U.S. PATENT DOCUMENTS

| | | |
|---|---|---|
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0255840 A1 | 10/2011 | Bornsen |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0314497 A1 | 12/2011 | Warrick et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054679 A1 | 3/2012 | Ma et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler, III |
| 2012/0114303 A1 | 5/2012 | Chung et al. |
| 2012/0117584 A1 | 5/2012 | Gordon |
| 2012/0124615 A1 | 5/2012 | Lee |
| 2012/0131615 A1 | 5/2012 | Kobayashi et al. |
| 2012/0139938 A1 | 6/2012 | Khedouri et al. |
| 2012/0141095 A1 | 6/2012 | Schwesinger et al. |
| 2012/0144003 A1 | 6/2012 | Rosenbaum et al. |
| 2012/0158524 A1 | 6/2012 | Hintz et al. |
| 2012/0159543 A1 | 6/2012 | Jin et al. |
| 2012/0166998 A1 | 6/2012 | Cotterill et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0007656 A1 | 1/2013 | Li et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0076681 A1 | 3/2013 | Sirpal et al. |
| 2013/0080968 A1 | 3/2013 | Hanson et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0254308 A1 | 9/2013 | Rose et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283301 A1 | 10/2013 | Avedissian et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332871 A1 | 12/2013 | Bucur et al. |
| 2013/0332960 A1 | 12/2013 | Young et al. |
| 2013/0339877 A1 | 12/2013 | Skeen et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |

(56) References Cited

U.S. PATENT DOCUMENTS

| | | |
|---|---|---|
| 2014/0024341 A1 | 1/2014 | Johan |
| 2014/0028780 A1 | 1/2014 | Croen et al. |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0067425 A1 | 3/2014 | Dudar et al. |
| 2014/0068654 A1 | 3/2014 | Marlow et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0082660 A1 | 3/2014 | Zhang et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0101706 A1 | 4/2014 | Kardatzke |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137029 A1 | 5/2014 | Stephenson et al. |
| 2014/0137030 A1 | 5/2014 | Matas |
| 2014/0143260 A1 | 5/2014 | Simonson et al. |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0157329 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172622 A1 | 6/2014 | Baronshin |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0196069 A1 | 7/2014 | Ahmed et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0253803 A1 | 9/2014 | Jiang |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0280728 A1 | 9/2014 | Szerlip Joyce et al. |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0288686 A1 | 9/2014 | Sant et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0317653 A1 | 10/2014 | Mlodzinski |
| 2014/0325357 A1 | 10/2014 | Sant et al. |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0364056 A1 | 12/2014 | Belk et al. |
| 2014/0365479 A1 | 12/2014 | Lyons et al. |
| 2014/0365481 A1 | 12/2014 | Novosel et al. |
| 2014/0365604 A1 | 12/2014 | Lewis et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0039685 A1 | 2/2015 | Lewis et al. |
| 2015/0046866 A1 | 2/2015 | Shimadate |
| 2015/0067582 A1 | 3/2015 | Donnelly et al. |
| 2015/0067724 A1 | 3/2015 | Johnson et al. |
| 2015/0074522 A1 | 3/2015 | Harned et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1 | 4/2015 | Chun et al. |
| 2015/0106856 A1 | 4/2015 | Rankine |
| 2015/0113000 A1 | 4/2015 | Scheer et al. |
| 2015/0113429 A1 | 4/2015 | Edwards et al. |
| 2015/0121408 A1 | 4/2015 | Jacoby et al. |
| 2015/0134653 A1 | 5/2015 | Bayer et al. |
| 2015/0135049 A1 | 5/2015 | Murphy |
| 2015/0135071 A1 | 5/2015 | Glotzer |
| 2015/0150049 A1 | 5/2015 | White |
| 2015/0150066 A1 | 5/2015 | Park et al. |
| 2015/0153571 A1 | 6/2015 | Ballard et al. |
| 2015/0154151 A1 | 6/2015 | Xue et al. |
| 2015/0161251 A1 | 6/2015 | Ramanarayanan et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0193119 A1 | 7/2015 | Chai et al. |
| 2015/0193192 A1 | 7/2015 | Kidron |
| 2015/0195624 A1 | 7/2015 | Gossweiler, III |
| 2015/0205591 A1 | 7/2015 | Jitkoff et al. |
| 2015/0237389 A1 | 8/2015 | Grouf et al. |
| 2015/0296072 A1 | 10/2015 | Zhou et al. |
| 2015/0301729 A1 | 10/2015 | Wang et al. |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0318020 A1 | 11/2015 | Pribula |
| 2015/0331685 A1 | 11/2015 | Bourke |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365306 A1 | 12/2015 | Chaudhri et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0373107 A1 | 12/2015 | Chan et al. |
| 2015/0379021 A1 | 12/2015 | Kuper |
| 2015/0382047 A1 | 12/2015 | Van Os et al. |
| 2015/0382066 A1 | 12/2015 | Heeter et al. |
| 2016/0004425 A1 | 1/2016 | Yoon et al. |
| 2016/0004772 A1 | 1/2016 | Kim et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0021412 A1 | 1/2016 | Zito, Jr. |
| 2016/0035119 A1 | 2/2016 | Lee et al. |
| 2016/0036897 A1 | 2/2016 | Kim et al. |

(56) References Cited

U.S. PATENT DOCUMENTS

| | | |
|---|---|---|
| 2016/0041702 A1 | 2/2016 | Wang |
| 2016/0043962 A1 | 2/2016 | Kim et al. |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078465 A1 | 3/2016 | Chai et al. |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0096113 A1 | 4/2016 | Decoufle |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |
| 2016/0357305 A1 | 12/2016 | Wells et al. |
| 2016/0357352 A1 | 12/2016 | Matas et al. |
| 2016/0357355 A1 | 12/2016 | Carrigan et al. |
| 2016/0357366 A1 | 12/2016 | Migos et al. |
| 2016/0370982 A1 | 12/2016 | Penha et al. |
| 2016/0378283 A1 | 12/2016 | Cockcroft et al. |
| 2017/0010846 A1 | 1/2017 | Bernstein et al. |
| 2017/0010847 A1 | 1/2017 | Bernstein et al. |
| 2017/0013295 A1* | 1/2017 | Wertheimer ....... H04N 21/2393 |
| 2017/0046039 A1 | 2/2017 | Karunamuni et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0070786 A1 | 3/2017 | Keene et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0140748 A1 | 5/2017 | Roberts et al. |
| 2017/0185240 A1 | 6/2017 | Delrosario et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0220228 A1 | 8/2017 | Sang et al. |
| 2017/0242913 A1 | 8/2017 | Tijssen et al. |
| 2017/0243244 A1 | 8/2017 | Trabelsi et al. |
| 2017/0245017 A1 | 8/2017 | Chaudhri et al. |
| 2017/0251257 A1 | 8/2017 | Obrien |
| 2017/0272543 A1* | 9/2017 | Lo .................... H04N 21/41407 |
| 2017/0300151 A1 | 10/2017 | Lue-sang et al. |
| 2017/0339443 A1 | 11/2017 | Lue-sang et al. |
| 2017/0344553 A1 | 11/2017 | Evnine et al. |
| 2017/0345040 A1 | 11/2017 | Pirnack et al. |
| 2017/0353603 A1 | 12/2017 | Grunewald et al. |
| 2017/0357387 A1* | 12/2017 | Clarke ................. H04N 21/482 |
| 2017/0359722 A1 | 12/2017 | Folse et al. |
| 2017/0364246 A1 | 12/2017 | Van Os et al. |
| 2017/0364274 A1 | 12/2017 | Hammons et al. |
| 2018/0011580 A1 | 1/2018 | Lebowitz et al. |
| 2018/0027279 A1 | 1/2018 | Templeman |
| 2018/0041814 A1 | 2/2018 | Christie et al. |
| 2018/0053094 A1 | 2/2018 | Patel et al. |
| 2018/0063591 A1 | 3/2018 | Newman et al. |
| 2018/0070121 A1* | 3/2018 | Zimmerman ...... H04N 21/4312 |
| 2018/0070138 A1 | 3/2018 | Chai et al. |
| 2018/0107353 A1 | 4/2018 | Lee |
| 2018/0113579 A1 | 4/2018 | Johnston et al. |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293210 A1 | 10/2018 | Xue et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0349509 A1 | 12/2018 | Abou Mahmoud et al. |
| 2018/0364872 A1 | 12/2018 | Miura et al. |
| 2018/0367834 A1 | 12/2018 | Carpenter et al. |
| 2018/0367863 A1 | 12/2018 | Newman et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0052744 A1 | 2/2019 | Jung et al. |
| 2019/0058921 A1 | 2/2019 | Christie et al. |
| 2019/0066672 A1 | 2/2019 | Wood et al. |
| 2019/0073104 A1 | 3/2019 | Wang |
| 2019/0073680 A1 | 3/2019 | Knox |
| 2019/0129588 A1 | 5/2019 | Johnston et al. |
| 2019/0138163 A1 | 5/2019 | Howland et al. |
| 2019/0141399 A1 | 5/2019 | Auxer et al. |
| 2019/0258373 A1 | 8/2019 | Davydov et al. |
| 2019/0272853 A1 | 9/2019 | Moore |
| 2019/0324614 A1 | 10/2019 | Brillon et al. |
| 2019/0342616 A1 | 11/2019 | Domm et al. |
| 2019/0354264 A1 | 11/2019 | Van Os et al. |
| 2019/0373320 A1 | 12/2019 | Balsamo |
| 2020/0034792 A1 | 1/2020 | Rogers et al. |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0137175 A1 | 4/2020 | Ganci et al. |
| 2020/0145726 A1 | 5/2020 | Ciuca et al. |
| 2020/0213642 A1 | 7/2020 | Bartos et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0344531 A1 | 10/2020 | Soundararajan et al. |
| 2020/0356160 A1 | 11/2020 | Kosugi et al. |
| 2020/0363934 A1 | 11/2020 | Van Os et al. |
| 2020/0374595 A1 | 11/2020 | Yang et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0092489 A1 | 3/2021 | Dutta et al. |
| 2021/0168424 A1 | 6/2021 | Sharma |
| 2021/0181901 A1 | 6/2021 | Johnston et al. |
| 2021/0195277 A1 | 6/2021 | Thurlow et al. |
| 2021/0286454 A1 | 9/2021 | Beaumier et al. |
| 2021/0306711 A1 | 9/2021 | Ellingford et al. |
| 2021/0337280 A1 | 10/2021 | Diaz Delgado et al. |
| 2021/0345004 A1 | 11/2021 | Christie et al. |
| 2021/0365134 A1 | 11/2021 | Beaumier et al. |
| 2021/0397306 A1 | 12/2021 | Rajam et al. |
| 2021/0406995 A1 | 12/2021 | Peters et al. |
| 2021/0409822 A1 | 12/2021 | Aher et al. |
| 2022/0057984 A1 | 2/2022 | Yang et al. |
| 2022/0132215 A1 | 4/2022 | Venugopal et al. |
| 2022/0179526 A1 | 6/2022 | Schöberl |
| 2022/0244824 A1 | 8/2022 | Cielak |
| 2022/0321940 A1 | 10/2022 | Christie et al. |

(56)                References Cited

U.S. PATENT DOCUMENTS

| | | | |
|---|---|---|---|
| 2022/0329891 A1 | 10/2022 | Christie et al. |
| 2022/0337914 A1 | 10/2022 | Christie et al. |
| 2022/0360858 A1 | 11/2022 | Christie et al. |
| 2022/0413796 A1 | 12/2022 | Christie et al. |
| 2023/0022781 A1 | 1/2023 | Lindholm et al. |
| 2023/0033604 A1 | 2/2023 | Diaz Delgado et al. |
| 2023/0096458 A1 | 3/2023 | Van Os et al. |
| 2023/0127228 A1 | 4/2023 | Clarke |
| 2023/0132595 A1 | 5/2023 | Van Os et al. |
| 2023/0300415 A1 | 9/2023 | Balsamo |
| 2024/0037144 A1 | 2/2024 | Chen |
| 2024/0089550 A1 | 3/2024 | Ellingford et al. |
| 2024/0089553 A1 | 3/2024 | Payne |
| 2024/0126401 A1 | 4/2024 | Rajam et al. |
| 2024/0220195 A1 | 7/2024 | Christie et al. |
| 2024/0267583 A1 | 8/2024 | Domm et al. |
| 2024/0302952 A1 | 9/2024 | Wood et al. |
| 2024/0323473 A1 | 9/2024 | Newman et al. |
| 2024/0388761 A1 | 11/2024 | Christie et al. |
| 2024/0402899 A1 | 12/2024 | Sart et al. |
| 2024/0419736 A1 | 12/2024 | Van Os et al. |
| 2024/0422394 A1 | 12/2024 | Keighran et al. |
| 2025/0021218 A1 | 1/2025 | Os et al. |
| 2025/0138725 A1 | 5/2025 | Lindholm |
| 2025/0142175 A1 | 5/2025 | Christie et al. |
| 2025/0147722 A1 | 5/2025 | Christie et al. |
| 2025/0150659 A1 | 5/2025 | Christie et al. |
| 2025/0156036 A1 | 5/2025 | Johnston et al. |
| 2025/0156051 A1 | 5/2025 | Van Os et al. |
| 2025/0159298 A1 | 5/2025 | Keighran et al. |
| 2025/0165534 A1 | 5/2025 | Van Os et al. |
| 2025/0168443 A1 | 5/2025 | Christie et al. |
| 2025/0168460 A1 | 5/2025 | Christie et al. |
| 2025/0168461 A1 | 5/2025 | Christie et al. |
| 2025/0217009 A1 | 7/2025 | Clarke |

FOREIGN PATENT DOCUMENTS

| | | | |
|---|---|---|---|
| AU | 2017101431 A4 | 11/2017 |
| AU | 2018100810 A4 | 7/2018 |
| CN | 1295419 A | 5/2001 |
| CN | 1391765 A | 1/2003 |
| CN | 1985277 A | 6/2007 |
| CN | 1985327 A | 6/2007 |
| CN | 101160932 A | 4/2008 |
| CN | 101228570 A | 7/2008 |
| CN | 101317149 A | 12/2008 |
| CN | 101370104 A | 2/2009 |
| CN | 101405679 A | 4/2009 |
| CN | 101436110 A | 5/2009 |
| CN | 101465993 A | 6/2009 |
| CN | 101529437 A | 9/2009 |
| CN | 101641662 A | 2/2010 |
| CN | 101699505 A | 4/2010 |
| CN | 101706704 A | 5/2010 |
| CN | 101719125 A | 6/2010 |
| CN | 101860447 A | 10/2010 |
| CN | 102098537 A | 6/2011 |
| CN | 102103460 A | 6/2011 |
| CN | 102187338 A | 9/2011 |
| CN | 102265586 A | 11/2011 |
| CN | 102325144 A | 1/2012 |
| CN | 102541419 A | 7/2012 |
| CN | 102819715 A | 12/2012 |
| CN | 102859484 A | 1/2013 |
| CN | 102880404 A | 1/2013 |
| CN | 102890615 A | 1/2013 |
| CN | 102939515 A | 2/2013 |
| CN | 102955653 A | 3/2013 |
| CN | 102981695 A | 3/2013 |
| CN | 103037265 A | 4/2013 |
| CN | 103177738 A | 6/2013 |
| CN | 103399967 A | 11/2013 |
| CN | 103516933 A | 1/2014 |
| CN | 103546816 A | 1/2014 |
| CN | 103562848 A | 2/2014 |
| CN | 103562947 A | 2/2014 |
| CN | 103620531 A | 3/2014 |
| CN | 103620541 A | 3/2014 |
| CN | 103620639 A | 3/2014 |
| CN | 103686418 A | 3/2014 |
| CN | 103985045 A | 8/2014 |
| CN | 103999017 A | 8/2014 |
| CN | 104508618 A | 4/2015 |
| CN | 104822098 A | 8/2015 |
| CN | 105190590 A | 12/2015 |
| CN | 105247526 A | 1/2016 |
| CN | 105264479 A | 1/2016 |
| CN | 105303372 A | 2/2016 |
| CN | 105308634 A | 2/2016 |
| CN | 105308923 A | 2/2016 |
| CN | 105336350 A | 2/2016 |
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| CN | 107710131 A | 2/2018 |
| CN | 108292190 A | 7/2018 |
| CN | 109313491 A | 2/2019 |
| CN | 109313651 A | 2/2019 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2679017 A2 | 1/2014 |
| EP | 2704032 A2 | 3/2014 |
| EP | 2725531 A1 | 4/2014 |
| EP | 2879398 A1 | 6/2015 |
| EP | 2947905 A1 | 11/2015 |
| JP | 2000112977 A | 4/2000 |
| JP | 2000-163031 A | 6/2000 |
| JP | 2001197445 A | 7/2001 |
| JP | 2002027381 A | 1/2002 |
| JP | 2002-342033 A | 11/2002 |
| JP | 2003099452 A | 4/2003 |
| JP | 2003534737 A | 11/2003 |
| JP | 2004062237 A | 2/2004 |
| JP | 2006031219 A | 2/2006 |
| JP | 2007-124465 A | 5/2007 |
| JP | 2007512640 A | 5/2007 |
| JP | 2007140910 A | 6/2007 |
| JP | 2007294068 A | 11/2007 |
| JP | 2008071112 A | 3/2008 |
| JP | 2008135911 A | 6/2008 |
| JP | 2009060328 A | 3/2009 |
| JP | 2009-206957 A | 9/2009 |
| JP | 2009-276557 A | 11/2009 |
| JP | 2009260947 A | 11/2009 |
| JP | 2010028437 A | 2/2010 |
| JP | 2010056595 A | 3/2010 |
| JP | 2010509684 A | 3/2010 |
| JP | 2010114733 A | 5/2010 |
| JP | 2011-076588 A | 4/2011 |
| JP | 2011-512701 A | 4/2011 |
| JP | 2011-123750 A | 6/2011 |
| JP | 2011154455 A | 8/2011 |
| JP | 2011-182146 A | 9/2011 |
| JP | 2011205562 A | 10/2011 |
| JP | 2011257930 A | 12/2011 |
| JP | 2012-95123 A | 5/2012 |
| JP | 2012123685 A | 6/2012 |
| JP | 2012208622 A | 10/2012 |
| JP | 2013-12021 A | 1/2013 |
| JP | 2013008369 A | 1/2013 |

(56)  References Cited

FOREIGN PATENT DOCUMENTS

| | | | |
|---|---|---|---|
| JP | 2013223150 A | 10/2013 |
| JP | 2013-235523 A | 11/2013 |
| JP | 2013-242610 A | 12/2013 |
| JP | 2014081740 A | 5/2014 |
| JP | 2014102660 A | 6/2014 |
| JP | 2015050655 A | 3/2015 |
| JP | 2015-70404 A | 4/2015 |
| KR | 20010005939 A | 1/2001 |
| KR | 20010035356 A | 5/2001 |
| KR | 10-2002-0010151 A | 2/2002 |
| KR | 10-2007-0114329 A | 12/2007 |
| KR | 20090106104 A | 10/2009 |
| KR | 20100039194 A | 4/2010 |
| KR | 20110036408 A | 4/2011 |
| KR | 20110061811 A | 6/2011 |
| KR | 20120076682 A | 7/2012 |
| KR | 20120124445 A | 11/2012 |
| KR | 10-2013-0014712 A | 2/2013 |
| KR | 20130058034 A | 6/2013 |
| KR | 20130137969 A | 12/2013 |
| KR | 20140041939 A | 4/2014 |
| KR | 10-2019-0033658 A | 3/2019 |
| KR | 10-2022-0041231 A | 3/2022 |
| TW | 200622893 A | 7/2006 |
| TW | 200719204 A | 5/2007 |
| TW | 201337717 A | 9/2013 |
| TW | 201349049 A | 12/2013 |
| TW | 201351261 A | 12/2013 |
| WO | 9409438 A2 | 4/1994 |
| WO | 9940728 A1 | 8/1999 |
| WO | 2004/063862 A2 | 7/2004 |
| WO | 2004/102285 A2 | 11/2004 |
| WO | 2005050652 A1 | 6/2005 |
| WO | 2005/109345 A1 | 11/2005 |
| WO | 2007/078623 A2 | 7/2007 |
| WO | 2008005135 A1 | 1/2008 |
| WO | 2008060486 A2 | 5/2008 |
| WO | 2009016607 A2 | 2/2009 |
| WO | 2009/039786 A1 | 4/2009 |
| WO | 2009148781 A1 | 12/2009 |
| WO | 2010/025168 A1 | 3/2010 |
| WO | 2010022570 A1 | 3/2010 |
| WO | 2010/118690 A1 | 10/2010 |
| WO | 2011095693 A1 | 8/2011 |
| WO | 2011/158475 A1 | 12/2011 |
| WO | 2012012446 A2 | 1/2012 |
| WO | 2012061760 A2 | 5/2012 |
| WO | 2012/088665 A1 | 7/2012 |
| WO | 2013000741 A1 | 1/2013 |
| WO | 2013149128 A2 | 10/2013 |
| WO | 2013169849 A2 | 11/2013 |
| WO | 2013169877 A2 | 11/2013 |
| WO | 2013/187370 A1 | 12/2013 |
| WO | 2013149128 A3 | 2/2014 |
| WO | 2014105276 A1 | 7/2014 |
| WO | 2014144908 A1 | 9/2014 |
| WO | 2014177929 A2 | 11/2014 |
| WO | 2014200730 A1 | 12/2014 |
| WO | 2015/200227 A1 | 12/2015 |
| WO | 2015200228 A1 | 12/2015 |
| WO | 2015200537 A2 | 12/2015 |
| WO | 2016/030437 A1 | 3/2016 |
| WO | 2016048308 A1 | 3/2016 |
| WO | 2016048310 A1 | 3/2016 |
| WO | 2016111065 A1 | 7/2016 |
| WO | 2017008079 A1 | 1/2017 |
| WO | 2017124116 A1 | 7/2017 |
| WO | 2017200923 A1 | 11/2017 |
| WO | 2017218104 A1 | 12/2017 |
| WO | 2018081157 A1 | 5/2018 |

OTHER PUBLICATIONS

Final Office Action received for U.S. Appl. No. 15/167,801, mailed on Sep. 19, 2023, 19 pages.

Final Office Action received for U.S. Appl. No. 17/379,785, mailed on Aug. 23, 2023, 13 pages.

Final Office Action received for U.S. Appl. No. 17/937,410, mailed on Aug. 3, 2023, 15 pages.

Final Office Action received for U.S. Appl. No. 17/937,704, mailed on Aug. 31, 2023, 18 pages.

Final Office Action received for U.S. Appl. No. 18/060,902, mailed on Aug. 25, 2023, 8 pages.

Non-Final Office Action received for U.S. Appl. No. 18/146,336, mailed on Aug. 3, 2023, 23 pages.

Notice of Allowance received for U.S. Appl. No. 16/827,910, mailed on Aug. 3, 2023, 21 pages.

Notice of Allowance received for U.S. Appl. No. 16/827,926, mailed on Sep. 13, 2023, 9 pages.

Notice of Allowance received for U.S. Appl. No. 16/888,478, mailed on Aug. 2, 2023, 9 pages.

Notice of Allowance received for U.S. Appl. No. 17/353,527, mailed on Oct. 4, 2023, 7 pages.

Notice of Allowance received for U.S. Appl. No. 17/651,731, mailed on Oct. 3, 2023, 5 pages.

Search Report received for Chinese Patent Application No. 202010011436.6 mailed on Aug. 30, 2023, 4 pages (2 pages of English Translation and 2 pages of Official Copy).

Search Report received for Chinese Patent Application No. 202210799020.4, mailed on Jul. 27, 2023, 5 pages (1 page of English Translation and 4 pages of Official Copy).

Cai, Chongshan, "Analysis of Copyright Infringement Problems of Video Aggregation App", China Copyright, vol. 02, Apr. 15, 2015.

Advisory Action received for U.S. Appl. No. 14/208,963, mailed on Feb. 17, 2017, 3 pages.

Advisory Action received for U.S. Appl. No. 15/167,801, mailed on Feb. 16, 2018, 4 pages.

Applicant Initiated Interview Summary received for U.S. Appl. No. 15/167,801, mailed on Apr. 23, 2018, 3 pages.

Applicant Initiated Interview Summary received for U.S. Appl. No. 15/167,801, mailed on Jul. 29, 2019, 3 pages.

Applicant Initiated Interview Summary received for U.S. Appl. No. 17/210,352, mailed on Feb. 28, 2022, 4 pages.

Corrected Notice of Allowability received for U.S. Appl. No. 16/108,519, mailed on Dec. 22, 2021, 3 pages.

Corrected Notice of Allowance received for U.S. Appl. No. 14/242,575, mailed on Dec. 15, 2016, 7 pages.

Corrected Notice of Allowance received for U.S. Appl. No. 14/242,575, mailed on Nov. 16, 2016, 7 pages.

Corrected Notice of Allowance received for U.S. Appl. No. 14/255,664, mailed on Aug. 29, 2017, 4 pages.

Corrected Notice of Allowance received for U.S. Appl. No. 14/267,671, mailed on Nov. 29, 2018, 3 pages.

Corrected Notice of Allowance received for U.S. Appl. No. 14/749,288, mailed on Sep. 21, 2017, 5 pages.

Corrected Notice of Allowance received for U.S. Appl. No. 15/276,633, mailed on Sep. 10, 2019, 7 pages.

Corrected Notice of Allowance received for U.S. Appl. No. 15/695,880, mailed on Jun. 11, 2018, 6 pages.

Corrected Notice of Allowance received for U.S. Appl. No. 15/714,904, mailed on Sep. 7, 2018, 5 pages.

Corrected Notice of Allowance received for U.S. Appl. No. 15/876,715, mailed on Apr. 11, 2022, 4 Pages.

Corrected Notice of Allowance received for U.S. Appl. No. 15/876,715, mailed on Apr. 19, 2022, 4 Pages.

Corrected Notice of Allowance received for U.S. Appl. No. 15/876,715, mailed on Oct. 20, 2021, 2 pages.

Corrected Notice of Allowance received for U.S. Appl. No. 16/010,280, mailed on Aug. 6, 2019, 2 pages.

Corrected Notice of Allowance received for U.S. Appl. No. 16/036,810, mailed on Nov. 19, 2018, 6 pages.

Corrected Notice of Allowance received for U.S. Appl. No. 16/142,635, mailed on Mar. 10, 2022, 2 Pages.

Corrected Notice of Allowance received for U.S. Appl. No. 16/233,990, mailed on Mar. 8, 2022, 4 pages.

(56) References Cited

OTHER PUBLICATIONS

Corrected Notice of Allowance received for U.S. Appl. No. 16/233,990, mailed on Oct. 20, 2022, 2 pages.
Corrected Notice of Allowance received for U.S. Appl. No. 16/827,931, mailed on Dec. 6, 2021, 4 pages.
Corrected Notice of Allowance received for U.S. Appl. No. 16/872,274, mailed on Aug. 12, 2022, 5 pages.
Corrected Notice of Allowance received for U.S. Appl. No. 16/945,724, mailed on Aug. 31, 2022, 2 pages.
Corrected Notice of Allowance received for U.S. Appl. No. 17/000,112, mailed on Jun. 17, 2022, 2 pages.
Corrected Notice of Allowance received for U.S. Appl. No. 17/065,387, mailed on Mar. 30, 2022, 2 Pages.
Cover Flow, Wikipedia, Available online at: <https://en.wikipedia.org/w/index.php?title=Cover_Flow&oldid=879285208>, Jan. 20, 2019, 3 pages.
Examiner Initiated Interview Summary received for U.S. Appl. No. 15/390,377, mailed on Oct. 30, 2017, 2 pages.
Examiner's Answer to Appeal Brief received for U.S. Appl. No. 15/876,715, mailed on Aug. 18, 2020, 16 pages.
Extended European Search Report received for European Patent Application No. 17813728.7, mailed on Feb. 11, 2019, 8 pages.
Extended European Search Report received for European Patent Application No. 20190698.9, mailed on Oct. 30, 2020, 6 pages.
Extended European Search Report received for European Patent Application No. 20199219.5, mailed on Apr. 22, 2021, 8 pages.
Extended European Search Report received for European Patent Application No. 22167405.4, mailed on Jul. 4, 2022, 11 Pages.
Final Office Action received for U.S. Appl. No. 14/208,963, mailed on Aug. 13, 2015, 16 pages.
Final Office Action received for U.S. Appl. No. 14/208,963, mailed on Aug. 18, 2016, 17 pages.
Final Office Action received for U.S. Appl. No. 14/255,664, mailed on Oct. 17, 2016, 16 pages.
Final Office Action received for U.S. Appl. No. 14/267,671, mailed on May 23, 2018, 17 pages.
Final Office Action received for U.S. Appl. No. 14/267,671, mailed on Oct. 26, 2016, 21 pages.
Final Office Action received for U.S. Appl. No. 14/271,179, mailed on Dec. 15, 2016, 10 pages.
Final Office Action received for U.S. Appl. No. 14/271,179, mailed on Jun. 20, 2019, 15 pages.
Final Office Action received for U.S. Appl. No. 14/271,179, mailed on Jun. 21, 2018, 14 pages.
Final Office Action received for U.S. Appl. No. 14/746,095, mailed on Jul. 16, 2018, 33 pages.
Final Office Action received for U.S. Appl. No. 14/746,662, mailed on Apr. 24, 2017, 8 pages.
Final Office Action received for U.S. Appl. No. 14/746,662, mailed on Jun. 27, 2017, 9 pages.
Final Office Action received for U.S. Appl. No. 15/167,801, mailed on Apr. 5, 2019, 18 pages.
Final Office Action received for U.S. Appl. No. 15/167,801, mailed on May 28, 2020, 17 pages.
Final Office Action received for U.S. Appl. No. 15/167,801, mailed on Nov. 29, 2017, 12 pages.
Final Office Action received for U.S. Appl. No. 15/235,000, mailed on Dec. 19, 2018, 33 pages.
Final Office Action received for U.S. Appl. No. 15/235,000, mailed on Mar. 13, 2018, 31 pages.
Final Office Action received for U.S. Appl. No. 15/272,393, mailed on Mar. 25, 2019, 54 pages.
Final Office Action received for U.S. Appl. No. 15/272,397, mailed on Mar. 7, 2017, 23 pages.
Final Office Action received for U.S. Appl. No. 15/276,633, mailed on Jul. 26, 2017, 15 pages.
Final Office Action received for U.S. Appl. No. 15/276,633, mailed on Oct. 29, 2018, 12 pages.
Final Office Action received for U.S. Appl. No. 15/390,377, mailed on Nov. 9, 2017, 18 pages.

Final Office Action received for U.S. Appl. No. 15/507,229, mailed on Jul. 15, 2020, 20 pages.
Final Office Action received for U.S. Appl. No. 15/507,229, mailed on Sep. 18, 2019, 15 pages.
Final Office Action received for U.S. Appl. No. 15/719,404, mailed on Aug. 8, 2019, 19 pages.
Final Office Action received for U.S. Appl. No. 15/719,404, mailed on Mar. 30, 2021, 19 pages.
Final Office Action received for U.S. Appl. No. 15/876,715, mailed on Nov. 5, 2018, 15 pages.
Final Office Action received for U.S. Appl. No. 15/943,316, mailed on Apr. 27, 2020, 19 pages.
Final Office Action received for U.S. Appl. No. 15/943,316, mailed on Mar. 6, 2019, 8 pages.
Final Office Action received for U.S. Appl. No. 16/108,519, mailed on Dec. 12, 2019, 10 pages.
Final Office Action received for U.S. Appl. No. 16/108,519, mailed on Nov. 25, 2020, 12 pages.
Final Office Action received for U.S. Appl. No. 16/126,962, mailed on Apr. 8, 2020, 20 pages.
Final Office Action received for U.S. Appl. No. 16/136,005, mailed on Mar. 9, 2020, 9 pages.
Final Office Action received for U.S. Appl. No. 16/142,635, mailed on Feb. 3, 2021, 23 pages.
Final Office Action received for U.S. Appl. No. 16/144,077, mailed on Jul. 12, 2019, 22 pages.
Final Office Action received for U.S. Appl. No. 16/175,565, mailed on May 27, 2022, 33 pages.
Final Office Action received for U.S. Appl. No. 16/175,565, mailed on Nov. 12, 2020, 40 pages.
Final Office Action received for U.S. Appl. No. 16/233,990, mailed on Jan. 11, 2021, 17 pages.
Final Office Action received for U.S. Appl. No. 16/584,790, mailed on Jun. 14, 2022, 37 pages.
Final Office Action received for U.S. Appl. No. 16/584,790, mailed on Jun. 15, 2021, 30 pages.
Final Office Action received for U.S. Appl. No. 16/584,790, mailed on May 27, 2020, 27 pages.
Final Office Action received for U.S. Appl. No. 16/682,443, mailed on Mar. 9, 2021, 9 pages.
Final Office Action received for U.S. Appl. No. 16/697,090, mailed on Feb. 23, 2022, 25 pages.
Final Office Action received for U.S. Appl. No. 16/697,090, mailed on Jan. 27, 2021, 18 pages.
Final Office Action received for U.S. Appl. No. 16/827,910, mailed on Feb. 28, 2022, 17 pages.
Final Office Action received for U.S. Appl. No. 16/827,918, mailed on Jul. 8, 2021, 31 pages.
Final Office Action received for U.S. Appl. No. 16/827,926, mailed on Mar. 17, 2021, 44 pages.
Final Office Action received for U.S. Appl. No. 16/865,172, mailed on Feb. 12, 2021, 29 pages.
Final Office Action received for U.S. Appl. No. 16/872,274, mailed on Dec. 23, 2021, 20 pages.
Final Office Action received for U.S. Appl. No. 16/888,453, mailed on Apr. 8, 2022, 39 pages.
Final Office Action received for U.S. Appl. No. 16/888,478, mailed on Nov. 15, 2021, 27 pages.
Final Office Action received for U.S. Appl. No. 17/133,550, mailed on Feb. 11, 2022, 18 pages.
Final Office Action received for U.S. Appl. No. 17/210,352, mailed on Jun. 3, 2022, 21 pages.
Final Office Action received for U.S. Appl. No. 17/353,527, mailed on May 11, 2022, 17 Pages.
Final Office Action received for U.S. Appl. No. 17/379,785, mailed on Oct. 28, 2022, 14 pages.
International Search Report received for PCT Patent Application No. PCT/US2014/057272, mailed on May 28, 2015, 4 pages.
International Search Report received for PCT Patent Application No. PCT/US2014/057280, mailed on May 27, 2015, 4 pages.
International Search Report received for PCT Patent Application No. PCT/US2015/037030, mailed on Dec. 10, 2015, 6 pages.

(56) References Cited

OTHER PUBLICATIONS

International Search Report received for PCT Patent Application No. PCT/US2015/037520, mailed on Mar. 7, 2016, 6 pages.
International Search Report received for PCT Patent Application No. PCT/US2017/029448, mailed on Jul. 13, 2017, 3 pages.
International Search Report received for PCT Patent Application No. PCT/US2017/031764, mailed on Aug. 7, 2017, 2 pages.
International Search Report received for PCT Patent Application No. PCT/US2017/058132, mailed on Mar. 27, 2018, 6 pages.
International Search Report received for PCT Patent Application No. PCT/US2019/034921, mailed on Nov. 19, 2019, 5 pages.
International Search Report received for PCT Patent Application No. PCT/US2020/024452, mailed on Aug. 6, 2020, 6 pages.
International Search Report received for PCT Patent Application No. PCT/US2020/024485, mailed on Aug. 3, 2020, 6 pages.
International Search Report received for PCT Patent Application No. PCT/US2020/024486, mailed Aug. 11, 2020, 6 pages.
International Search Report received for PCT Patent Application No. PCT/US2020/024492, mailed on Aug. 10, 2020, 6 pages.
International Search Report received for PCT Patent Application No. PCT/US2020/035423, mailed on Oct. 13, 2020, 4 pages.
Invitation to Pay Additional Fees received for PCT Patent Application No. PCT/US2019/034921, mailed on Sep. 24, 2019, 12 pages.
Invitation to Pay Additional Fees received for PCT Patent Application No. PCT/US2020/024452, mailed on Jun. 15, 2020, 13 pages.
Invitation to Pay Additional Fees received for PCT Patent Application No. PCT/US2020/024485, mailed on Jun. 8, 2020, 11 pages.
Invitation to Pay Additional Fees received for PCT Patent Application No. PCT/US2020/024486, mailed on Jun. 3, 2020, 11 pages.
Invitation to Pay Additional Fees received for PCT Patent Application No. PCT/US2020/024492, mailed on Jun. 8, 2020, 10 pages.
Non-Final Office Action received for U.S. Appl. No. 14/208,099, mailed on Jun. 25, 2015, 12 pages.
Non-Final Office Action received for U.S. Appl. No. 14/208,963, mailed on Nov. 3, 2014, 17 pages.
Non-Final Office Action received for U.S. Appl. No. 14/208,963, mailed on Apr. 21, 2017, 19 pages.
Non-Final Office Action received for U.S. Appl. No. 14/208,963, mailed on Jan. 29, 2016, 17 pages.
Non-Final Office Action received for U.S. Appl. No. 14/242,575, mailed on Mar. 21, 2016, 12 pages.
Non-Final Office Action received for U.S. Appl. No. 14/255,664, mailed on Apr. 1, 2016, 15 pages.
Non-Final Office Action received for U.S. Appl. No. 14/262,435, mailed on Feb. 22, 2016, 22 pages.
Non-Final Office Action received for U.S. Appl. No. 14/267,671, mailed on Apr. 1, 2016, 16 pages.
Non-Final Office Action received for U.S. Appl. No. 14/267,671, mailed on Dec. 1, 2017, 18 pages.
Non-Final Office Action received for U.S. Appl. No. 14/267,671, mailed on May 26, 2017, 18 pages.
Non-Final Office Action received for U.S. Appl. No. 14/271,179, mailed on May 29, 2015, 25 pages.
Non-Final Office Action received for U.S. Appl. No. 14/271,179, mailed on Oct. 5, 2018, 15 pages.
Non-Final Office Action received for U.S. Appl. No. 14/271,179, mailed on Sep. 21, 2017, 12 pages.
Non-Final Office Action received for U.S. Appl. No. 14/746,095, mailed on Dec. 1, 2017, 34 pages.
Non-Final Office Action received for U.S. Appl. No. 14/746,095, mailed on Jul. 25, 2019, 33 pages.
Non-Final Office Action received for U.S. Appl. No. 14/746,620, mailed on Jan. 11, 2017, 16 pages.
Non-Final Office Action received for U.S. Appl. No. 14/746,662, mailed on Aug. 9, 2016, 8 pages.
Non-Final Office Action received for U.S. Appl. No. 14/749,288, mailed on Oct. 12, 2016, 11 pages.

Non-Final Office Action received for U.S. Appl. No. 15/167,801 mailed on Mar. 24, 2017, 12 Pages.
Non-Final Office Action received for U.S. Appl. No. 15/167,801, mailed on Aug. 30, 2018, 15 pages.
Non-Final Office Action received for U.S. Appl. No. 15/167,801, mailed on Dec. 11, 2020, 18 pages.
Non-Final Office Action received for U.S. Appl. No. 15/167,801, mailed on May 18, 2022, 17 Pages.
Non-Final Office Action received for U.S. Appl. No. 15/167,801, mailed on Sep. 3, 2021, 17 pages.
Non-Final Office Action received for U.S. Appl. No. 15/167,801, mailed on Sep. 26, 2019, 18 pages.
Non-Final Office Action received for U.S. Appl. No. 15/224,370, mailed on Oct. 3, 2017, 14 pages.
Non-Final Office Action received for U.S. Appl. No. 15/235,000, mailed on Jul. 14, 2017, 31 pages.
Non-Final Office Action received for U.S. Appl. No. 15/235,000, mailed on Jul. 25, 2018, 31 pages.
Non-Final Office Action received for U.S. Appl. No. 15/235,000, mailed on Jun. 26, 2019, 31 pages.
Non-Final Office Action received for U.S. Appl. No. 15/272,393, mailed on Oct. 2, 2018, 52 pages.
Non-Final Office Action received for U.S. Appl. No. 15/272,397, mailed on Nov. 22, 2016, 20 pages.
Non-Final Office Action received for U.S. Appl. No. 15/276,633, mailed on Feb. 23, 2018, 12 pages.
Non-Final Office Action received for U.S. Appl. No. 15/276,633, mailed on Mar. 5, 2019, 16 pages.
Non-Final Office Action received for U.S. Appl. No. 15/276,633, mailed on Nov. 17, 2016, 12 pages.
Non-Final Office Action received for U.S. Appl. No. 15/390,377, mailed on Apr. 5, 2017, 17 pages.
Non-Final Office Action received for U.S. Appl. No. 15/414,493, mailed on Oct. 6, 2017, 15 pages.
Non-Final Office Action received for U.S. Appl. No. 15/507,229, mailed on Feb. 27, 2020, 16 pages.
Non-Final Office Action received for U.S. Appl. No. 15/507,229, mailed on Jun. 3, 2019, 14 pages.
Non-Final Office Action received for U.S. Appl. No. 15/674,992, mailed on May 11, 2018, 8 pages.
Non-Final Office Action received for U.S. Appl. No. 15/719,404, mailed on Dec. 14, 2018, 14 pages.
Non-Final Office Action received for U.S. Appl. No. 15/719,404, mailed on Nov. 26, 2021, 19 pages.
Non-Final Office Action received for U.S. Appl. No. 15/719,404, mailed on Oct. 16, 2020, 18 pages.
Non-Final Office Action received for U.S. Appl. No. 15/798,092, mailed on Dec. 20, 2017, 20 pages.
Non-Final Office Action received for U.S. Appl. No. 15/876,715, mailed on Jun. 4, 2018, 12 pages.
Non-Final Office Action received for U.S. Appl. No. 15/876,715, mailed on Sep. 10, 2019, 13 pages.
Non-Final Office Action received for U.S. Appl. No. 15/943,316, mailed on Aug. 20, 2019, 11 pages.
Non-Final Office Action received for U.S. Appl. No. 15/943,316, mailed on Jul. 23, 2018, 9 pages.
Non-Final Office Action received for U.S. Appl. No. 15/990,327, mailed on Jul. 31, 2018, 8 pages.
Non-Final Office Action received for U.S. Appl. No. 16/010,280, mailed on Mar. 7, 2019, 5 pages.
Non-Final Office Action received for U.S. Appl. No. 16/108,519, mailed on Apr. 5, 2021, 13 pages.
Non-Final Office Action received for U.S. Appl. No. 16/108,519, mailed on Aug. 2, 2019, 10 pages.
Non-Final Office Action received for U.S. Appl. No. 16/108,519, mailed on May 8, 2020, 11 pages.
Non-Final Office Action received for U.S. Appl. No. 16/126,962, mailed on Aug. 25, 2020, 22 pages.
Non-Final Office Action received for U.S. Appl. No. 16/126,962, mailed on Sep. 3, 2019, 16 pages.
Non-Final Office Action received for U.S. Appl. No. 16/136,005, mailed on Sep. 9, 2020, 10 pages.

(56)  References Cited

OTHER PUBLICATIONS

Non-Final Office Action received for U.S. Appl. No. 16/136,005, mailed on Sep. 18, 2019, 9 pages.

Non-Final Office Action received for U.S. Appl. No. 16/142,635, mailed on Jun. 8, 2020, 19 pages.

Non-Final Office Action received for U.S. Appl. No. 16/142,635, mailed on Jun. 11, 2021, 23 pages.

Non-Final Office Action received for U.S. Appl. No. 16/144,077, mailed on Feb. 19, 2019, 24 pages.

Non-Final Office Action received for U.S. Appl. No. 16/144,077, mailed on Nov. 27, 2019, 40 pages.

Non-Final Office Action received for U.S. Appl. No. 16/175,565, mailed on Sep. 20, 2021, 33 pages.

Non-Final Office Action received for U.S. Appl. No. 16/233,990, mailed on Jul. 9, 2021, 18 pages.

Non-Final Office Action received for U.S. Appl. No. 16/233,990, mailed on Jun. 18, 2020, 17 pages.

Non-Final Office Action received for U.S. Appl. No. 16/392,467, mailed on Sep. 27, 2019, 5 pages.

Non-Final Office Action received for U.S. Appl. No. 16/584,790, mailed on Dec. 23, 2020, 30 pages.

Non-Final Office Action received for U.S. Appl. No. 16/584,790, mailed on Dec. 26, 2019, 24 pages.

Non-Final Office Action received for U.S. Appl. No. 16/584,790, mailed on Feb. 1, 2022, 33 pages.

Non-Final Office Action received for U.S. Appl. No. 16/682,443, mailed on Sep. 23, 2020, 10 pages.

Non-Final Office Action received for U.S. Appl. No. 16/697,090, mailed on Aug. 3, 2021, 16 pages.

Non-Final Office Action received for U.S. Appl. No. 16/697,090, mailed on Jul. 6, 2020, 14 pages.

Non-Final Office Action received for U.S. Appl. No. 16/697,090, mailed on Jul. 7, 2022, 25 pages.

Non-Final Office Action received for U.S. Appl. No. 16/827,910, mailed on Jun. 17, 2021, 16 pages.

Non-Final Office Action received for U.S. Appl. No. 16/827,910, mailed on Sep. 14, 2022, 18 pages.

Non-Final Office Action received for U.S. Appl. No. 16/827,918, mailed on Dec. 10, 2020, 28 pages.

Non-Final Office Action received for U.S. Appl. No. 16/827,926, mailed on Apr. 25, 2022, 27 pages.

Non-Final Office Action received for U.S. Appl. No. 16/827,926, mailed on Oct. 29, 2020, 45 pages.

Non-Final Office Action received for U.S. Appl. No. 16/827,931, mailed on Mar. 3, 2021, 24 pages.

Non-Final Office Action received for U.S. Appl. No. 16/865,172, mailed on Jun. 29, 2021, 29 pages.

Non-Final Office Action received for U.S. Appl. No. 16/865,172, mailed on Aug. 20, 2020, 19 pages.

Non-Final Office Action received for U.S. Appl. No. 16/872,274, mailed on Jul. 9, 2021, 19 pages.

Non-Final Office Action received for U.S. Appl. No. 16/888,453, mailed on Jun. 4, 2021, 37 pages.

Non-Final Office Action received for U.S. Appl. No. 16/888,478, mailed on Feb. 8, 2021, 24 pages.

Non-Final Office Action received for U.S. Appl. No. 16/888,478, mailed on May 2, 2022, 29 pages.

Non-Final Office Action received for U.S. Appl. No. 16/945,724, mailed on Jul. 19, 2021, 8 pages.

Non-Final Office Action received for U.S. Appl. No. 17/000,112, mailed on Dec. 7, 2021, 15 pages.

Non-Final Office Action received for U.S. Appl. No. 17/065,387, mailed on Jan. 28, 2021, 28 pages.

Non-Final Office Action received for U.S. Appl. No. 17/065,387, mailed on Jun. 1, 2021, 25 pages.

Non-Final Office Action received for U.S. Appl. No. 17/133,550, mailed on Jun. 8, 2021, 23 pages.

Non-Final Office Action received for U.S. Appl. No. 17/133,550, mailed on Sep. 9, 2022, 23 pages.

Non-Final Office Action received for U.S. Appl. No. 17/210,352, mailed on Oct. 18, 2021, 18 pages.

Non-Final Office Action received for U.S. Appl. No. 17/353,527, mailed on Dec. 8, 2022, 17 pages.

Non-Final Office Action received for U.S. Appl. No. 17/353,527, mailed on Oct. 5, 2021, 14 pages.

Non-Final Office Action received for U.S. Appl. No. 17/379,785, mailed on Mar. 30, 2022, 18 Pages.

Non-Final Office Action received for U.S. Appl. No. 17/457,901, mailed on Apr. 28, 2022, 24 pages.

Non-Final Office Action received for U.S. Appl. No. 16/175,565, mailed on Mar. 4, 2020, 36 pages.

Notice of Allowance received for U.S. Appl. No. 14/208,099, mailed on Feb. 3, 2016, 10 pages.

Notice of Allowance received for U.S. Appl. No. 14/242,575, mailed on Oct. 27, 2016, 11 pages.

Notice of Allowance received for U.S. Appl. No. 14/255,664, mailed on May 5, 2017, 7 pages.

Notice of Allowance received for U.S. Appl. No. 14/262,435, mailed on Aug. 16, 2016, 6 pages.

Notice of Allowance received for U.S. Appl. No. 14/267,671, mailed on Sep. 19, 2018, 8 pages.

Notice of Allowance received for U.S. Appl. No. 14/746,095, mailed on Dec. 31, 2019, 8 pages.

Notice of Allowance received for U.S. Appl. No. 14/746,620, mailed on Sep. 25, 2017, 8 pages.

Notice of Allowance received for U.S. Appl. No. 14/746,662, mailed on Sep. 25, 2017, 7 pages.

Notice of Allowance received for U.S. Appl. No. 14/749,288, mailed on May 25, 2017, 8 pages.

Notice of Allowance received for U.S. Appl. No. 15/272,393, mailed on Jan. 15, 2020, 7 pages.

Notice of Allowance received for U.S. Appl. No. 15/272,393, mailed on Sep. 18, 2019, 10 pages.

Notice of Allowance received for U.S. Appl. No. 15/272,397, mailed on Oct. 18, 2017, 8 pages.

Notice of Allowance received for U.S. Appl. No. 15/276,633, mailed on Aug. 26, 2019, 8 pages.

Notice of Allowance received for U.S. Appl. No. 15/390,377, mailed on Jul. 2, 2018, 9 pages.

Notice of Allowance received for U.S. Appl. No. 15/414,493, mailed on Mar. 14, 2018, 7 pages.

Notice of Allowance received for U.S. Appl. No. 15/674,992, mailed on Oct. 1, 2018, 7 pages.

Notice of Allowance received for U.S. Appl. No. 15/695,880, mailed on Feb. 28, 2018, 10 pages.

Notice of Allowance received for U.S. Appl. No. 15/695,880, mailed on Oct. 18, 2017, 9 pages.

Notice of Allowance received for U.S. Appl. No. 15/714,904, mailed on May 22, 2018, 8 pages.

Notice of Allowance received for U.S. Appl. No. 15/719,404, mailed on Jul. 13, 2022, 8 Pages.

Notice of Allowance received for U.S. Appl. No. 15/719,404, mailed on Nov. 9, 2022, 7 pages.

Notice of Allowance received for U.S. Appl. No. 15/798,092, mailed on Jun. 7, 2018, 9 pages.

Notice of Allowance received for U.S. Appl. No. 15/798,092, mailed on Oct. 9, 2018, 5 pages.

Notice of Allowance received for U.S. Appl. No. 15/833,618, mailed on Mar. 14, 2018, 9 pages.

Notice of Allowance received for U.S. Appl. No. 15/876,715, mailed on Apr. 4, 2022, 7 pages.

Notice of Allowance received for U.S. Appl. No. 15/876,715, mailed on Aug. 3, 2022, 7 Pages.

Notice of Allowance received for U.S. Appl. No. 15/876,715, mailed on Oct. 14, 2021, 7 pages.

Notice of Allowance received for U.S. Appl. No. 15/990,327, mailed on Jan. 11, 2019, 7 pages.

Notice of Allowance received for U.S. Appl. No. 16/010,280, mailed on Jul. 29, 2019, 7 pages.

Notice of Allowance received for U.S. Appl. No. 16/036,810, mailed on Oct. 31, 2018, 9 pages.

(56) References Cited

OTHER PUBLICATIONS

Notice of Allowance received for U.S. Appl. No. 16/108,519, mailed on Sep. 21, 2021, 8 pages.
Notice of Allowance received for U.S. Appl. No. 16/136,005, mailed on Feb. 24, 2021, 8 pages.
Notice of Allowance received for U.S. Appl. No. 16/136,005, mailed on Jun. 9, 2021, 7 pages.
Notice of Allowance received for U.S. Appl. No. 16/142,635, mailed on Nov. 10, 2021, 8 pages.
Notice of Allowance received for U.S. Appl. No. 16/144,077, mailed on May 8, 2020, 15 pages.
Notice of Allowance received for U.S. Appl. No. 16/233,990, mailed on Feb. 22, 2022, 8 pages.
Notice of Allowance received for U.S. Appl. No. 16/233, 990, mailed on May 26, 2022, 5 pages.
Notice of Allowance received for U.S. Appl. No. 16/233,990, mailed on Oct. 5, 2022, 5 pages.
Notice of Allowance received for U.S. Appl. No. 16/392,467, mailed on Mar. 23, 2020, 9 pages.
Notice of Allowance received for U.S. Appl. No. 16/584,790, mailed on Feb. 3, 2023, 9 pages.
Notice of Allowance received for U.S. Appl. No. 16/682,443, mailed on Aug. 20, 2021, 7 pages.
Notice of Allowance received for U.S. Appl. No. 16/682,443, mailed on Nov. 17, 2021, 8 pages.
Notice of Allowance received for U.S. Appl. No. 16/726,179, mailed on Jun. 17, 2021, 9 pages.
Notice of Allowance received for U.S. Appl. No. 16/726,179, mailed on Sep. 30, 2021, 8 pages.
Notice of Allowance received for U.S. Appl. No. 16/817,918, mailed on Feb. 7, 2022, 9 pages.
Notice of Allowance received for U.S. Appl. No. 16/817,918, mailed on Jun. 8, 2022, 9 Pages.
Notice of Allowance received for U.S. Appl. No. 16/827,926, mailed on Nov. 1, 2021, 35 pages.
Notice of Allowance received for U.S. Appl. No. 16/827,931, mailed on Apr. 19, 2022, 7 Pages.
Notice of Allowance received for U.S. Appl. No. 16/827,931, mailed on Jan. 5, 2022, 7 pages.
Notice of Allowance received for U.S. Appl. No. 16/827,931, mailed on Sep. 15, 2021, 11 pages.
Notice of Allowance received for U.S. Appl. No. 16/827,942, mailed on Apr. 28, 2021, 5 pages.
Notice of Allowance received for U.S. Appl. No. 16/827,942, mailed on Jan. 22, 2021, 5 pages.
Notice of Allowance received for U.S. Appl. No. 16/827,942, mailed on Oct. 5, 2020, 10 pages.
Notice of Allowance received for U.S. Appl. No. 16/865,172, mailed on Apr. 13, 2022, 8 pages.
Notice of Allowance received for U.S. Appl. No. 16/865,172, mailed on Aug. 25, 2022, 8 Pages.
Notice of Allowance received for U.S. Appl. No. 16/865,172, mailed on Dec. 16, 2021, 10 pages.
Notice of Allowance received for U.S. Appl. No. 16/872,274, mailed on Apr. 19, 2022, 10 Pages.
Notice of Allowance received for U.S. Appl. No. 16/945,724, mailed on Apr. 4, 2022, 8 Pages.
Notice of Allowance received for U.S. Appl. No. 16/945,724, mailed on Dec. 20, 2021, 7 pages.
Notice of Allowance received for U.S. Appl. No. 16/945,724, mailed on Jul. 20, 2022, 8 Pages.
Notice of Allowance received for U.S. Appl. No. 17/000,112, mailed on Jun. 3, 2022, 14 pages.
Notice of Allowance received for U.S. Appl. No. 17/000,112, mailed on Oct. 18, 2022, 10 pages.
Notice of Allowance received for U.S. Appl. No. 17/065,387, mailed on Dec. 1, 2021, 10 pages.
Notice of Allowance received for U.S. Appl. No. 17/210,352, mailed on Dec. 5, 2022, 9 pages.

Notice of Allowance received for U.S. Appl. No. 17/457,901, mailed on Nov. 16, 2022, 9 pages.
Notice of Allowance received for U.S. Appl. No. 17/654,578, mailed on Oct. 25, 2022, 8 pages.
Patent Board Decision received for U.S. Appl. No. 15/876,715, mailed on Aug. 3, 2021, 8 pages.
Restriction Requirement received for U.S. Appl. No. 14/208,099, mailed on Feb. 24, 2015, 5 pages.
Search Report received for Chinese Patent Application No. 201580028382.1, mailed on Oct. 12, 2018, 5 pages (2 pages of English Translation & 3 pages of Official copy).
Search Report received for Chinese Patent Application No. 201680050096.X, mailed on Jan. 10, 2022, 4 pages (2 pages of English Translation and 2 pages of Official Copy).
Search Report received for Chinese Patent Application No. 201780033590.X, mailed on Mar. 24, 2021, 4 pages (2 page of English Translation and 2 pages of Official Copy).
Search Report received for Chinese Patent Application No. 201780066823.6, mailed on Nov. 1, 2022, 4 pages (2 pages of English Translation and 2 pages of Official Copy).
Search Report received for Chinese Patent Application No. 201811143102.3, mailed on Nov. 22, 2022, 5 pages (2 pages of English Translation and 3 pages of Official Copy).
Search Report received for Chinese Patent Application No. 201910469185.3, mailed on Feb. 23, 2021, 6 pages (3 page of English Translation and 3 page of Official Copy).
Search Report received for Chinese Patent Application No. 201910587972.8, mailed on Jan. 4, 2022, 4 pages (2 pages of English Translation and 2 pages of Official Copy).
Search Report received for Danish Patent Application No. PA 201670581, mailed on Apr. 4, 2017, 2 pages.
Search Report received for Danish Patent Application No. PA 201670581, mailed on Feb. 5, 2018, 1 page.
Search Report received for Danish Patent Application No. PA 201670581, mailed on Nov. 3, 2016, 1 page.
Search Report received for Danish Patent Application No. PA 201870354, mailed on Sep. 26, 2018, 4 pages.
Search Report received for Danish Patent Application No. PA201670582, mailed on Feb. 9, 2017, 1 pages.
Search Report received for Danish Patent Application No. PA201670582, mailed on Mar. 6, 2018, 2 pages.
Search Report received for Danish Patent Application No. PA201670582, mailed on Oct. 28, 2016, 4 pages.
Search Report received for Danish Patent Application No. PA201770200, Completed on Jul. 12, 2017, 4 pages.
Search Report received for Taiwanese Patent Application No. 104120369, mailed on Aug. 8, 2016, 2 Pages (1 page of official copy & 1 page of English translation).
Supplemental Notice of Allowability received for U.S. Appl. No. 16/827,942, mailed on Nov. 4, 2020, 3 pages.
Supplemental Notice of Allowance received for U.S. Appl. No. 15/798,092, mailed on Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, [Retrieved May 4, 2020], 2017, 8 pages.
Alvarez Edgar, "Sling TV Redesign Makes It Easy To Find Your Favorite Content", Engadget, Available online at: <https://www.engadget.com/2016/01/05/sling-tv-major-redesign/>, [Retrieved Aug. 5, 2019], May 1, 2016, pp. 1-12.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Cheredar Tom, "Verizon's Viewdini Lets You Watch Netflix, Comcast, & Hulu Videos from a Single App", Available online at: <venturebeat.com>, [Retrieved Jun. 10, 2021], May 22, 2012, 6 pages.
Fingas Roger, "Walmart's Vudu to get Native Apple TV", AppleInsider, 2017, pp. 1-4.

(56) References Cited

OTHER PUBLICATIONS

Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.

International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.

Kaijser Martijn, "Mimic Skin for Kodi 15.x: Installation and Showcase", Time 2:23-2:28, Available online at: <https://www.youtube.com/watch?v=RGfpbUWVkgQ&t=143s>, [Retrieved Jun. 10, 2021], Aug. 3, 2015, 1 page.

Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158.

Ng Gary, "New Netflix User Interface Coming This Month, First Redesign in Four Years", iPhone in Canada, Available online at: <https://www.iphoneincanada.ca/news/new-netflix-user-interface/>, [Retrieved Jul. 7, 2020], Jun. 1, 2015, 3 pages.

Panzarino Matthew, "Apple Announces Voice Activated Siri Assistant Feature For iOS 5, Integrates Wolfram Alpha And Wikipedia", Available online at: <www.thenextweb.com>, Oct. 4, 2011, pp. 1-6.

Pierce David, "Got Hulu and Netflix? You Need an App to Search It All", Wired, Available online at: <https://www.wired.com/2016/03/got-hulu-netflix-need-app-search/>, [Retrieved Mar. 10, 2016], Mar. 10, 2016, pp. 1-4.

Corrected Notice of Allowance received for U.S. Appl. No. 16/888,453, mailed on Jul. 26, 2023, 5 pages.

Corrected Notice of Allowance received for U.S. Appl. No. 17/367,227, mailed on Jul. 27, 2023, 2 pages.

Final Office Action received for U.S. Appl. No. 16/697,090, mailed on Dec. 14, 2022, 28 pages.

Final Office Action received for U.S. Appl. No. 16/827,910, mailed on Mar. 15, 2023, 18 pages.

Final Office Action received for U.S. Appl. No. 16/827,926, mailed on Apr. 18, 2023, 32 pages.

Final Office Action received for U.S. Appl. No. 16/888,478, mailed on Feb. 13, 2023, 27 pages.

Final Office Action received for U.S. Appl. No. 17/133,550, mailed on Feb. 15, 2023, 22 pages.

Final Office Action received for U.S. Appl. No. 17/586,625, mailed on May 4, 2023, 15 pages.

Final Office Action received for U.S. Appl. No. 17/660,622, mailed on May 24, 2023, 20 pages.

International Search Report received for PCT Patent Application No. PCT/US2015/037027, mailed on Sep. 28, 2015, 3 pages.

Non-Final Office Action received for U.S. Appl. No. 15/167,801, mailed on Feb. 8, 2023, 23 pages.

Non-Final Office Action received for U.S. Appl. No. 15/719,404, mailed on May 10, 2023, 14 pages.

Non-Final Office Action received for U.S. Appl. No. 16/175,565, mailed on Feb. 17, 2023, 33 pages.

Non-Final Office Action received for U.S. Appl. No. 17/379,785, mailed on Mar. 9, 2023, 14 pages.

Non-Final Office Action received for U.S. Appl. No. 17/586,625, mailed on Sep. 1, 2022, 13 pages.

Non-Final Office Action received for U.S. Appl. No. 17/651,731, mailed on Apr. 25, 2023, 9 pages.

Non-Final Office Action received for U.S. Appl. No. 17/656,610, mailed on Feb. 6, 2023, 10 pages.

Non-Final Office Action received for U.S. Appl. No. 17/656,610, mailed on Jul. 26, 2023, 10 Pages.

Non-Final Office Action received for U.S. Appl. No. 17/657,913, mailed on Jul. 21, 2023, 16 Pages.

Non-Final Office Action received for U.S. Appl. No. 17/660,622, mailed on Dec. 20, 2022, 17 pages.

Non-Final Office Action received for U.S. Appl. No. 17/937,410, mailed on Mar. 2, 2023, 15 pages.

Non-Final Office Action received for U.S. Appl. No. 17/937,704, mailed on Mar. 30, 2023, 18 pages.

Non-Final Office Action received for U.S. Appl. No. 18/060,902, mailed on Mar. 10, 2023, 8 pages.

Notice of Allowability received for U.S. Appl. No. 17/457,901, mailed on Mar. 8, 2023, 9 pages.

Notice of Allowability received for U.S. Appl. No. 16/233,990, mailed on Jan. 31, 2023, 5 pages.

Notice of Allowability received for U.S. Appl. No. 16/888,453, mailed on Jun. 21, 2023, 7 pages.

Notice of Allowability received for U.S. Appl. No. 16/888,453, mailed on Mar. 1, 2023, 8 pages.

Notice of Allowability received for U.S. Appl. No. 17/210,352, mailed on Mar. 16, 2023, 7 pages.

Notice of Allowability received for U.S. Appl. No. 17/353,527, mailed on Jul. 21, 2023, 7 pages.

Notice of Allowability received for U.S. Appl. No. 17/367,227, mailed on Mar. 23, 2023, 12 pages.

Notice of Allowability received for U.S. Appl. No. 17/654,5782, mailed on Feb. 15, 2023, 8 pages.

Notice of Allowability received for U.S. Appl. No. 17/654,578, mailed on Jun. 13, 2023, 7 pages.

Search Report received for Chinese Patent Application No. 201911313480.6, mailed on Jan. 20, 2023, 4 pages (2 pages of English Translation and 2 pages of Official Copy).

Search Report received for Chinese Patent Application No. 201911313496.7, mailed on Jan. 20, 2023, 4 pages (2 pages of English Translation and 2 pages of Official Copy).

Search Report received for Chinese Patent Application No. 201911313497.1, mailed on Apr. 11, 2023, 5 pages (2 pages of English Translation and 3 pages of Official Copy).

Search Report received for Chinese Patent Application No. 201911313497.1, mailed on Dec. 14, 2022, 3 pages (1 page of English Translation and 2 pages of Official Copy).

Search Report received for Chinese Patent Application No. 202010011436.6, mailed on Dec. 15, 2022, 9 pages (4 pages of English Translation and 5 pages of Official Copy).

Search Report received for Chinese Patent Application No. 202010662190.9, mailed on Apr. 28, 2023, 5 pages (2 pages of English Translation and 3 pages of Official Copy).

Search Report received for Chinese Patent Application No. 202010662206.6, mailed on Apr. 28, 2023, 5 pages (2 pages of English Translation and 3 pages of Official Copy).

Search Report received for Chinese Patent Application No. 202010662994.9, mailed on Apr. 28, 2023, 5 pages (2 pages of English Translation and 3 pages of Official Copy).

Search Report received for European Patent Application No. 20718506.7, mailed on Mar. 21, 2023, 2 pages.

Search Report received for Taiwanese Patent Application No. 104120385, mailed on Nov. 25, 2016, 2 pages (1 page of official copy & 1 page of English translation).

Anonymous, "Video Progress Bar—YouTube Help", Available online at: <https://web.archive.org/web/20190317001501/https://support.google.com/youtube/answer/7174115?hl=en>, [retrieved on Mar. 22, 2023], Mar. 17, 2019, 2 pages.

Apple, "The control is all yours", Available online at: <https://www.apple.com.cn/privacy/control/>, [Retrieved Dec. 29, 2022], Nov. 30, 2022, 12 pages. See attached Communication 37 CFR § 1.98(a)(3).

Beer et al., "The Odds Of Running A Nonlinear TV Program Using Web Technologies", IEEE International Symposium on Broadband Multimedia Systems and Broadcasting (BMSB), 2011, 4 pages.

Biao et al., "Research on UI Optimization of Chinese Network Television Stations", Southeast Communications, 2013, 4 pages. See attached Communication 37 CFR § 1.98(a)(3).

Budhraja et al., "Probability Based Playlist Generation Based on Music Similarity and User Customization", National Conference On Computing And Communication Systems, 2012, 5 pages.

Cheng Luo, "The Designing of Dynamic Play-list Based on Flash Streaming Media Technology", Computer and Telecommunication, 2008, 3 pages. See attached Communication 37 CFR § 1.98(a)(3).

(56)  References Cited

OTHER PUBLICATIONS

Drews et al., "Virtual Jukebox—Reviving a Classic", Proceedings of the 35th Hawaii International Conference on System Sciences, 2022, 7 pages.

episodecalendar.com, "Keep track of your favorite TV shows!—TV Episode Calendar", Available Online At: <https://web.archive.org/web/20140517060612/https://episodecalendar.com/>, [Retrieved Oct. 18, 2017], May 17, 2014, 6 pages.

Jin et al., "Pricing Sponsored Content in Wireless Networks with Multiple Content Providers", The Fourth IEEE Workshop on Smart Data Pricing 2015, 2015, pp. 668-673.

Kimbler Kristofer, "App Store Strategies for Service Providers", 2010 4th International Conference on Intelligence in Next Generation Networks, Nov. 18, 2010, 5 pages.

Lee et al., "A Multi-Touch Three Dimensional Touch-Sensitive Tablet", CHI'85 Proceedings, Apr. 1985, pp. 21-25.

Liu Chang, "Functions and Design of Multi-Screen Playing System in TV Variety Studio", Modern TV Technology, 2013, 5 pages. See attached Communication 37 CFR § 1.98(a)(3).

Meng et al., "Role Authorization Based Web Service Access Control Model", Journal of Lanzhou University (Natural Science Edition), vol. 42, No. 2, 2007, pp. 84-88. See attached Communication 37 CFR § 1.98(a)(3).

Rubine Dean, "Combining Gestures and Direct Manipulation", CHI'92, May 3-7, 1992, pp. 659-660.

Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Tinari George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 23, 2023], Nov. 10, 2016, 9 pages.

Wang et al., "Authorization Management Mechanism of Web Application System", Network and Information Technology, vol. 25, No. 11, 2006, 3 pages. See attached Communication 37 CFR § 1.98(a)(3).

Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Zhang et al., "Music Playlist Prediction Via Detecting Song Moods", IEEE China Summit and International Conference on Signal and Information Processing, 2013, pp. 174-178.

Advisory Action received for U.S. Appl. No. 18/060,902, mailed on Nov. 13, 2023, 2 pages.

Applicant Initiated Interview Summary received for U.S. Appl. No. 17/656,610, mailed on Apr. 10, 2024, 2 pages.

Corrected Notice of Allowability received for U.S. Appl. No. 18/060,902, mailed on Sep. 5, 2024, 4 pages.

Corrected Notice of Allowability received for U.S. Appl. No. 15/719,404, mailed on Mar. 22, 2024, 2 pages.

Corrected Notice of Allowability received for U.S. Appl. No. 17/586,625, mailed on Feb. 20, 2024, 2 pages.

Corrected Notice of Allowability received for U.S. Appl. No. 17/656,610, mailed on Dec. 19, 2024, 2 pages.

Corrected Notice of Allowability received for U.S. Appl. No. 17/656,610, mailed on Jan. 13, 2025, 2 pages.

Corrected Notice of Allowability received for U.S. Appl. No. 17/657,913, mailed on Jan. 23, 2025, 2 pages.

Corrected Notice of Allowability received for U.S. Appl. No. 17/657,913, mailed on Sep. 16, 2024, 2 pages.

Corrected Notice of Allowability received for U.S. Appl. No. 17/657,913, mailed on Sep. 26, 2024, 2 pages.

Corrected Notice of Allowability received for U.S. Appl. No. 17/937,704, mailed on Jul. 31, 2024, 8 pages.

Corrected Notice of Allowability received for U.S. Appl. No. 16/888,478, mailed on Oct. 31, 2023, 6 pages.

European Search Report received for European Patent Application No. 20718505.9, mailed on Sep. 27, 2024, 5 pages.

Examiner's Answer to Appeal Brief received for U.S. Appl. No. 16/175,565, mailed on Dec. 15, 2023, 27 pages.

Examiner's Answer to Appeal Brief received for U.S. Appl. No. 16/697,090, mailed on Oct. 26, 2023, 10 pages.

Examiner's Answer to Appeal Brief received for U.S. Appl. No. 17/133,550, mailed on Sep. 23, 2024, 26 pages.

Extended European Search Report received for European Patent Application No. 24152097.2, mailed on Jul. 23, 2024, 9 pages.

Extended European Search Report received for European Patent Application No. 24195286.0, mailed on Nov. 5, 2024, 9 pages.

Final Office Action received for U.S. Appl. No. 17/379,785, mailed on Aug. 16, 2024, 14 pages.

Final Office Action received for U.S. Appl. No. 17/656,610, mailed on Jan. 16, 2024, 12 pages.

Final Office Action received for U.S. Appl. No. 17/930,703, mailed on Nov. 6, 2024, 39 pages.

Final Office Action received for U.S. Appl. No. 18/146,336, mailed on Feb. 23, 2024, 23 pages.

Final Office Action received for U.S. Appl. No. 17/133,550, mailed on Dec. 18, 2023, 25 pages.

Non-Final Office Action received for U.S. Appl. No. 17/379,785, mailed on Feb. 15, 2024, 14 pages.

Non-Final Office Action received for U.S. Appl. No. 17/656,610, mailed on Apr. 30, 2024, 12 pages.

Non-Final Office Action received for U.S. Appl. No. 17/657,913, mailed on Jan. 11, 2024, 20 pages.

Non-Final Office Action received for U.S. Appl. No. 17/930,703, mailed on May 16, 2024, 36 pages.

Non-Final Office Action received for U.S. Appl. No. 17/937,410, mailed Feb. 29, 2024, 16 pages.

Non-Final Office Action received for U.S. Appl. No. 17/937,704, mailed on Feb. 1, 2024, 21 pages.

Non-Final Office Action received for U.S. Appl. No. 18/060,902, mailed on Dec. 1, 2023, 9 pages.

Non-Final Office Action received for U.S. Appl. No. 18/168,490, mailed on Jun. 27, 2024, 19 pages.

Non-Final Office Action received for U.S. Appl. No. 18/391,448, mailed on Sep. 24, 2024, 12 pages.

Non-Final Office Action received for U.S. Appl. No. 18/518,109, mailed on Jul. 9, 2024, 26 pages.

Non-Final Office Action received for U.S. Appl. No. 18/602,342, mailed on Sep. 24, 2024, 19 pages.

Notice of Allowance received for U.S. Appl. No. 17/656,610, mailed on Sep. 11, 2024, 7 pages.

Notice of Allowance received for U.S. Appl. No. 17/657,913, mailed on Aug. 30, 2024, 7 pages.

Notice of Allowance received for U.S. Appl. No. 17/657,913, mailed on Jan. 14, 2025, 5 pages.

Notice of Allowance received for U.S. Appl. No. 17/660,622, mailed on Aug. 22, 2024, 9 pages.

Notice of Allowance received for U.S. Appl. No. 18/168,490, mailed on Sep. 18, 2024, 10 pages.

Notice of Allowance received for U.S. Appl. No. 15/719,404, mailed on Dec. 8, 2023, 10 pages.

Notice of Allowance received for U.S. Appl. No. 16/175,565, mailed on Oct. 24, 2024, 5 pages.

Notice of Allowance received for U.S. Appl. No. 16/827,910, mailed on Dec. 13, 2023, 19 pages.

Notice of Allowance received for U.S. Appl. No. 16/827,926, mailed on Feb. 2, 2024, 8 pages.

Notice of Allowance received for U.S. Appl. No. 17/586,625, mailed on Oct. 26, 2023, 7 pages.

Notice of Allowance received for U.S. Appl. No. 17/651,731, mailed on Jan. 25, 2024, 5 pages.

Notice of Allowance received for U.S. Appl. No. 17/651,731, mailed on Jul. 10, 2024, 5 pages.

Notice of Allowance received for U.S. Appl. No. 17/660,622, mailed on Jan. 24, 2024, 11 pages.

Notice of Allowance received for U.S. Appl. No. 17/937,410, mailed on Sep. 26, 2024, 8 pages.

Notice of Allowance received for U.S. Appl. No. 17/937,704, mailed on Apr. 25, 2024, 12 pages.

(56) References Cited

OTHER PUBLICATIONS

Notice of Allowance received for U.S. Appl. No. 18/060,902, mailed on May 21, 2024, 8 pages.
Notice of Allowance received for U.S. Appl. No. 18/146,336, mailed on Nov. 22, 2024, 11 pages.
Notice of Allowance received for U.S. Appl. No. 18/395,268, mailed on Dec. 2, 2024, 8 pages.
Notice of Allowance received for U.S. Appl. No. 18/487,837, mailed on May 30, 2024, 8 pages.
Notice of Allowance received for U.S. Appl. No. 18/487,837, mailed on Nov. 8, 2024, 7 pages.
Notice of Allowance received for U.S. Appl. No. 18/503,515, mailed on Jun. 13, 2024, 8 pages.
Notice of Allowance received for U.S. Appl. No. 18/503,515, mailed on Oct. 1, 2024, 8 pages.
Notice of Allowance received for U.S. Appl. No. 18/518,109, mailed on Jan. 17, 2025, 8 pages.
Notice of Allowance received for U.S. Appl. No. 18/518,365, mailed on Jul. 3, 2024, 8 pages.
Notice of Allowance received for U.S. Appl. No. 18/518,365, mailed on Nov. 6, 2024, 8 pages.
Patent Board Decision received for U.S. Appl. No. 16/175,565, mailed on Jul. 31, 2024, 19 pages.
Patent Board Decision received for U.S. Appl. No. 16/697,090, mailed on Jul. 26, 2024, 33 pages.
Search Report received for Chinese Patent Application No. 201811143102.3, mailed on Nov. 2, 2023, 5 pages (3 pages of English Translation and 2 pages of Official Copy).
Search Report received for Chinese Patent Application No. 202010662994.9, mailed on Sep. 28, 2023, 2 pages (1 pages of English Translation and 2 pages of Official Copy).
Search Report received for Chinese Patent Application No. 202080040261.5, mailed on Apr. 4, 2024, 8 pages (4 pages of English Translation and 4 pages of Official Copy).
Search Report received for Chinese Patent Application No. 202110201931.8, mailed on Oct. 16, 2023, 3 pages (1 pages of English Translation and 2 pages of Official Copy).
Search Report received for Chinese Patent Application No. 202111293833.8, mailed on Dec. 9, 2023, 4 pages (2 pages of English Translation and 2 pages of Official Copy).
Search Report received for Chinese Patent Application No. 202111314528.2, mailed on Mar. 30, 2024, 4 pages (2 pages of English Translation and 2 pages of Official Copy).
Search Report received for Chinese Patent Application No. 202111635535.2, mailed on Dec. 21, 2023, 5 pages (2 pages of English Translation and 3 pages of Official Copy).
Search Report received for Chinese Patent Application No. 202210608296.X, mailed on Aug. 15, 2024, 4 pages (1 page of English Translation and 3 pages of Official Copy).
Usainbolt.com, Available online at: <https://usainbolt.com/>; <https://web.archive.org>, Archived on Mar. 15, 2015 in Wayback Machine, 2015, 4 pages.
Anonymous, "YouTube(TM) On Hover :: add0n.com", Retrieved from the Internet: <URL: https://web.archive.org/web/20180713134812/https://add0n.com/youtube-hover.html>, [retrieved on Nov. 8, 2024], Jul. 13, 2018, 4 pages.
Chen et al., "What a Juke! A Collaborative Music Sharing System", IEEE, 2012, 6 pages.
Cunningham et al., "An Ethnographic Study of Music Information Seeking: Implications for the Design of a Music Digital Library", IEEE, 2003, 13 pages.

Kim et al., "Towards Optimal Navigation Through Video Content on Interactive TV", Interacting with Computers, vol. 18, No. 4, Mar. 3, 2006, pp. 723-746.
Leonard Sengere, "You can now hover over videos on Youtube to get GIF like previews—Techzim", Retrieved from the Internet: URL: <https://web.archive.org/web/20171007193435/https://www.techzim.co.zw/2017/07/can-now-hover-videos-youtube-get-gif-like-previews/>, [retrieved on Nov. 8, 2024], Oct. 7, 2017, 6 pages.
Matejka et al., "Swifter: Improved Online Video Scrubbing", Proceedings of the SIGCHI Conference on Human Factors in Computing Systems, Apr. 27-May 2, 2013, 10 pages.
Schmidt Alexander, "Graphical User Interface for Video on Demand Navigation from an IPTV Set Top Box", Jun. 16, 2009, 52 pages.
Tech Life Unity, "How to Use Netflix | Netflix Guide Part 2", Available online at: <https://www.youtube.com/watch?v=Hg4IC_BIHss> [Retrieved Sep. 16, 2017], Aug. 19, 2017, 2 pages.
Extended European Search Report received for European Patent Application No. 24217869.7, mailed on Feb. 28, 2025, 10 pages.
Non-Final Office Action received for U.S. Appl. No. 18/665,420, mailed on Apr. 8, 2025, 16 pages.
Corrected Notice of Allowability received for U.S. Appl. No. 18/518,109, mailed on Apr. 18, 2025, 2 pages.
Patent Board Decision received for U.S. Appl. No. 17/133,550, mailed on Mar. 27, 2025, 27 pages.
European Search Report received for European Patent Application No. 20718500.0, mailed on Feb. 11, 2025, 5 pages.
Corrected Notice of Allowability received for U.S. Appl. No. 18/168,490, mailed on Mar. 4, 2025, 2 pages.
Final Office Action received for U.S. Appl. No. 18/391,448, mailed on Jan. 29, 2025, 14 pages.
Non-Final Office Action received for U.S. Appl. No. 18/668,008, mailed on Feb. 11, 2025, 14 pages.
Notice of Allowance received for U.S. Appl. No. 16/175,565, mailed on Feb. 12, 2025, 5 pages.
Notice of Allowance received for U.S. Appl. No. 17/379,785, mailed on Feb. 20, 2025, 9 pages.
Notice of Allowance received for U.S. Appl. No. 17/937,410, mailed on Jan. 29, 2025, 8 pages.
Notice of Allowance received for U.S. Appl. No. 18/168,490, mailed on Feb. 21, 2025, 9 pages.
Pai, Aditi, "38 More Health and Wellness Apps That Connect to Apple's HealthKit", MobiHealthNews, Oct. 16, 2024 [online]. Retrieved from <http://www.mobihealthnews.com/37340/38-more-health-and-wellness-apps-that-connect-to-apples-healthkit>, 3 pages.
Corrected Notice of Allowability received for U.S. Appl. No. 18/602,342, mailed on Sep. 5, 2025, 11 pages.
Extended European Search Report received for European Patent Application No. 25159269.7, mailed on Sep. 8, 2025, 12 pages.
Non-Final Office Action received for U.S. Appl. No. 18/391,448, mailed on May 7, 2025, 16 pages.
Notice of Allowance received for U.S. Appl. No. 18/602,342, mailed on May 9, 2025, 16 pages.
Corrected Notice of Allowability received for U.S. Appl. No. 18/168,490, mailed on May 28, 2025, 2 pages.
Corrected Notice of Allowability received for U.S. Appl. No. 18/602,342, mailed on May 29, 2025, 2 pages.
Corrected Notice of Allowability received for U.S. Appl. No. 18/902,473, mailed on Sep. 23, 2025, 2 pages.
Non-Final Office Action received for U.S. Appl. No. 19/025,368, mailed on Sep. 24, 2025, 8 pages.
Notice of Allowance received for U.S. Appl. No. 18/902,473, mailed on Jun. 3, 2025, 9 pages.
Notice of Allowance received for U.S. Appl. No. 18/902,473, mailed on Sep. 18, 2025, 9 pages.

* cited by examiner

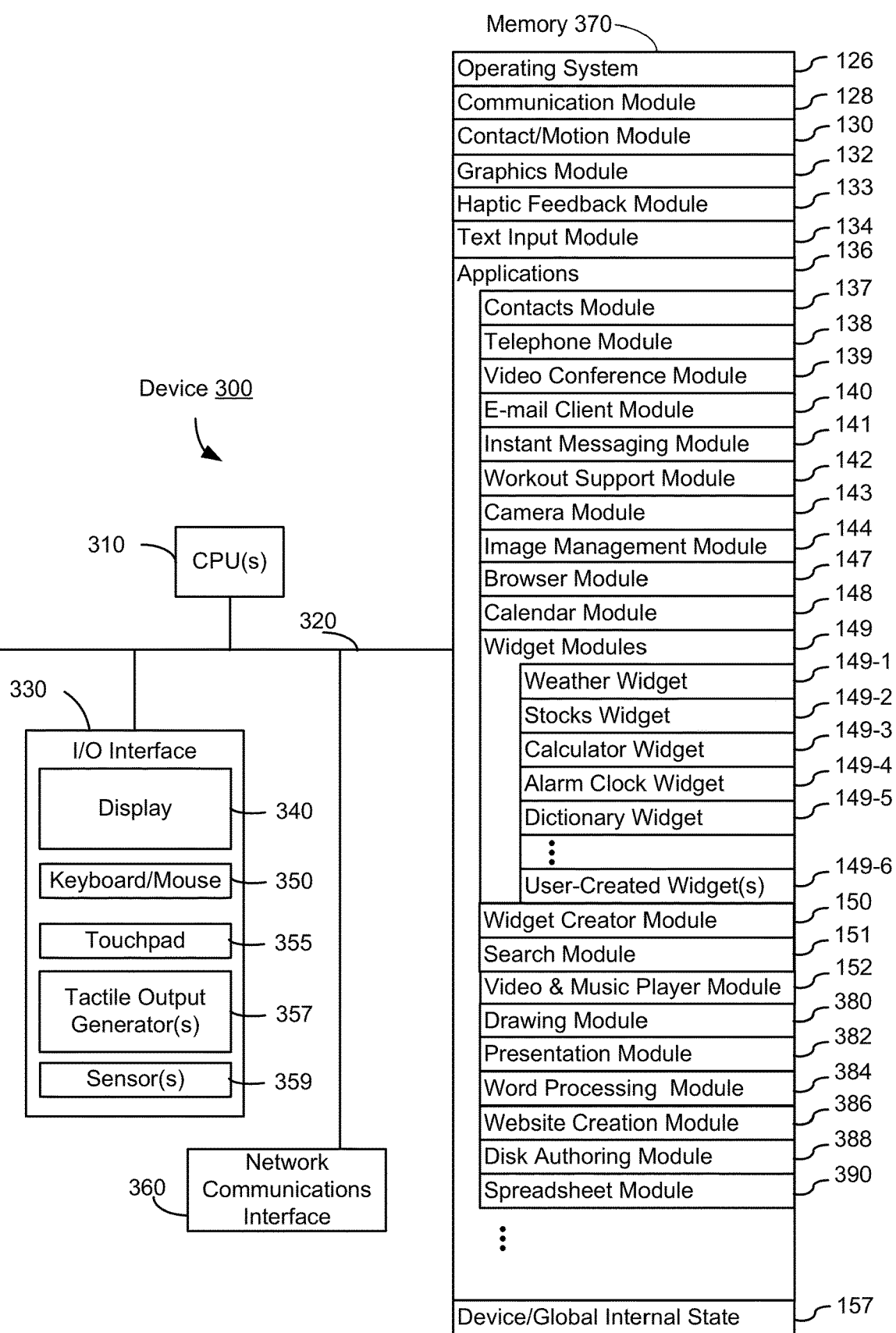

Memory 370

| | |
|---|---|
| Operating System | 126 |
| Communication Module | 128 |
| Contact/Motion Module | 130 |
| Graphics Module | 132 |
| Haptic Feedback Module | 133 |
| Text Input Module | 134 |
| Applications | 136 |
| Contacts Module | 137 |
| Telephone Module | 138 |
| Video Conference Module | 139 |
| E-mail Client Module | 140 |
| Instant Messaging Module | 141 |
| Workout Support Module | 142 |
| Camera Module | 143 |
| Image Management Module | 144 |
| Browser Module | 147 |
| Calendar Module | 148 |
| Widget Modules | 149 |
| Weather Widget | 149-1 |
| Stocks Widget | 149-2 |
| Calculator Widget | 149-3 |
| Alarm Clock Widget | 149-4 |
| Dictionary Widget | 149-5 |
| ⋮ | |
| User-Created Widget(s) | 149-6 |
| Widget Creator Module | 150 |
| Search Module | 151 |
| Video & Music Player Module | 152 |
| Drawing Module | 380 |
| Presentation Module | 382 |
| Word Processing  Module | 384 |
| Website Creation Module | 386 |
| Disk Authoring Module | 388 |
| Spreadsheet Module | 390 |
| ⋮ | |
| Device/Global Internal State | 157 |

Device 300

310 — CPU(s)

320

330 — I/O Interface

Display — 340

Keyboard/Mouse — 350

Touchpad — 355

Tactile Output Generator(s) — 357

Sensor(s) — 359

360 — Network Communications Interface

FIG. 3

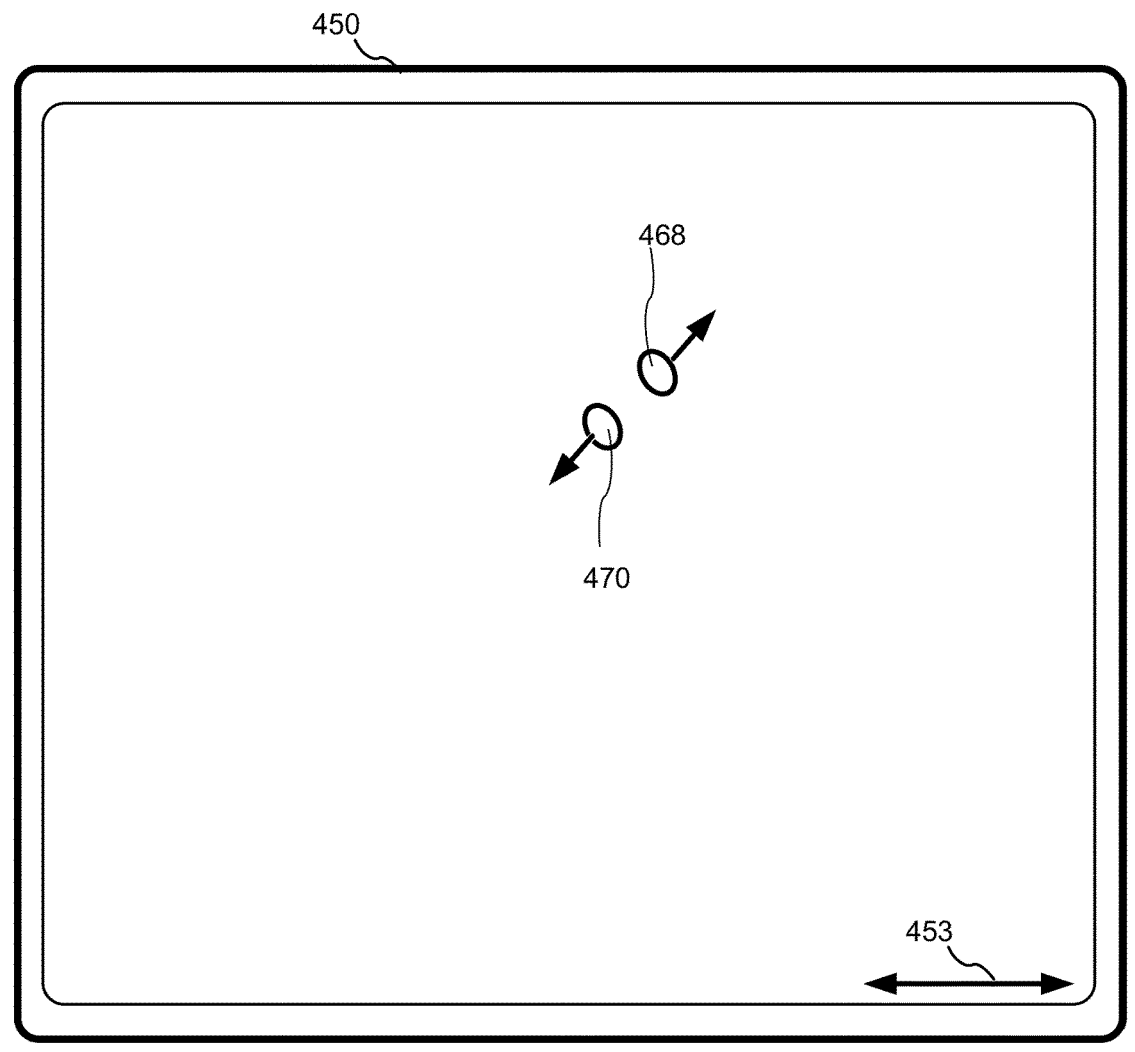
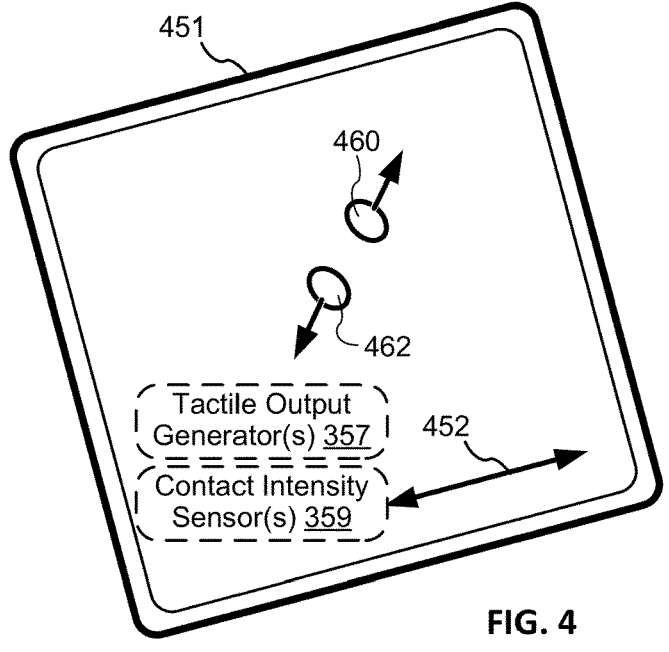
FIG. 4

451

516

518

526

522

520

524

510

514

451

603

Menu

510

514

451

510

<u>700</u>

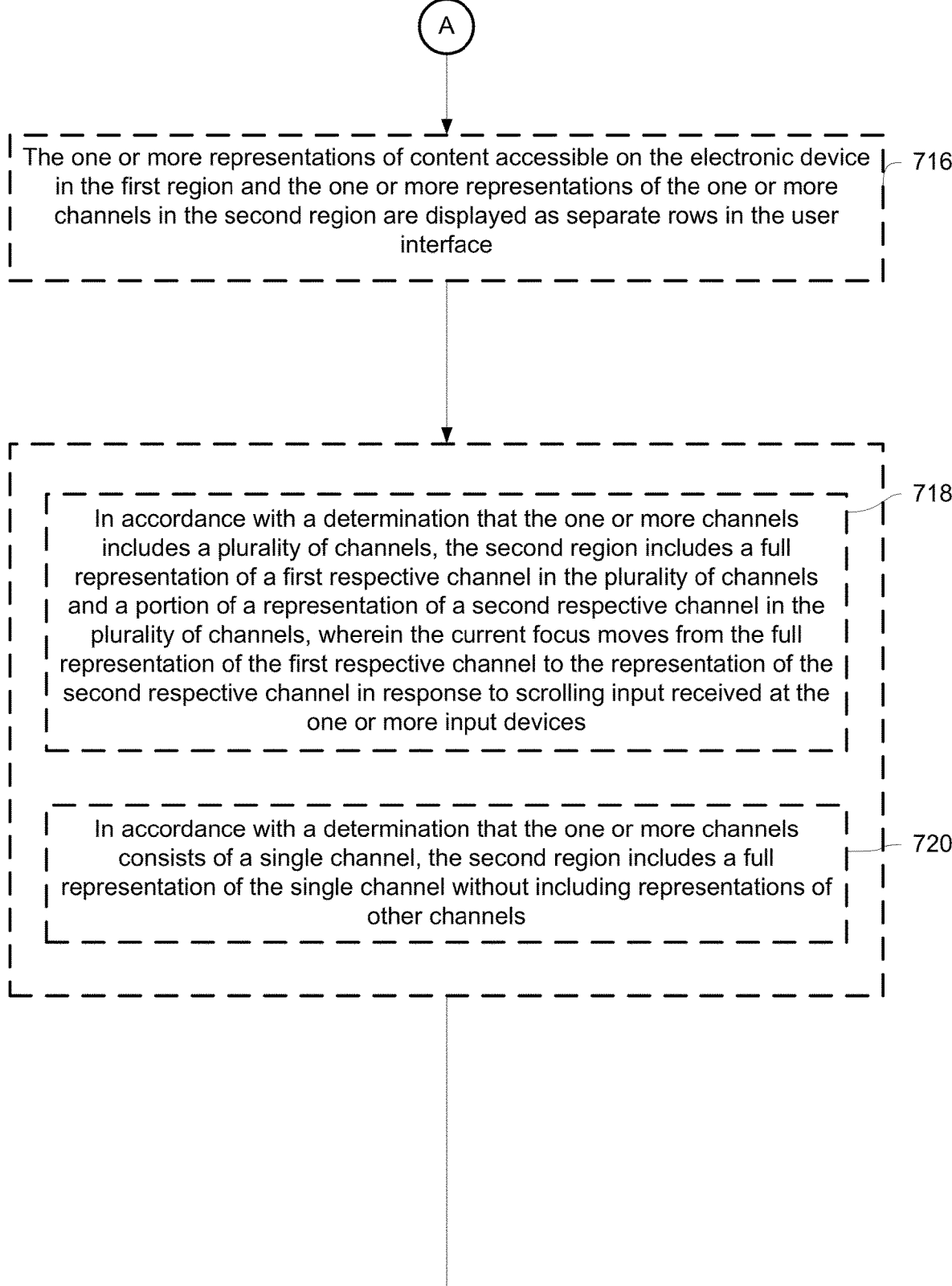

Ⓐ

The one or more representations of content accessible on the electronic device in the first region and the one or more representations of the one or more channels in the second region are displayed as separate rows in the user interface ⌐ 716

In accordance with a determination that the one or more channels includes a plurality of channels, the second region includes a full representation of a first respective channel in the plurality of channels and a portion of a representation of a second respective channel in the plurality of channels, wherein the current focus moves from the full representation of the first respective channel to the representation of the second respective channel in response to scrolling input received at the one or more input devices ⌐ 718

In accordance with a determination that the one or more channels consists of a single channel, the second region includes a full representation of the single channel without including representations of other channels ⌐ 720

FIG.7B     Ⓑ

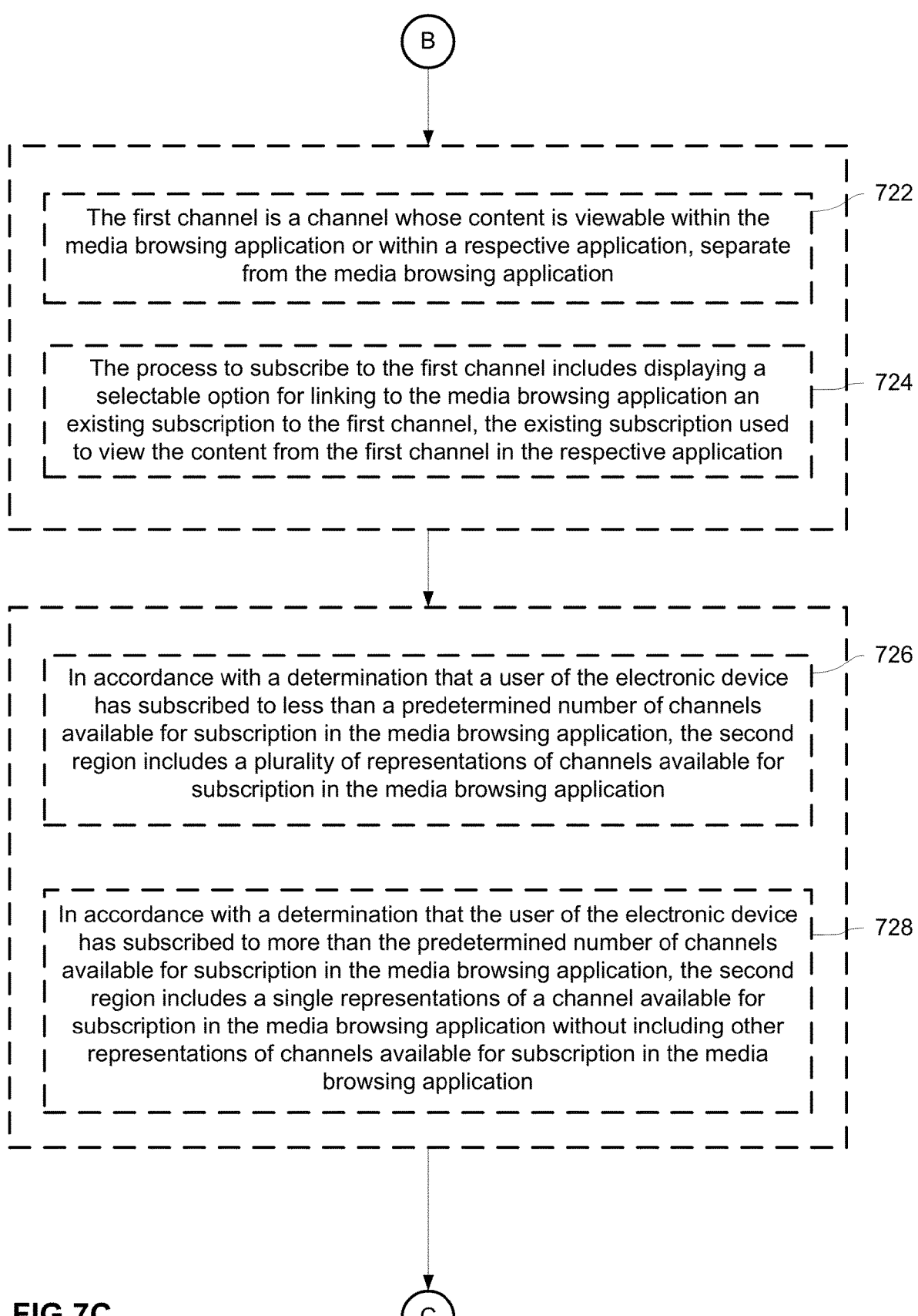

B

The first channel is a channel whose content is viewable within the media browsing application or within a respective application, separate from the media browsing application

722

The process to subscribe to the first channel includes displaying a selectable option for linking to the media browsing application an existing subscription to the first channel, the existing subscription used to view the content from the first channel in the respective application

724

In accordance with a determination that a user of the electronic device has subscribed to less than a predetermined number of channels available for subscription in the media browsing application, the second region includes a plurality of representations of channels available for subscription in the media browsing application

726

In accordance with a determination that the user of the electronic device has subscribed to more than the predetermined number of channels available for subscription in the media browsing application, the second region includes a single representations of a channel available for subscription in the media browsing application without including other representations of channels available for subscription in the media browsing application

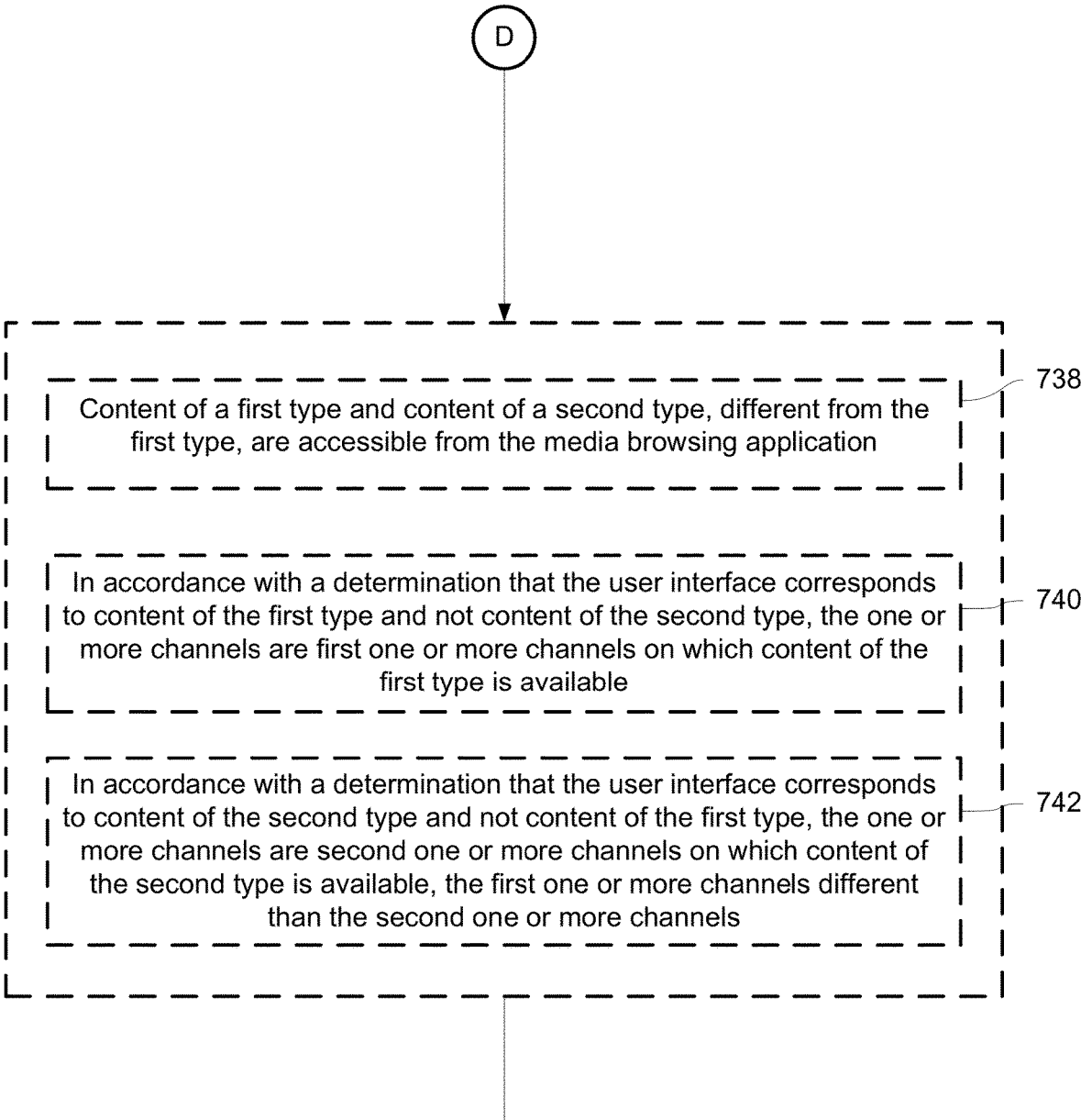

Content of a first type and content of a second type, different from the first type, are accessible from the media browsing application ⟶ 738

In accordance with a determination that the user interface corresponds to content of the first type and not content of the second type, the one or more channels are first one or more channels on which content of the first type is available ⟶ 740

In accordance with a determination that the user interface corresponds to content of the second type and not content of the first type, the one or more channels are second one or more channels on which content of the second type is available, the first one or more channels different than the second one or more channels ⟶ 742

FIG.7E

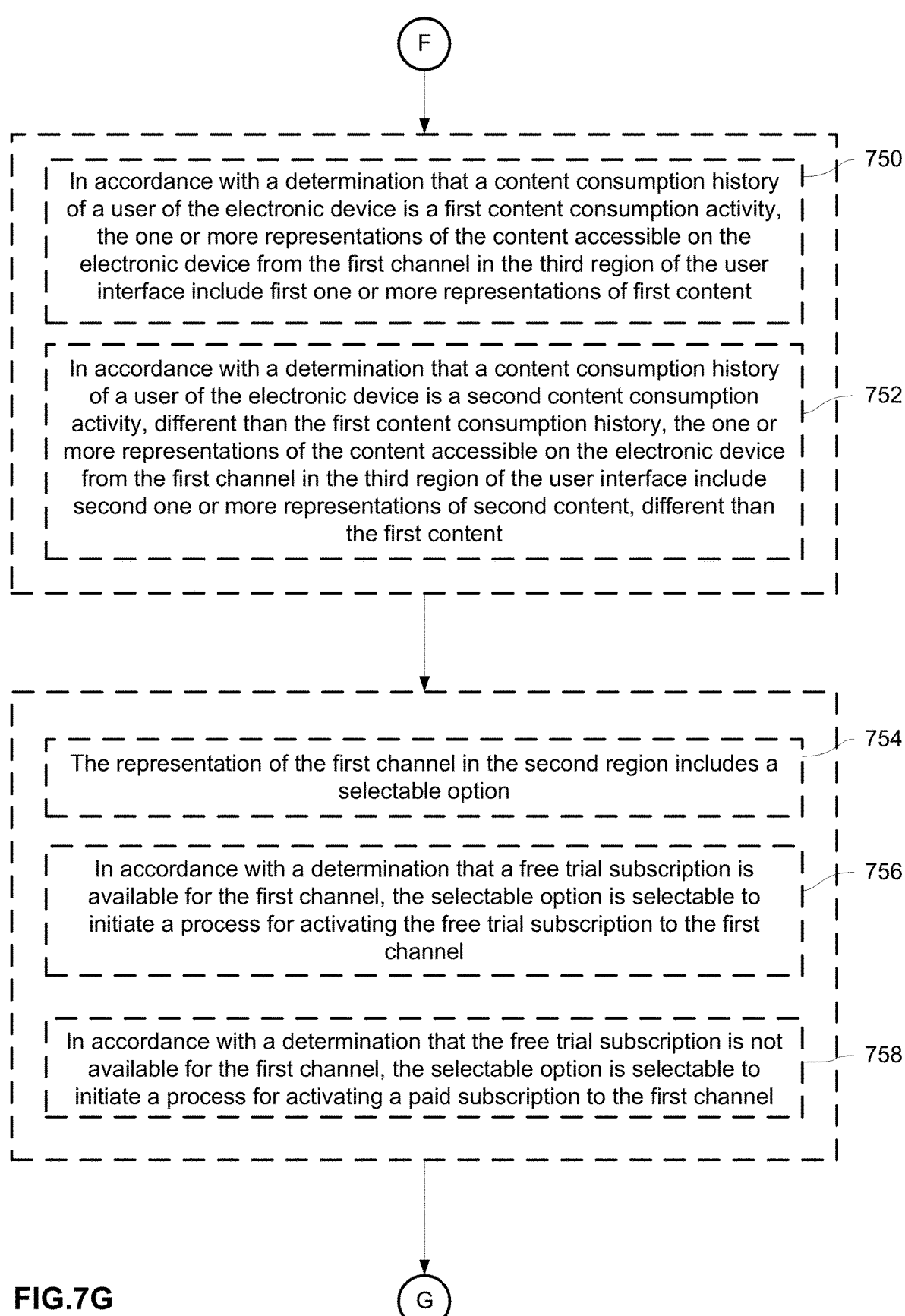

F

In accordance with a determination that a content consumption history of a user of the electronic device is a first content consumption activity, the one or more representations of the content accessible on the electronic device from the first channel in the third region of the user interface include first one or more representations of first content

750

In accordance with a determination that a content consumption history of a user of the electronic device is a second content consumption activity, different than the first content consumption history, the one or more representations of the content accessible on the electronic device from the first channel in the third region of the user interface include second one or more representations of second content, different than the first content

752

The representation of the first channel in the second region includes a selectable option

754

In accordance with a determination that a free trial subscription is available for the first channel, the selectable option is selectable to initiate a process for activating the free trial subscription to the first channel

756

In accordance with a determination that the free trial subscription is not available for the first channel, the selectable option is selectable to initiate a process for activating a paid subscription to the first channel

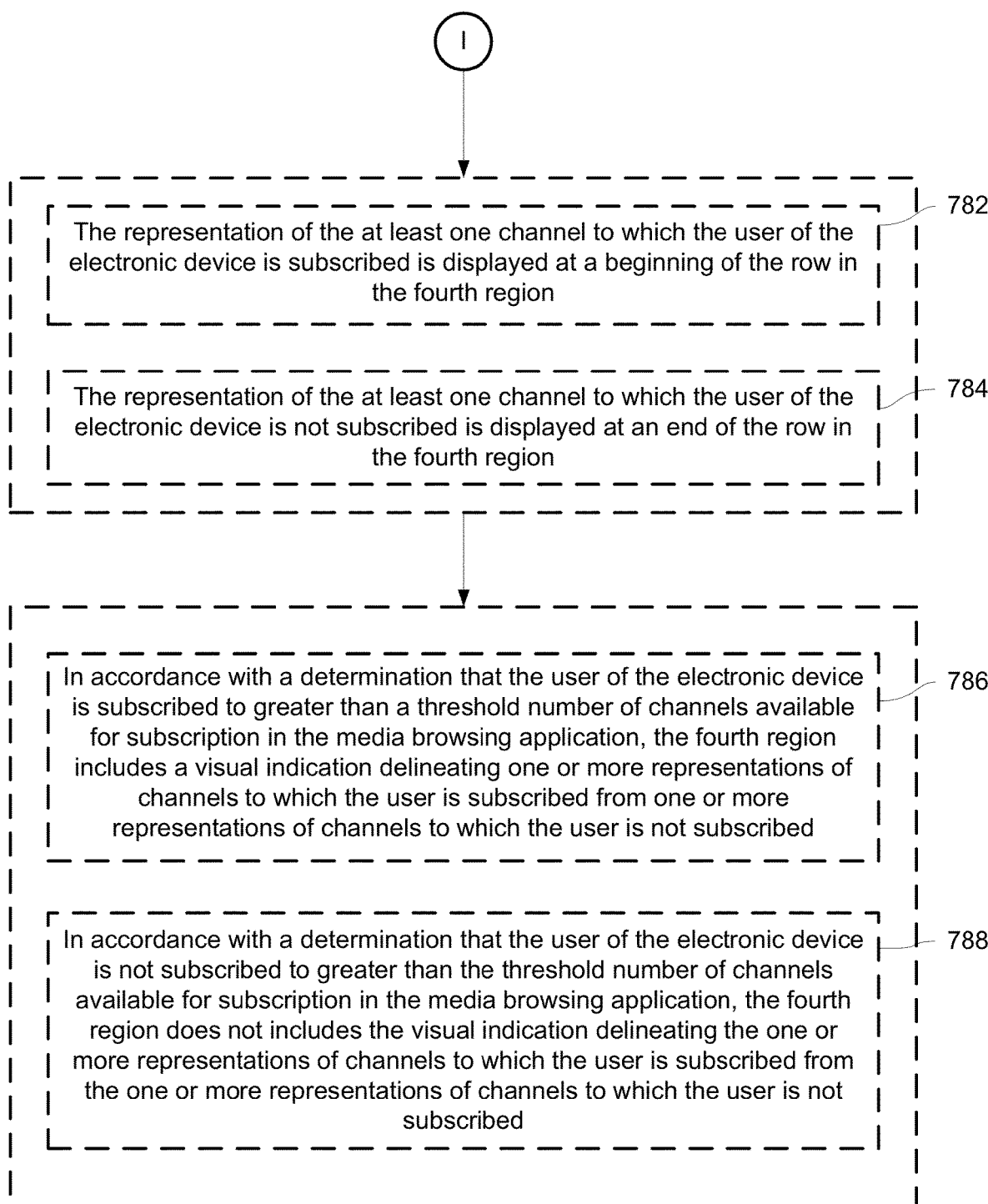

The representation of the at least one channel to which the user of the electronic device is subscribed is displayed at a beginning of the row in the fourth region

782

The representation of the at least one channel to which the user of the electronic device is not subscribed is displayed at an end of the row in the fourth region

784

In accordance with a determination that the user of the electronic device is subscribed to greater than a threshold number of channels available for subscription in the media browsing application, the fourth region includes a visual indication delineating one or more representations of channels to which the user is subscribed from one or more representations of channels to which the user is not subscribed

786

In accordance with a determination that the user of the electronic device is not subscribed to greater than the threshold number of channels available for subscription in the media browsing application, the fourth region does not includes the visual indication delineating the one or more representations of channels to which the user is subscribed from the one or more representations of channels to which the user is not subscribed

( Movie A provided by channel B in media browsing application)

514

[TV Show R Plays in App Q]

451

803

510

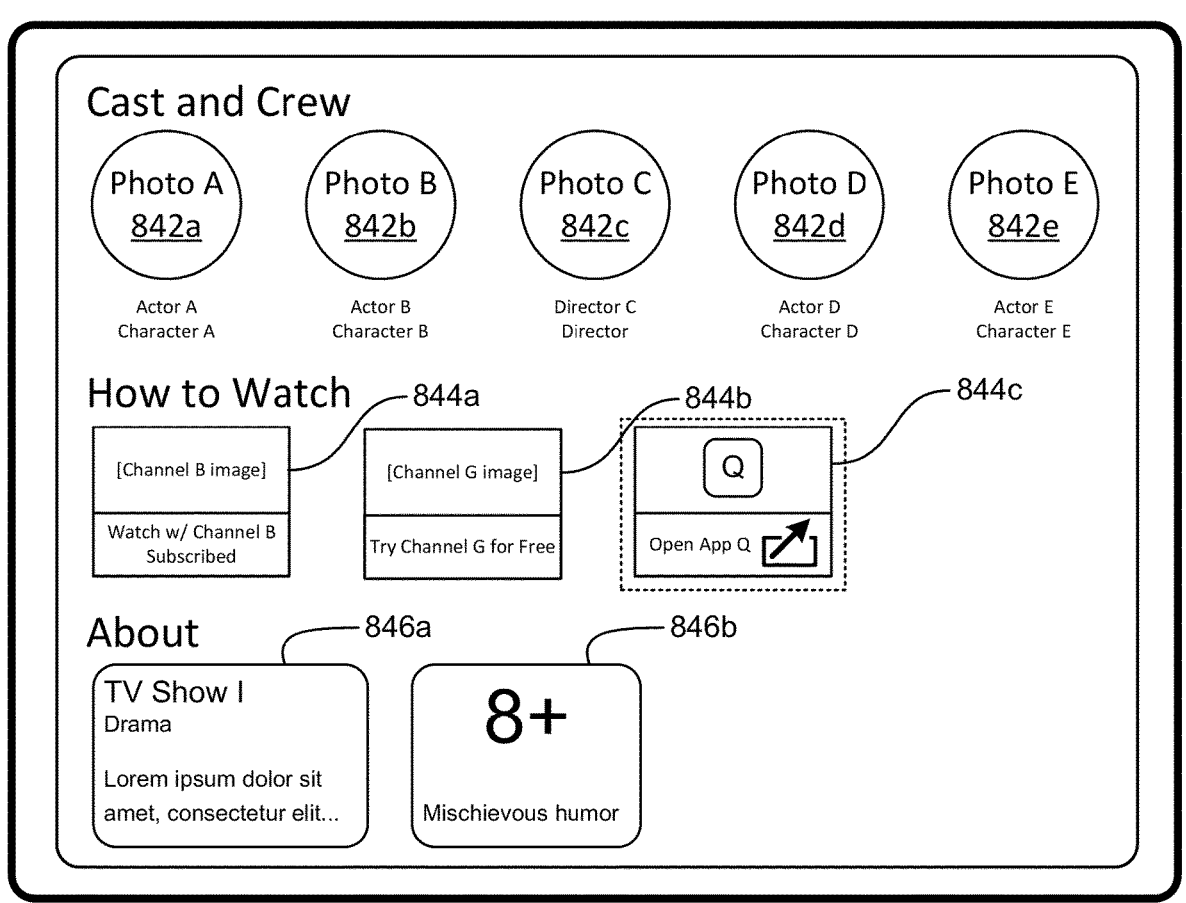
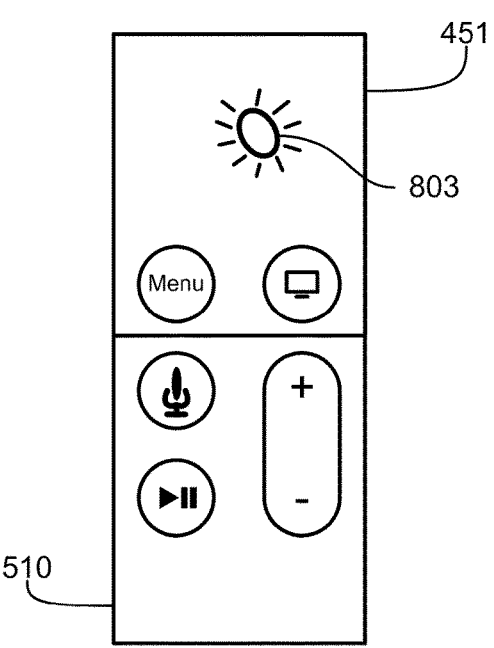
FIG. 8W

514

451

510

Figure 9A:
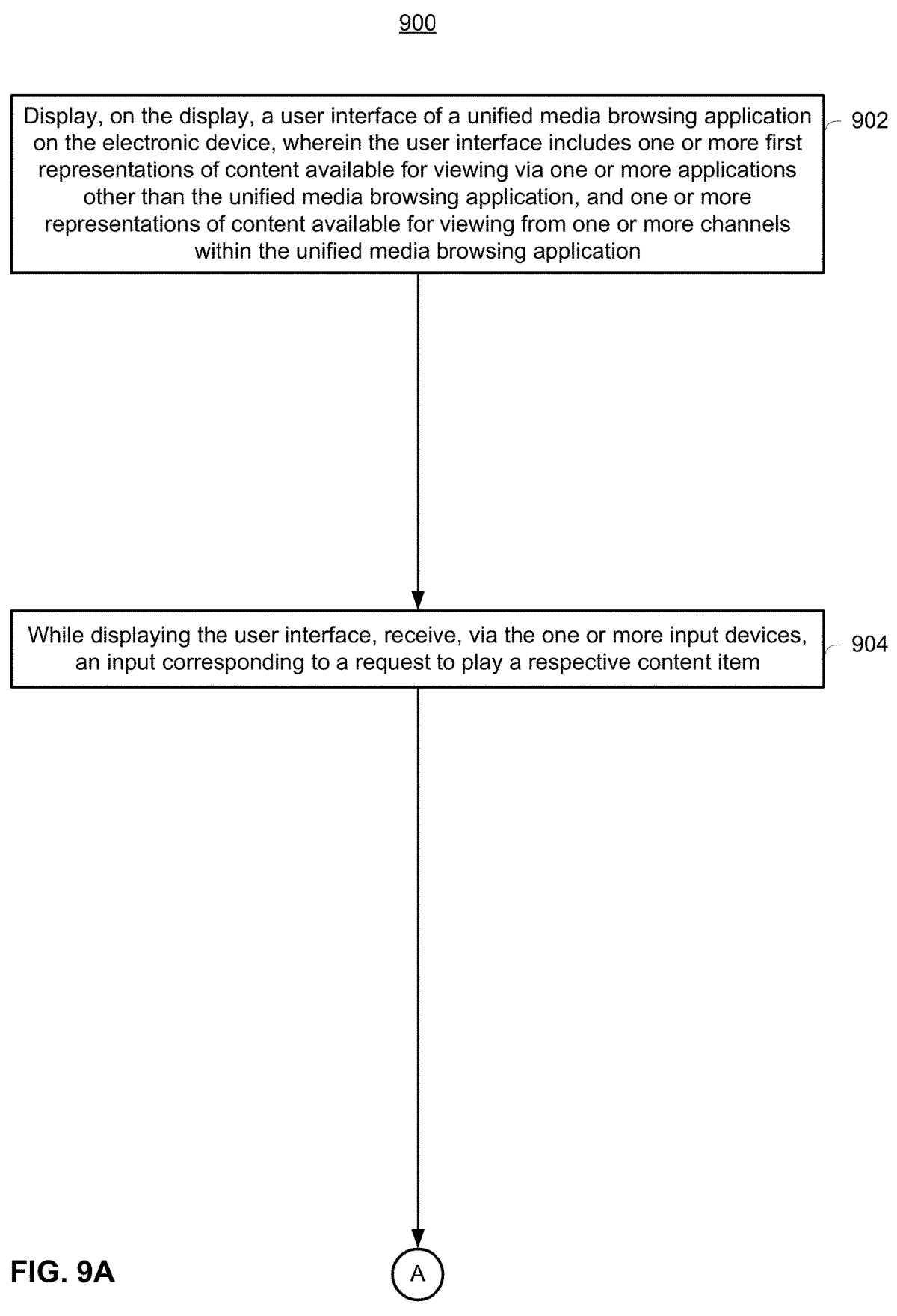

900

Display, on the display, a user interface of a unified media browsing application on the electronic device, wherein the user interface includes one or more first representations of content available for viewing via one or more applications other than the unified media browsing application, and one or more representations of content available for viewing from one or more channels within the unified media browsing application — 902

While displaying the user interface, receive, via the one or more input devices, an input corresponding to a request to play a respective content item — 904

FIG. 9A    (A)

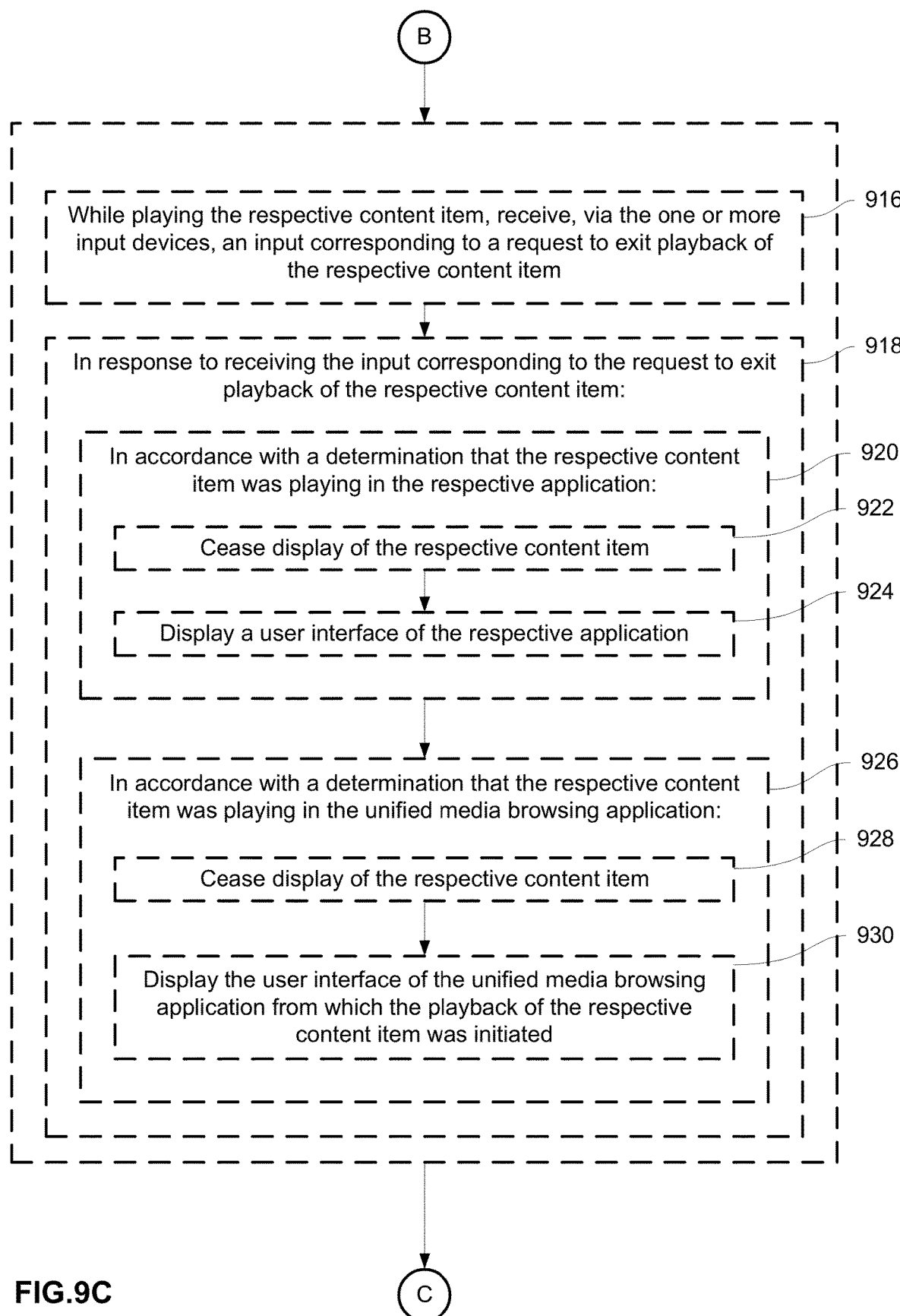

B

While playing the respective content item, receive, via the one or more input devices, an input corresponding to a request to exit playback of the respective content item

916

In response to receiving the input corresponding to the request to exit playback of the respective content item:

918

In accordance with a determination that the respective content item was playing in the respective application:

920

Cease display of the respective content item

922

Display a user interface of the respective application

924

In accordance with a determination that the respective content item was playing in the unified media browsing application:

926

Cease display of the respective content item

928

Display the user interface of the unified media browsing application from which the playback of the respective content item was initiated

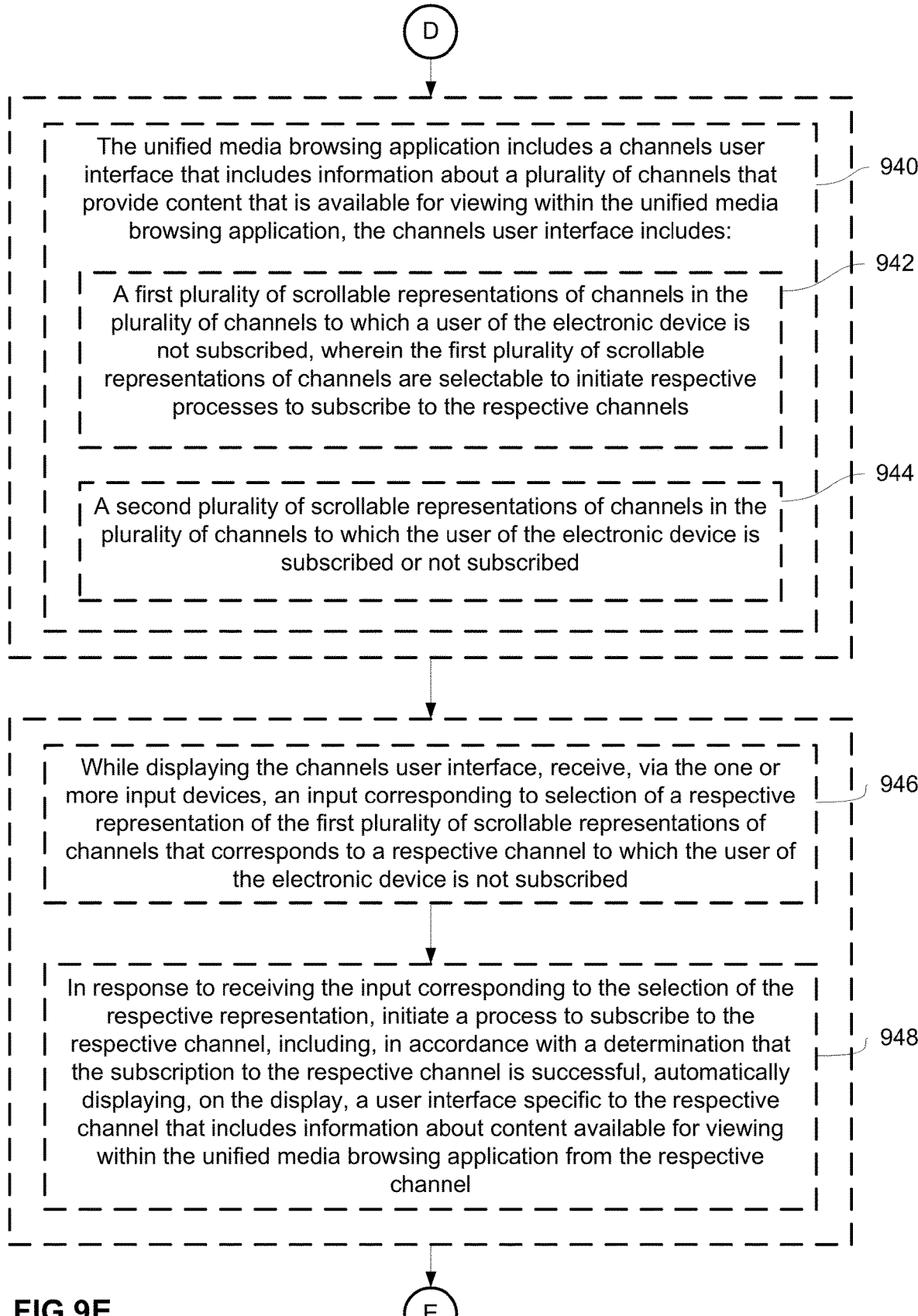

D

The unified media browsing application includes a channels user interface that includes information about a plurality of channels that provide content that is available for viewing within the unified media browsing application, the channels user interface includes: — 940

A first plurality of scrollable representations of channels in the plurality of channels to which a user of the electronic device is not subscribed, wherein the first plurality of scrollable representations of channels are selectable to initiate respective processes to subscribe to the respective channels — 942

A second plurality of scrollable representations of channels in the plurality of channels to which the user of the electronic device is subscribed or not subscribed — 944

While displaying the channels user interface, receive, via the one or more input devices, an input corresponding to selection of a respective representation of the first plurality of scrollable representations of channels that corresponds to a respective channel to which the user of the electronic device is not subscribed — 946

In response to receiving the input corresponding to the selection of the respective representation, initiate a process to subscribe to the respective channel, including, in accordance with a determination that the subscription to the respective channel is successful, automatically displaying, on the display, a user interface specific to the respective channel that includes information about content available for viewing within the unified media browsing application from the respective channel — 948

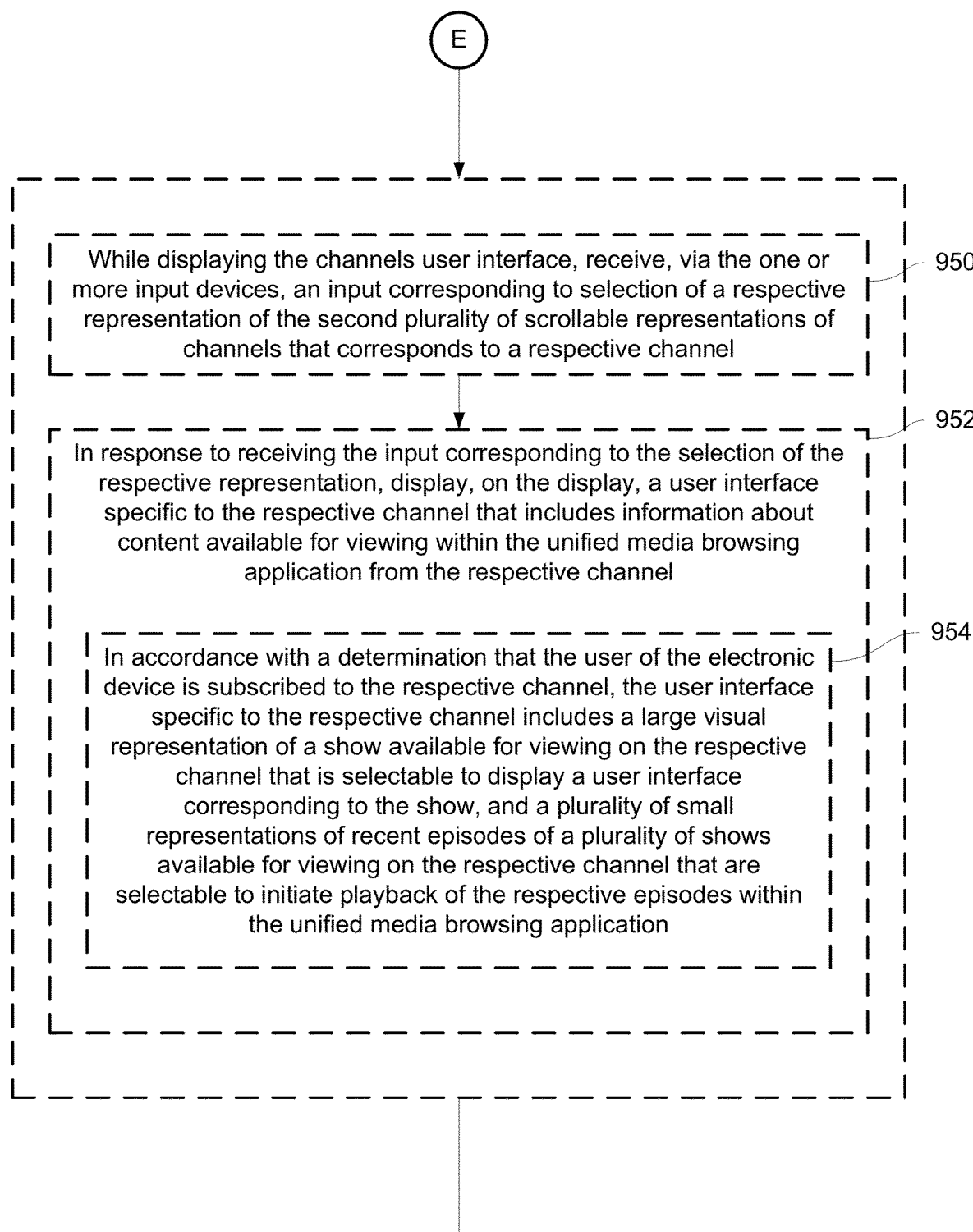

While displaying the channels user interface, receive, via the one or more input devices, an input corresponding to selection of a respective representation of the second plurality of scrollable representations of channels that corresponds to a respective channel                    950

In response to receiving the input corresponding to the selection of the respective representation, display, on the display, a user interface specific to the respective channel that includes information about content available for viewing within the unified media browsing application from the respective channel                    952

In accordance with a determination that the user of the electronic device is subscribed to the respective channel, the user interface specific to the respective channel includes a large visual representation of a show available for viewing on the respective channel that is selectable to display a user interface corresponding to the show, and a plurality of small representations of recent episodes of a plurality of shows available for viewing on the respective channel that are selectable to initiate playback of the respective episodes within the unified media browsing application                    954

FIG.9F

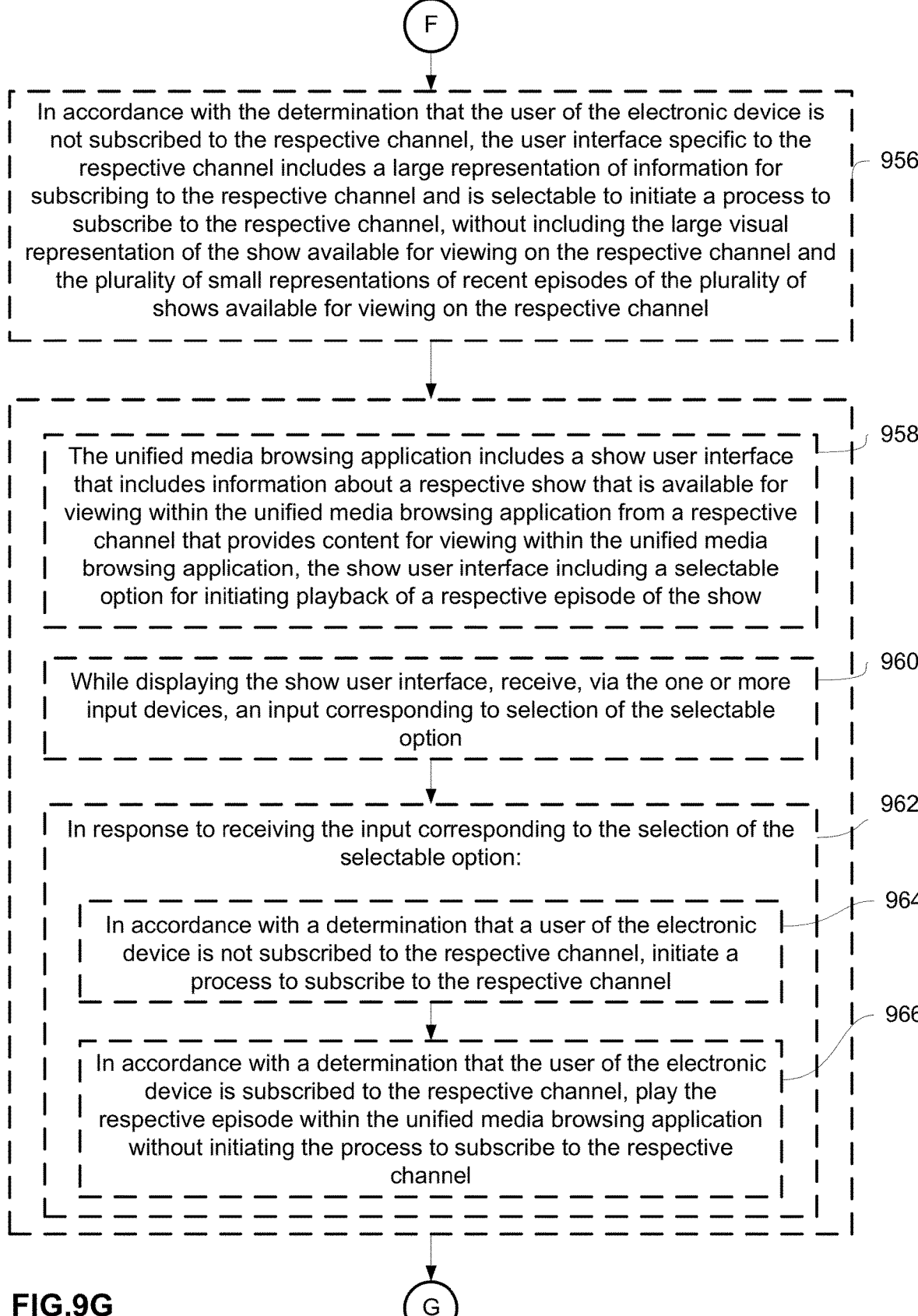

( F )

In accordance with the determination that the user of the electronic device is not subscribed to the respective channel, the user interface specific to the respective channel includes a large representation of information for subscribing to the respective channel and is selectable to initiate a process to subscribe to the respective channel, without including the large visual representation of the show available for viewing on the respective channel and the plurality of small representations of recent episodes of the plurality of shows available for viewing on the respective channel — 956

958

The unified media browsing application includes a show user interface that includes information about a respective show that is available for viewing within the unified media browsing application from a respective channel that provides content for viewing within the unified media browsing application, the show user interface including a selectable option for initiating playback of a respective episode of the show

960

While displaying the show user interface, receive, via the one or more input devices, an input corresponding to selection of the selectable option

962

In response to receiving the input corresponding to the selection of the selectable option:

964

In accordance with a determination that a user of the electronic device is not subscribed to the respective channel, initiate a process to subscribe to the respective channel

966

In accordance with a determination that the user of the electronic device is subscribed to the respective channel, play the respective episode within the unified media browsing application without initiating the process to subscribe to the respective channel

FIG.9G      ( G )

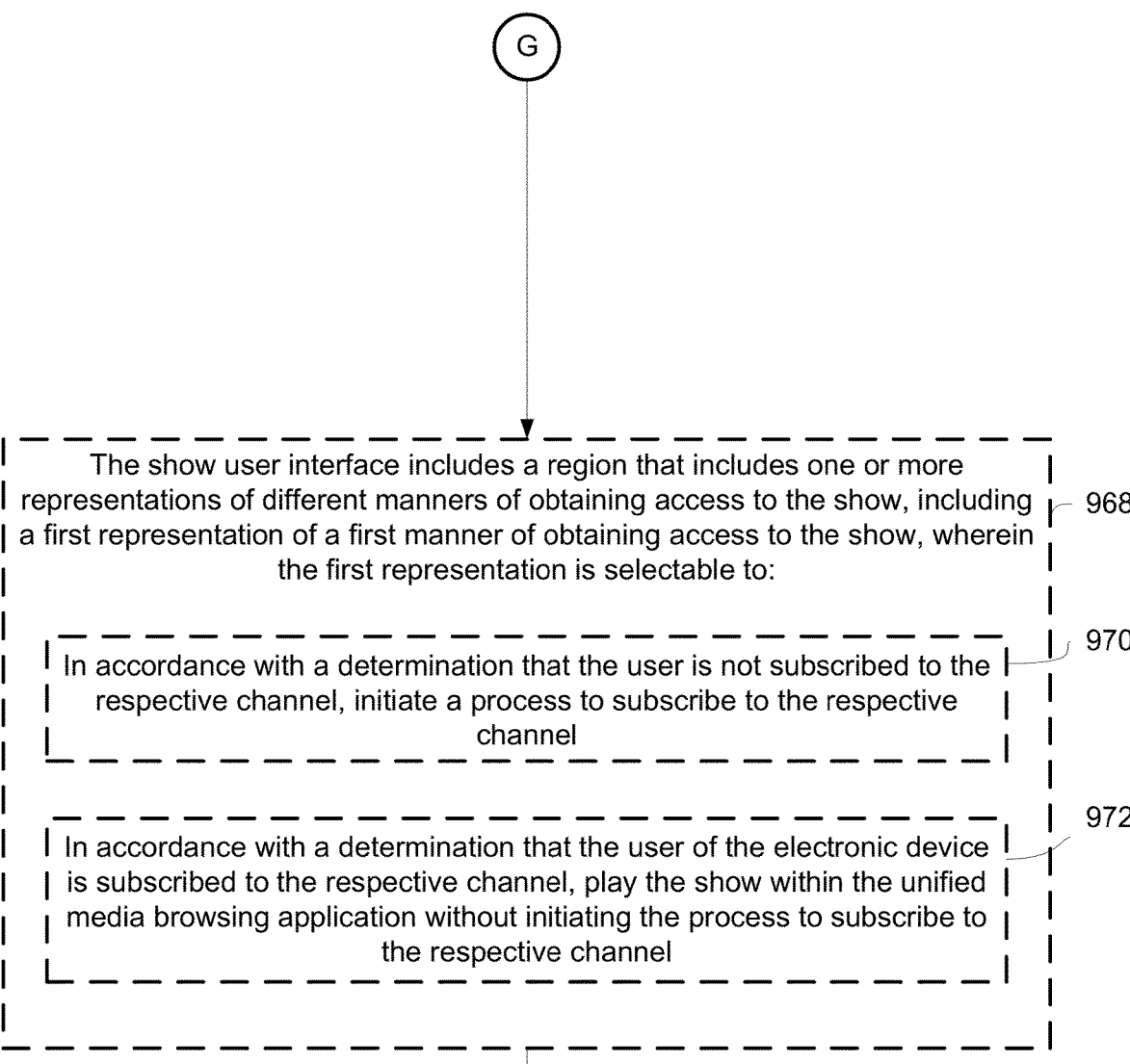

G

The show user interface includes a region that includes one or more representations of different manners of obtaining access to the show, including a first representation of a first manner of obtaining access to the show, wherein the first representation is selectable to: — 968

In accordance with a determination that the user is not subscribed to the respective channel, initiate a process to subscribe to the respective channel — 970

In accordance with a determination that the user of the electronic device is subscribed to the respective channel, play the show within the unified media browsing application without initiating the process to subscribe to the respective channel — 972

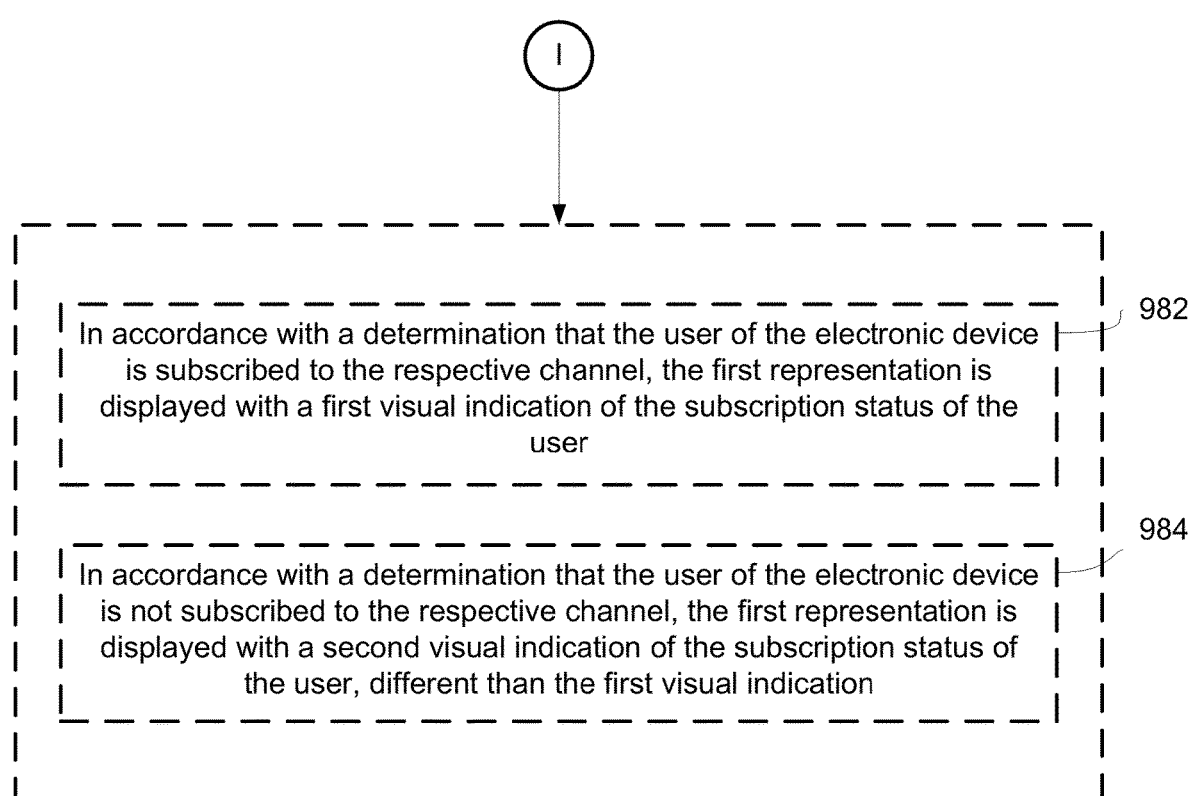

In accordance with a determination that the user of the electronic device is subscribed to the respective channel, the first representation is displayed with a first visual indication of the subscription status of the user
982

In accordance with a determination that the user of the electronic device is not subscribed to the respective channel, the first representation is displayed with a second visual indication of the subscription status of the user, different than the first visual indication
984

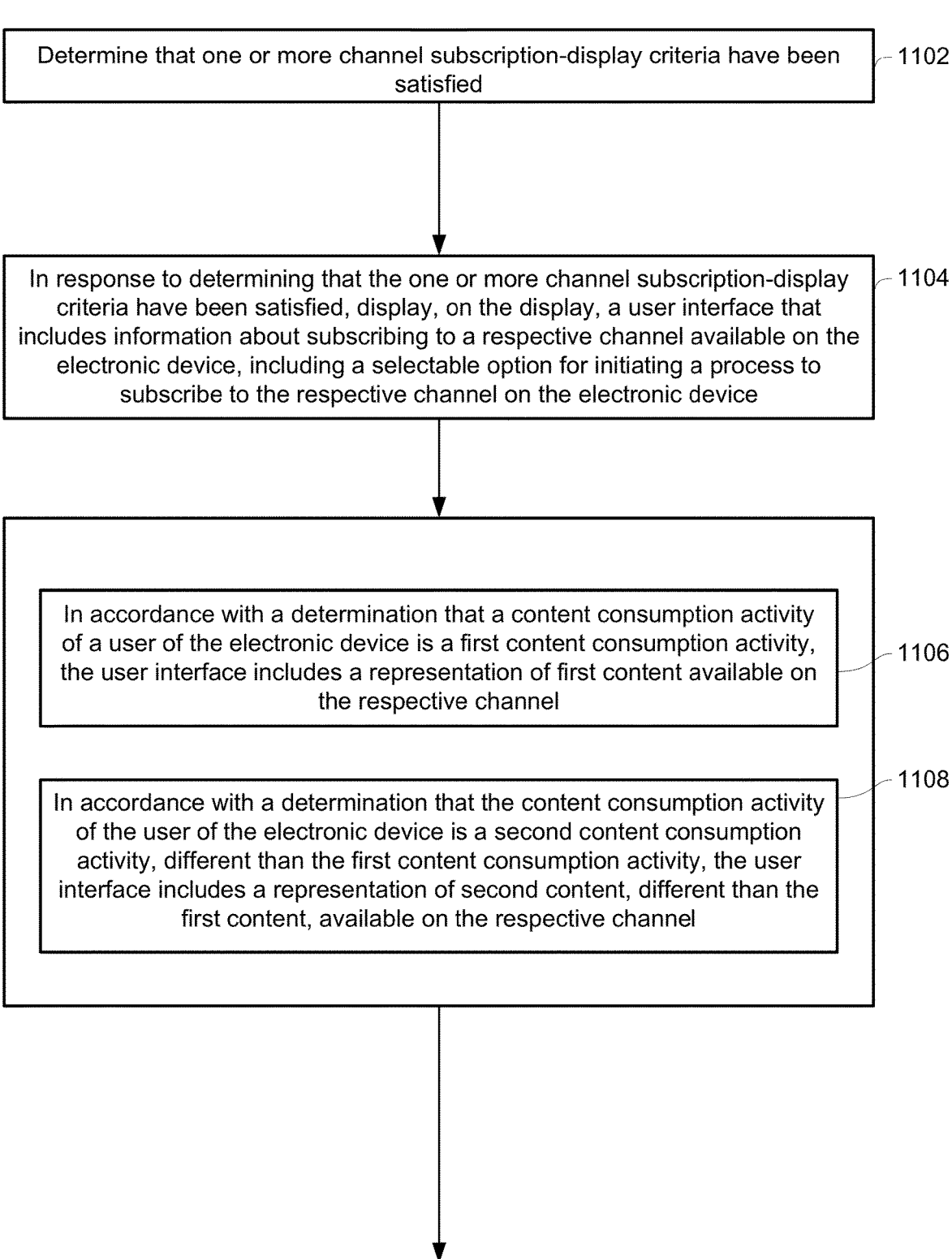

Determine that one or more channel subscription-display criteria have been satisfied — 1102

In response to determining that the one or more channel subscription-display criteria have been satisfied, display, on the display, a user interface that includes information about subscribing to a respective channel available on the electronic device, including a selectable option for initiating a process to subscribe to the respective channel on the electronic device — 1104

In accordance with a determination that a content consumption activity of a user of the electronic device is a first content consumption activity, the user interface includes a representation of first content available on the respective channel — 1106

In accordance with a determination that the content consumption activity of the user of the electronic device is a second content consumption activity, different than the first content consumption activity, the user interface includes a representation of second content, different than the first content, available on the respective channel — 1108

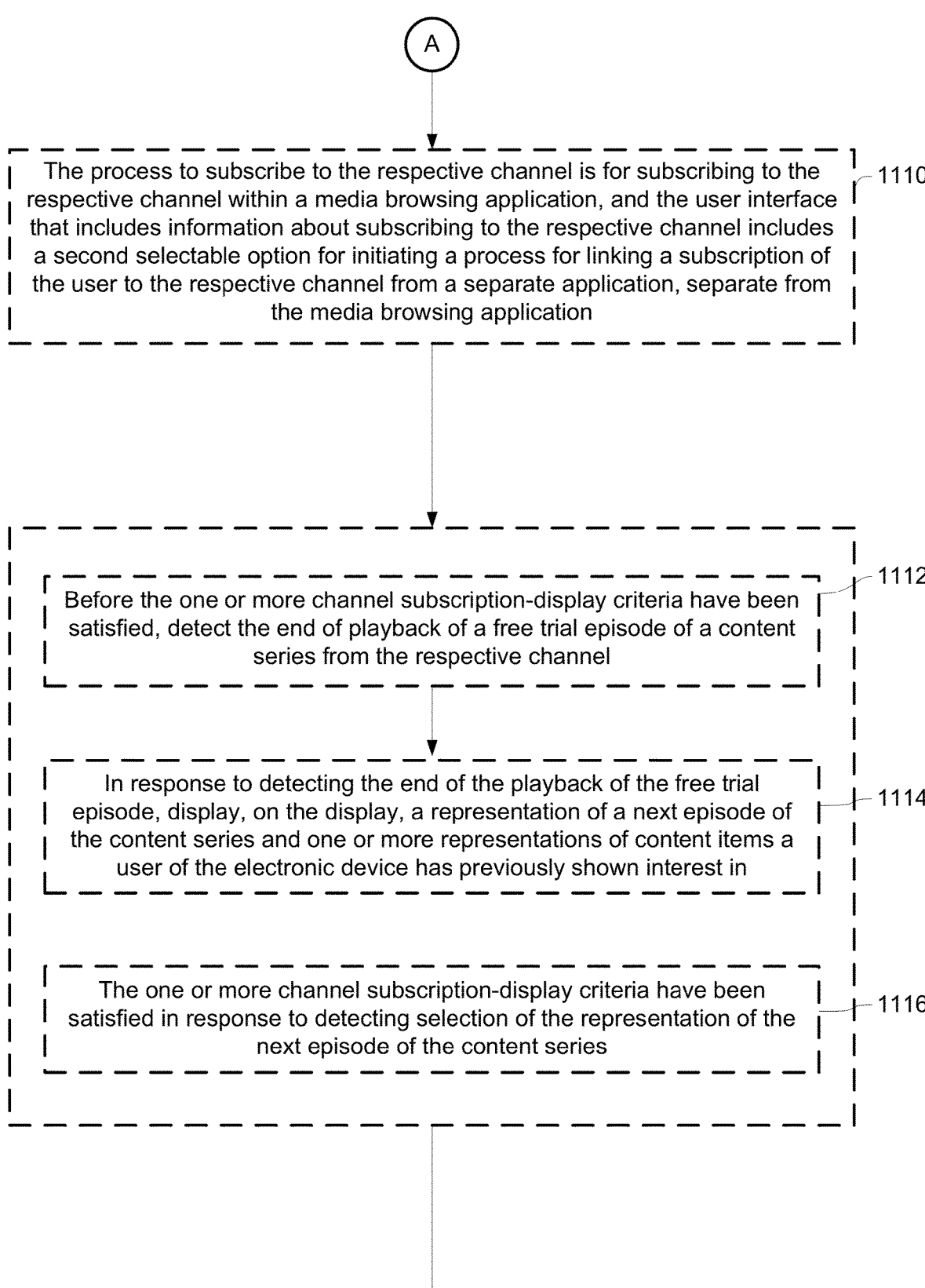

The process to subscribe to the respective channel is for subscribing to the respective channel within a media browsing application, and the user interface that includes information about subscribing to the respective channel includes a second selectable option for initiating a process for linking a subscription of the user to the respective channel from a separate application, separate from the media browsing application — 1110

Before the one or more channel subscription-display criteria have been satisfied, detect the end of playback of a free trial episode of a content series from the respective channel — 1112

In response to detecting the end of the playback of the free trial episode, display, on the display, a representation of a next episode of the content series and one or more representations of content items a user of the electronic device has previously shown interest in — 1114

The one or more channel subscription-display criteria have been satisfied in response to detecting selection of the representation of the next episode of the content series — 1116

FIG.11B

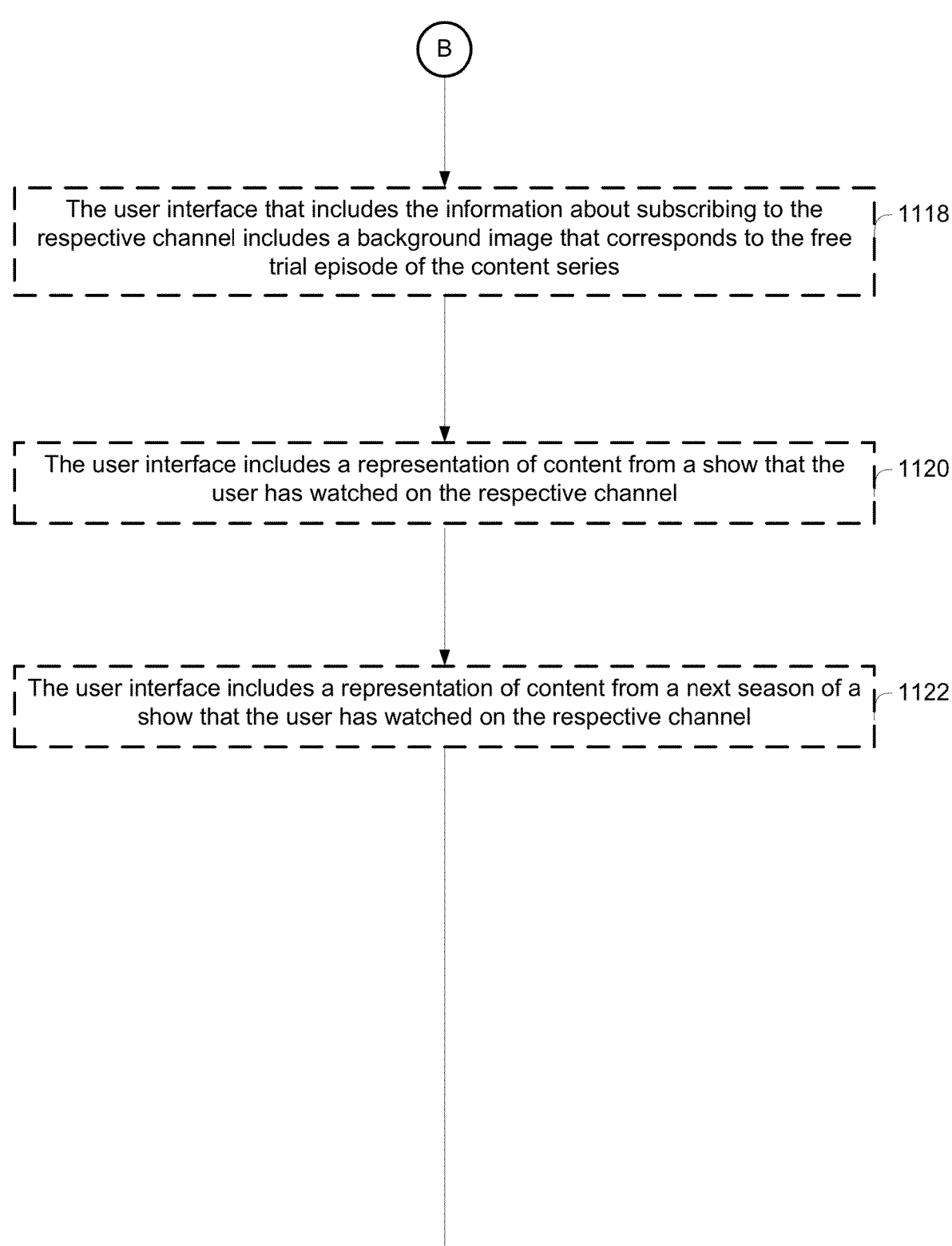

B

The user interface that includes the information about subscribing to the respective channel includes a background image that corresponds to the free trial episode of the content series ⌐1118

The user interface includes a representation of content from a show that the user has watched on the respective channel ⌐1120

The user interface includes a representation of content from a next season of a show that the user has watched on the respective channel ⌐1122

FIG.11C     C

USER INTERFACES FOR INTERACTING WITH CHANNELS THAT PROVIDE CONTENT THAT PLAYS IN A MEDIA BROWSING APPLICATION

CROSS-REFERENCE TO RELATED APPLICATIONS

This application is a continuation of U.S. patent application Ser. No. 16/584,790, filed Sep. 26, 2019, and published on Sep. 24, 2020 as U.S. Publication No. 2020-0304876, which claims benefit of U.S. Provisional Patent Application No. 62/822,952, filed Mar. 24, 2019, the contents of which are hereby incorporated by reference in their entireties for all purposes.

FIELD OF THE DISCLOSURE

This relates generally to user interfaces that enable a user to interact with channels that provide content that plays in a media browsing application on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device presents items of content using a media browsing application. In some circumstances, the items of content are provided by a variety of sources. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that present a plurality of representations of content items that are available on a respective channel in response to successfully subscribing to the respective channel. Some embodiments described in this disclosure are directed to one or more electronic devices that play content that is provided by a channel in a unified media browsing application. Some embodiments described in this disclosure are directed to one or more electronic devices that present information about subscribing to a channel based on content consumption activity of the user on the electronic device. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 3 is a block diagram of an exemplary multifunction device with a display and a touch-sensitive surface in accordance with some embodiments of the disclosure.

FIG. 4 illustrates an exemplary user interface for a multifunction device with a touch-sensitive surface that is separate from the display in accordance with some embodiments of the disclosure.

FIGS. 7A-7J are flow diagrams illustrating a method of presenting a plurality of representations of content items that are available on a respective channel in response to successfully subscribing to the respective channel in accordance with some embodiments of the disclosure.

FIGS. 9A-9J are flow diagrams illustrating a method of playing content that is provided by a channel in a unified media browsing application in accordance with some embodiments of the disclosure.

FIGS. 11A-11D are flow diagrams illustrating a method of presenting information about subscribing to a channel based on content consumption activity of the user on the electronic device in accordance with some embodiments of the disclosure.

DETAILED DESCRIPTION

Figure 1A:
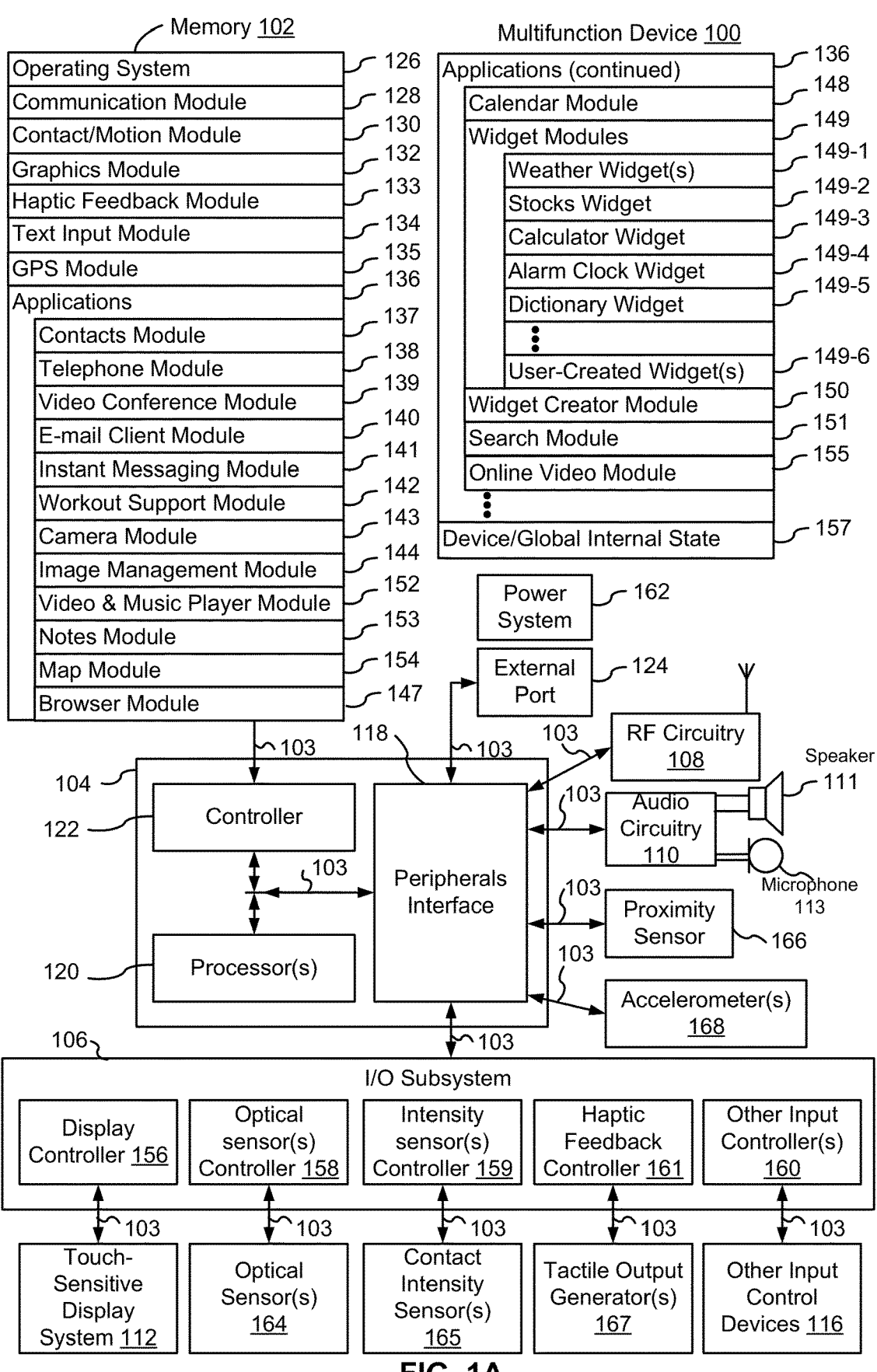
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman) and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch- Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);

telephone module 138;

video conferencing module 139;

e-mail client module 140;

instant messaging (IM) module 141;

workout support module 142;

camera module 143 for still and/or video images;

image management module 144;

video player module;

music player module;

browser module 147;

calendar module 148;

widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module and music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
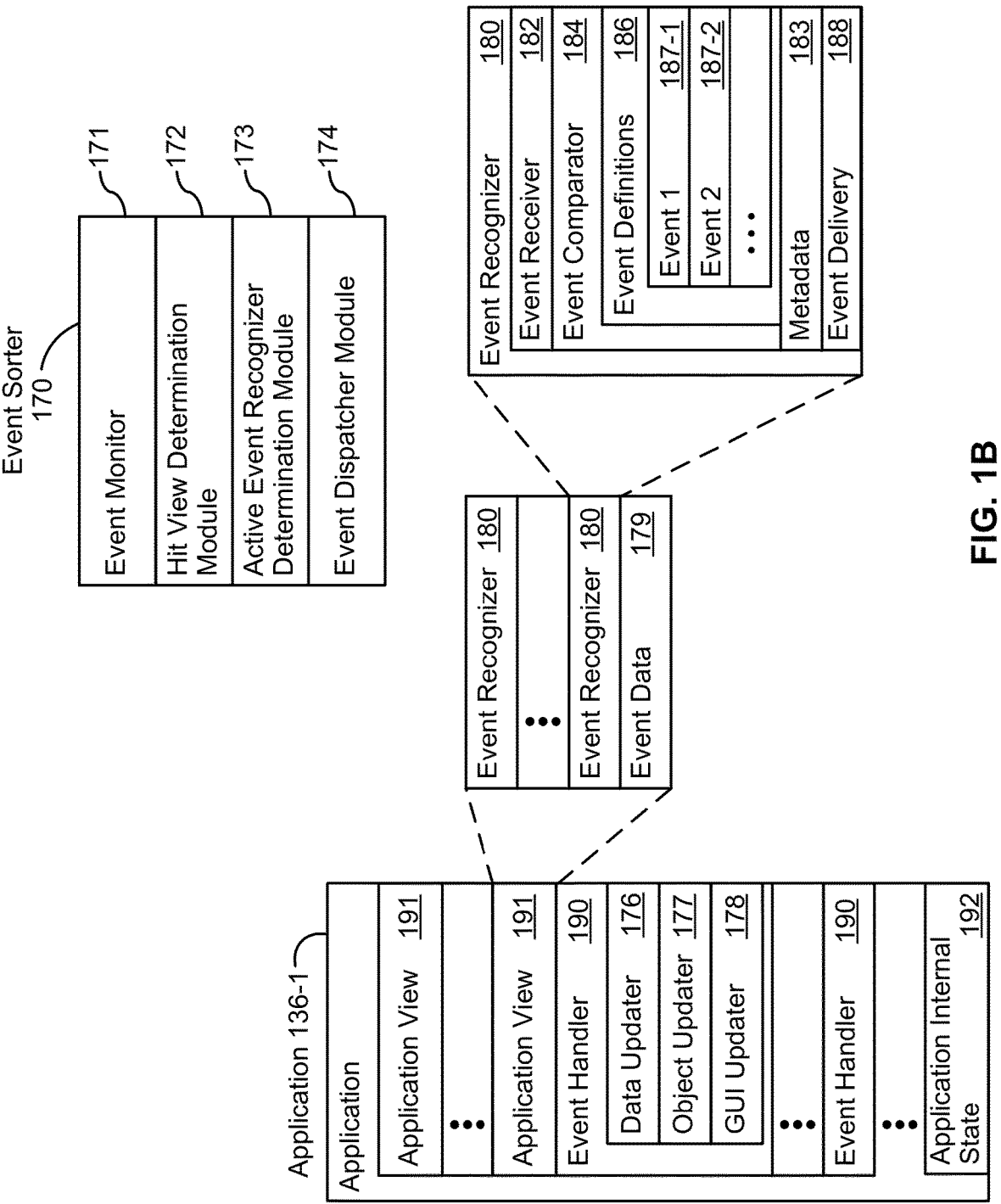
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
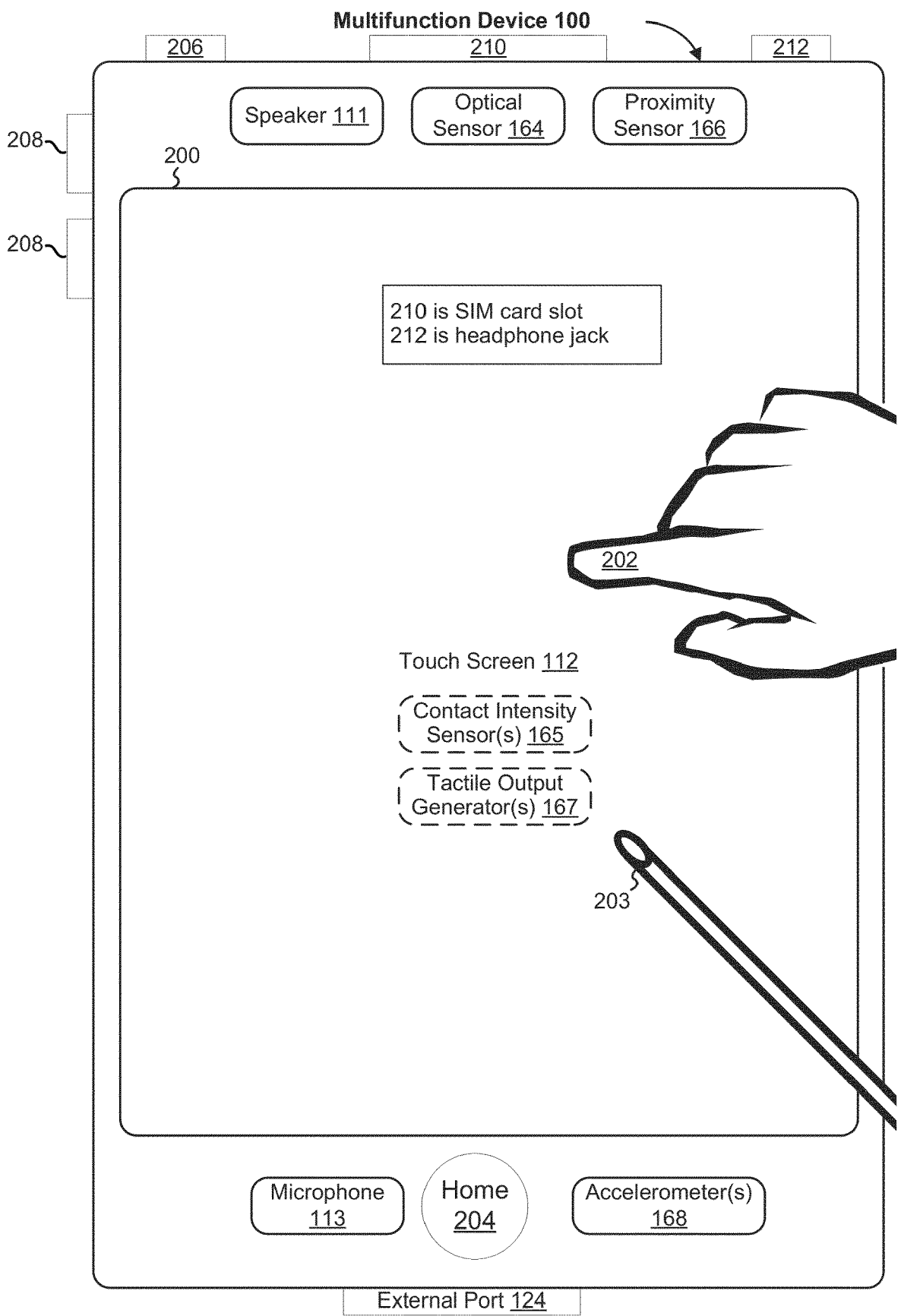
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
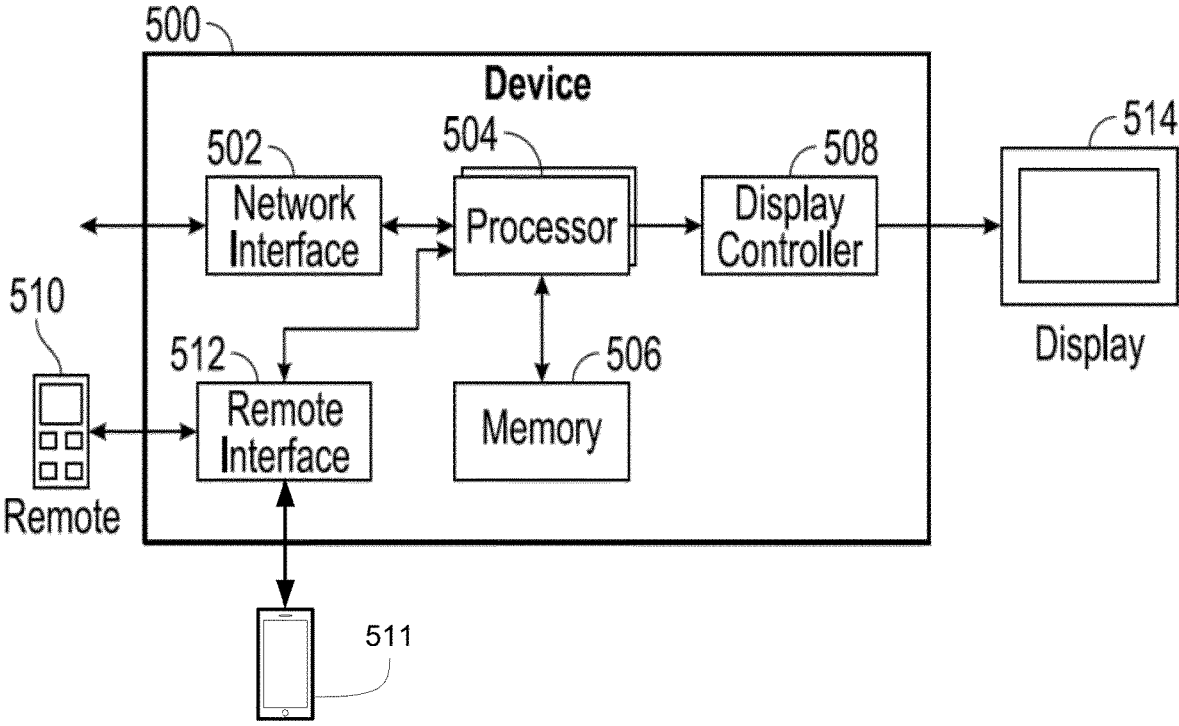
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900 and 1100).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106

(and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
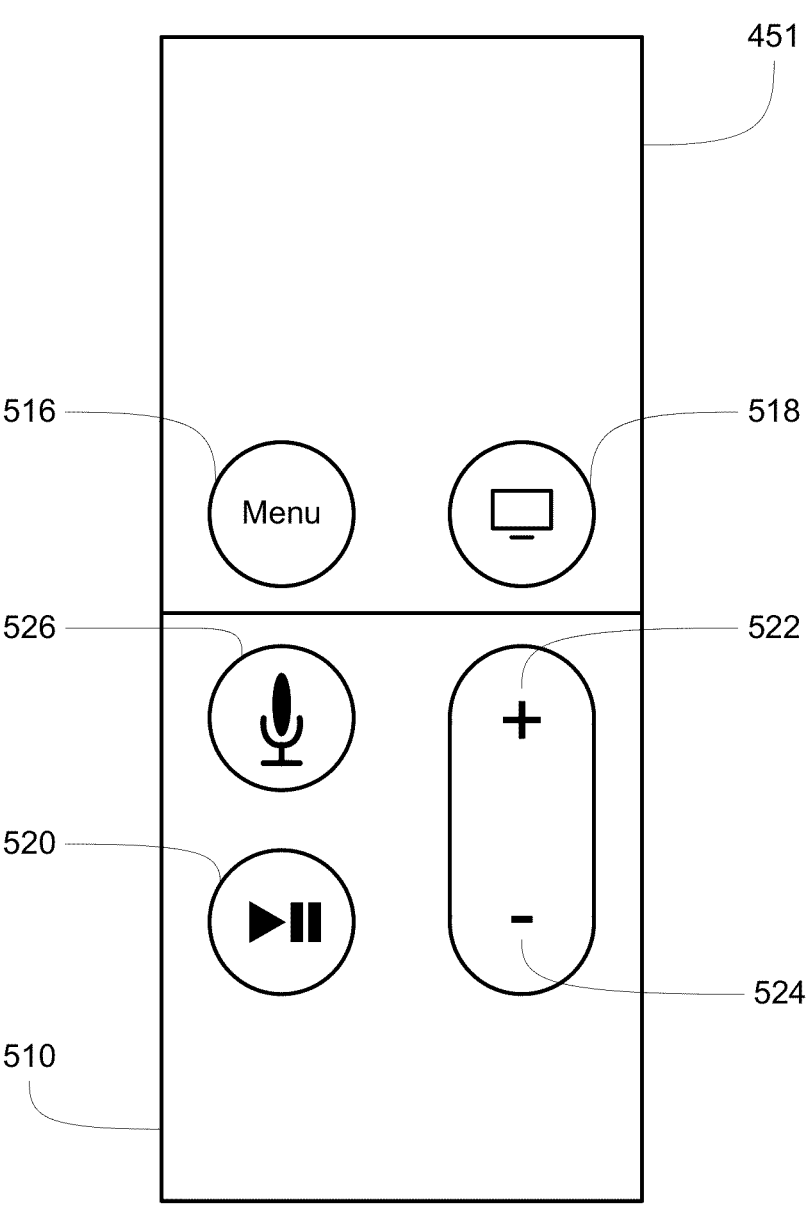

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
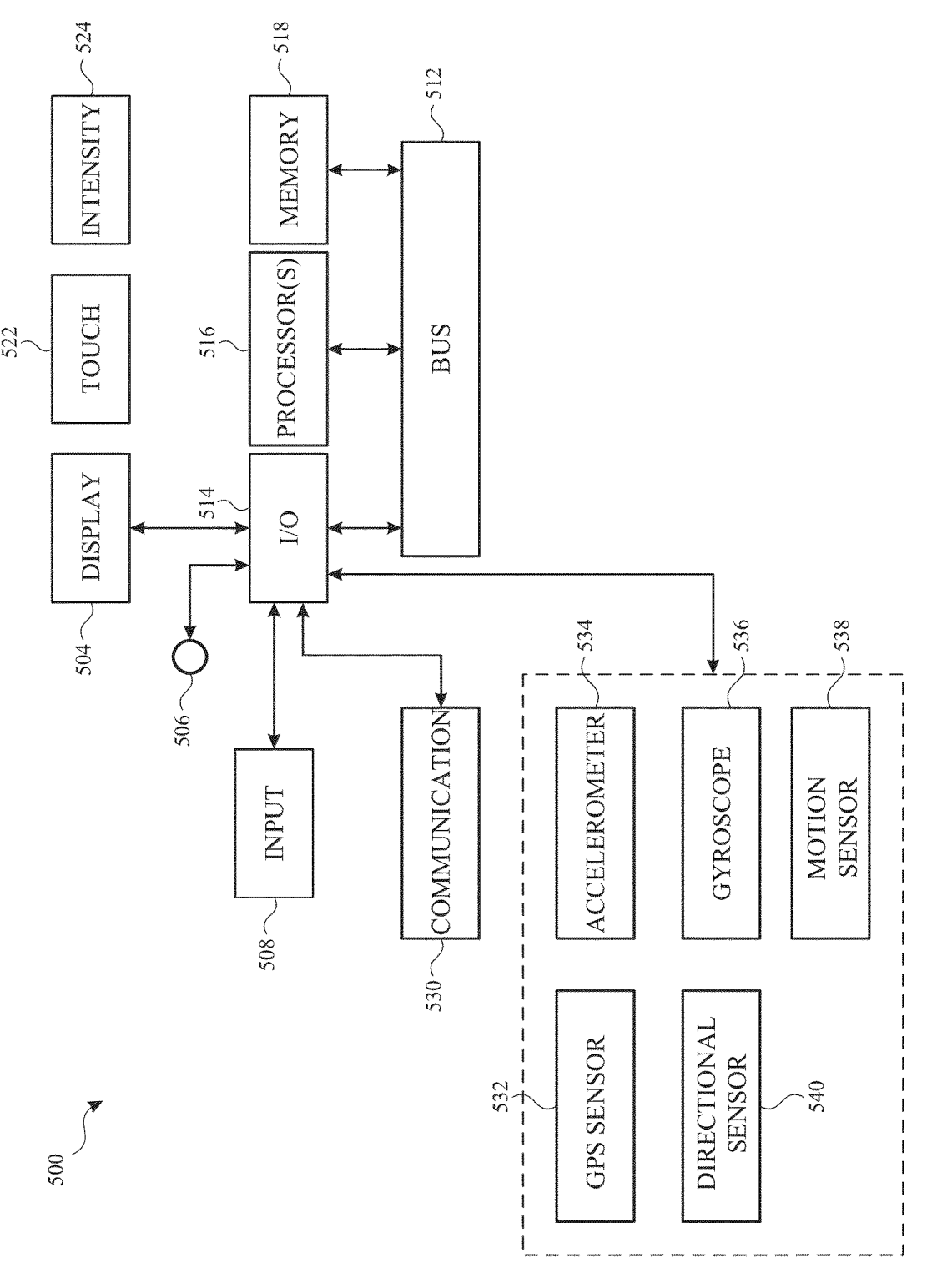

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For a Media Browsing Application" (U.S. application Ser. No. 16/827,910, filed Mar. 24, 2020, and published as U.S. Publication No. 2020/0304863 on Sep. 24, 2020), "User Interfaces Including Selectable Representations of Content Items" (U.S. application Ser. No. 16/827,931, filed Mar. 24, 2020, and issued as U.S. Pat. No. 11,445,263 on Sep. 13, 2022), and "User Interfaces for Viewing and Accessing Content on an Electronic Device" (U.S. application Ser. No. 16/827,918, filed Mar. 24, 2020, and issued as U.S. Pat. No. 11,467,726 on Oct. 11, 2022), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

Representations of Content Available on a Respective Channel

Users interact with electronic devices in many different manners, including using an electronic device to subscribe to a channel that provides access to items of content that play in a media browsing application. In some embodiments, an electronic device is able to present a representation of a channel that is selectable to subscribe to the channel. The embodiments described below provide ways in which an electronic device presents, in a user interface of the media browsing application, representations of items of content available on a respective channel in response to successfully subscribing to the respective channel. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6HH illustrate exemplary ways in which an electronic device presents a plurality of representations of content items that are available on a respective channel in response to successfully subscribing to the respective channel in accordance with some embodiments of the disclosure. The embodiments in these figures are used to illustrate the processes described below, including the processes described with reference to FIGS. 7A-7J.

Figure 6A:
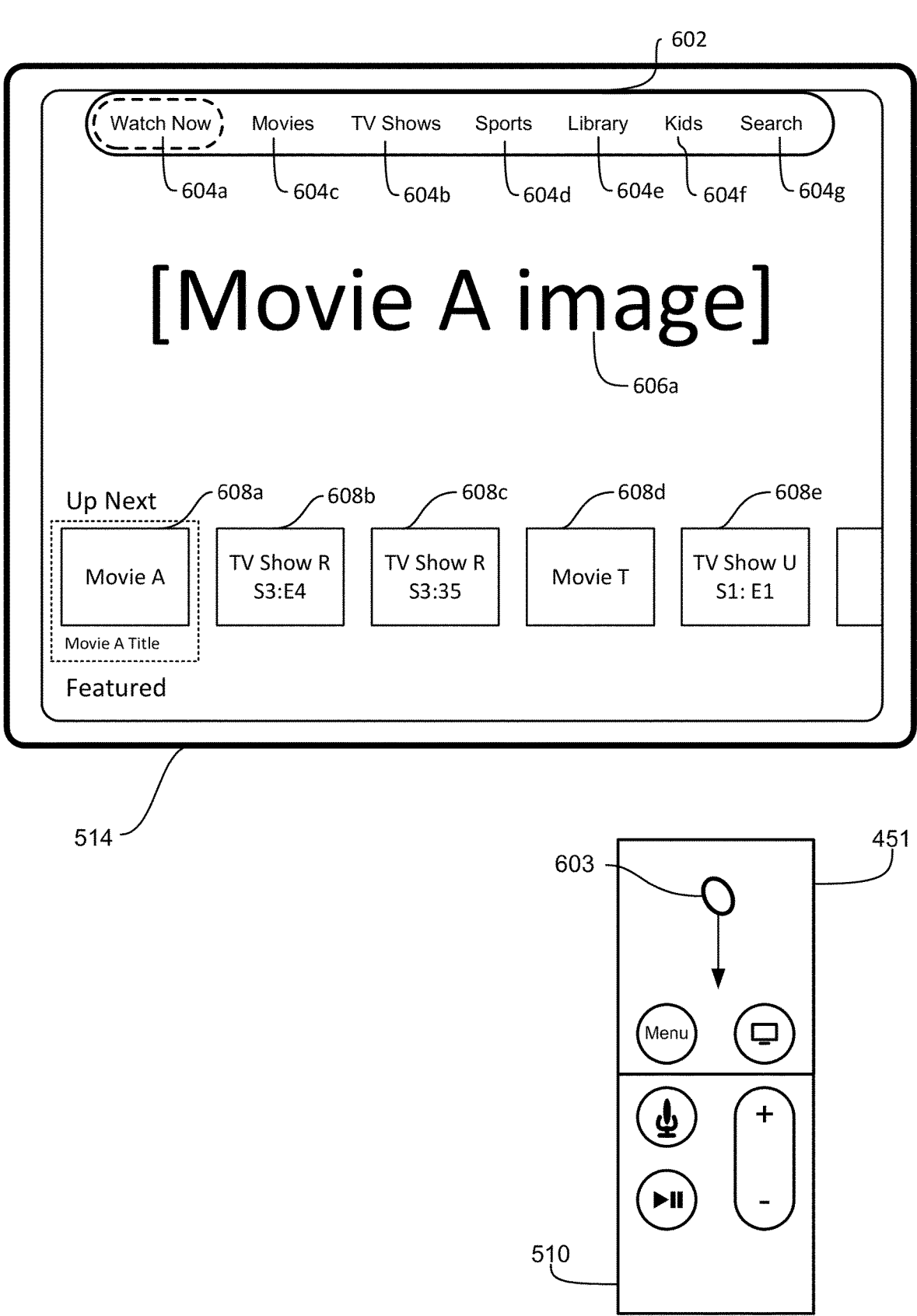
FIGS. 6A-6HH illustrate exemplary ways in which an electronic device presents a plurality of representations of content items that are available on a respective channel in response to successfully subscribing to the respective channel in accordance with some embodiments of the disclosure.

FIGS. 6A-6K illustrate an electronic device 500 presenting user interfaces associated with a process for subscribing to a channel that provides content that plays in a media browsing application. FIG. 6A illustrates a media browsing application user interface. The media browsing application user interface includes a navigation bar 602 including a plurality of navigation tabs 604a (e.g., "Watch Now"), 604b ("TV Shows"), 604c ("Movies"), 604d ("Sports"), 604e ("Library"), 604f ("Kids"), and 604g ("Search"). The media browsing application user interface further includes a plurality of representations of items of content 608a-e that, when selected, cause the electronic device 500 to present the selected content. As shown in FIG. 6A, the user interface includes representations of television and video content because the "Watch Now" tab 604a is selected and the "Watch Now" user interface is associated with both movies and television. As shown in FIG. 6A, the user scrolls (e.g., with contact 603) down in the user interface.

Figure 6B:
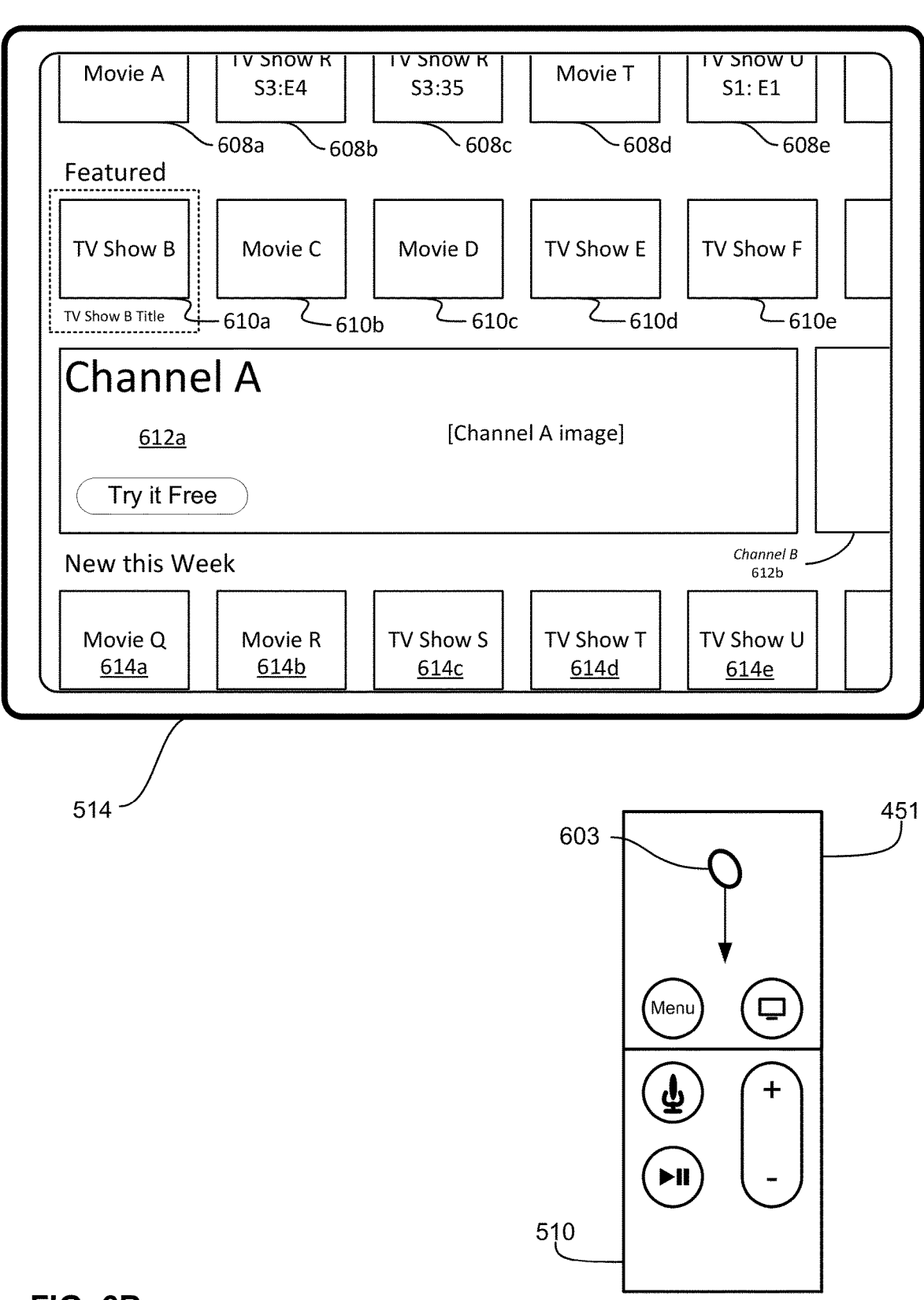

In response to the user's scrolling illustrated in FIG. 6A, in FIG. 6B, the electronic device 500 presents another part of the media browsing application user interface. The user interface includes a plurality of representations of content 608a-e, 610a-e, and 614a-e. In response to selection of one of the representations of content 608, 610, or 614, the electronic device 500 presents a product page user interface that includes more information about the selected item of content. The user interface further includes a representation 612a of a channel that provides content that plays in the media browsing application of the user interface and a portion of another representation 612b of another representation of another channel that provides content that plays in the media browsing application. As shown in FIG. 6B, the user scrolls (e.g., with contact 603) down in the user interface.

Figure 6C:
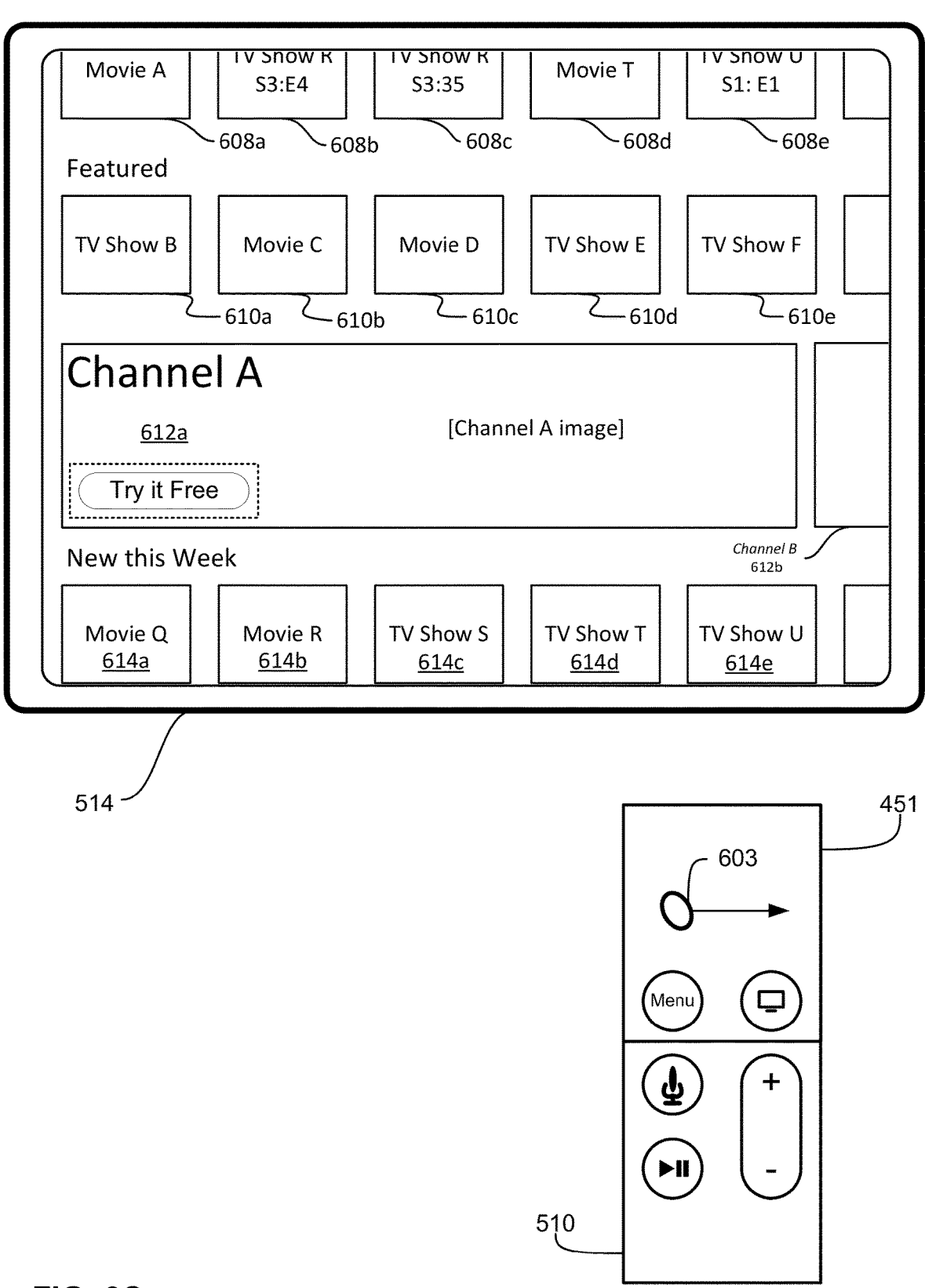

In response to the user's scrolling illustrated in FIG. 6B, the electronic device 500 moves the current focus to the representation 612a of Channel A, as shown in FIG. 6C. The user scrolls (e.g., with contact 603) to the right.

Figure 6D:
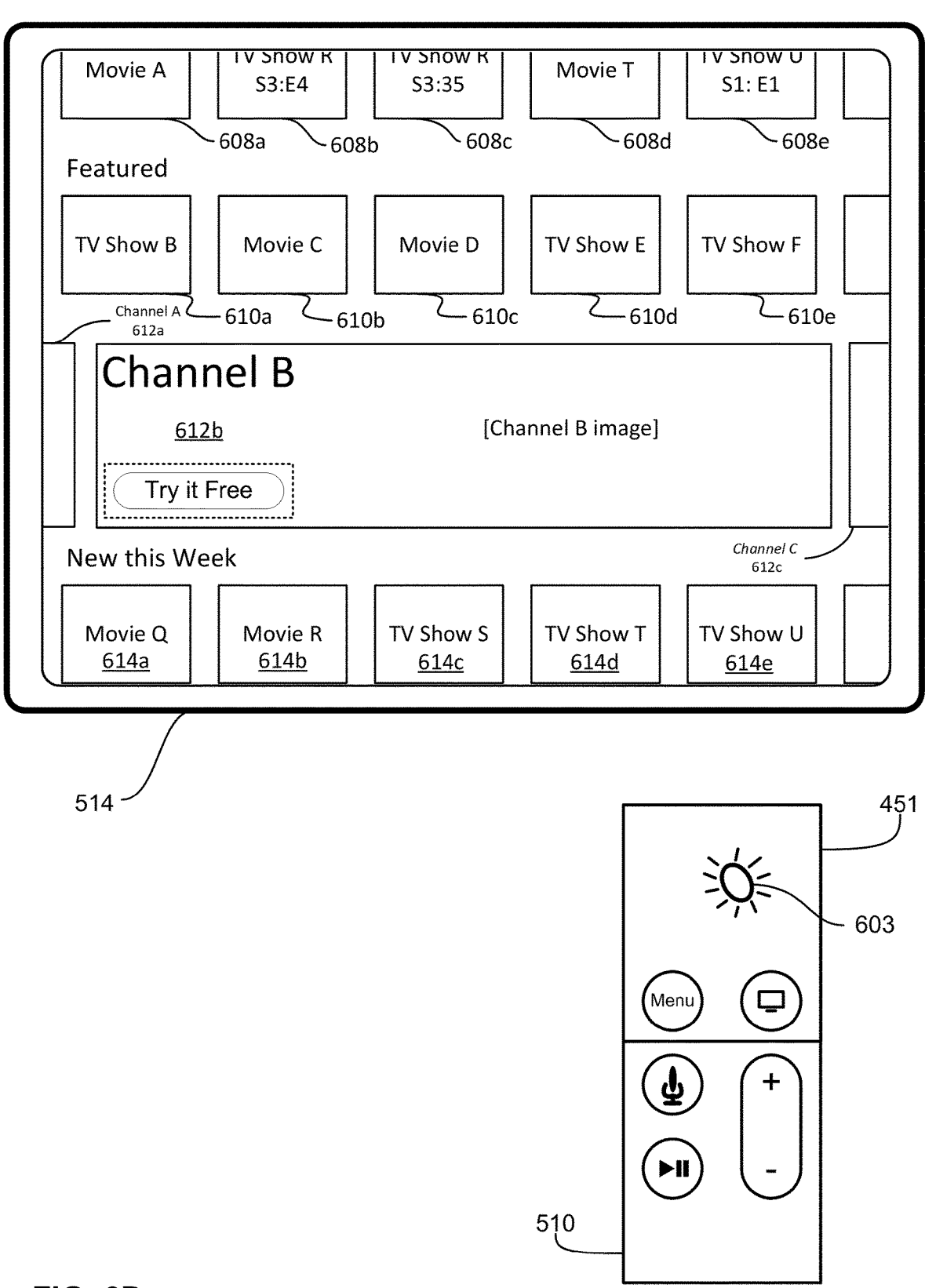

In response to the user's scrolling illustrated in FIG. 6C, the electronic device 500 presents the representation of Channel B 612b in the location in which the representation of Channel A had previously been presented, as shown in FIG. 6C. A portion of the representation 612a of Channel A and a portion of a representation 612c of Channel C are visible on either side of the representation of Channel B. The representation 612b of Channel B includes a selectable option to "Try it Free" because a free trial of Channel B is available. As shown in FIG. 6D, the user selects (e.g., with contact 603) the representation 612b of Channel B. In response to the user's selection, the electronic device 500 presents a user interface for subscribing to Channel B.

Figure 6E:
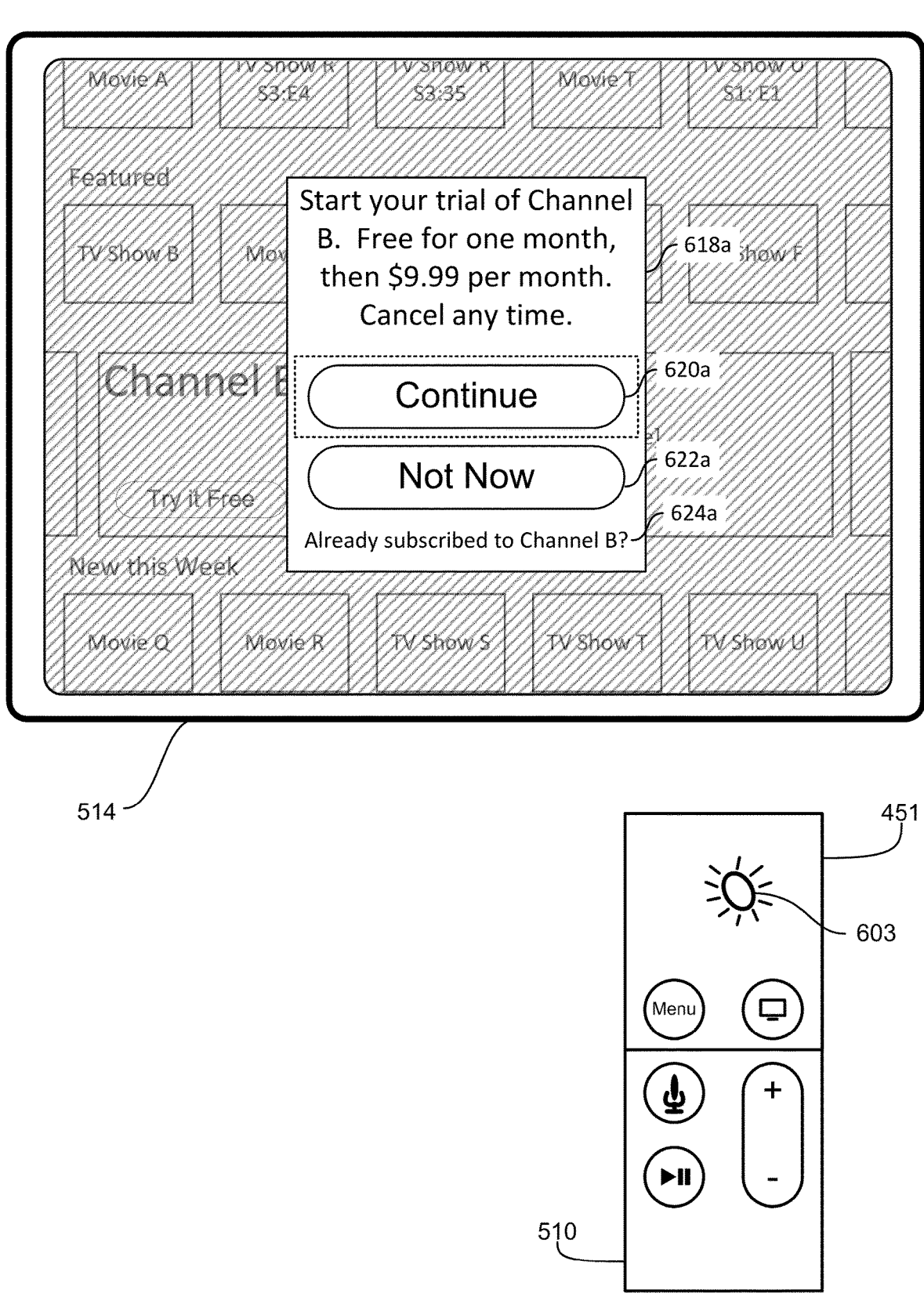

FIG. 6E illustrates a user interface for subscribing to Channel B. The user interface includes an indication 618a of the terms of the subscription to Channel B, a selectable option 620a to continue to subscribe to Channel B, a selectable option 620a to stop the process of subscribing the Channel B, and a selectable option 624a to access a subscription to Channel B via an existing subscription (e.g., an existing subscription to Channel B or an existing subscription to a content provider that includes access to Channel B, such as a television provider account). The user selects (e.g., with contact 603) the option 620a to continue to subscribe to Channel B. In response to the user's selection, the electronic device 500 subscribes to Channel B.

Figure 6F:
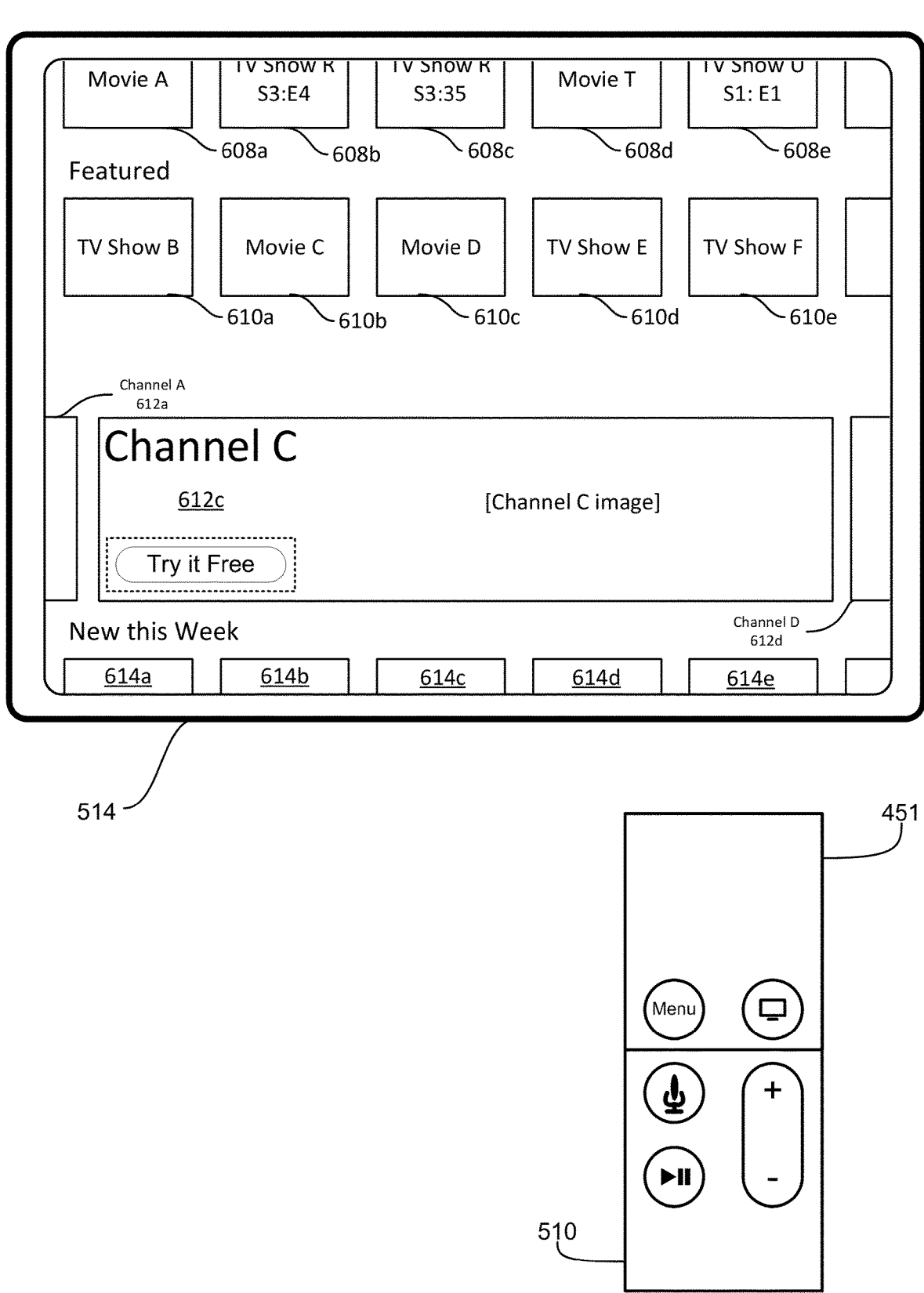

FIGS. 6F-6I illustrate the steps of an animation that is performed in response to the successful subscription to Channel B. In FIG. 6F, the electronic device 500 ceases displaying the user interface for subscribing to Channel B. After ceasing the display of the user interface for subscribing to Channel B, the electronic device 500 presents an animation of a row including representations 612a-612d moving down in the user interface. Although the electronic device 500 no longer presents the representation 612b of Channel B, a representation of Channel C 612c and portions of representations 612a and 612d are presented in the row.

Figure 6G:
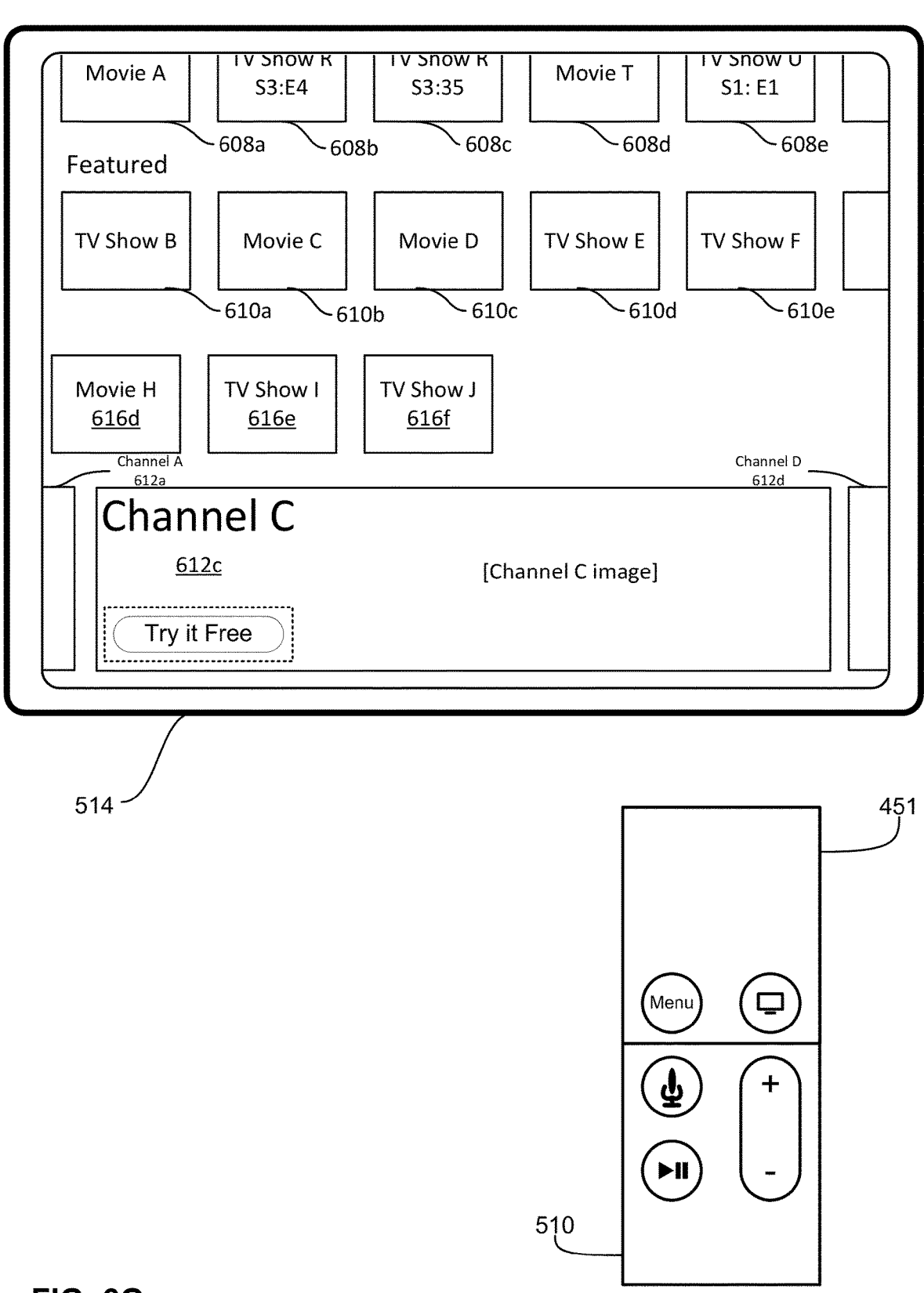
Figure 6H:
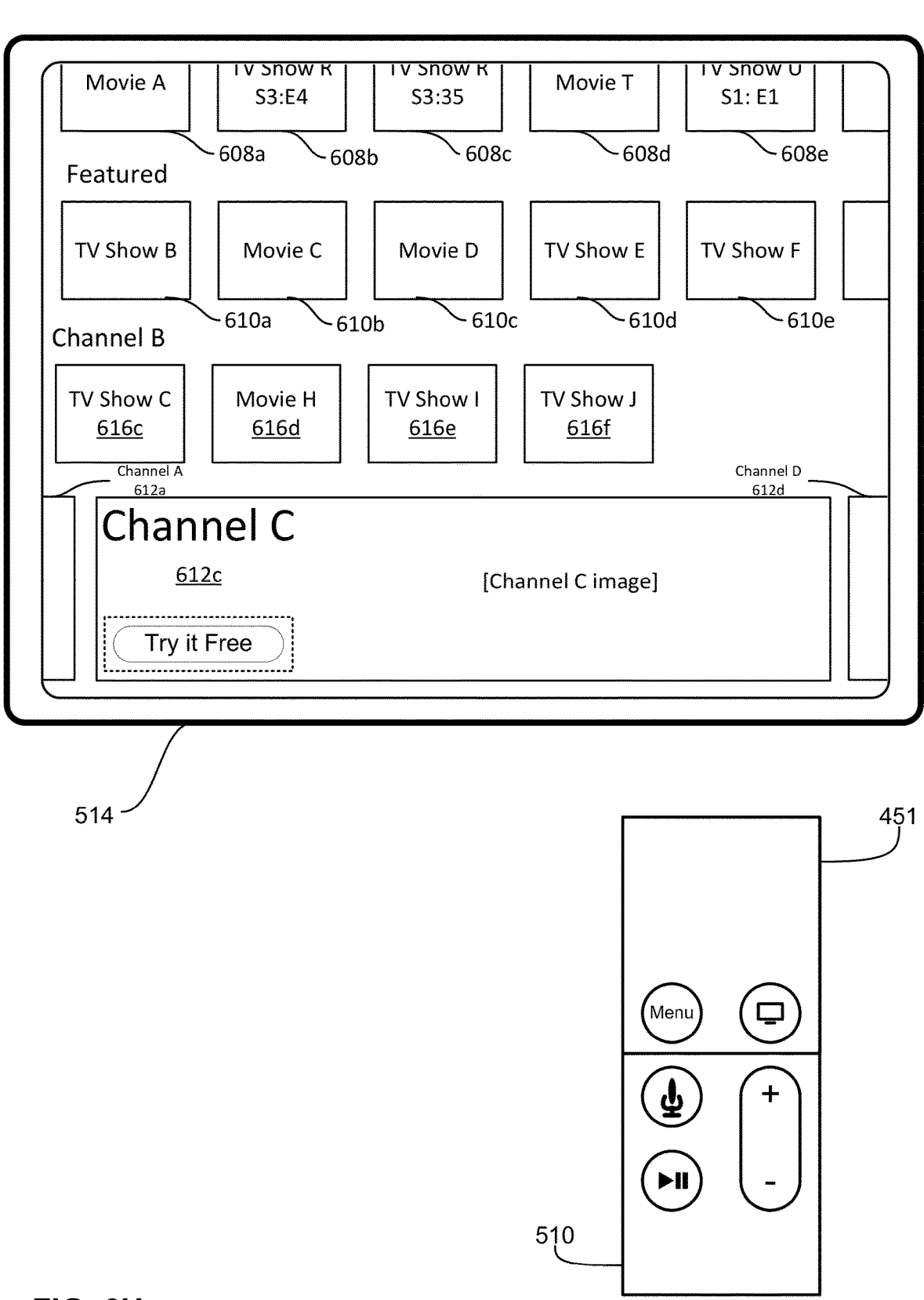

In FIGS. 6G-H, the electronic device 500 presents an animation of a row of representations 616a-616f of content items sliding in to the user interface. The content items are available for playback in the media browsing application with Channel B.

Figure 6I:
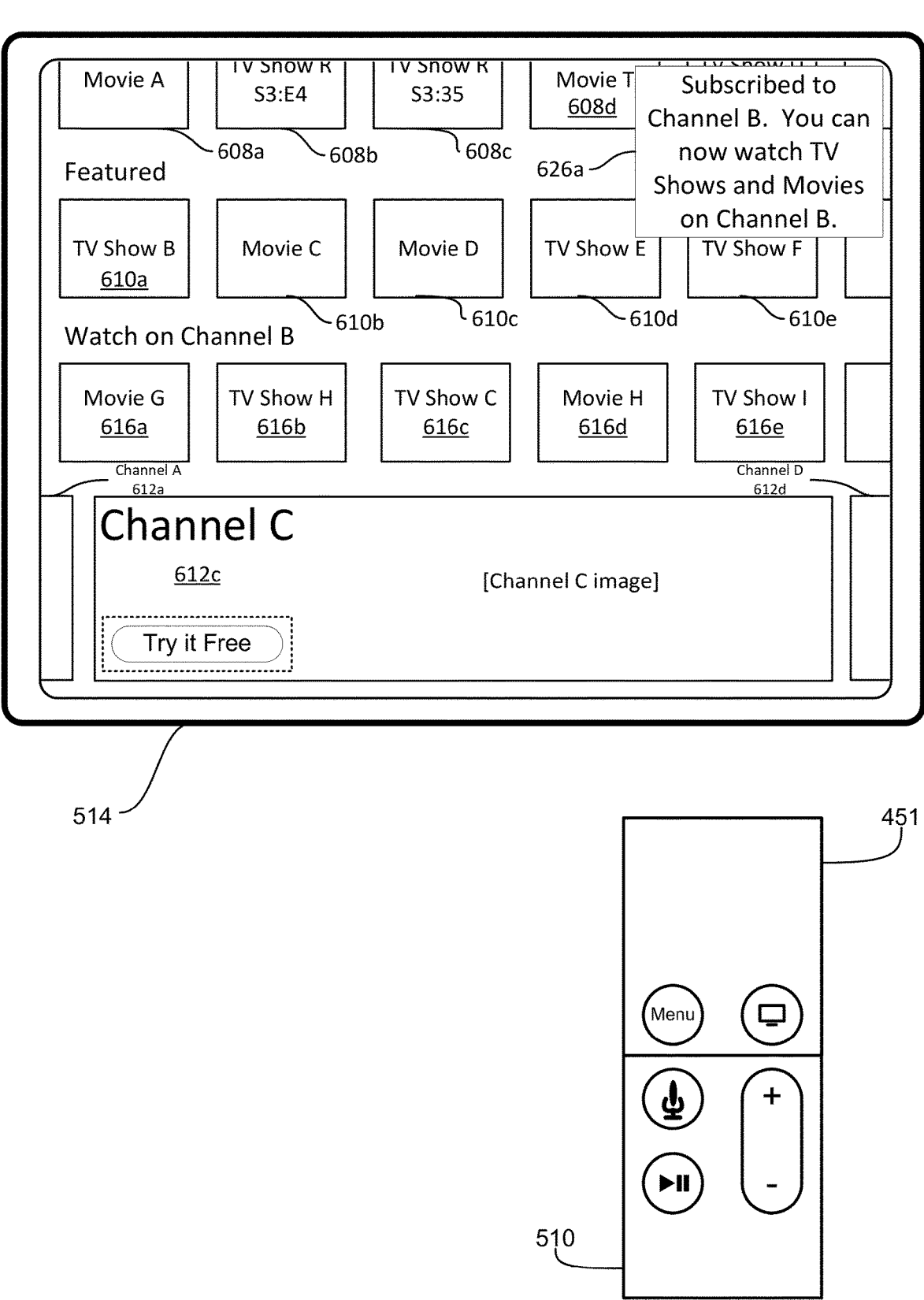

In FIG. 6I, the row of representations 616a-616f of content items available for playback in the media browsing application with Channel B are presented in the user interface. The user interface includes a visual indication 616a of the subscription to Channel B. After a predetermined amount of time (e.g., 1 second, 3 seconds, 5 seconds, 10 seconds, etc.), the indication 626a auto-dismisses, as shown in FIG. 6J.

Figure 6J:
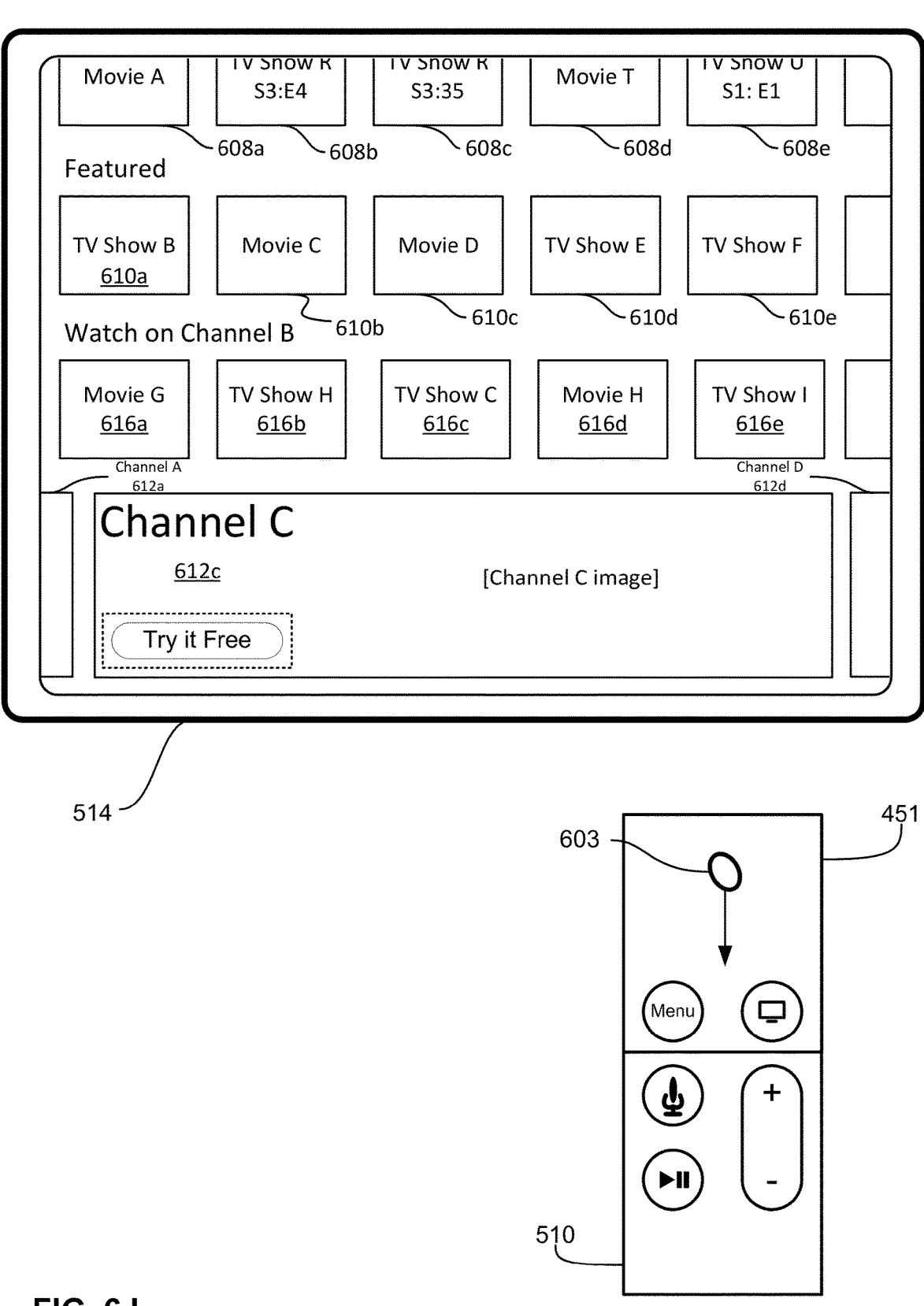
Figure 6K:
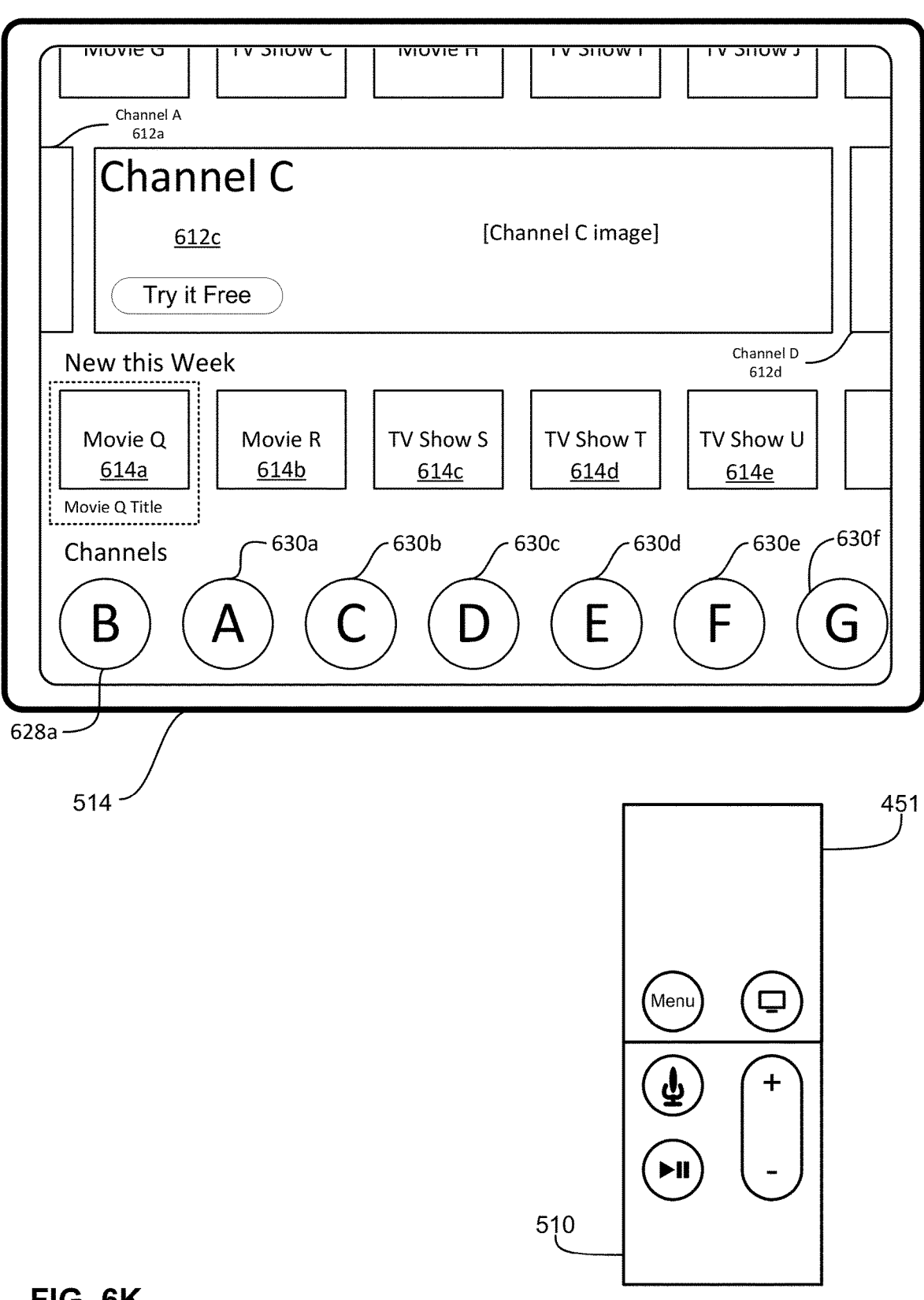

In FIG. 6J, the user scrolls (e.g., with contact 603) the user interface down. In response to the user's scrolling, the electronic device 500 presents additional sections of the user interface of the media browsing application, as shown in FIG. 6K. The electronic device 500 presents a plurality of representations 614a-614e of content available through the media browsing application. When one of the representations 614 is selected, the electronic device 500 presents a product page user interface specific to the selected item of content. The electronic device 500 also presents a plurality of representations of channels available in the content browsing application. The representations include a representation 628a of a channel to which the user is subscribed followed by a plurality of representations 630a-630f of channels to which the user is not subscribed. As shown in FIG. 6K, the representation 628a of the channel to which the user is subscribed is presented first in the row of representations of channels in the user interface. In some embodiments, if the user is subscribed to fewer than two channels, the electronic device does not present an indication or delineation of which channels the user is subscribed to and which channels the user is not subscribed to.

Figure 6L:
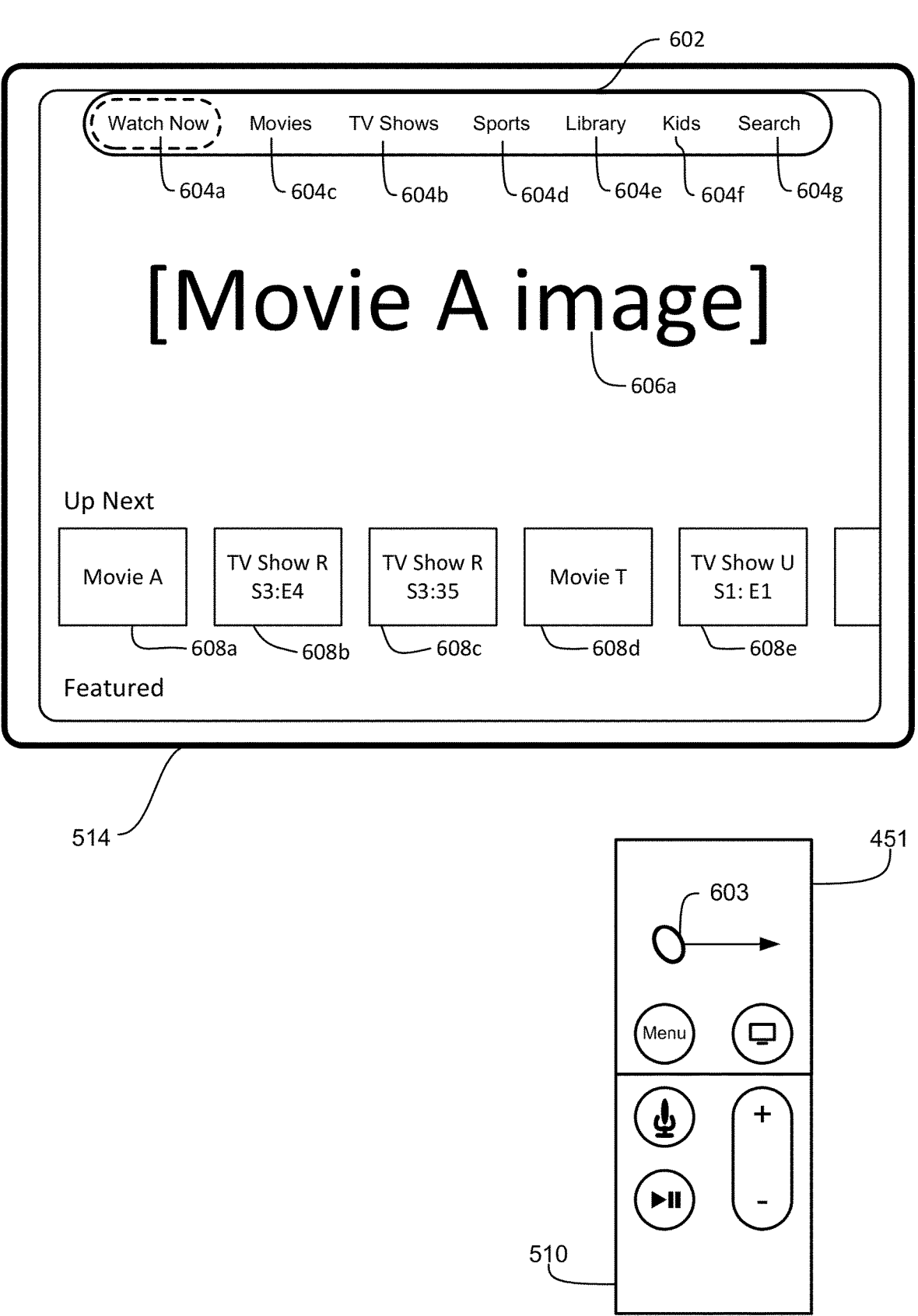

FIGS. 6L-6U illustrate an electronic device 500 presenting user interfaces associated with a process for subscribing to another channel that provides content that plays in a media browsing application. FIG. 6L illustrates the user interface of the media browsing application that includes the navigation bar 602. The current focus of the electronic device is on the "Watch Now" tab 604a of the navigation bar and the user scrolls (e.g., with contact 603) to the right. In response to the scrolling, the electronic device 500 moves the current focus to the right in the user interface.

Figure 6M:
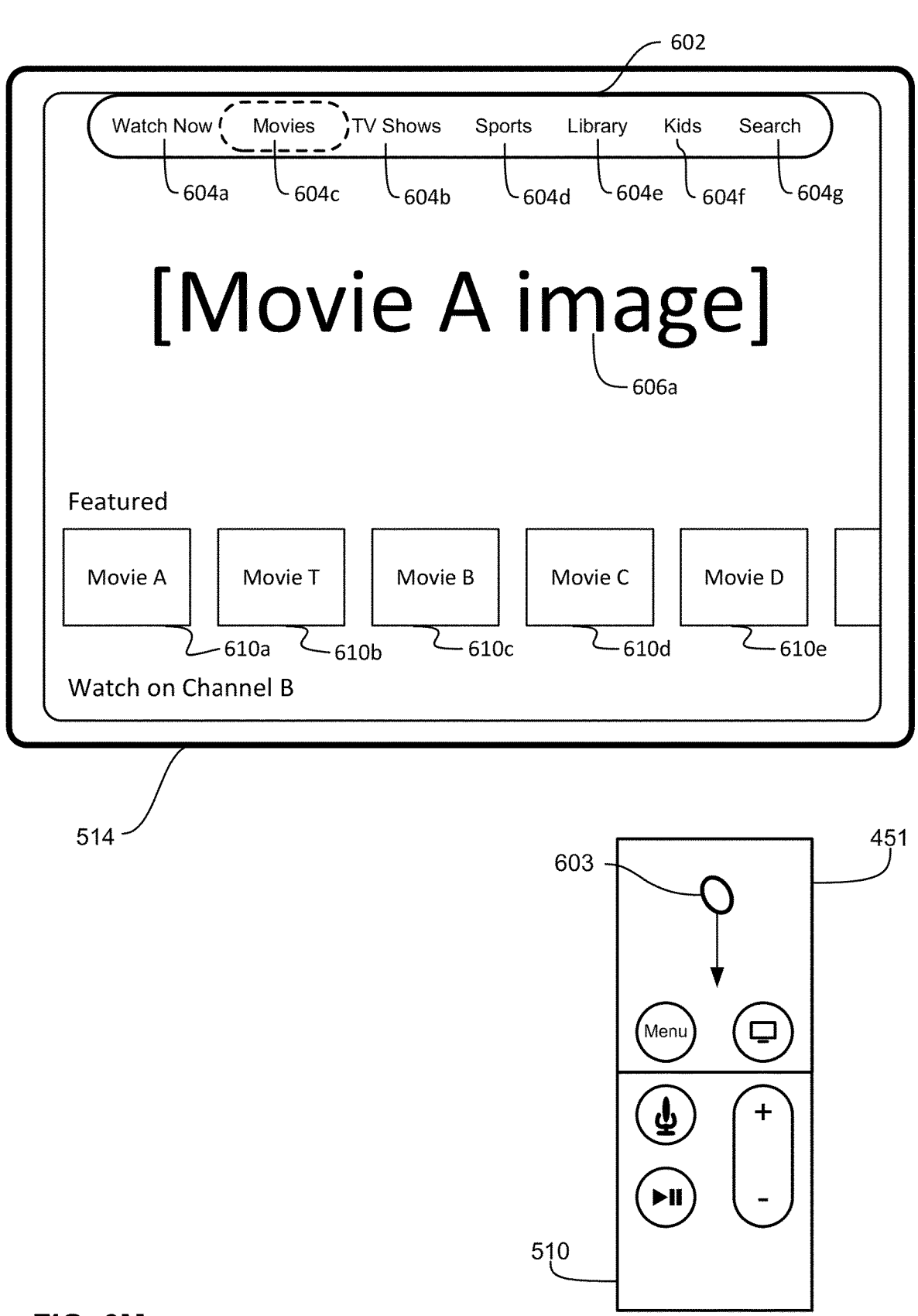

FIG. 6M illustrates the media browsing application user interface after the current focus moved to the "Movies" tab 604c in the navigation bar 602. In response to the user's selection of the "Movies" tab, the electronic device presents a user interface including representations of movie content, such as the representations 610a-610e shown in FIG. 6M. The user scrolls (e.g., with contact 603) down in the user interface. In response to the user's scrolling, the electronic device 500 presents additional portions of the media browsing application user interface.

Figure 6N:
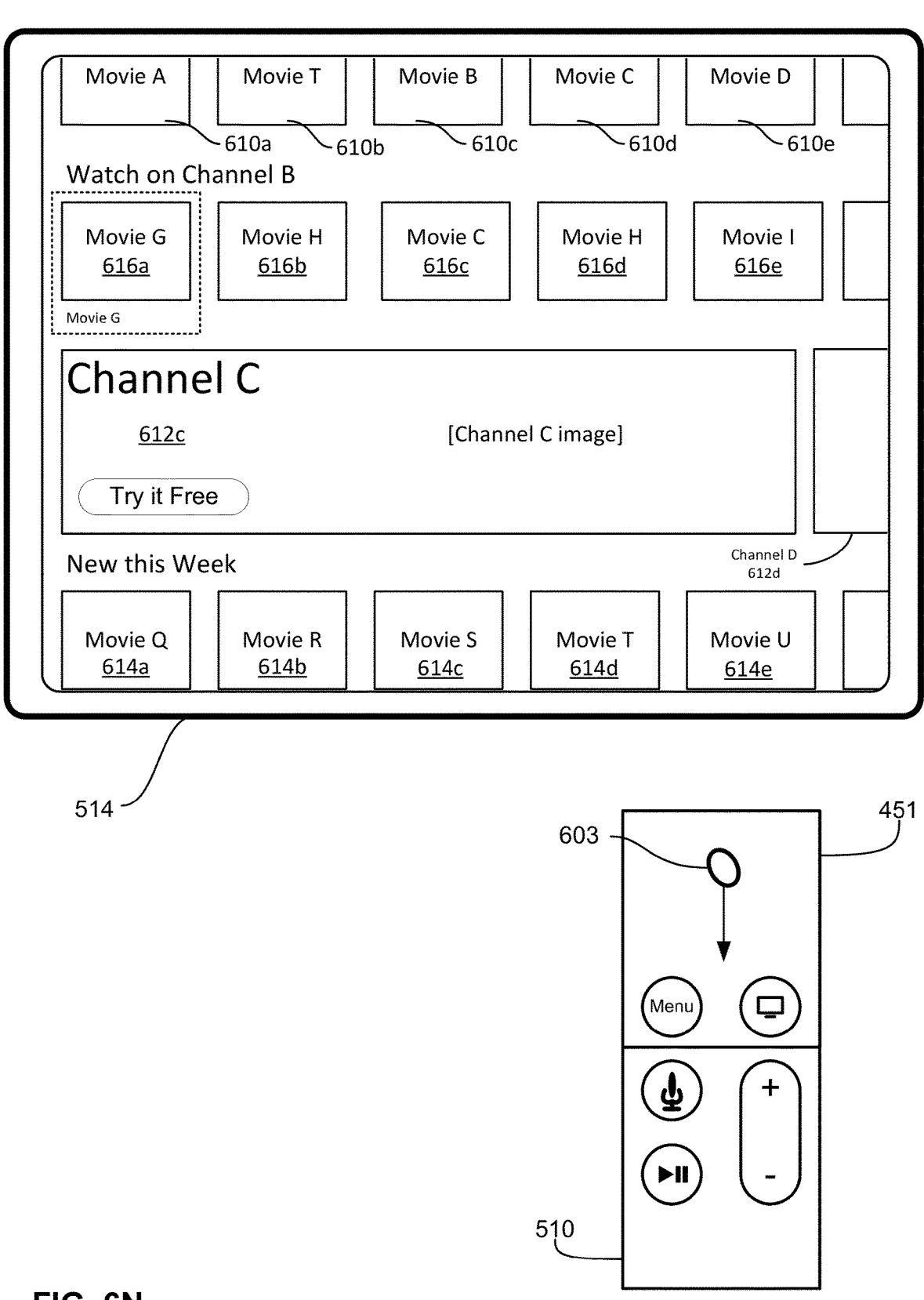

FIG. 6N illustrates an additional portion of the media browsing application user interface that is revealed in response to the user's scrolling illustrated in FIG. 6M. As shown in FIG. 6N, the user interface includes a plurality of representations 610*a-e*, 616*a*-616*e*, and 614*a*-614*e* of movie content accessible to the media browsing application. The user interface also includes a representation 612*c* of Channel C, which is a channel that includes movie content that plays in the media browsing application, and part of a representation 612*d* of Channel D. Although channel A is also available on the media browsing application, the representation of channel A (e.g., representation 612*a* illustrated in FIG. 6B) is not included in the "Movies" page of the media browsing application user interface because Channel A does not provide access to movies (e.g., Channel A only provides access to TV shows). As shown in FIG. 6N, the user scrolls (e.g., with contact 603) down. In response to the user's scrolling, the electronic device moves the current focus from a representation 616*a* of an item of content to the representation 612*c* of Channel C.

Figure 6O:
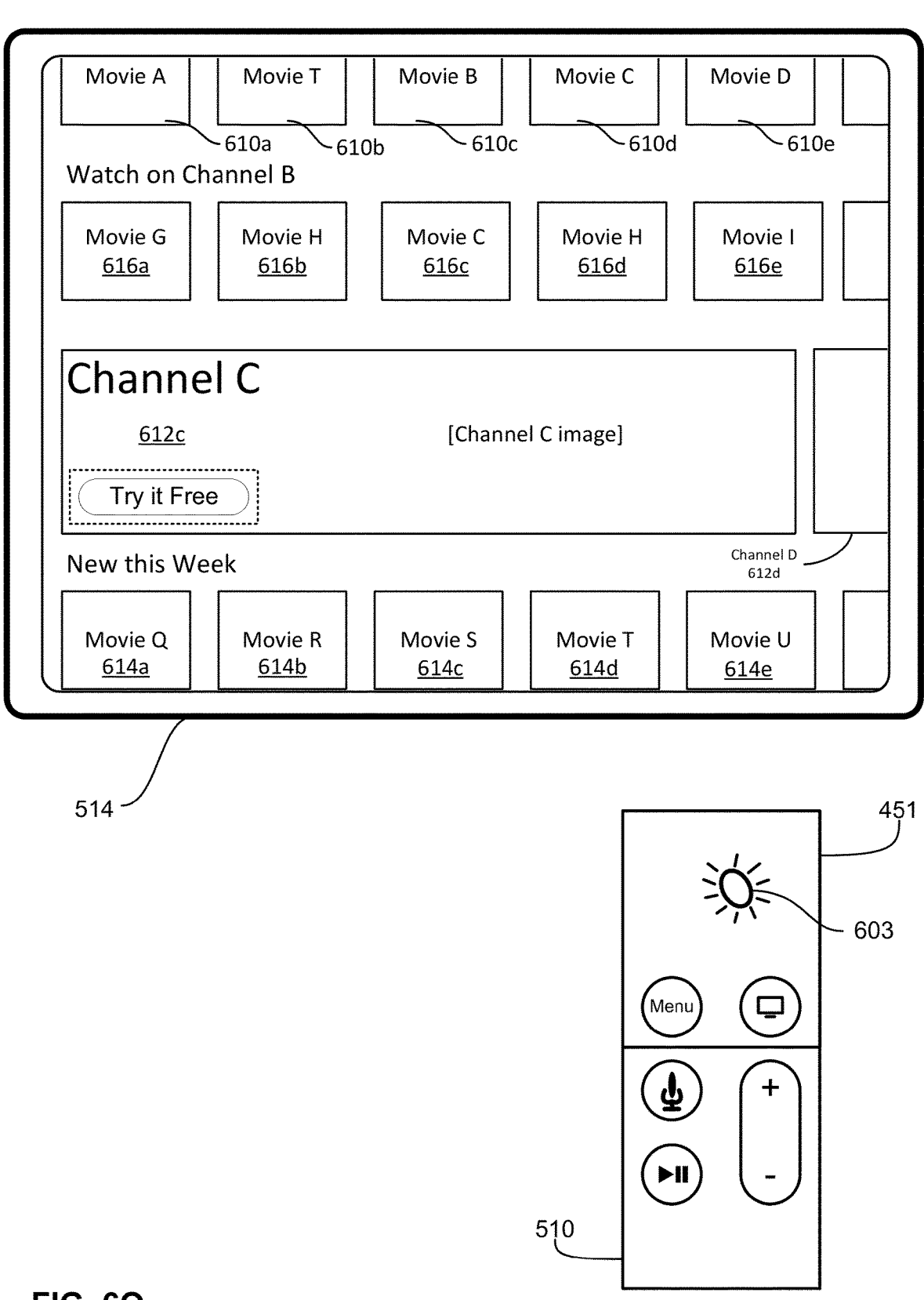

FIG. 6O illustrates the media browsing application user interface with the current focus on the representation 612*c* of Channel C. The representation 612*c* of Channel C includes an option to "Try it Free" because there is a free trial of Channel C available. As shown in FIG. 6O, the user selects (e.g., with contact 603) the representation 612*c* of Channel C. In response to the user's selection, the electronic device 500 presents a user interface for subscribing to Channel C.

Figure 6P:
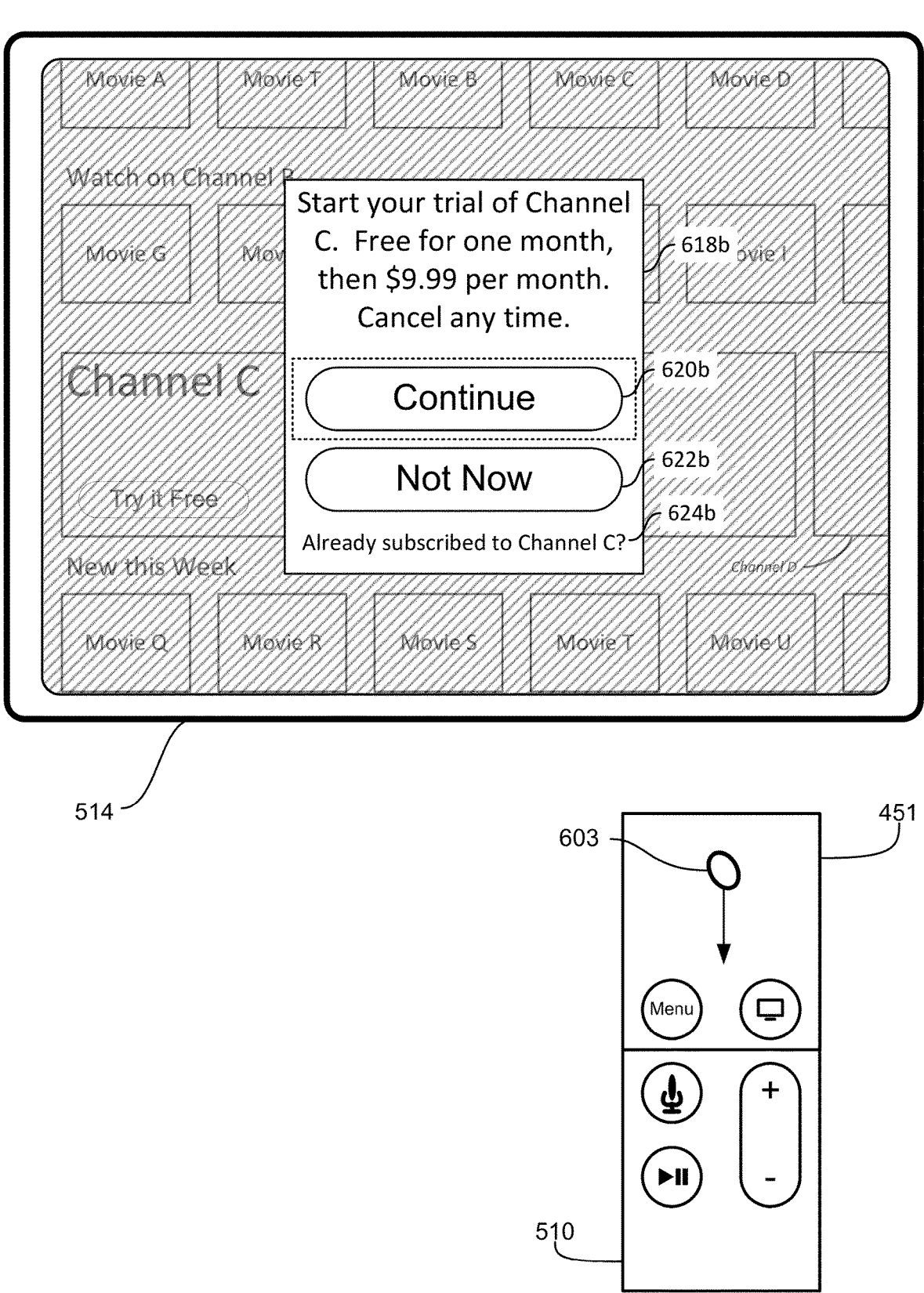

FIG. 6P illustrates a user interface of the media browsing application for subscribing to Channel C. The user interface includes an indication 618*b* of the terms of the subscription to Channel C, a selectable option 620*b* to subscribe to Channel C, a selectable option 622*b* to exit the user interface without subscribing to Channel C, and a selectable option 624*b* to link an existing account that provides access to Channel C. As shown in FIG. 6P, the user scrolls (e.g., with contact 603) down in the user interface. In response to the scrolling, the electronic device 500 moves the current focus down.

Figure 6Q:
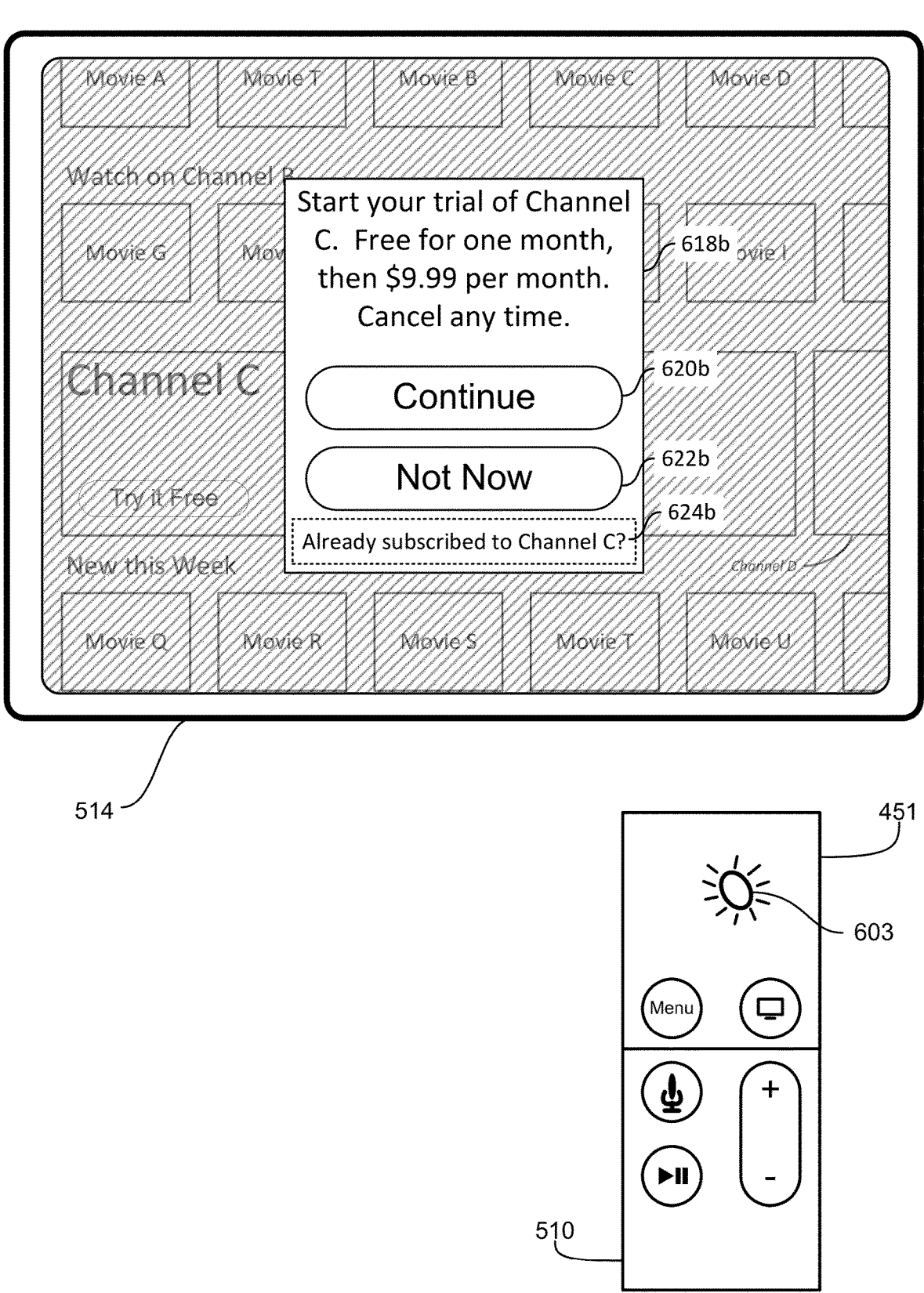

As shown in FIG. 6Q, in response to the user's scrolling, the electronic device 500 moves the current focus to the selectable option 624*b* to sign in to an existing account that provides access to Channel C. As shown in FIG. 6Q, the user selects (e.g., with contact 603) the option 624*b* to sign in to the account. In response to the user's selection, the electronic device 500 presents a log in user interface.

Figure 6R:
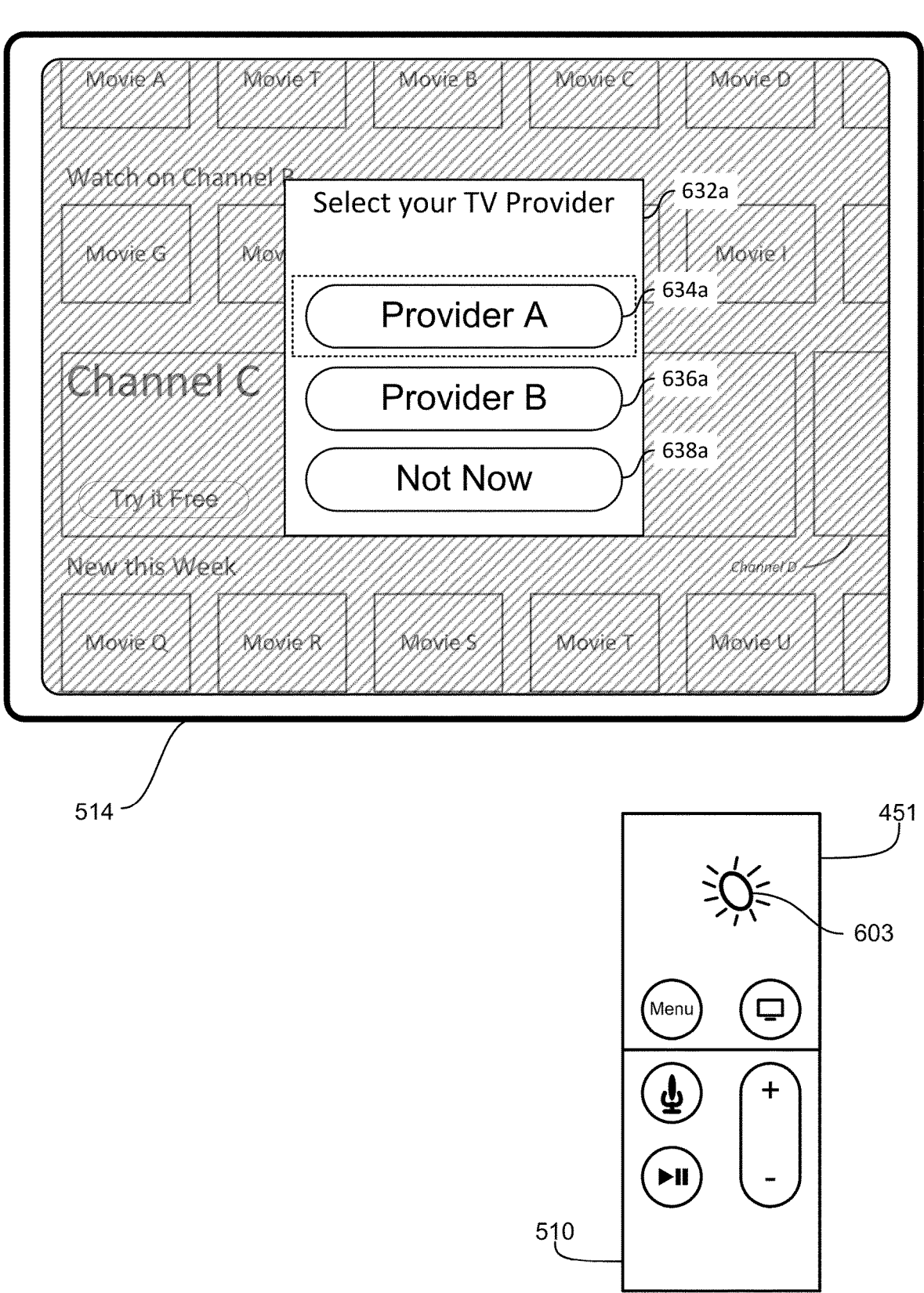

FIG. 6R illustrates a log in user interface of the media browsing application. The log in user interface includes an indication 632*a* to select a provider that provides access to Channel C, selectable options 634*a* and 636*a* for selecting the provider service to log in to, and an option 638*a* to exit the log in user interface without signing in to an account. The providers shown in FIG. 6R are optionally television or other content providers that enable the user account to access one or more channels, including Channel C. In some embodiments, the user is able to log in to an account that is specific to Channel C, as opposed to a TV provider account. As shown in FIG. 6R, the user selects (e.g., with contact 603) the option 634*a* to log in to an account with provider A. In response to the user's selection, the electronic device presents a user name and password user interface from which the user is able to enter the credentials of their Provider A account.

Figure 6S:
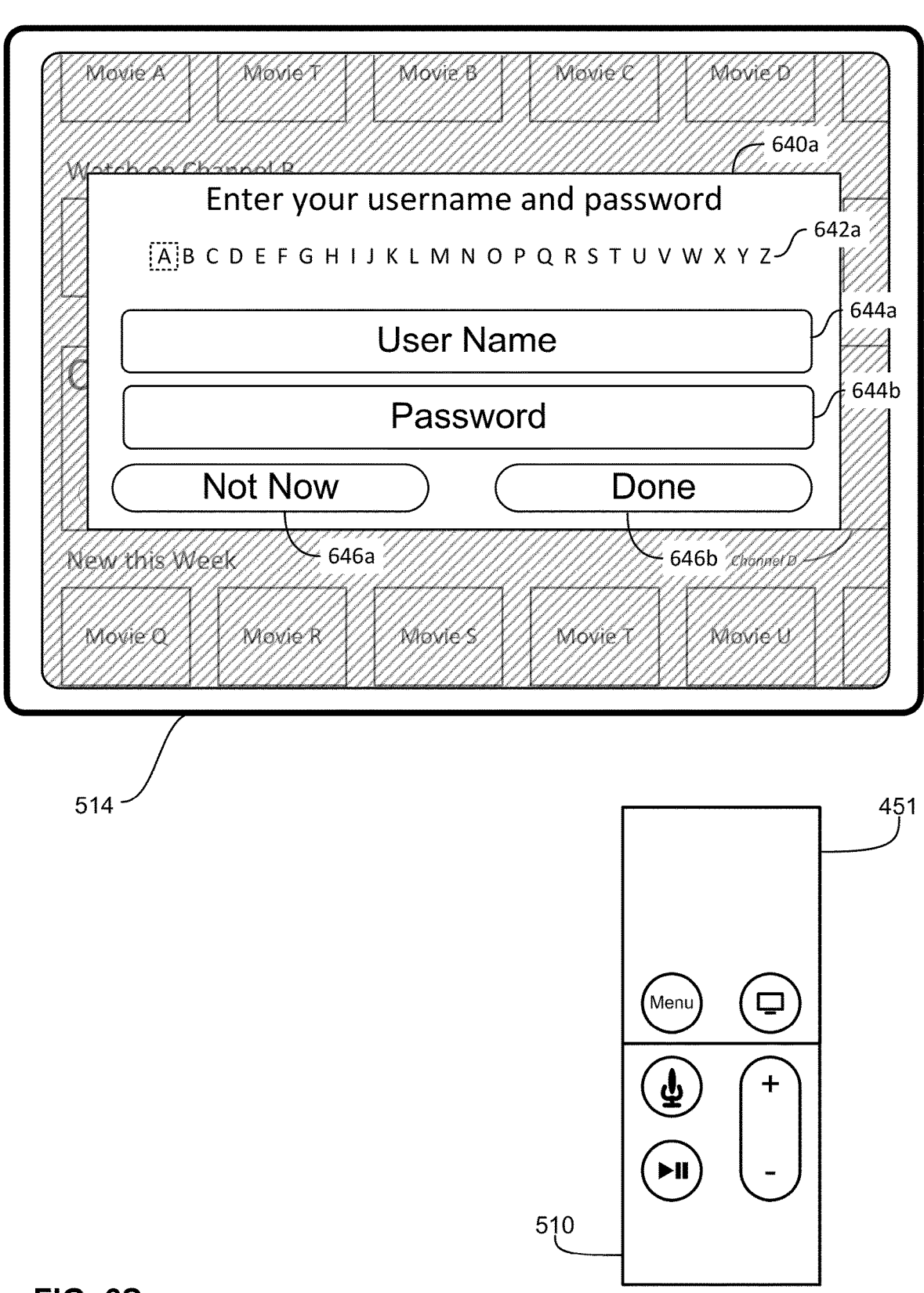

FIG. 6S illustrates a user name and password user interface. The user interface includes an indication 640*a* to enter the user name and password associated with Provider A, and an on-screen keyboard 642*a* from which the user is able to select characters to enter into the user name field 644*a* and password field 644*b*. The user interface also includes a selectable option 646*a* to exit the user name and password user interface without entering the login credentials and a selectable option 646*b* to submit the entered user name and password to log in to the account. Once the user enters the user name and password and selects the option 646*b*, the electronic device logs in to the provider account and presents a content browsing user interface.

Figure 6T:
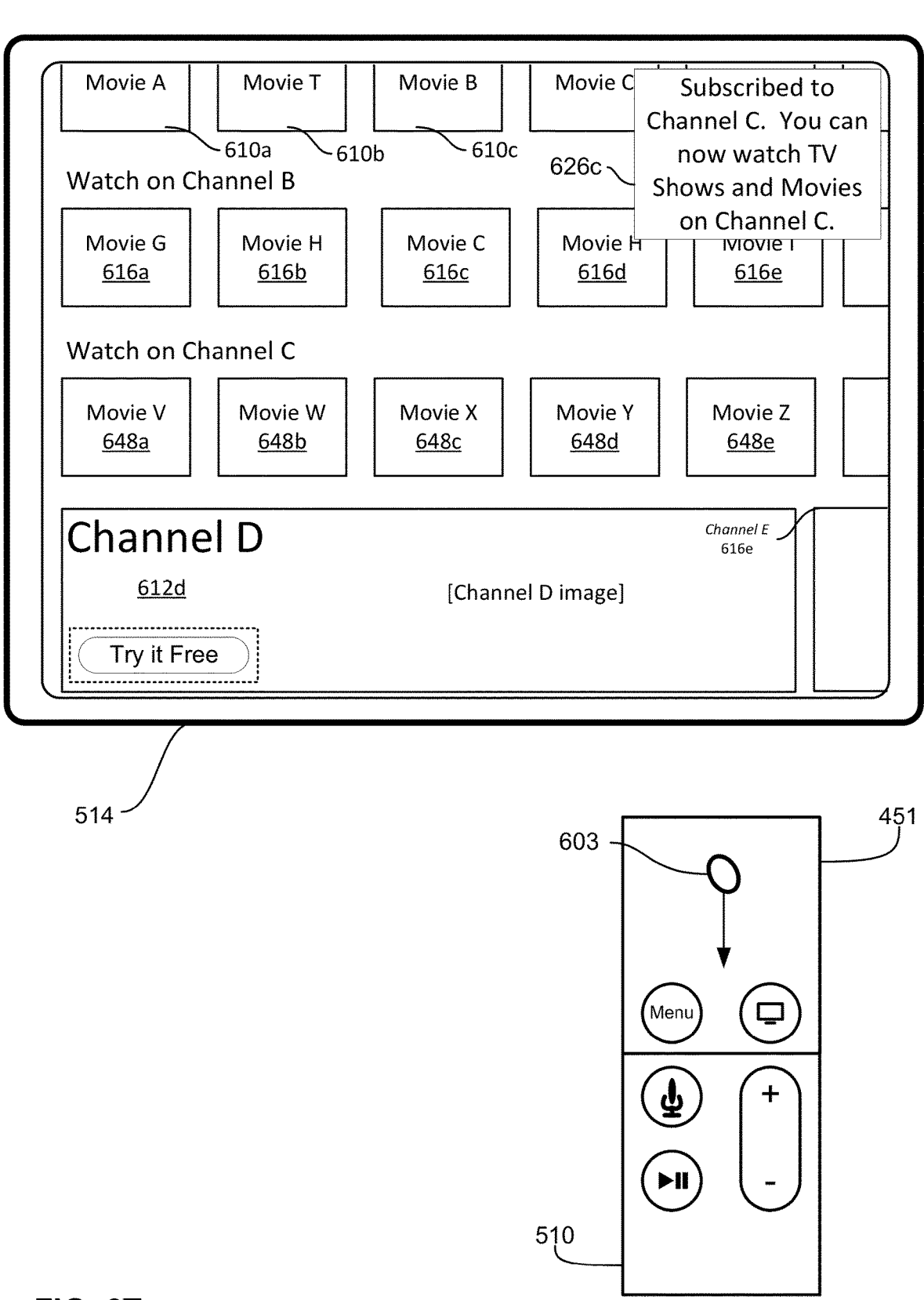

FIG. 6T illustrates the content browsing user interface. The content browsing user interface includes a row of representations 648*a-e* of content items that are accessible from Channel C that play in the media browsing application. It should be understood that the electronic device presents an animation similar to the animation illustrated in FIGS. 6F-6I in response to the successful subscription to Channel C that animates the appearance of the row of representations 648*a-e* of content items available through Channel C. Although the electronic device 500 no longer presents the representation 612*c* of Channel C, the electronic device 500 presents an indication 612*d* of Channel D and a portion of a representation 612*e* of Channel E. The user interface further includes a visual indication 626*b* that the subscription to Channel C is active. As shown in FIG. 6T, the user scrolls (e.g., with contact 603) down. In response to the user's scrolling, the electronic device scrolls the user interface down.

Figure 6U:
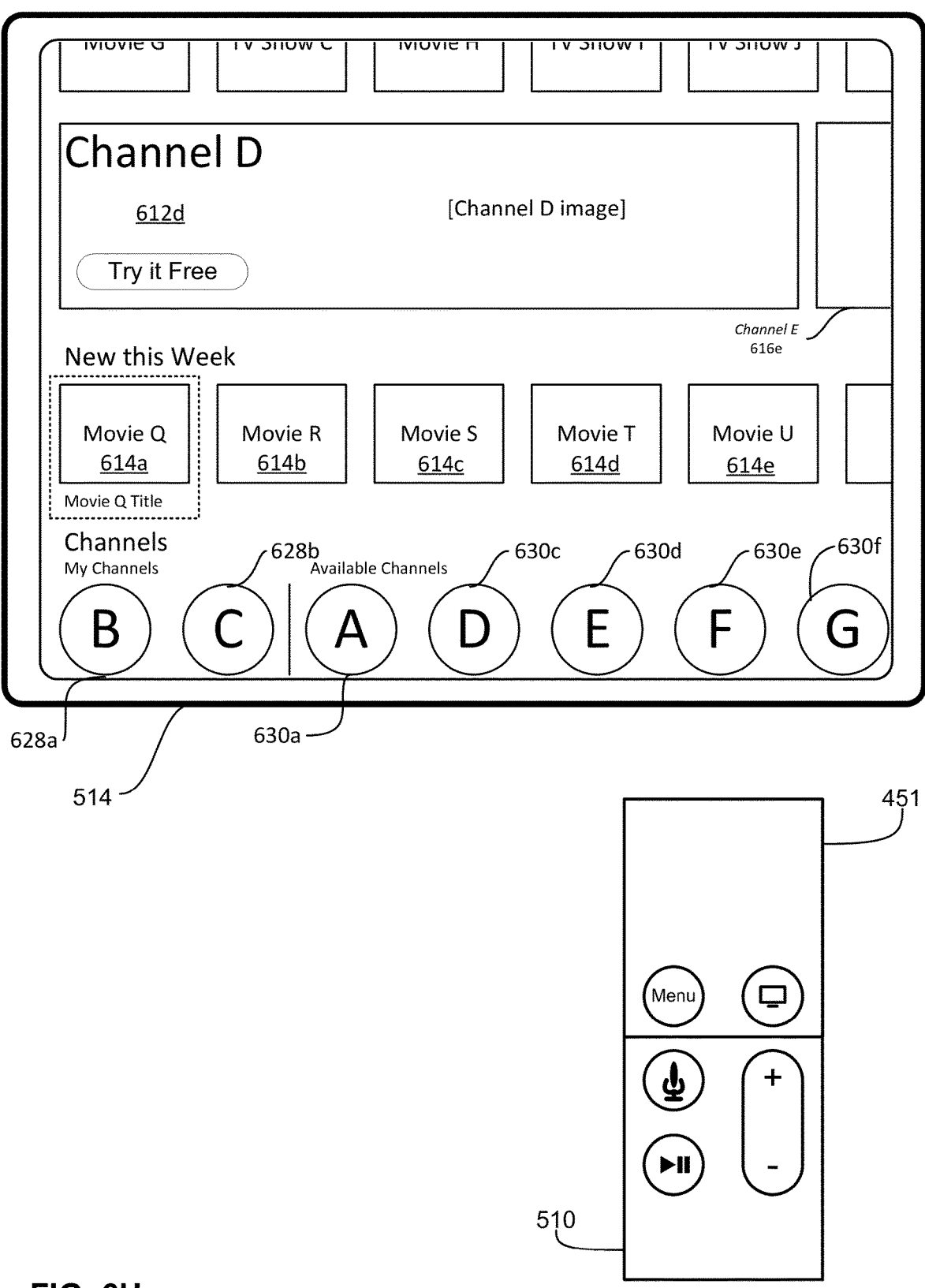

FIG. 6U illustrates the media browsing application user interface after the user scrolls the user interface down. In response to the user's scrolling, the current focus moves from the representation 612*d* of Channel D to a representation 614*a* of an item of content. The user interface further includes the row of representations 628*a-b* and 630*a-f* of channels available in the media browsing application. The channels are arranged to include representations 628*a-b* of channels to which the user is subscribed at the start of the row under a "My Channels" indication, followed by the representations 630*a-f* of channels to which the user is not subscribed under an "Available Channels" indication. It should be understood that the row of channels is horizontally scrollable to reveal additional representations of channels not shown here.

Figure 6V:
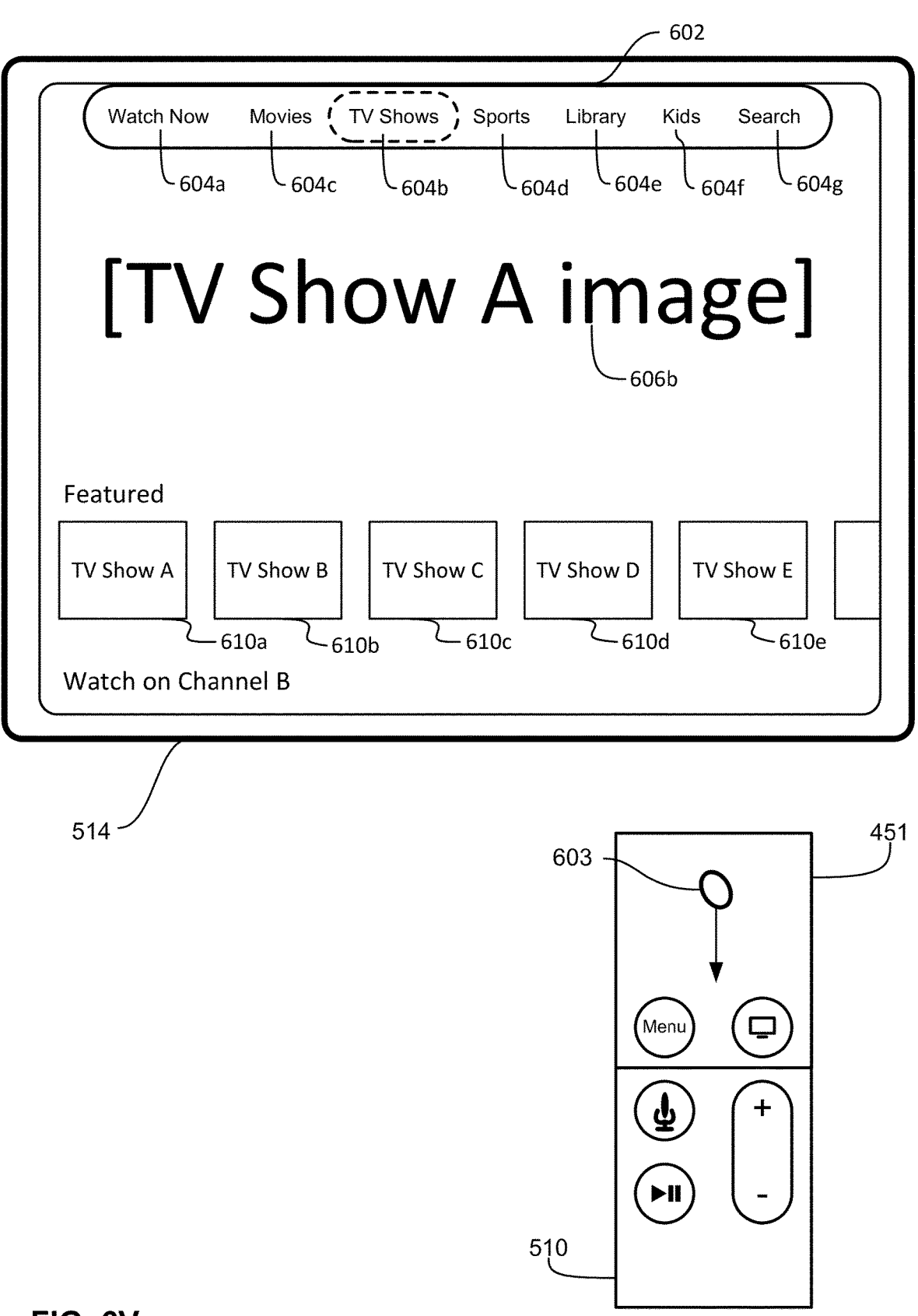

FIG. 6V illustrates a user interface of the media browsing application that is specific to television shows. The navigation bar 602 indicates that the tab 604*b* for television shows is currently selected. The user interface further includes a plurality of representations 610*a-e* of television show content. As shown in FIG. 6V, the user scrolls (e.g., with contact 6030 down. In response to the user's scrolling, the electronic device 500 scrolls the user interface down.

Figure 6W:
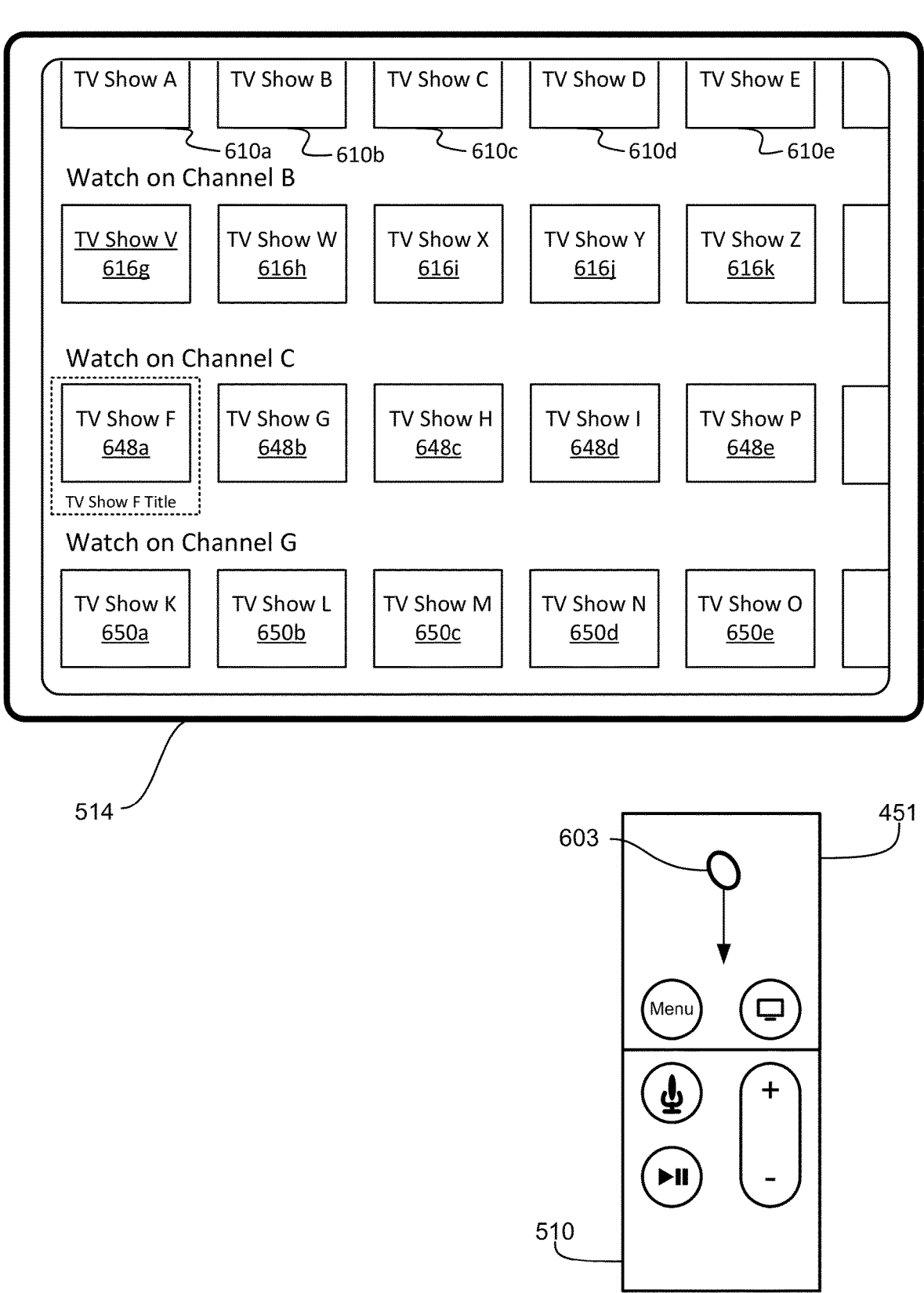

FIG. 6W illustrates a portion of the user interface that includes a plurality of rows of representations of content (e.g., TV shows) that are available from three channels in the media browsing application. The user interface includes a row of representations 616*g-k* of content that are available from Channel B, a row of representations of 648*a-e* of content that are available from Channel C, and a row of representations 650*a-e* of content that are available from Channel G. Although there are three rows of content available from channels to which the user is subscribed (and the user interface does not include more channel rows if the user scrolls down), it is possible that the user is subscribed to more than three channels (e.g., the user is subscribed to four channels, including Channel D) but the electronic device presents a maximum of three rows of channel-specific content. As shown in FIG. 6W, the user scrolls (e.g., with contact 603) down. In response to the user's scrolling, the electronic device 500 scrolls the user interface down.

Figure 6X:
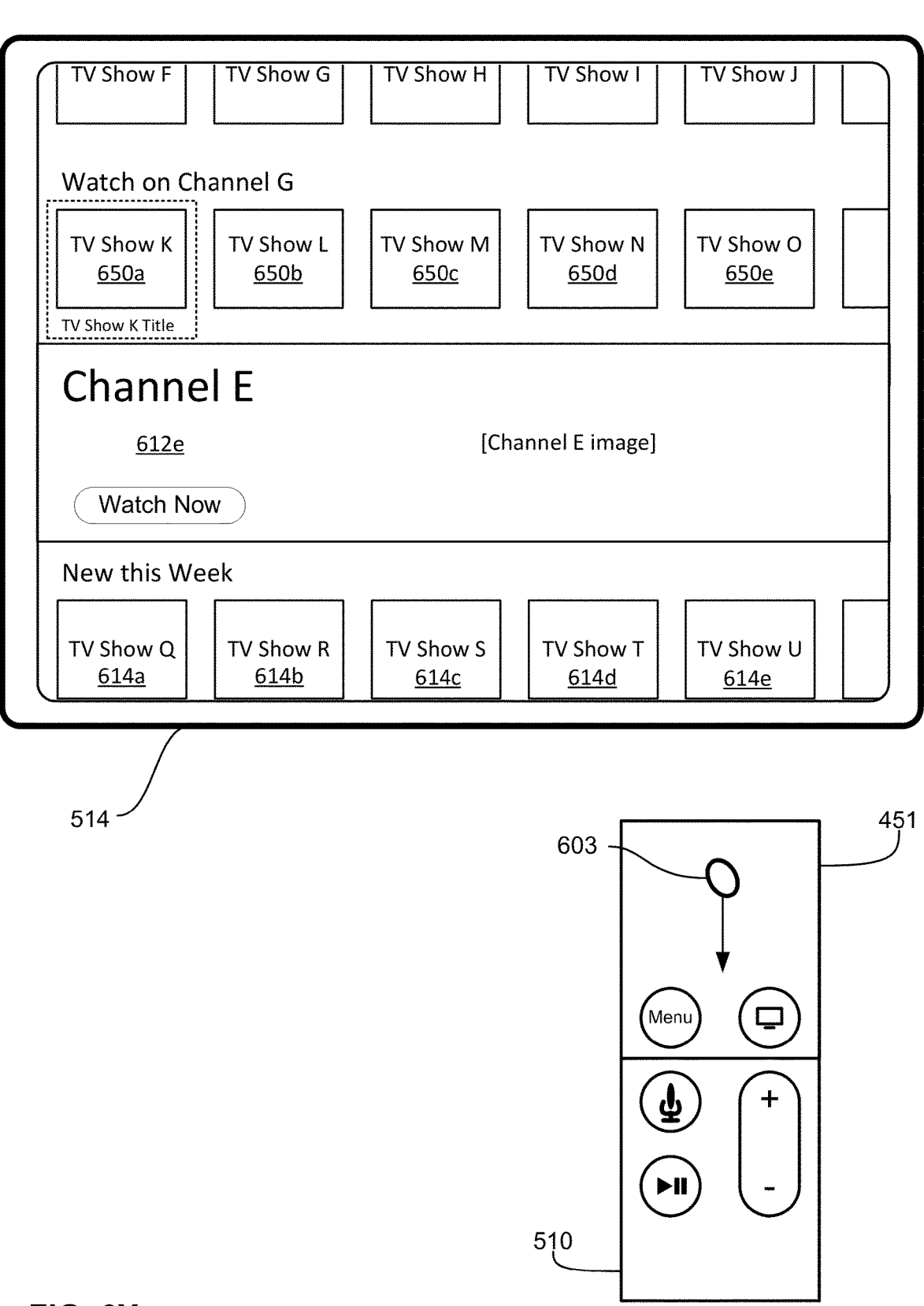

FIG. 6X illustrates another portion of the media browsing application user interface. The user interface includes a representation 612e of Channel E. As shown in FIG. 6X, the user interface does not include portions of additional representations of available channels, which is because the number of available channels to which the user is not subscribed is less than a predetermined threshold (e.g., three available channels). As shown in FIG. 6X, the user scrolls (e.g., with contact 603) down. In response to the user's scrolling, the electronic device 500 moves the current focus down.

Figure 6Y:
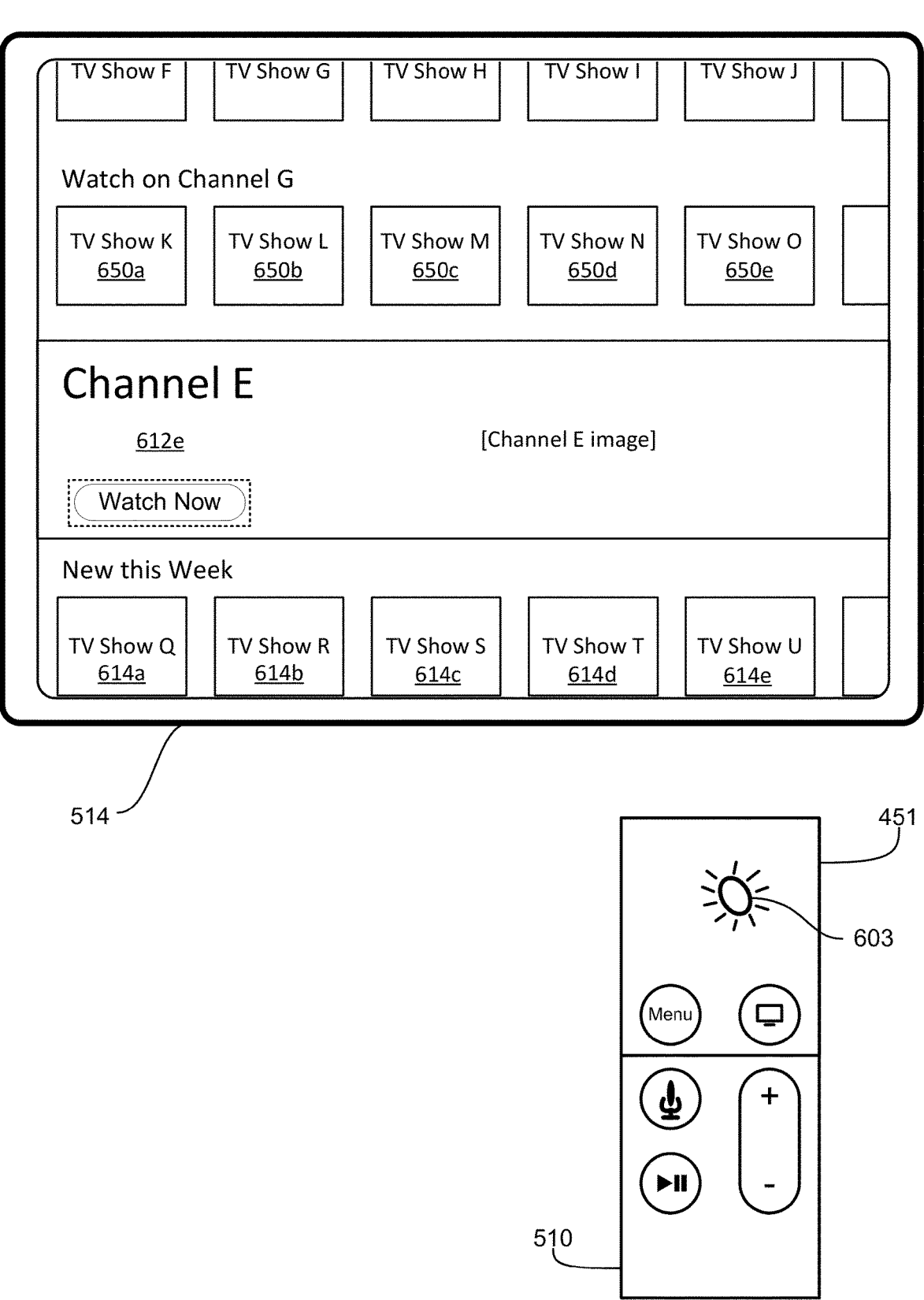

As shown in FIG. 6Y, the electronic device 500 moves the current focus to the representation 612e of Channel E. The representation 612e of Channel E includes an option to "Watch Now," instead of an option to "Try it Free" because there is no free trial of Channel E currently available. The user selects (e.g., with contact 603) the representation 612e of Channel E. In response to the user's selection, the electronic device presents a user interface from which the user is able to subscribe to Channel E, as shown in FIG. 6Z.

Figure 6Z:
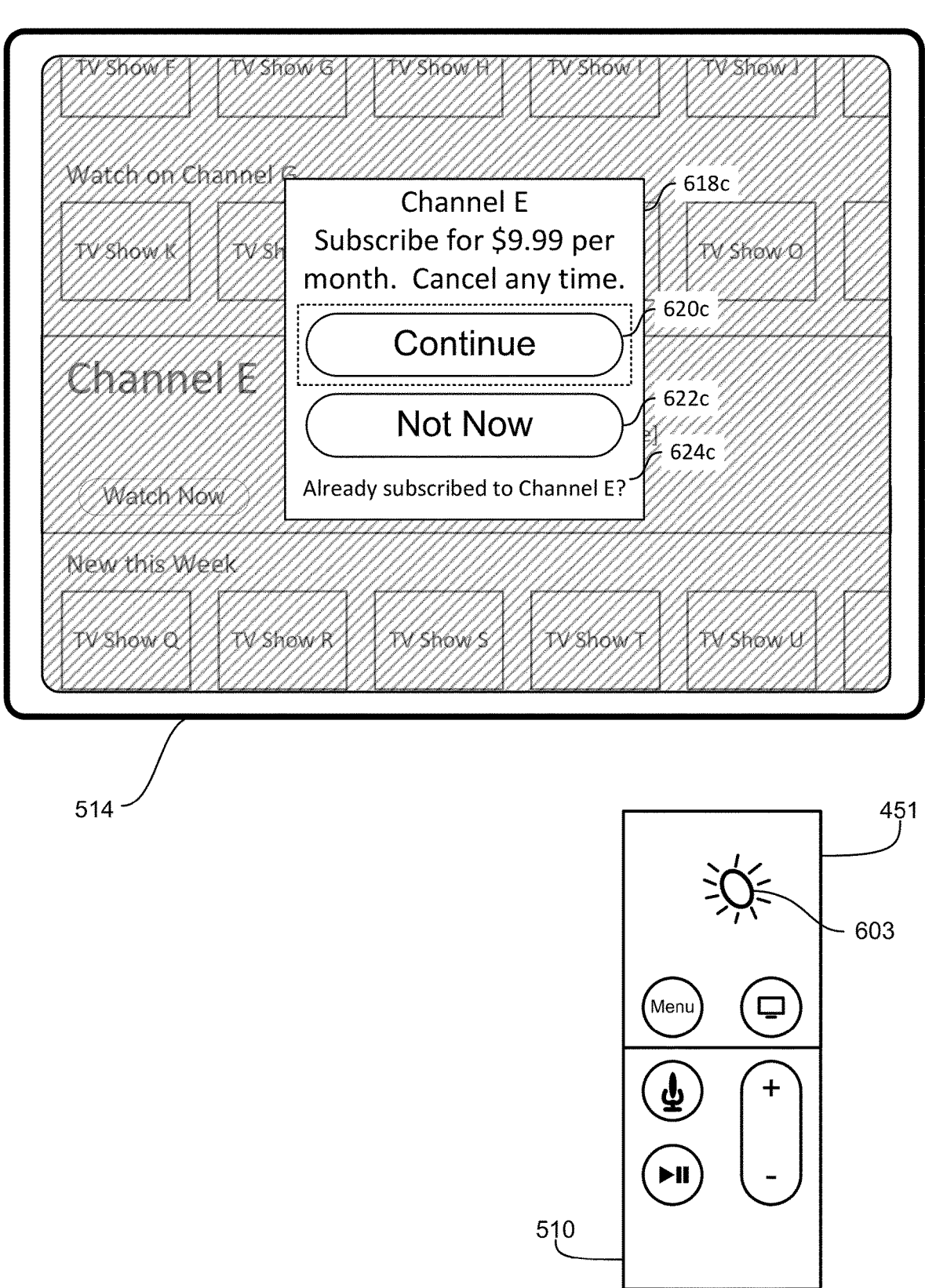
Figure 6A:
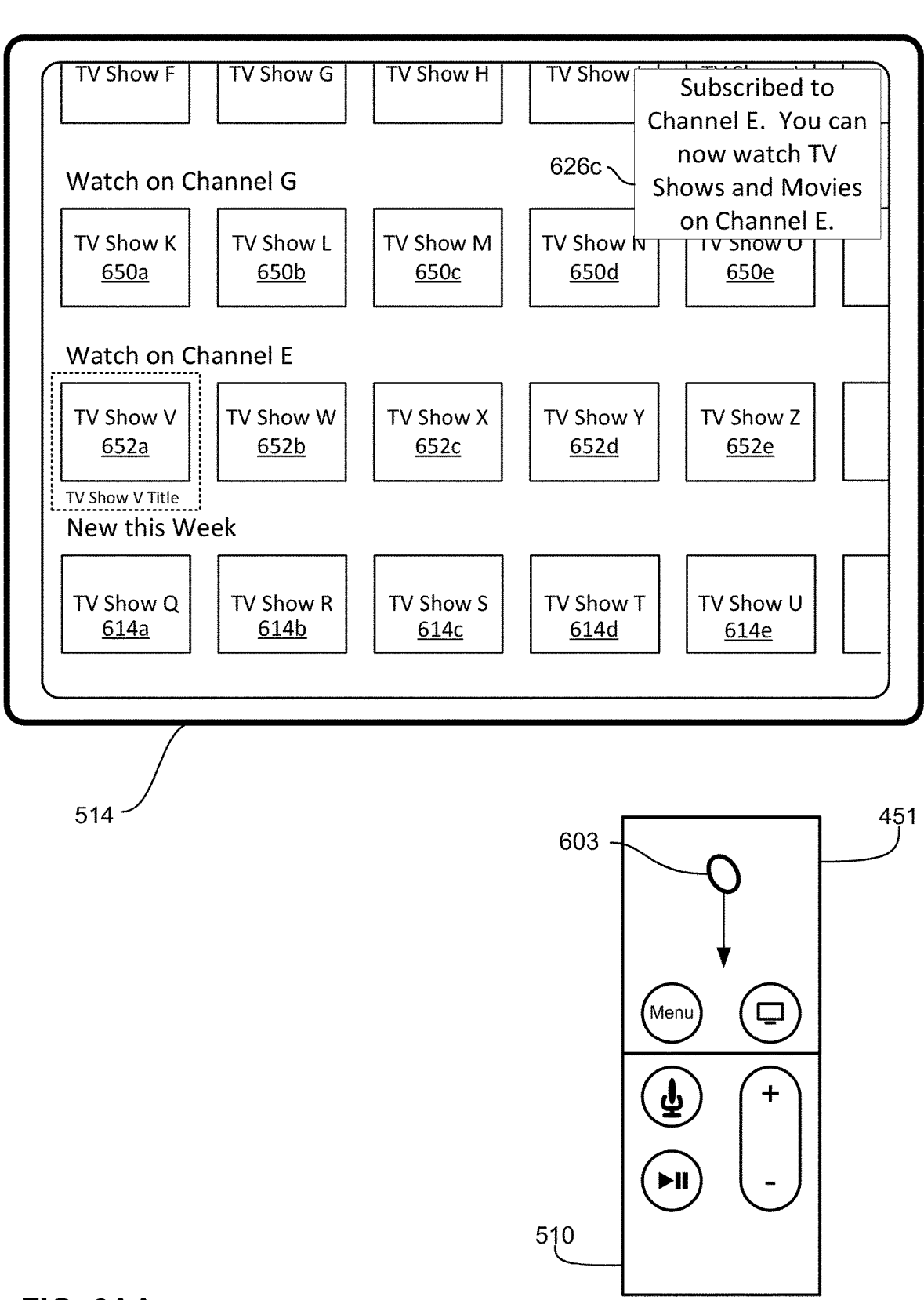
Figure 6B:
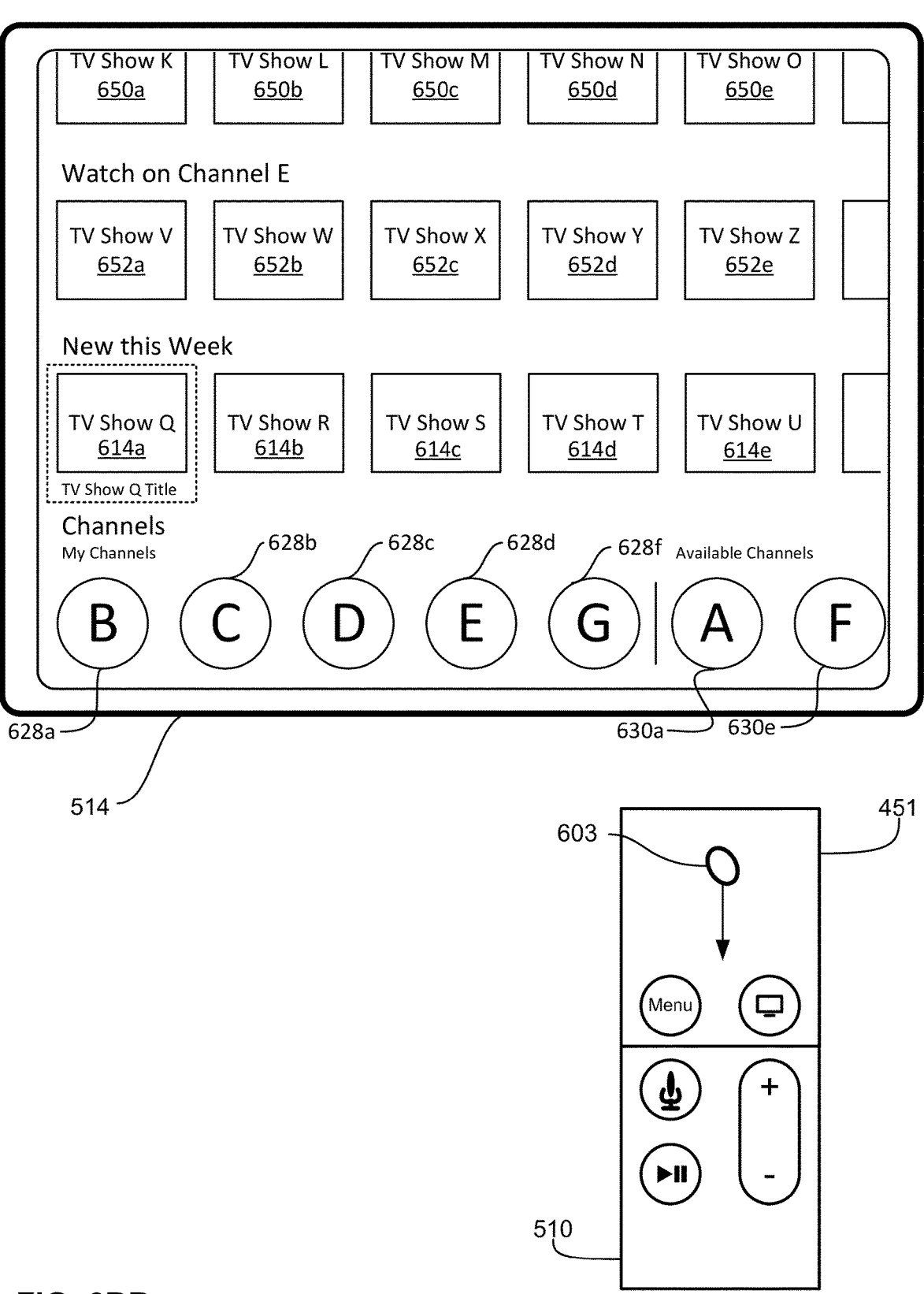
Figure 6C:
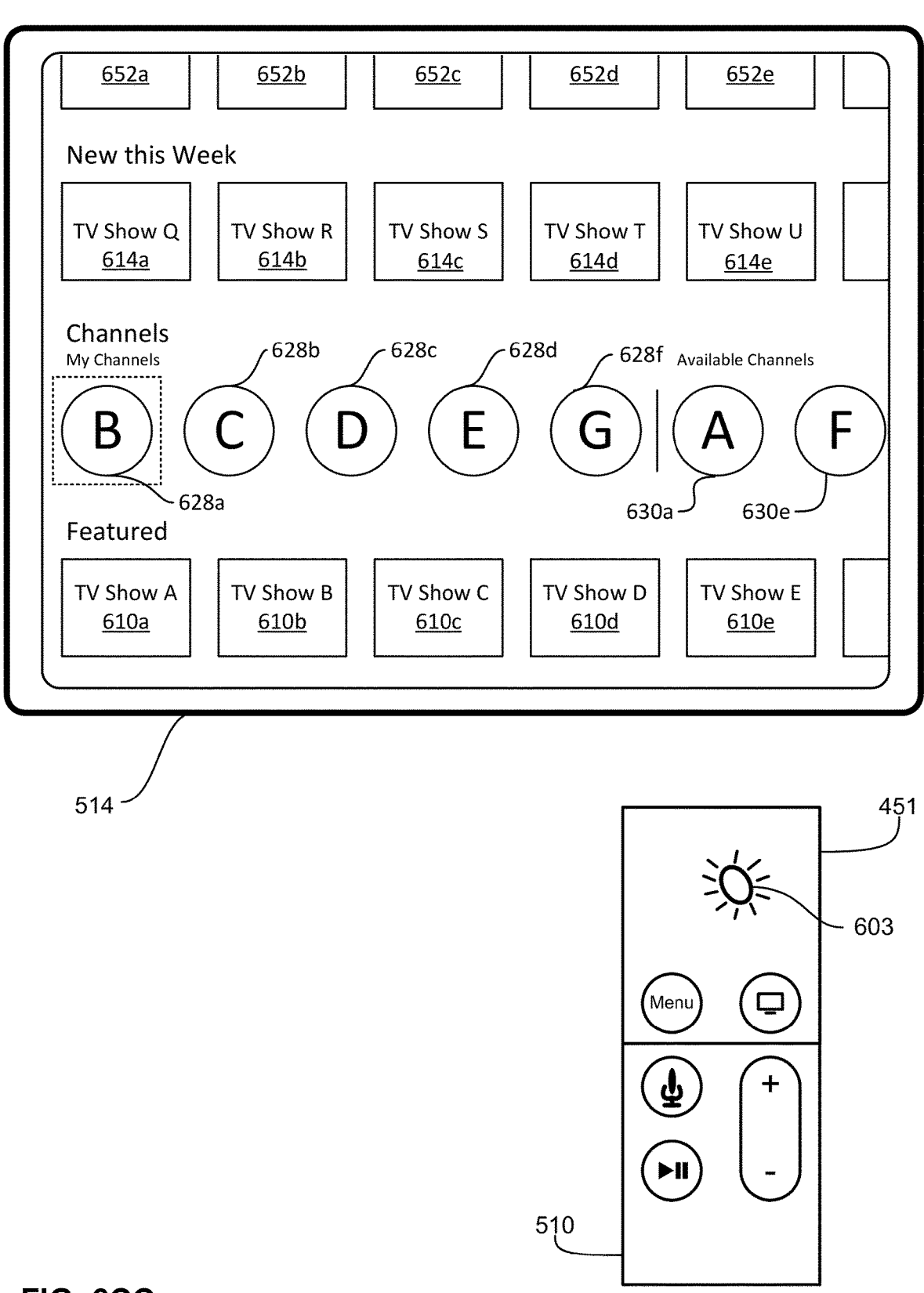
Figure 6D:
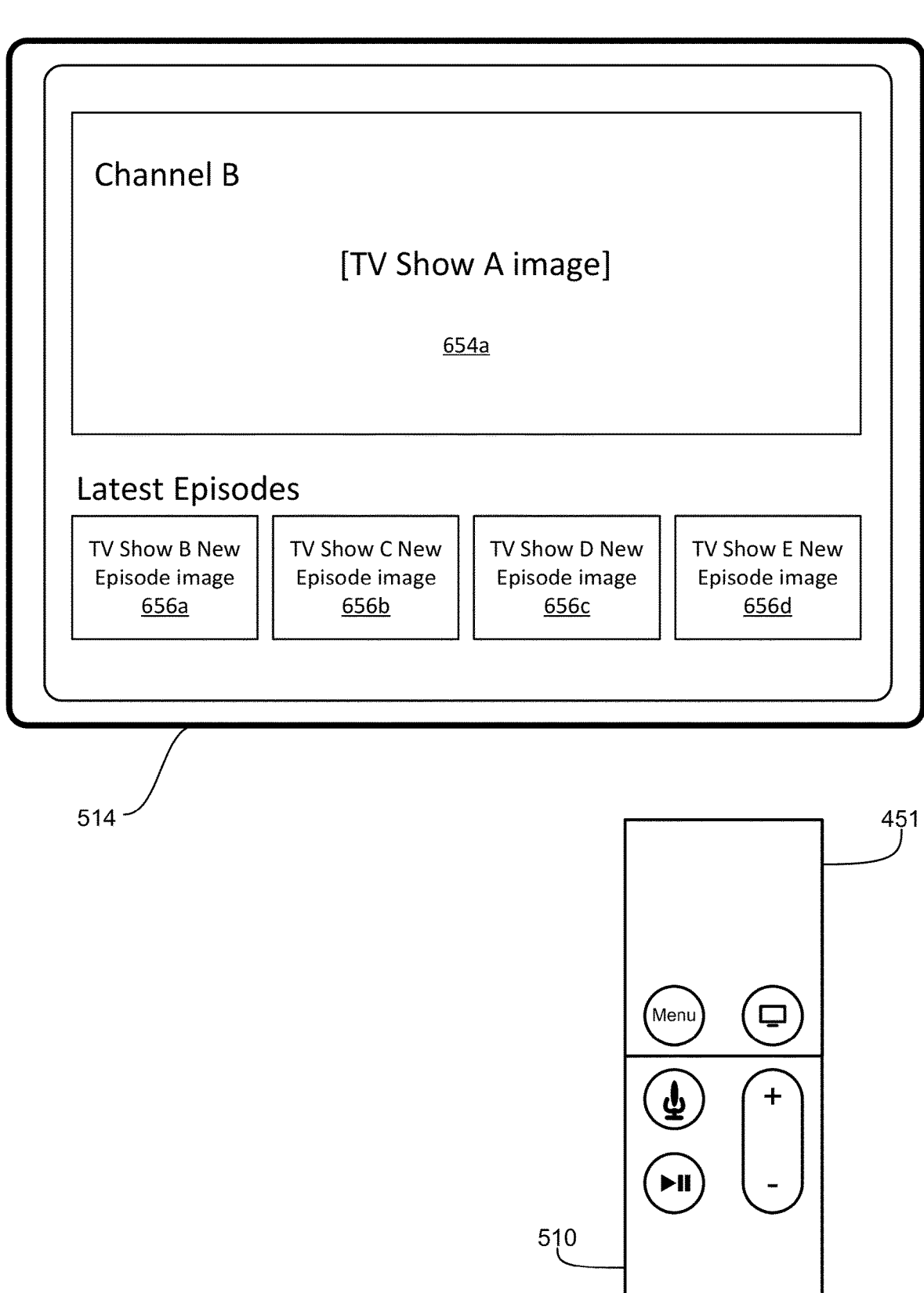
Figure 6E:
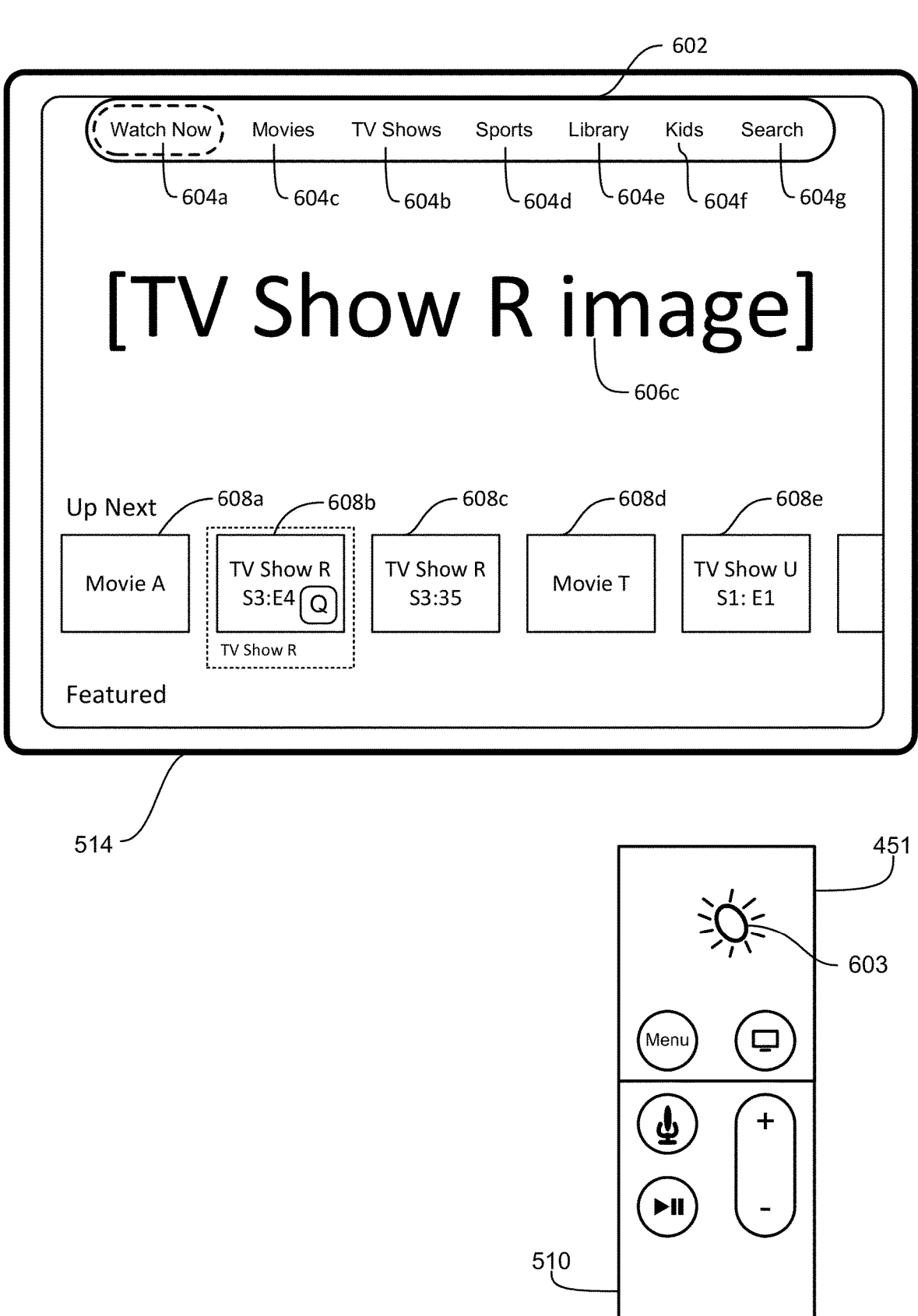
Figure 6F:
Figure 6G:
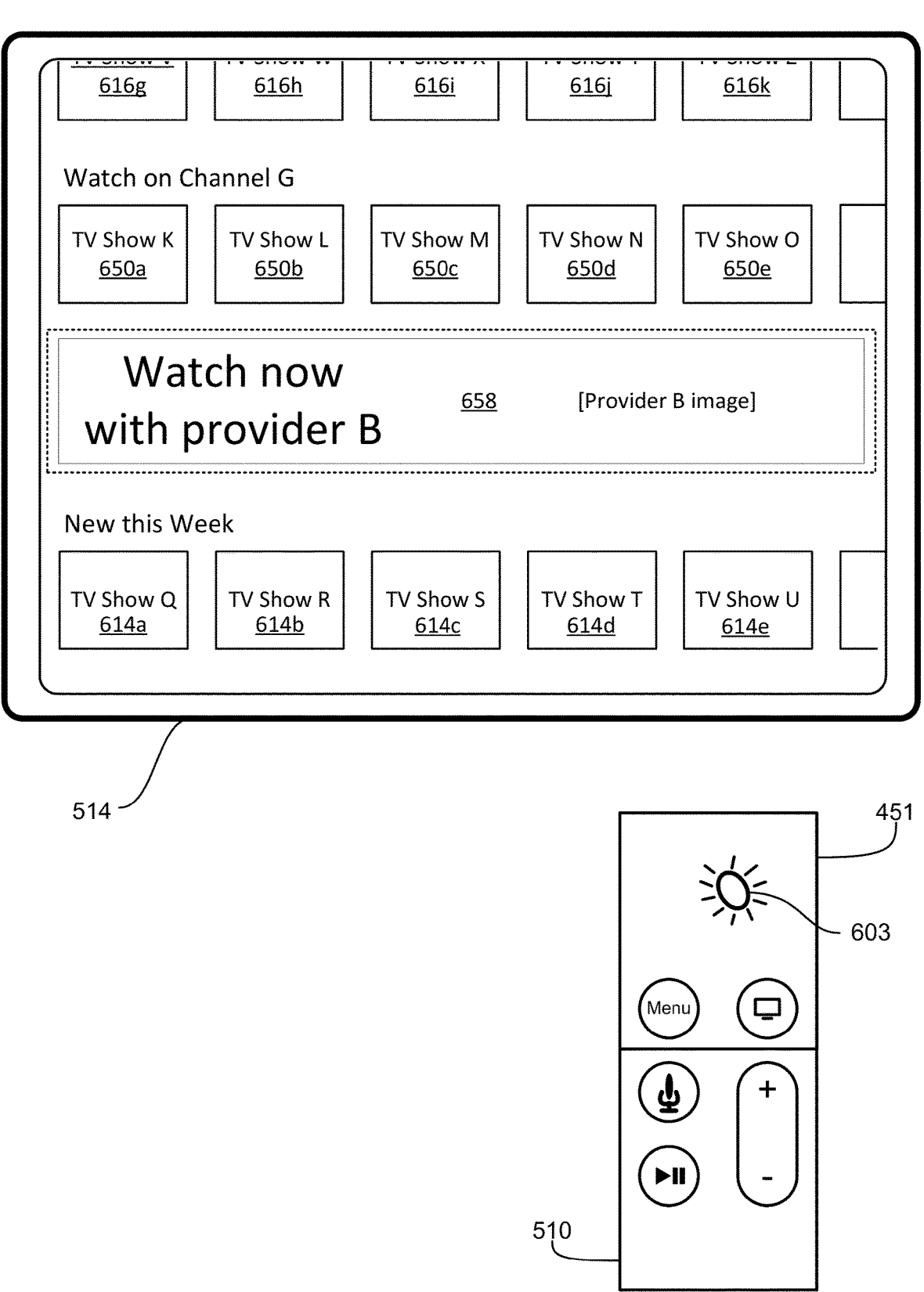
Figure 6H:
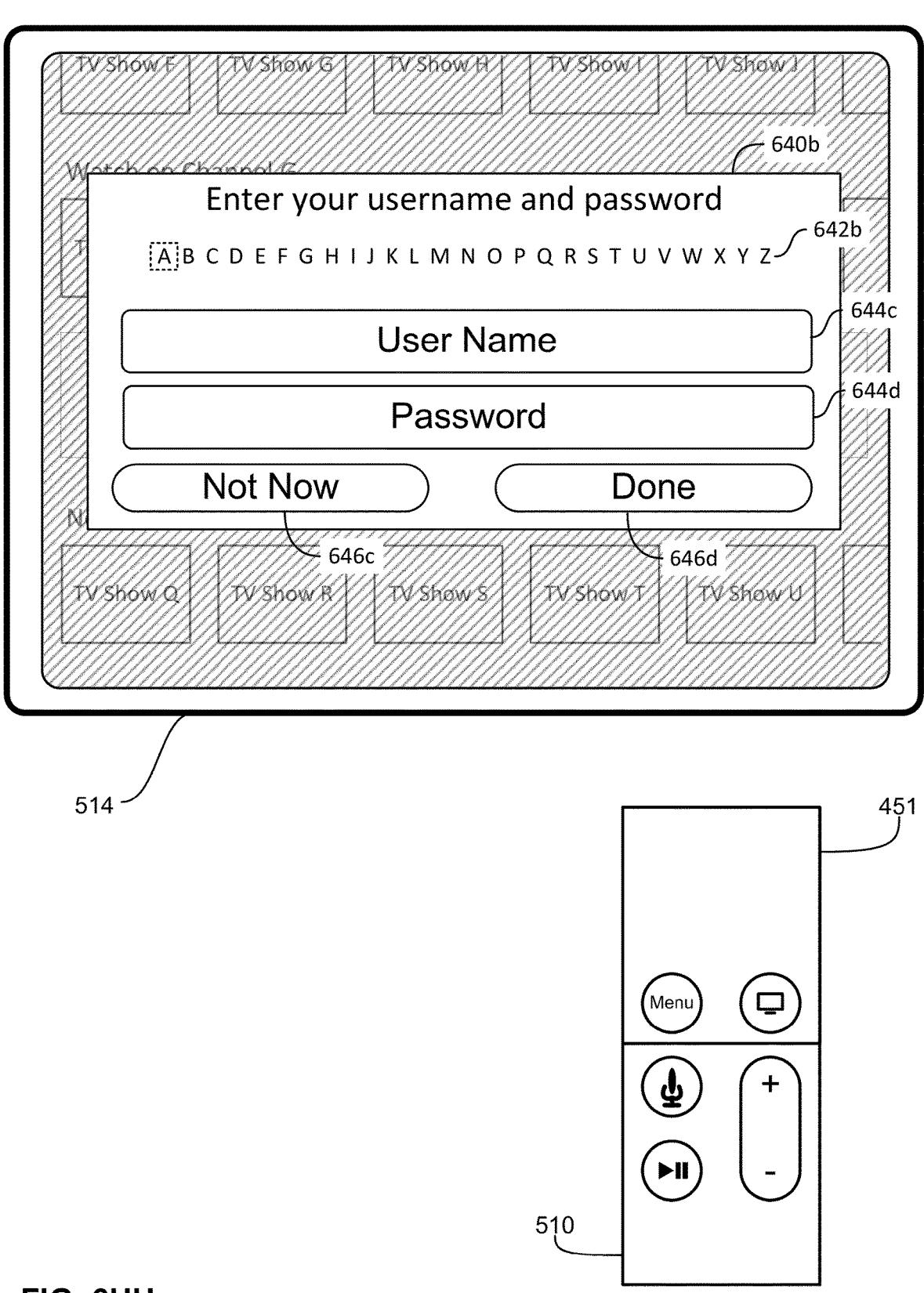
Figure 7A:
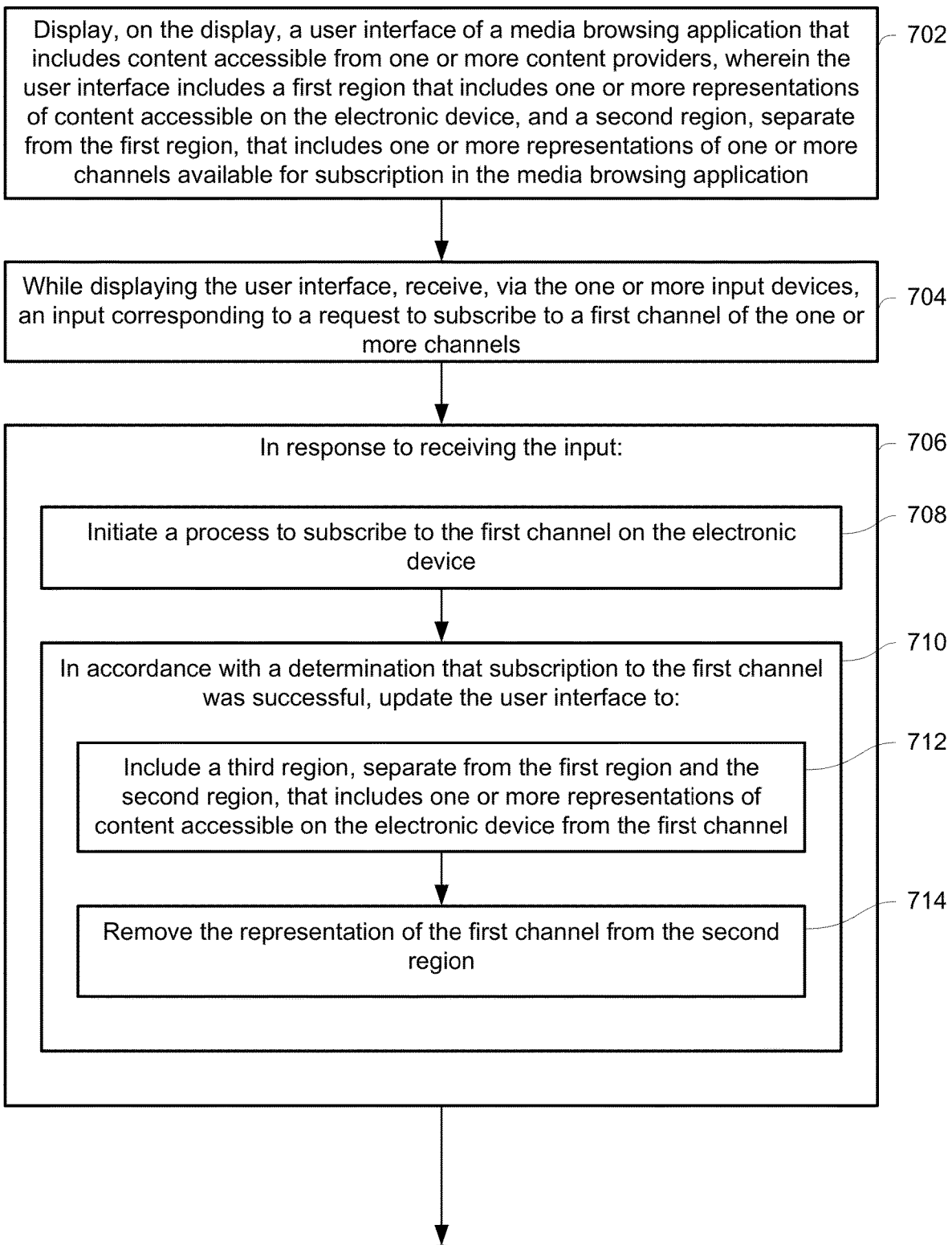
Figure 7D:
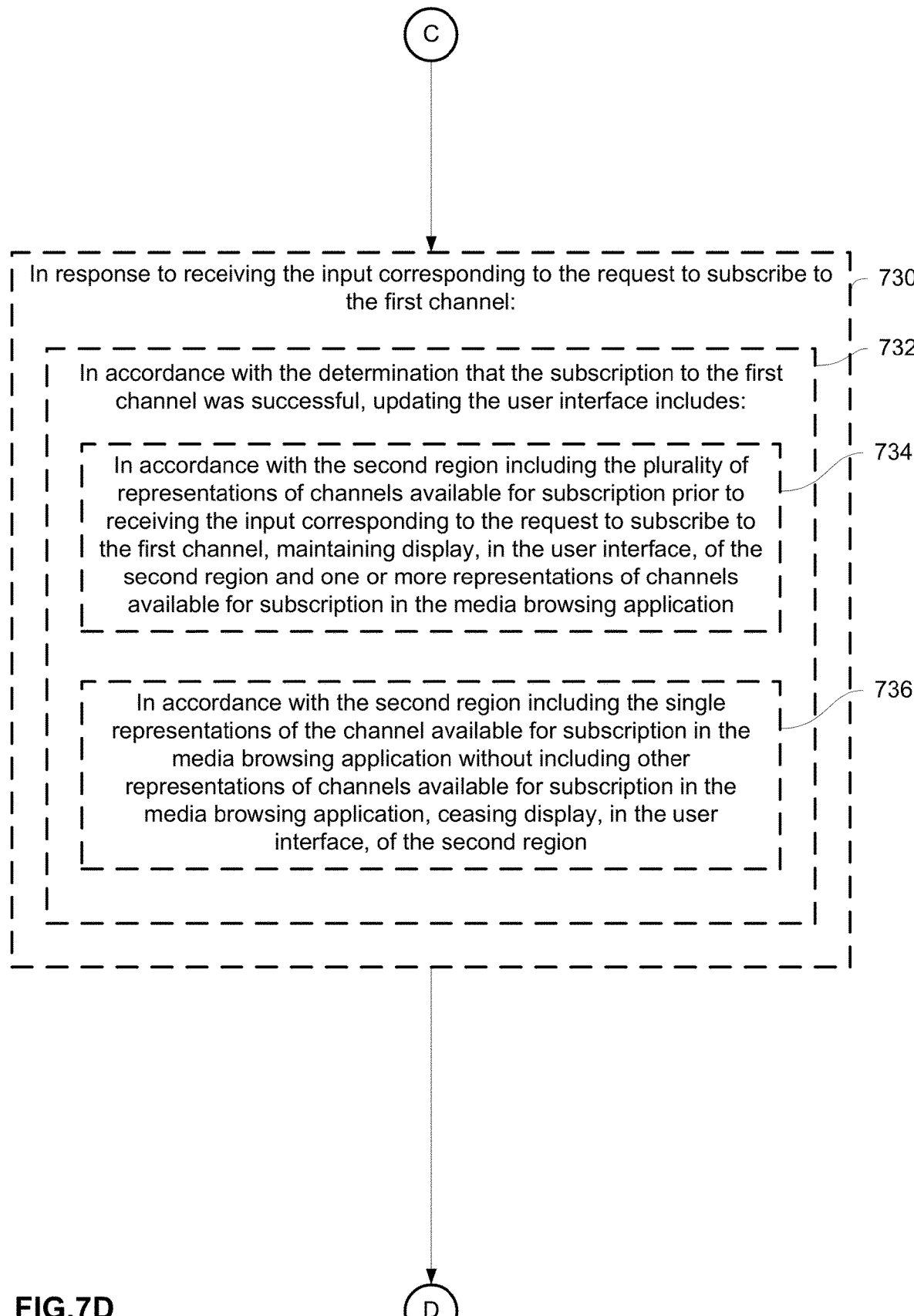
Figure 7F:
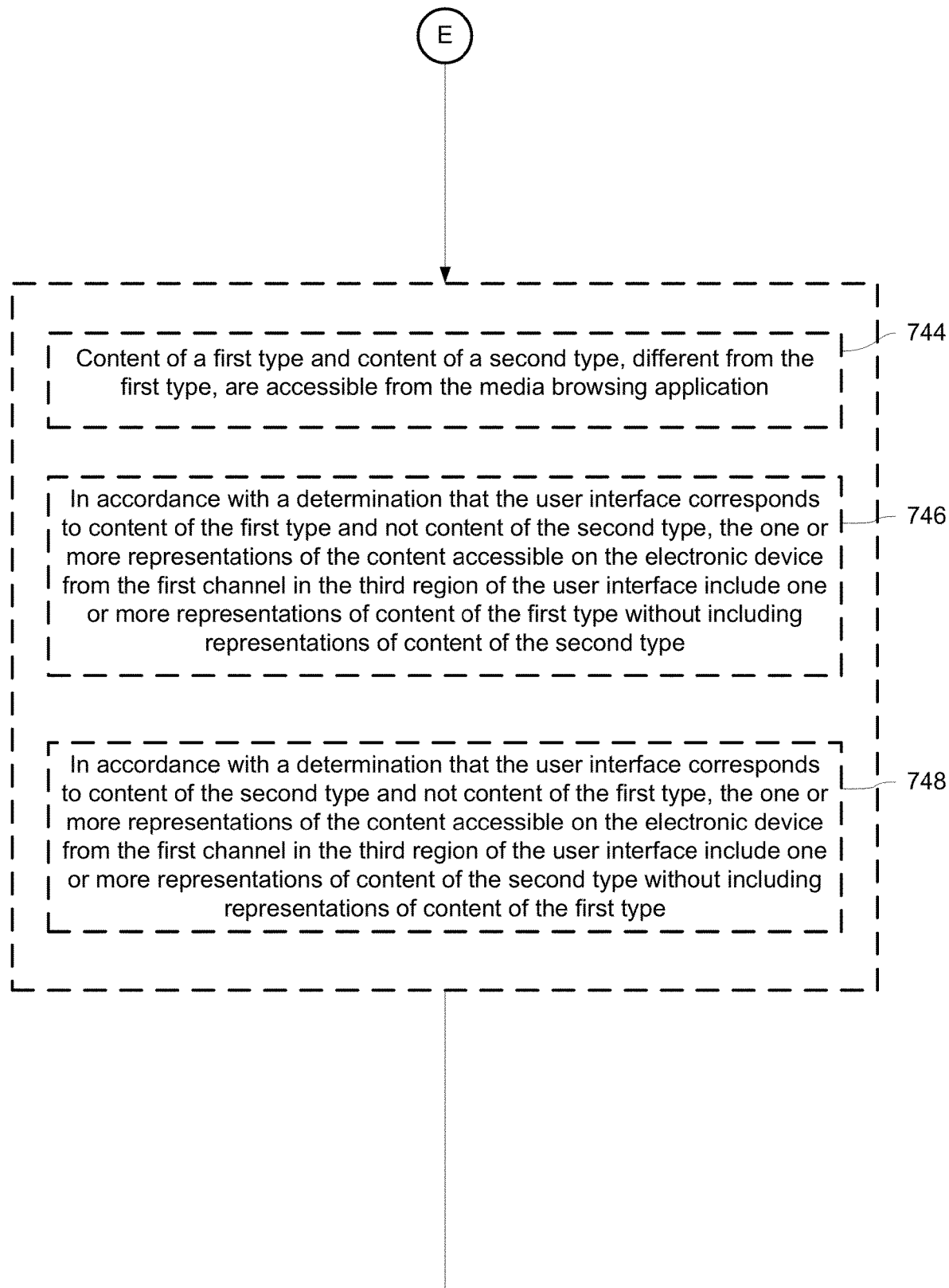
Figure 7H:
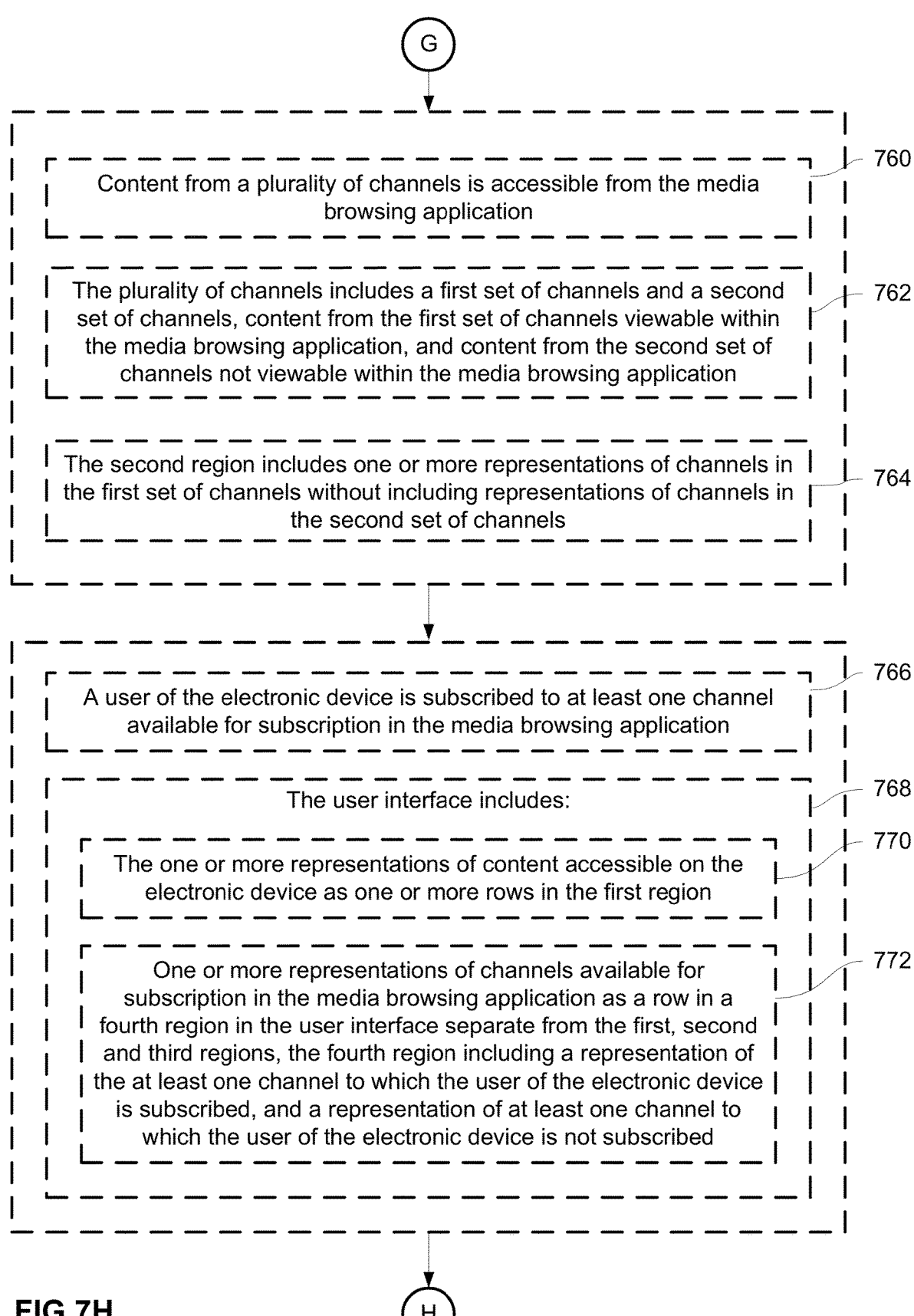
Figure 7I:
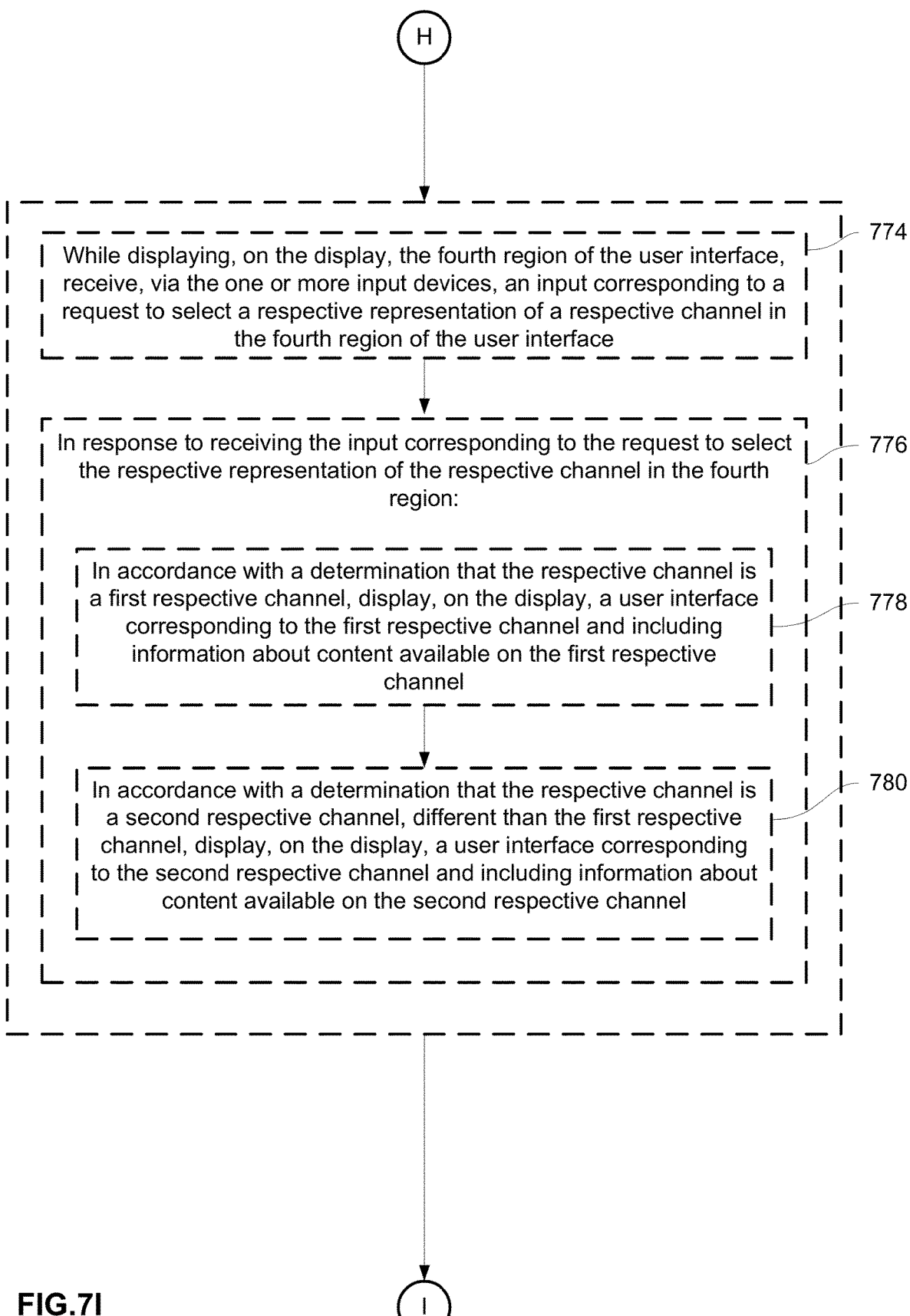

FIG. 6Z illustrates a user interface from which the user is able to subscribe to Channel E. The user interface includes an indication 618c of the terms of the subscription to Channel E, a selectable option 620c to subscribe to Channel E, a selectable option 622c to exit the user interface without subscribing to Channel E, and a selectable option 624c to log in to a user account that provides access to Channel E. As shown in FIG. 6Z, the user selects (e.g., with contact 603) the option 620c to subscribe to Channel E. In response to the user's selection, the electronic device subscribes to Channel E.

FIG. 6AA illustrates a user interface of the media browsing application after the user successfully subscribes to Channel E. The electronic device 500 no longer presents the indication 612e of Channel E and presents a row of representations 652a-e of items of content available through Channel E. It should be understood that the electronic device is able to present an animation of the representation 612e of channel E disappearing and the row of representations 652a-e appearing on the display that is similar to the animation illustrated in FIGS. 6F-6I. The user interface also includes an indication 626c that the subscription to channel E was successful. The indication 626c is presented for a predetermined amount of time before auto-dismissing. As shown in FIG. 6AA, the user scrolls (e.g., with contact 603) down. In response to the user's scrolling, the electronic device 500 scrolls the user interface down.

FIG. 6BB illustrates the user interface after the user scrolls down, as shown in FIG. 6AA. The user interface includes indications 628a-f of channels the user is subscribed to, including Channel E, and indications 630a-e of channels the user is not subscribed to. After subscribing to Channel E, the user is subscribed to five channels. Although the user is subscribed to five channels, the user interface of the media browsing application includes three rows of representations of content accessible on a particular channel the user is subscribed to, such as illustrated in FIG. 6W. As shown in FIG. 6BB, the user scrolls (e.g., with contact 603) down. In response to the user's scrolling, the electronic device 500 scrolls the user interface down. In response to the user's scrolling, the electronic device moves the current focus from a representation 614a of an item of content to a representation 628a of Channel B.

FIG. 6CC illustrates the user interfaced of the media browsing application with the current focus on the representation 628a of Channel B. The user selects (e.g., with contact 603) the representation 628a of Channel B. In response to the user's selection, the electronic device 500 presents a user interface specific to Channel B.

FIG. 6DD illustrates the user interface specific to Channel B. The user interface includes a large representation 654a of an item of content and a plurality of smaller representations 656a-d of items of content. The representations 654a and 656a-d are selectable to present a product page user interface specific to the selected item of content that includes information about the item of content and a selectable option to play the content. In some embodiments, the representation 654a is selectable to present the product page user interface of the series of content and the representations 656a-d are selectable to play the respective item of content.

As discussed in FIGS. 6A-6DD, the electronic device presents various representations (e.g., representations 612, 628, and 630) of channels that provide content that plays in the media browsing application. The electronic device 500 also presents, in the media browsing application, representations items of content that play in applications other than the media browsing application. However, the channels, providers, and applications that provide content that play in applications other than the media browsing application are not represented by the representations (e.g., representations 612, 628, 630) that represent channels that provide content that plays in the media browsing application.

FIGS. 6EE-6FF illustrate the electronic device presenting, in the media browsing application user interface, a representation 608b of an item of content that plays in an application other than the media browsing application and playing the content in the application other than the media browsing application in response to selection of the representation 608b. In FIG. 6EE, the electronic device presents the indication 608b of the item of content that plays in application Q, which is an application other than the media browsing application. The user selects (e.g., with contact 603) the representation 608b of the content.

In response to the user's selection in FIG. 6EE, the electronic device 500 plays the content in application Q, as shown in FIG. 6FF. Although the electronic device 500 presents representations of content that plays in application Q in the media browsing application, the electronic device 500 does not present a representation of application Q in the same ways it presents representations 612, 628, and 630 of channels that play content in the media browsing application.

FIG. 6GG-6HH illustrate user interfaces for logging in to a provider (e.g., a television provider) that enables the electronic device to access one or more channels that provide content that plays in the media browsing application. In some embodiments, logging in to the provider account provides the electronic device 500 with access to a plurality of channels that provide content that plays in the unified media browsing application. In some embodiments, the electronic device 500 is able to log in to an account associated with a single channel instead of logging in to a provider account that provides access to multiple channels. In FIG. 6GG, the electronic device presents an indication 658 of a provider. The user selects (e.g., with contact 603) the representation 658 of the provider. In response to the user's selection, the electronic device 500 presents a user interface to log in to the provider account, as shown in FIG. 6HH.

As shown in FIG. 6HH, the user interface to log in to the provider account includes an indication 640b to enter the user name and password of the provider account, a soft keyboard 642b, a user name field 644c, a password field 644d, a selectable option 646c to cancel logging in to the provider account, and an option 646d to log in to the provider account.

In response to successful log in to the provider account, the electronic device ceases to display the representation 658 of the provider. In some embodiments, the electronic device presents a row of representations of content available through the provider in a manner similar to that illustrated in FIGS. 6F-6I. In some embodiments, the electronic device does not present a row of representations of content items available through the provider in response to successful log in to the provider account.

FIGS. 7A-7J are flow diagrams illustrating a method of presenting a plurality of representations of content items that are available on a respective channel in response to successfully subscribing the respective channel in accordance with some embodiments of the disclosure. The method 700 is optionally performed at an electronic device such as device 100, device 300, device 500, device 501, device 510, and device 511 as described above with reference to FIGS. 1A-1B, 2-3, 4A-4B and 5A-5B. Some operations in method 700 are, optionally combined and/or order of some operations is, optionally, changed.

As described below, the method 700 provides ways to present representations of content items that are available via a channel to which the electronic device just successfully subscribed. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6B, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices displays (702), on the display 514, a user interface of a media browsing application that includes content accessible from one or more content providers, wherein the user interface includes a first region that includes one or more representations 608a-e and 610a-e of content accessible on the electronic device 500, and a second region, separate from the first region, that includes one or more representations 612a and 612b of one or more channels available for subscription in the media browsing application.

The one or more representations of content accessible on the electronic device are optionally selectable. The one or more channels available for subscription in the media browsing application optionally enable the user to access content provided by the one or more channels that plays in the media browsing application (e.g., as opposed to playing in a separate application, such as a dedicated application for each of the one or more channels). In some embodiments, in response to detecting selection of one of the representations of content, the electronic device presents the respective item of content represented by the selected representation. In some embodiments, in response to detecting selection of one of the representations of content, the electronic device presents a user interface (e.g., a product page) including information about the respective item of content. The content providers optionally include one or more channels the user is already subscribed to. The content providers optionally include content providers that provide content that will play in the media browsing application when playback is initiated and providers that provide content that will play in a different media application when playback is initiated (e.g., an application specific to the content provider that provides the content). In some embodiments, the representations of one or more channels are representations of channels that provide content that will play in the media browsing application when playback of the content is initiated without opening a different application, and do not include representations of channels whose content cannot be played in the media browsing application without needing to launch a separate media application. In some embodiments, the second region only includes representations of channels the user is not subscribed to and does not include representations of channels the user is already subscribed to. The one or more representations of the channels optionally include background images related to the content available through the channel, but unrelated to a content consumption history of the user. In some embodiments, the background images include video content. The background images optionally update periodically (e.g., every 3 seconds, 5 seconds, 10 seconds) to present an image related to a different item of content or series of content available through the channel. Furthermore, in some embodiments, the background images that are presented periodically update from time to time (e.g., every day, every several days, every several weeks, every season) to feature items of content or series of content that are currently popular, new, recently updated, or featured for some other marketing reason.

In some embodiments, such as in FIG. 6D, while displaying the user interface, the electronic device 500 receives (704), via the one or more input devices 510, an input (e.g., via contact 603) corresponding to a request to subscribe to a first channel of the one or more channels. In some embodiments, the input is selection of one of the representations of the one or more channels in the second region of the user interface.

In some embodiments, such as in FIG. 6E, in response to receiving the input (706): the electronic device 500 initiates (708) a process to subscribe to the first channel on the electronic device 500. In some embodiments, the process includes presenting an option to confirm the subscription request and an option to cancel the subscription process. In response to detecting selection of the option to confirm the subscription, the electronic device optionally presents a payments user interface from which the user is able to authenticate payment through a user account of the electronic device or, in some embodiments, enter payment information that is not associated with the user account.

In some embodiments, such as in FIG. 6I, in accordance with a determination that subscription to the first channel was successful, the electronic device 500 updates (710) the user interface to: include a third region, separate from the first region and the second region, that includes one or more representations 616a-e of content accessible on the electronic device 500 from the first channel (712). In some embodiments, the third region is presented adjacent to a fourth region of the user interface that includes one or more representations of content accessible on the electronic device from a different channel the user is already subscribed to. The user interface optionally includes a plurality of rows of representations of content (e.g., "channel rows"), where each row includes content from a respective channel that plays within the content browsing application in response to an input to initiate playback of the content. In some embodiments, the electronic device is configured to present a maximum number (e.g., 3) of channel rows. Even if the user is subscribed to a number of channels that exceeds the maximum number of channel rows, the electronic device optionally does not display more than the maximum number of channel rows, meaning, optionally, a row for each channel is not always displayed.

In some embodiments, such as in FIG. 6I, the electronic device 500 updates the user interface to remove the representation 612b, shown in FIG. 6D, of the first channel from the second region (714). In some embodiments, the second region continues to be displayed and includes representations of other channels the user is not subscribed to. In some embodiments, if the second region only included the representation of the first channel when the first channel was selected, the electronic device does not present a representation of a different channel in the second region (e.g., the device ceases to display the second region). In some embodiments, if the second region only included the representation of the first channel when the first channel was selected, the electronic device presents a representation of one other channel the user is not yet subscribed to. If the electronic device continues to present one or more representations of channels in the second region, the third region of the user interface is optionally adjacent to the second region of the user interface (e.g., directly below or directly above, with no other options or content in between). In accordance with a determination that the subscription to the first channel is unsuccessful, the electronic device optionally continues to present the representation of the first channel in the second region and optionally forgoes presenting the one or more representations of content accessible on the electronic device from the first channel in the third region of the user interface. In some embodiments, in accordance with a determination that the subscription to the first channel is unsuccessful, the electronic device presents an error message informing the user that the subscription to the first channel is unsuccessful. For example, the electronic device presents a user interface that includes a representation of an item of content that, when selected, causes the electronic device to initiate playback of the item of content and a representation of a first channel. In some embodiments, the representation of the first channel includes an image related to one or more items or series of content that are accessible through the first channel. The user optionally selects the representation of the first channel and, in response to the user's selection, the electronic device initiates a process to subscribe to the first channel. In some embodiments, the user completes the subscription process. In response to completion of the subscription process, the electronic device optionally presents the user interface again, but the user interface optionally does not include the representation of the first channel. In some embodiments, the user interface now includes a row of representations of content items that are available through the first channel. In some embodiments, the electronic device presents an animation of the representation of the first channel "morphing" or "sliding" into the row of representations of content items that are available through the first channel.

The above-described manner of presenting one or more representations of content available through a respective channel in response to subscribing to the respective channel allows the electronic device to present the user with representations of content the user is likely to be interested in consuming (e.g., based on their channel subscription activity), which simplifies the interaction between the user and the electronic device and enhances the operability of the electronic device and makes the user-device interface more efficient (e.g., by presenting the representations of the content in response to the subscription without requiring an additional input to do so), which additionally reduces power usage and improves battery life of the electronic device by enabling the user to use the electronic device more quickly and efficiency, such as by anticipating that the user will want to browse content available through a respective channel after subscribing to the respective channel.

In some embodiments, such as in FIG. 6D, the one or more representations 610a-3 of content accessible on the electronic device 500 in the first region and the one or more representations of the one or more channels 612a-c in the second region are displayed as separate rows in the user interface (716). In some embodiments, the user interface includes additional rows including representations of content or channels accessible to the media browsing application. When the electronic device updates the user interface to include the third region including representations of content accessible on the electronic device from the first channel, the third region is optionally another row in the user interface. For example, the user interface includes one or more rows of representations of items of content and a row of one or more representations of channels, including a representation of the first channel.

The above-described manner of presenting the representations of the one or more channels in a row of a user interface that also includes a row of representations of content accessible on the electronic device allows the electronic device to present items of content for browsing by the user while presenting representations of channels that are able to provide additional content to the user, which simplifies the interaction between the user and the electronic device and enhances the operability of the electronic device and makes the user-device interface more efficient (e.g., by allowing the user to view the channels and the representations of content without navigating between separate user interfaces), which additionally reduces power usage and improves battery life of the electronic device by enabling the user to use the electronic device more quickly and efficiency.

In some embodiments, such as in FIG. 6C, in accordance with a determination that the one or more channels includes a plurality of channels, the second region includes a full representation 612a of a first respective channel in the plurality of channels and a portion of a representation 612b of a second respective channel in the plurality of channels, wherein the current focus moves from the full representation 612a of the first respective channel to the representation 612b of the second respective channel as shown in FIG. 6D in response to scrolling input received at the one or more input devices 510 (718) as shown in FIG. 6C. For example, the electronic device optionally displays the entire representation of the first respective channel and part of the representation of the second respective channel next to the representation of the first respective channel. In response to detecting an input to scroll in the direction towards the representation of the second respective channel, the electronic device updates the user interface to present the entire representation of the second respective channel and moves the current focus to the second respective channel. While displaying the entire representation of the second respective channel, the electronic device optionally concurrently displays a portion of the first respective channel. In some embodiments, the electronic device presents the full representation of only one channel at a time. In some embodiments, such as in FIG. 6Y, in accordance with a determination that the one or more channels consists of a single channel, the second region includes a full representation 612*e* of the single channel without including representations of other channels (720). In some embodiments, the representation of the single channel occupies an entire row of the user interface. In some embodiments, the user is not able to scroll sideways to reveal a representation of another channel. For example, the row optionally only includes a representation of one channel).

The above-described manner of presenting a portion of the second respective channel when multiple channels are included in the second region and not presenting indications of other channels when the second region includes only one channel allows the electronic device to indicate to the user when the second region is scrollable and when the second region is not scrollable, which simplifies the interaction between the user and the electronic device and enhances the operability of the electronic device and makes the user-device interface more efficient (e.g., by differentiating between situations when scrolling input will be accepted and situations when scrolling input will not be accepted), which additionally reduces power usage and improves battery life of the electronic device by enabling the user to use the electronic device more quickly and efficiency.

In some embodiments, such as in FIGS. 6O-6S, the first channel is a channel whose content is viewable within the media browsing application or within a respective application, separate from the media browsing application (722). In some embodiments, the channel is available for subscription in the media browsing application (e.g., available to provide content to the media application that plays in the media application) and available for subscription in a dedicated application for the channel (e.g., available to provide content to the dedicated application that plays in the dedicated application)). In some embodiments, the process to subscribe to the first channel includes displaying a selectable option 624*b* for linking to the media browsing application an existing subscription to the first channel, the existing subscription used to view the content from the first channel in the respective application (724), such as in FIG. 6Q. In some embodiments, the user is able to associate a user account of the channel (e.g., a user account for the dedicated application for the channel) with the media browsing application to enable the media browsing application to access the content of the channel within the media browsing application without opening the dedicated application. For example, in response to selecting the representation of the first channel, the electronic device presents a menu including an option to create a new subscription to the channel in the media browsing application and an option to sign in to an existing account with the first channel. In response to detecting selection of the option to sign in to the existing account, the electronic device optionally presents a user interface for entering log in credentials (e.g. username, password). In some embodiments, if the user account is valid, the electronic device enables the media browsing application to present content provided by the first channel using the existing user account.

The above-described manner of enabling the user to link an existing account to the media browsing application allows the electronic device to provide access to content to which the user is already subscribed from the media browsing application, which simplifies the interaction between the user and the electronic device and enhances the operability of the electronic device and makes the user-device interface more efficient (e.g., by allowing the user to view content they have subscribed to without opening an application other than the media browsing application (e.g., an application dedicated to a respective channel), which additionally reduces power usage and improves battery life of the electronic device by enabling the user to use the electronic device more quickly and efficiency, such as by reducing the need to enter inputs to switch between applications.

In some embodiments, such as in FIG. 6O, in accordance with a determination that a user of the electronic device 500 has subscribed to less than a predetermined number of channels available for subscription in the media browsing application, the second region includes a plurality of representations 612*c*-612*d* of channels available for subscription in the media browsing application (726). In some embodiments, the predetermined number of channels is two, three, four, five, or ten. In some embodiments, the second region includes representations of some or all of the available channels the user has not subscribed to. In some embodiments, if representations of only some of the available channels are presented, the representations that are presented are selected based on popularity and/or a content consumption or channel subscription history of the user on the electronic device. The electronic device optionally presents one entire representation at a time and includes portions of other representations to indicate to the user that scrolling will cause a different representation to be presented. For example, the electronic device presents multiple representations of channels if there are at least three channels available for subscription with the media browsing application that the user is not subscribed to. In some embodiments, such as in FIG. 6X, in accordance with a determination that the user of the electronic device 500 has subscribed to more than the predetermined number of channels available for subscription in the media browsing application, the second region includes a single representation 612*e* of a channel available for subscription in the media browsing application without including other representations of channels available for subscription in the media browsing application (728). In some embodiments, even if more than one additional channel is available for subscription in the media browsing application, the electronic device only presents one representation of an available channel. The representation of an available channel is optionally selected based on popularity and/or a content consumption or channel subscription history of the user on the electronic device. For example, the electronic device presents one representation of a channel available for subscription with the media browsing application if there are three or fewer channels available for subscription with the media browsing application that the user is not subscribed to.

The above-described manner of presenting representations of multiple channels when the number of available channels exceeds a predetermined threshold allows the electronic device to present a plurality of representations of channels when many channels are available, which simplifies the interaction between the user and the electronic device and enhances the operability of the electronic device and makes the user-device interface more efficient (e.g., by presenting the representations of a plurality of channels in the user interface that also includes representations of items of content), which additionally reduces power usage and improves battery life of the electronic device by enabling the user to use the electronic device more quickly and efficiency, such as by reducing the number of inputs entered to browse a plurality of available channels.

In some embodiments, such as in FIGS. 6O-6T, in response to receiving the input corresponding to the request to subscribe to the first channel (730): in accordance with the determination that the subscription to the first channel was successful, updating the user interface includes (732): in accordance with the second region including the plurality of representations 612c-612d of channels available for subscription prior to receiving the input corresponding to the request to subscribe to the first channel, such as in FIG. 6O, maintaining display, in the user interface, of the second region and one or more representations 612d and 612e of channels available for subscription in the media browsing application (734), such as in FIG. 6T. In some embodiments, the electronic device continues to present a plurality of representations of channels available for subscription in the media browsing application, excluding the representation of the first channel. In some embodiments, the electronic device presents a representation of one channel available for subscription in the media browsing application, the one channel being different than the first channel. For example, the electronic device presents a plurality of representations of channels available for subscription, including the representation of the first channel. After the user subscribes to the first channel, the electronic device optionally continues to present a representation of at least one other channel available for subscription in the media browsing application in the second region of the user interface. In some embodiments, such as in FIG. 6Y-6AA, updating the user interface includes: in accordance with the second region including the single representation 612e of the channel available for subscription in the media browsing application without including other representations of channels available for subscription in the media browsing application, such as in FIG. 6Y, ceasing display, in the user interface, of the second region (736), such as in FIG. 6AA. After subscription to the first channel is successful, the electronic device optionally does not present a representation of a channel available for subscription in the media browsing application, though there may be channels available for subscription in the media browsing application that the user is not subscribed to. For example, the electronic device presents, in the second region of the user interface, the representation of the first channel. After the user subscribes to the first channel, the electronic device optionally ceases to display the representation of the first channel and optionally does not display a representation of a different channel in the second region of the user interface.

The above-described manner of continuing to present the representations of the available channels after the user subscribes to the first channel if multiple representations of channels were presented when the user subscribed to the first channel and ceasing to display the representation of the first channel if only the representation of the first channel was presented when the user subscribed to the first channel allows the electronic device to enable the user to continue to browse the plurality of channels the user may have been browsing when they subscribed to the first channel or to conserve display area to present more information, which simplifies the interaction between the user and the electronic device and enhances the operability of the electronic device and makes the user-device interface more efficient (e.g., by reducing the number of inputs needed to continue to browse available channels or to view different information), which additionally reduces power usage and improves battery life of the electronic device by enabling the user to use the electronic device more quickly and efficiency.

In some embodiments, such as in FIG. 6A content of a first type 604c and content of a second type 604b, different from the first type, are accessible from the media browsing application (738). In some embodiments, content of the first type are movies, and content of the second type are TV shows. In some embodiments, such as in FIGS. 6M-6N, in accordance with a determination that the user interface corresponds to content of the first type 604c and not content of the second type 604b, the one or more channels 612c and 612d are first one or more channels on which content of the first type is available (740). In some embodiments, the user interface includes representations of items of content that are the first type of content. One or more of the channels optionally provide the media browsing application with access to both the first and second type of content. For example, a movies user interface includes representations of movies and representations of one or more channels that provide access to movies and does not include representations of television shows or representations of one or more channels that only provide access to television shows, and not movies. In some embodiments, such as in FIGS. 6V-6X in accordance with a determination that the user interface corresponds to content of the second type 604b and not content of the first type 604c, the one or more channels 612e are second one or more channels on which content of the second type is available, the first one or more channels different than the second one or more channels (742). In some embodiments, the user interface includes representations of items of content that are the second type of content. One or more of the channels optionally provide the media browsing application with access to both the first and second type of content. For example, a TV show user interface includes representations of TV shows and representations of one or more channels that provide access to TV Shows without presenting representations of movies or representations of channels that only include access to movies without including access to television shows. In some embodiments, the user interface corresponds to both the first and the second types of content and presents representations of the first type of content, representations of the second type of content, representations of channels that provide access to the first type of content, representations of channels that provide access to the second type of content, and representations of channels that provide access to both the first and the second types of content.

The above-described manner of presenting representations of channels that provide the type of content corresponding to the user interface allows the electronic device to present to the user representations of channels that provide the type of content the user is presently browsing, which simplifies the interaction between the user and the electronic device and enhances the operability of the electronic device and makes the user-device interface more efficient (e.g., by conserving display space by only presenting channels related to the type of content the user requested to browse), which additionally reduces power usage and improves battery life of the electronic device by enabling the user to use the electronic device more quickly and efficiency.

In some embodiments, such as in FIG. 6A, content of a first type 604c and content of a second type 604b, different from the first type, are accessible from the media browsing application (744). In some embodiments, content of the first type are movies, and content of the second type are TV shows. In some embodiments, such as in FIGS. 6M-6O in accordance with a determination that the user interface corresponds to content of the first type 604c and not content of the second type 604b, the one or more representations 616a-616e of the content accessible on the electronic device from the first channel in the third region of the user interface include one or more representations 616a-616e of content of the first type without including representations of content of the second type (746). The first channel optionally also provides the media browsing application with access to the second type of content, but representations of the second type of content are optionally not presented in the third region of the user interface. For example, while displaying a movies user interface, the user subscribes to the first channel and the user interface is updated to include representations of movies provided by the first channel. In some embodiments, such as in FIGS. 6V-6W, in accordance with a determination that the user interface corresponds to content of the second type 604*b* and not content of the first type 604*c*, the one or more representations 616*g*-616*k*, 648*a*-648*e*, or 650*a*-650*e* of the content accessible on the electronic device from the first channel in the third region of the user interface include one or more representations of content of the second type without including representations of content of the first type (748). The first channel optionally also provides the media browsing application with access to the first type of content, but representations of the first type of content are optionally not presented in the third region of the user interface. For example, while displaying a TV show user interface, the user subscribes to the first channel and the user interface is updated to include representations of TV shows provided by the first channel. In some embodiments, the user interface corresponds to both the first type of content and the second type of content. When the user subscribes to the first channel while presenting the user interface that corresponds to the first and second types of content, the electronic device updates the user interface to include representations of both the first and second types of content that are accessible through the first channel in the third region of the user interface.

The above-described manner of presenting representations of items of content available on the first channel that have the content type corresponding to the user interface allows the electronic device to present to the user newly-available content that has the content type the user requested to view, which simplifies the interaction between the user and the electronic device and enhances the operability of the electronic device and makes the user-device interface more efficient (e.g., by presenting to the user content of the type the user requested to browse without using display space to display content of a different type), which additionally reduces power usage and improves battery life of the electronic device by enabling the user to use the electronic device more quickly and efficiency, such as by reducing the number of scrolling inputs needed to browse content of the desired type.

In some embodiments, such as in FIG. 6T, in accordance with a determination that a content consumption history of a user of the electronic device is a first content consumption activity, the one or more representations of the content accessible on the electronic device from the first channel in the third region of the user interface include first one or more representations 616*a*-616*e* of first content (750). In some embodiments, the representations of the content accessible on the electronic device from the first channel include items of content that the user has consumed previously and/or items of content related to content the user has consumed previously (e.g., same actor, director, producer, often watched by other viewers who consumed the content the user consumed previously, etc.). In some embodiments, in accordance with a determination that a content consumption history of a user of the electronic device is a second content consumption activity, different than the first content consumption history, the one or more representations of the content accessible on the electronic device from the first channel in the third region of the user interface include second one or more representations of second content, different than the first content (752). As an example, the user interface illustrated in FIG. 6T would include representations other than representations 616*a*-616*e* in the row labeled "Watch on Channel B." For example, if the user previously watched a season of a first TV show that is accessible on the electronic device from the first channel, the representations of the content accessible from the first channel includes a representation of the first TV show. As another example, the representations of the content accessible from the first channel include a representation of an item of content that is similar to the first TV show.

The above-described manner of customizing the representations of content available on the first channel in accordance with content consumption history of the user allows the electronic device to present content the user is most likely to be interested in, which simplifies the interaction between the user and the electronic device and enhances the operability of the electronic device and makes the user-device interface more efficient (e.g., by enabling the user to more quickly find content they are interested in consuming), which additionally reduces power usage and improves battery life of the electronic device by enabling the user to use the electronic device more quickly and efficiency.

In some embodiments, such as in FIG. 6T the representation 612*d* of the first channel in the second region includes a selectable option (754). In some embodiments, in response to detecting selection of the selectable option, the electronic device initiates a process for accessing the first channel. In some embodiments, such as in FIG. 6T, in accordance with a determination that a free trial subscription is available for the first channel, the selectable option 612*d* is selectable to initiate a process for activating the free trial subscription to the first channel (756). In some embodiments, in response to selecting the selectable option, the electronic device is able to access the first channel without the use making a payment. In some embodiments, the selectable option includes text that indicates that a free trial of the first channel is available (e.g., "try it free," "start free trial," etc.). For example, the first channel has a free trial available so the electronic device presents an option with the text "Try the first channel free." In response to detecting selection of the option, the electronic device initiates a free trial period of the first channel. In some embodiments, such as in FIG. 6Y, in accordance with a determination that the free trial subscription is not available for the first channel, the selectable option 612*e* is selectable to initiate a process for activating a paid subscription to the first channel (758). In some embodiments, in response to selecting the selectable option, the electronic device initiates a process for subscribing to the first channel, including collecting a payment for the subscription. In some embodiments, the selectable option includes text that indicates that selecting the option will initiate a subscription process (e.g., "subscribe now," "watch now," "subscribe" etc.). For example, the first channel does not have a free trial available so the electronic device presents an option with the text "Watch now." In response to detecting selection of the option, the electronic device initiates a process to subscribe to the first channel.

The above-described manner of initiating a process to begin a free trial or initiate a subscription depending on whether a free trial is available allows the electronic device to reduce the number of selectable options that are presented instead of always presenting both options, which simplifies the interaction between the user and the electronic device and enhances the operability of the electronic device and makes the user-device interface more efficient (e.g., by reducing the user's cognitive burden of reading available options), which additionally reduces power usage and improves battery life of the electronic device by enabling the user to use the electronic device more quickly and efficiency.

In some embodiments, such as in FIG. 6BB, content from a plurality of channels 628a-628f is accessible from the media browsing application (760). In some embodiments, the content from the plurality of channels is visible in the media browsing application. As will be described below, in some embodiments, some of the content plays in the media browsing application and some of the content plays in a different application. In some embodiments, the plurality of channels includes a first set of channels 628a-628f and a second set of channels, content from the first set of channels viewable within the media browsing application, and content from the second set of channels not viewable within the media browsing application (762), such as in FIG. 6FF. In some embodiments, the content is content that must be viewed from a separate corresponding application that is optionally displayed in response to an input received in the media browsing application. For example, in response to detecting selection of a representation of an item of content displayed in a user interface of the content browsing application, the electronic device opens a different application to play the content. In some embodiments, such as in FIG. 6U, the second region includes one or more representations 612d and 612e of channels in the first set of channels without including representations of channels in the second set of channels (764). In some embodiments, the second region only includes representations of channels that provide content that plays in the user interface of the content browsing application. For example, the user interface of the content browsing application presents a representation of a channel that provides access to content that plays in a different application and a representation of a channel that provides access to content that plays in the content browsing application. The representation of the channel that provides access to content that plays in the content browsing application is optionally presented in the second region of the user interface while the representation of the channel that provides content that plays in a different application is presented in a different region of the user interface.

The above-described manner of only including representations of channels that provide content accessible from the media browsing application in the second region allows the electronic device to indicate to the user that the channels presented in the second region provide content that plays in the media browsing application, which simplifies the interaction between the user and the electronic device and enhances the operability of the electronic device and makes the user-device interface more efficient (e.g., by reducing inputs needed to determine which channels provide content that is accessible from the media browsing application), which additionally reduces power usage and improves battery life of the electronic device by enabling the user to use the electronic device more quickly and efficiency.

In some embodiments, such as in FIG. 6U, a user of the electronic device 500 is subscribed to at least one channel available for subscription in the media browsing application (766). In some embodiments, the user has access to content provided by one or more channels that play the content in the media browsing application, as opposed to channels that provide content that plays in other applications. In some embodiments, such as in FIG. 6U, the user interface includes (768): the one or more representations 614a-614e of content accessible on the electronic device 500 as one or more rows in the first region (770). In some embodiments, each row of representations of content is horizontally scrollable to reveal additional representations of items of content in the row. In some embodiments, the items of content in each row are associated with one another (e.g., belong to the same genre, are available through the same channel, are in the same editorial collection, etc.). In some embodiments, such as in FIG. 6U, the user interface includes: one or more representations 628a, 628b, and 630a-630f of channels available for subscription in the media browsing application as a row in a fourth region in the user interface separate from the first, second and third regions, the fourth region including a representation 612a of the at least one channel to which the user of the electronic device 500 is subscribed, and a representation 630a of at least one channel to which the user of the electronic device 500 is not subscribed (772). In some embodiments, the fourth region includes representations of all of the channels that are available for subscription in the media browsing application. The one or more channels to which the user of the electronic device is subscribed optionally appear at the start (e.g., the left side) of the row, and the other channels optionally appear after (e.g., to the right of) the channels to which the user of the electronic device is subscribed. In some embodiments, the first, second, third, and fourth regions of the user interface each occupy a row in the user interface.

The above-described manner of presenting a row of channels that includes channels to which the user is subscribed and channels to which the user is not subscribed allows the electronic device to enable the user to browse channels to which the user is subscribed and channels to which the user is not subscribed, which simplifies the interaction between the user and the electronic device and enhances the operability of the electronic device and makes the user-device interface more efficient (e.g., by reducing the number of inputs needed to view all of the channels), which additionally reduces power usage and improves battery life of the electronic device by enabling the user to use the electronic device more quickly and efficiency.

In some embodiments, such as in FIG. 6CC, while displaying, on the display, the fourth region of the user interface, the electronic device 500 receives (774), via the one or more input devices 510, an input corresponding to a request to select a respective representation 628a of a respective channel in the fourth region of the user interface. In some embodiments, the user taps the representation on a touch-sensitive display or selects the representation using a keyboard, mouse, remote control device, or other input device. In some embodiments, such as in FIG. 6DD, in response to receiving the input corresponding to the request to select the respective representation 628a of the respective channel in the fourth region (776): in accordance with a determination that the respective channel is a first respective channel, the electronic device 500 displays (778), on the display, a user interface corresponding to the first respective channel and including information 654a and 656a-d about content available on the first respective channel. In some embodiments, the user interface corresponding to the first respective channel includes one or more representations of content available on the first respective channel. In some embodiments, in response to detecting selection of one of the representations of content available on the first respective channel, the electronic device initiates playback of the item of content or presents further information about the item of content. The information about the item of content optionally includes a description of the item of content, representations of each episode if the item of content is a series of episodic content, information about the cast and crew of the content, parental guidance information, critical review of the content, etc. In some embodiments, the user interface corresponding to the first respective channel includes information about subscribing to the first respective channel and a selectable option for initiating a process to subscribe to the first respective channel if the user is not yet subscribed to the first respective channel. In some embodiments, if the user is subscribed to the first respective channel, the user interface corresponding to the first respective channel includes an indication that the user is subscribed to the first respective channel. In some embodiments, in accordance with a determination that the respective channel is a second respective channel, different than the first respective channel, the electronic device displays (780), on the display, a user interface corresponding to the second respective channel and including information about content available on the second respective channel. For example, if the user selects a different channel other than Channel B, the electronic device 500 would display a user interface similar to the user interface illustrated in FIG. 6DD that has information about the other channel. For example, in response to detecting selection of a first channel, the electronic device optionally presents a user interface corresponding to the first channel. As another example, in response to detecting selection of a second channel, the electronic device presents a user interface corresponding to the second channel.

The above-described manner of presenting information about a respective channel in response to detecting selection of the respective channel allows the electronic device to provide to the user additional information about a selected channel while the user is browsing the channels, which simplifies the interaction between the user and the electronic device and enhances the operability of the electronic device and makes the user-device interface more efficient (e.g., by reducing the number of inputs needed to navigate between the representations of the channels and information about a selected channel), which additionally reduces power usage and improves battery life of the electronic device by enabling the user to use the electronic device more quickly and efficiency.

In some embodiments, such as in FIG. 6CC, the representation 628a of the at least one channel to which the user of the electronic device is subscribed is displayed at a beginning of the row in the fourth region (782). In some embodiments, the beginning of the row is left side of the row. In some embodiments, if the user is subscribed to a plurality of channels, the electronic device presents representations of each of the plurality of channels to which the user is subscribed at the beginning of the row of representations of channels. In some embodiments, such as in FIG. 6CC, the representation 630e of the at least one channel to which the user of the electronic device is not subscribed is displayed at an end of the row in the fourth region (784). In some embodiments, the end of the row is right side of the row. In some embodiments, if the user is not subscribed to a plurality of channels available for subscription through the media browsing application, the electronic device presents representations of each of the plurality of channels to which the user is not subscribed at the end of the row of representations of channels. In some embodiments, representations of all of the channels that are available for subscription through the media browsing application are included in the fourth region. If there is not enough space for representations of all of the channels that are available for subscription through the media browsing application to be concurrently presented in the row in the fourth region of the user interface, the row is optionally scrollable to change which representations of channels are currently presented.

The above-described manner of presenting the channels to which the user is subscribed at the beginning of the row of channels allows the electronic device to present the user channels that will provide content to the user before channels that the user does not yet have access to, which simplifies the interaction between the user and the electronic device and enhances the operability of the electronic device and makes the user-device interface more efficient (e.g., by presenting the channels the user is most likely interested in first), which additionally reduces power usage and improves battery life of the electronic device by enabling the user to use the electronic device more quickly and efficiency, such as by reducing the number of inputs needed to view the channels to which the user is subscribed.

In some embodiments, such as in FIG. 6CC, in accordance with a determination that the user of the electronic device 500 is subscribed to greater than a threshold number of channels available for subscription in the media browsing application, the fourth region includes a visual indication delineating one or more representations 628a-628f of channels to which the user is subscribed from one or more representations 630a-630e of channels to which the user is not subscribed (786). In some embodiments, the threshold number is two, three four, or five. In some embodiments, the user interface includes a text indication (e.g., "My Channels") above the representations of the one or more channels to which the user is subscribed and a visual delineation (e.g., a vertical bar) between the representations of the channels to which the user is subscribed and the representations of the channels to which the user is not subscribed. If the user is subscribed to less than the threshold number of channels but at least one channel, the one or more representations of channels to which the user is subscribed are optionally presented at the beginning (e.g., the left side) of the row without the text indication or delineation. In some embodiments, if the user is not subscribed to any channels, the forth region only includes representations of channels to which the user is not subscribed. In some embodiments, such as in FIG. 6K, in accordance with a determination that the user of the electronic device 500 is not subscribed to greater than the threshold number of channels available for subscription in the media browsing application, the fourth region does not includes the visual indication delineating the one or more representations 628a of channels to which the user is subscribed from the one or more representations 630a-f of channels to which the user is not subscribed (788). In some embodiments, the threshold number is two, three, four, or five. In some embodiments, the user interface includes a text indication (e.g., "Available Channels") above the representations of the one or more channels to which the user is not subscribed and a visual delineation (e.g., a vertical bar) between the representations of the channels to which the user is subscribed and the representations of the channels to which the user is not subscribed. If the user is not subscribed to less than the threshold number of channels but at least one channel, the one or more representations of channels to which the user is not subscribed are optionally presented at the end (e.g., the right side) of the row without the text indication or delineation. In some embodiments, if the user is subscribed to all available channels, the forth region only includes representations of channels to which the user is subscribed.

The above-described manner of delineating between channels to which the user is subscribed and channels to which the user is not subscribed allows the electronic device to indicate the subscription status of each channel to the user before the user selects a channel, which simplifies the interaction between the user and the electronic device and enhances the operability of the electronic device and makes the user-device interface more efficient (e.g., by enabling the user to decide whether or not they wish to view additional information about a respective channel based on the subscription status of the channel), which additionally reduces power usage and improves battery life of the electronic device by enabling the user to use the electronic device more quickly and efficiency.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1100) are also applicable in an analogous manner to method 700 described above with respect to FIGS. 7A-7J. For example, the operation of the electronic device to subscribe to a channel that presents content in the unified media browsing application with reference to method 700 optionally has one or more of the characteristics of the presentation of content within a unified media browsing application that is provided by a channel and presentation of information about subscribing to a respective channel based on the user's content consumption history, etc., described herein with reference to other methods described herein (e.g., methods 900 and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5B) or application specific chips. Further, the operations described above with reference to FIGS. 7A-7J are, optionally, implemented by components depicted in FIGS. 1A-1B. For example, displaying operations 702, 704, 716, 724, 734, 736, 774, 778, 780, 782, and 784, receiving operations 704, 706, 718, 730, 734, 774, and 776 and initiating operations 708, 756, and 758 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Playing Content Provided by a Channel in a Unified Media Browsing Application

Users interact with electronic devices in many different manners, including using an electronic device to play various media items. In some embodiments, an electronic device is able to access items of content in a media browsing application. The embodiments described below provide ways in which an electronic device plays items of content in a unified media browsing application that are provided by a channel. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
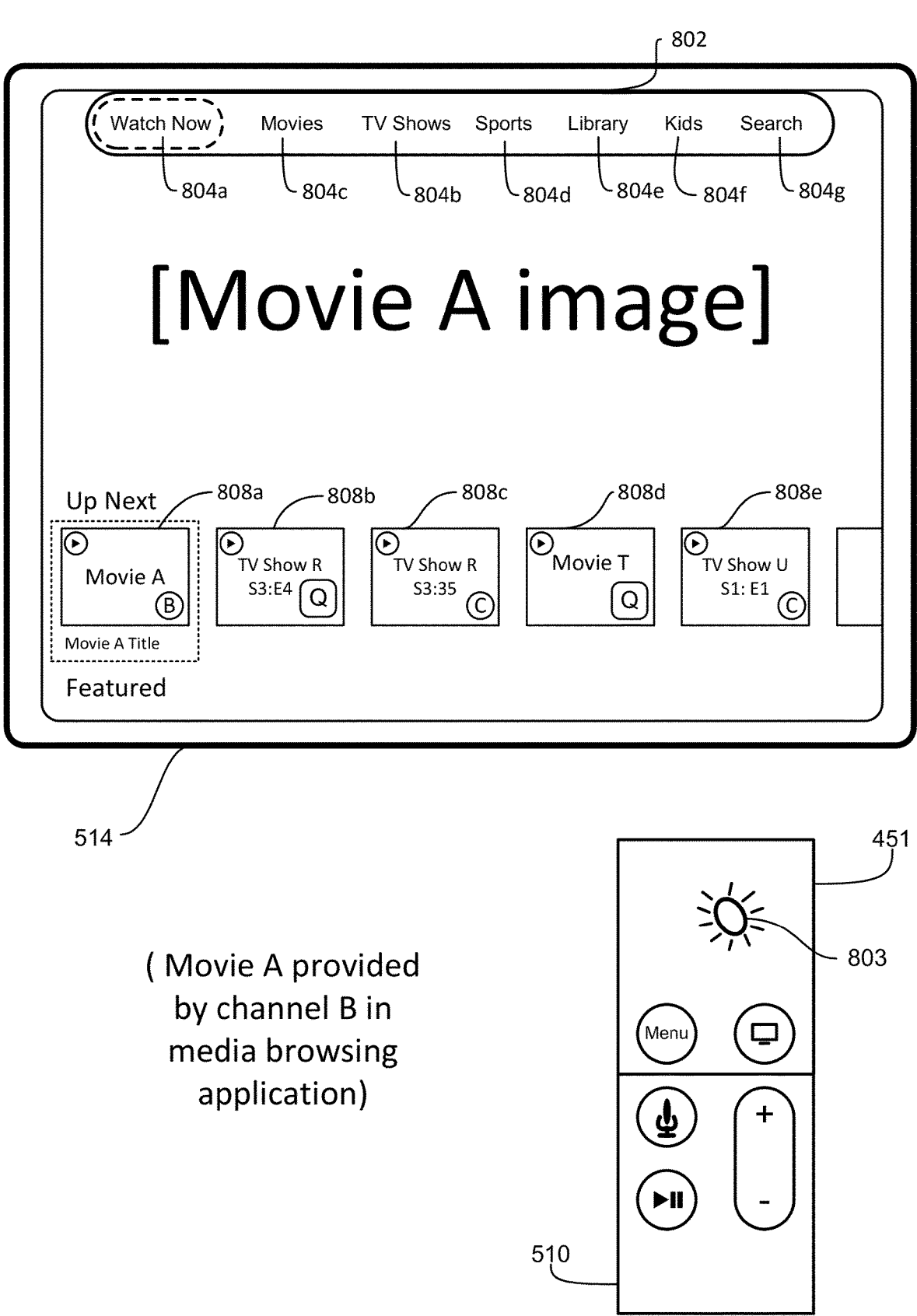
FIGS. 8A-8AA illustrate exemplary ways in which an electronic device plays content that is provided by a channel in a unified media browsing application in accordance with some embodiments of the disclosure.

FIGS. 8A-8AA illustrate exemplary ways in which an electronic device plays content that is provided by a channel in a unified media browsing application in accordance with some embodiments of the disclosure. The embodiments in these figures are used to illustrate the processes described below, including the processes described with reference to FIGS. 9A-9J.

FIGS. 8A-8F illustrate the electronic device 500 playing content in the media browsing application and playing content in an application other than the media browsing application. FIG. 8A illustrates a user interface of a media browsing application. The user interface includes a navigation bar 802 that includes a plurality of tabs 804*a-g*. The navigation bar 802 indicates that the media browsing user interface is currently a "Watch Now" user interface that is related to content of multiple types, such as television and movies. The user interface includes representations 808*a-e* of items of content. Each representation 808 includes an indication of the content (e.g., the content title), an indication of the channel or application that provides the content (e.g., the indications of Channel B, the indications of Channel C, or the indications of Application Q), and an indication that the user has access to the respective item of content (e.g., the play button in the upper left corner of each indication 808). Although not all of the user interface illustrated herein illustrate metadata icons on the representations of content items, it should be understood that the scope of the disclosure encompasses including any and all of the metadata icons illustrated in FIG. 8A or elsewhere in any of the other user interfaces illustrated herein as including representations of content items.

As shown in FIG. 8A, the current focus is on a representation 808*a* of a movie that is provided by Channel B, which provides content that plays in the media browsing application. The user selects (e.g., with contact 803) the representation 808*a* of the movie. In response to the user's selection, the electronic device 500 plays the movie in the media browsing application, as shown in FIG. 8B.

Figure 8B:
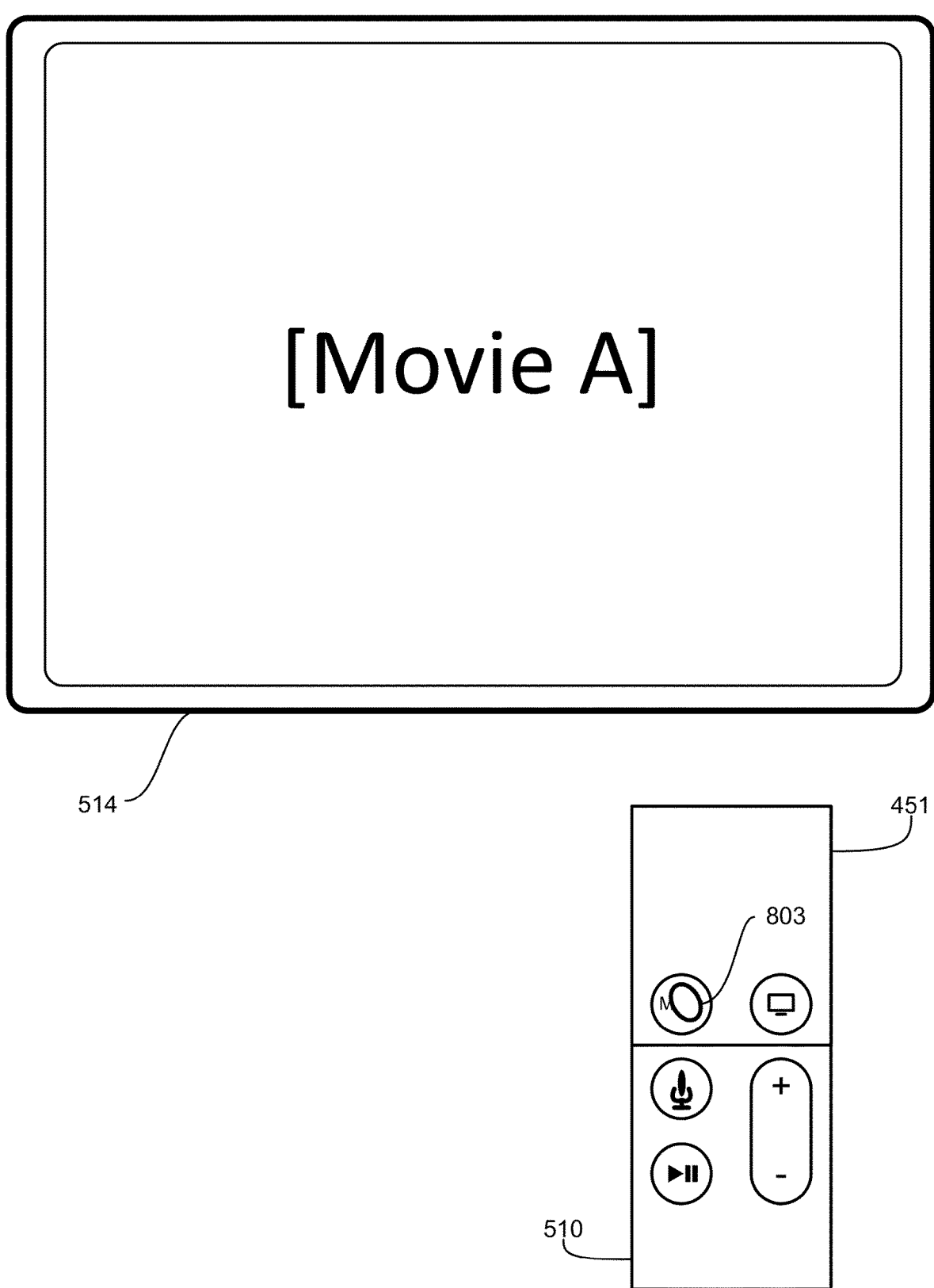

FIG. 8B illustrates the electronic device 500 playing Movie B in the media browsing application. While the movie is playing, the user selects (e.g., with contact 803) a "menu" button that functions as a back button to navigate backwards through the user interface. In response to the selection of the "menu" button, the electronic device 500 presents a user interface of the media browsing application, as shown in FIG. 8C.

Figure 8C:
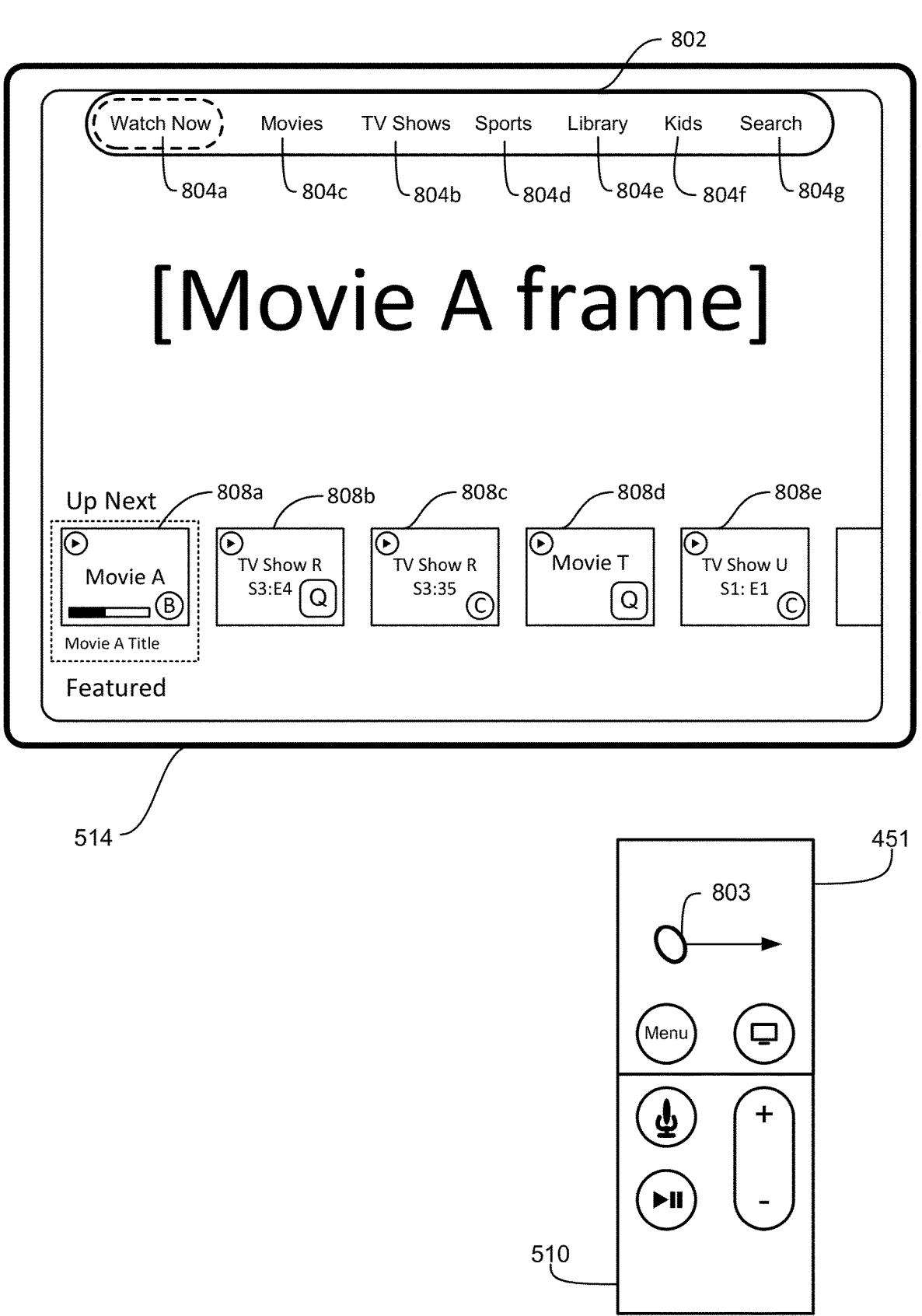

In FIG. 8C, the electronic device 500 presents the user interface of the media browsing application. The representation 808*a* is updated to include a scrubber bar that indicates the playback progress of Movie A. The user scrolls (e.g., with contact 803) to the right. Although not all of the user interface illustrated herein illustrate metadata icons on the representations of content items, it should be understood that the scope of the disclosure encompasses including any and all of the metadata icons illustrated in FIG. 8C or elsewhere in any of the other user interfaces illustrated herein as including representations of content items. In response to the user's scrolling, the electronic device moves the current focus from the representation 808*a* of the movie to a representation 808*b* of a television show that plays in application Q.

Figure 8D:
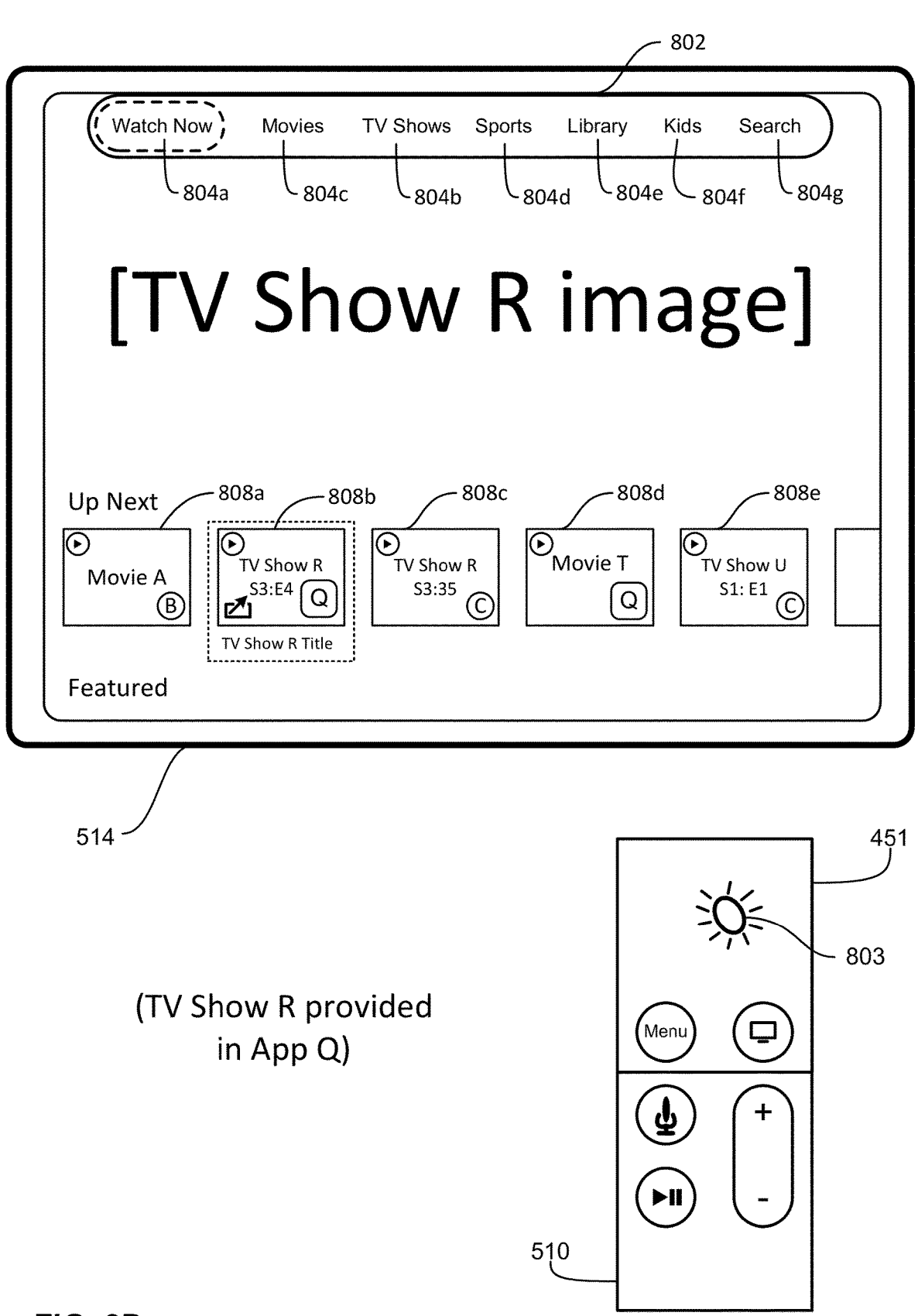

As shown in FIG. 8D, when the current focus is on the representation 808*b* of the television show that plays in application Q, the indication 808*b* of the television show includes an icon that indicates that selection of the indication 808*b* will cause the electronic device to open an application other than the media streaming application (e.g., the electronic device will open application Q). Although not all of the user interfaces illustrated herein illustrate metadata icons on the representations of content items, it should be understood that the scope of the disclosure encompasses including any and all of the metadata icons illustrated in FIG. 8D or elsewhere in any of the other user interfaces illustrated herein as including representations of content items. The user selects (e.g., with contact 803) the representation 808*b* of the television show.

Figure 8E:
Figure 8F:
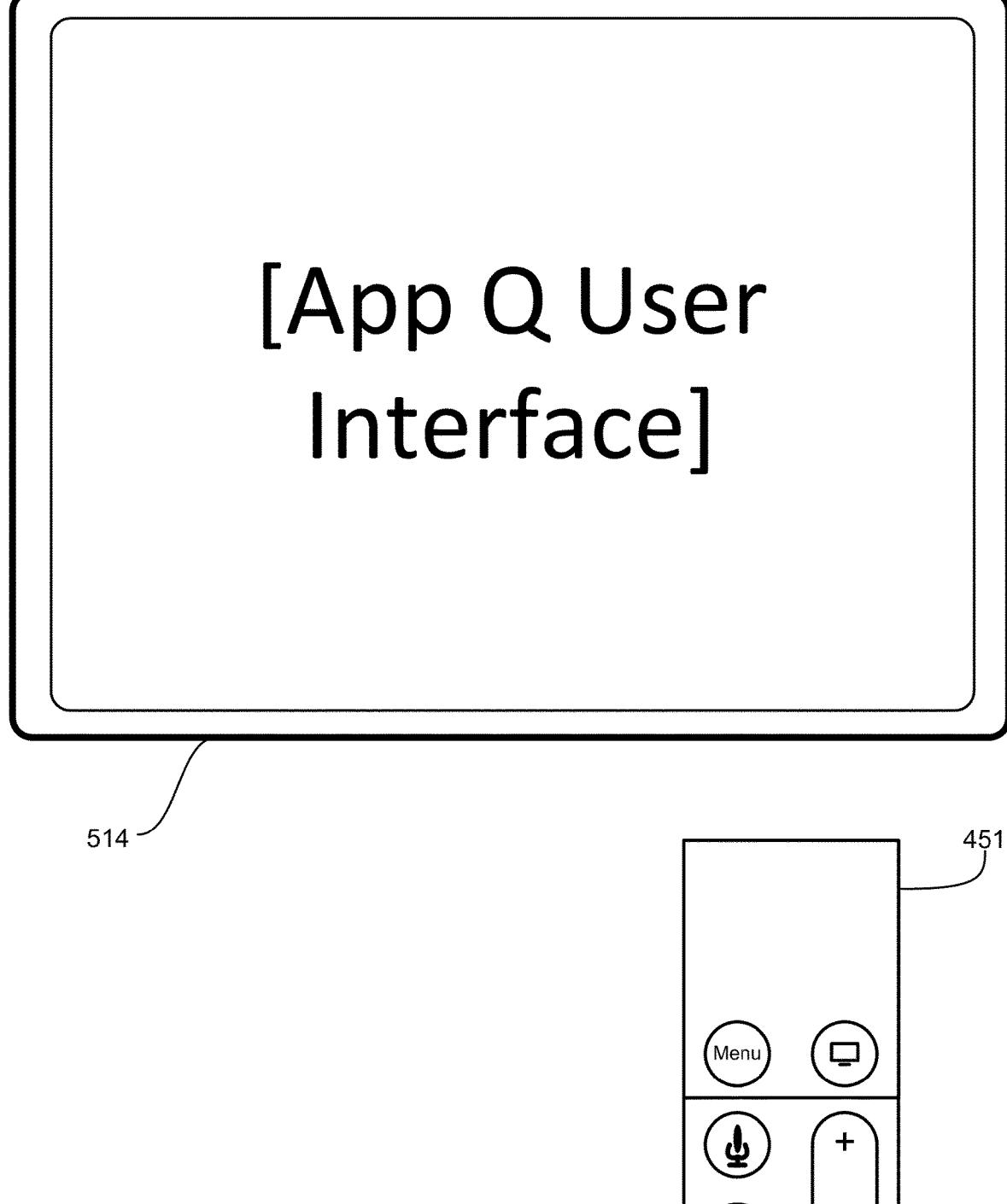

As shown in FIG. 8E, in response to the user's selection illustrated in FIG. 8D, the electronic device plays the television show in application Q. While the television show is playing, the user presses (e.g., with contact 803) the "menu" button. In response to the user input, the electronic device presents a user interface of application Q, as shown in FIG. 8F, because the television show was playing in application Q when the "menu" button was selected.

Figure 8G:
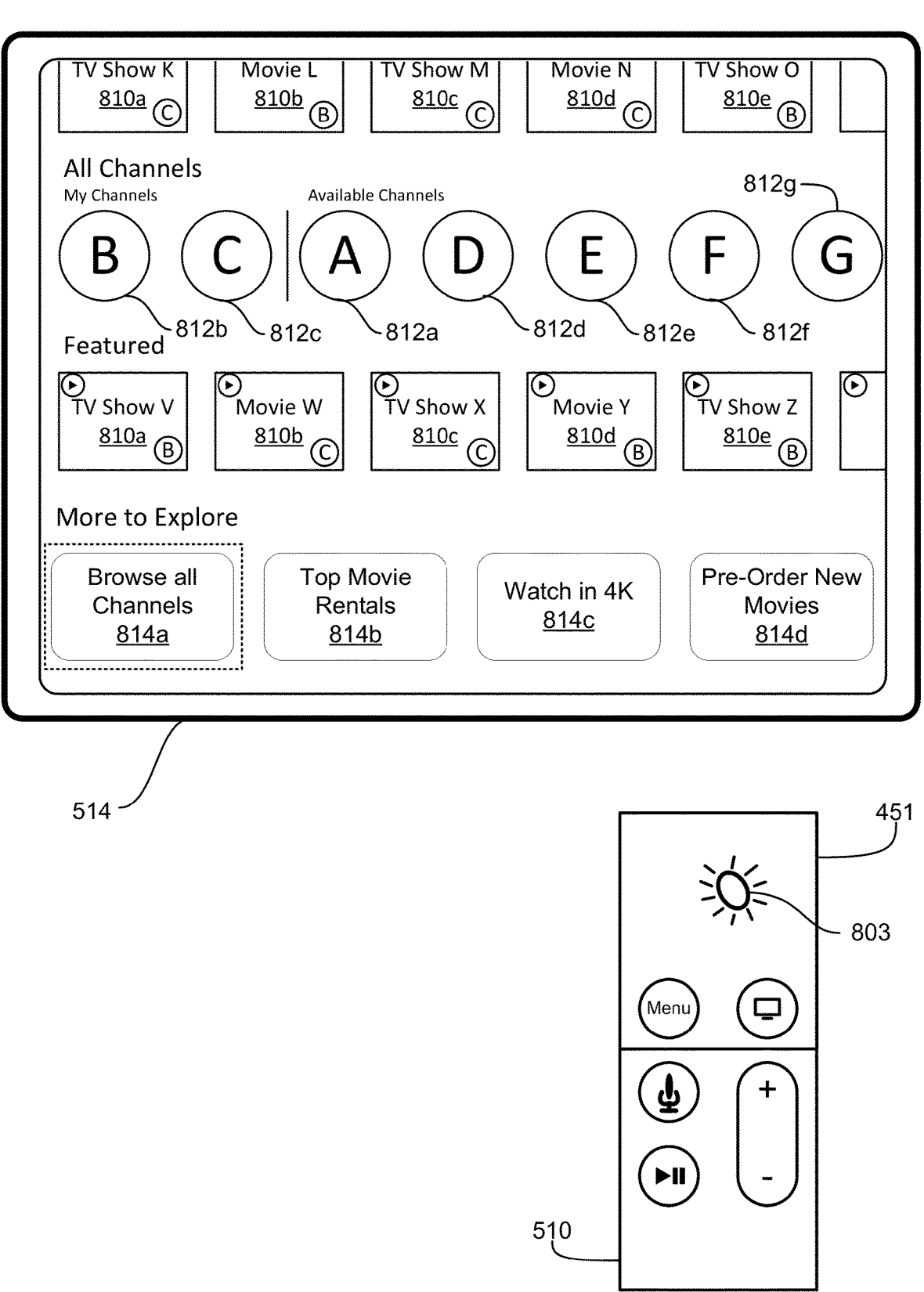

FIG. 8G illustrates another user interface of the media browsing application. The user interface includes a plurality of representations of items of content 810*a*-810*j*, a plurality of representations 812*a*-*g* of channels, and a plurality of selectable tiles 814*a*-*d*. The representations 810*a*-810*j* of the items of content are selectable to display product page user interfaces that are specific to the selected item of content. The representations 812*a*-812*g* are selectable to display channel user interfaces that are specific to the selected channels, as will be described in more detail below with reference to FIGS. 8K-8P. Although not all of the user interface illustrated herein illustrate metadata icons on the representations of content items, it should be understood that the scope of the disclosure encompasses including any and all of the metadata icons illustrated in FIG. 8G or elsewhere in any of the other user interfaces illustrated herein as including representations of content items. The tiles 814*a* are selectable to present various user interfaces of the media browsing application. The "Browse all Channels" tile 814*a* is selectable to present a subscription channels user interface that is illustrated in FIGS. 8H-8L. The "Top Movie Rentals" tile 814*b* is selectable to present a plurality of representations of movies that are available to rent in the media browsing application. The "Watch in 4K" tile is selectable to present representations of items of content available in 4K resolution. The "Pre-Order New Movies" tile 814*d* is selectable to present a plurality of representation of movies that are available for pre-order. As shown in FIG. 8G, the user selects (e.g., with contact 803) the tile 814*a* that, when selected, causes the electronic device to present the subscription channels user interface illustrated in FIGS. 8H-8L.

Figure 8H:
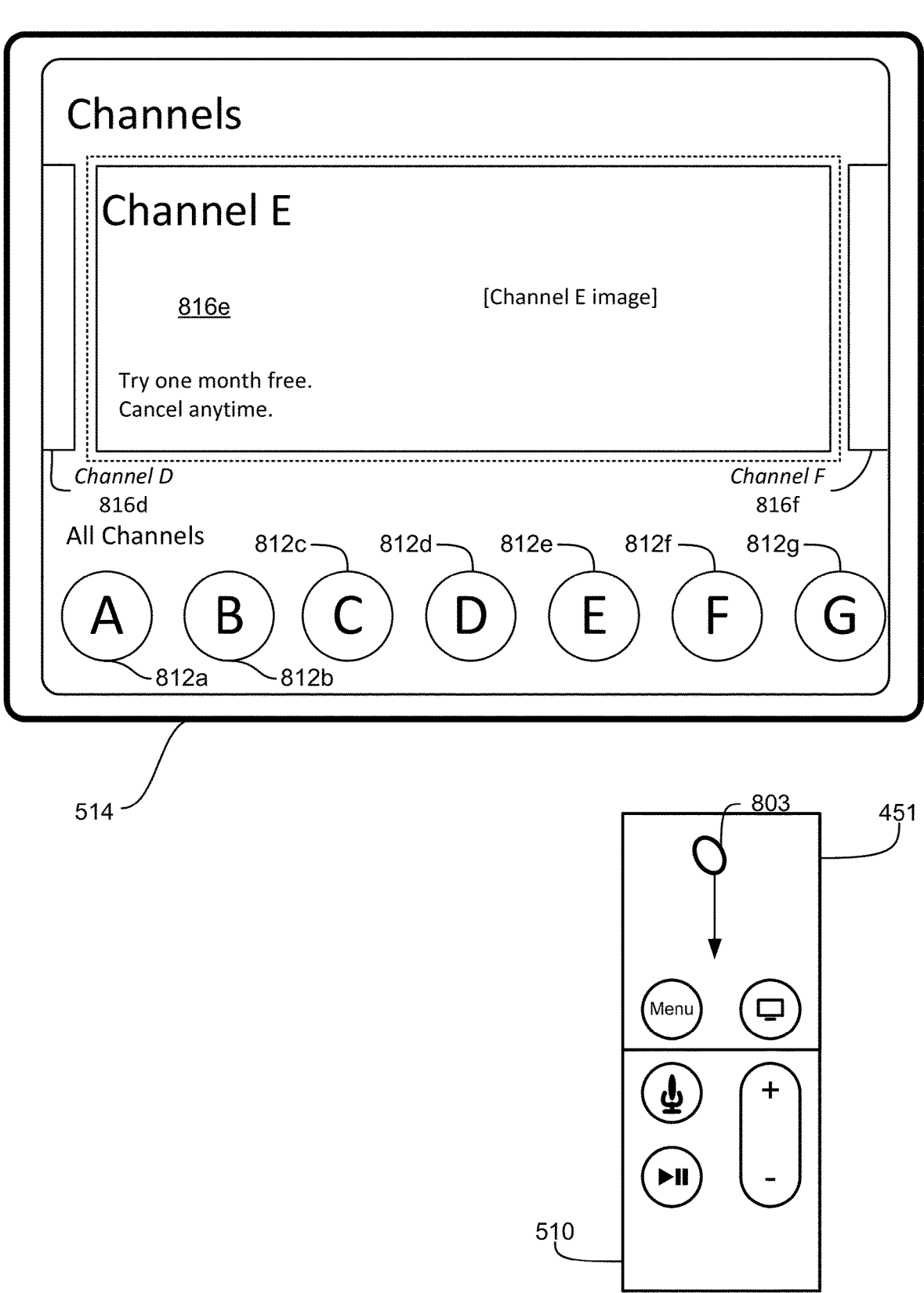

FIGS. 8H-8L illustrate the channels user interface. FIG. 8H illustrates the channels user interface that is presented in response to the user's selection in FIG. 8G. The channels user interface includes a large representation 816*e* of Channel E, parts of representations 816*d* and 816*f* of Channels D and F, and a plurality of representations 812*a*-*g* of all of the channels available in the media browsing application. The channels represented in the large representations 816*d*-*f* are channels that are available for subscription to which the user is not yet subscribed. The representations 812*a*-*g* of all of the channels include channels to which the user is subscribed and channels to which the user is not subscribed.

Figure 8I:
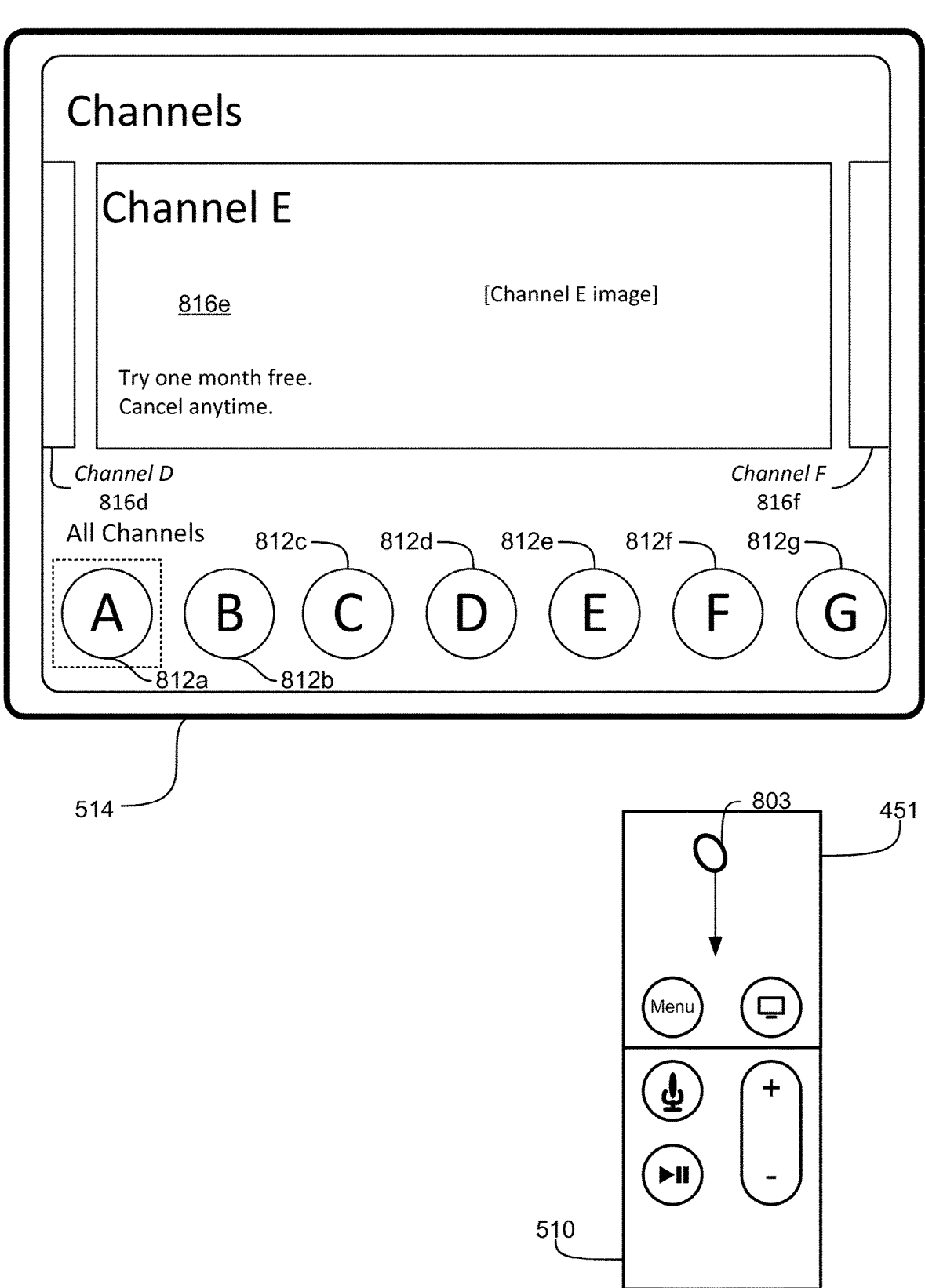

As shown in FIG. 8H, the user scrolls (e.g., with contact 803) down. In response to the user's scrolling, the electronic device moves the current focus from the representation 816*e* of Channel E to the representation 812*a* of Channel A, as shown in FIG. 8I. As shown in FIG. 8I, the user scrolls (e.g., with contact 803) down again. In response to the user's scrolling, the electronic device 500 scrolls the channels user interface.

Figure 8J:
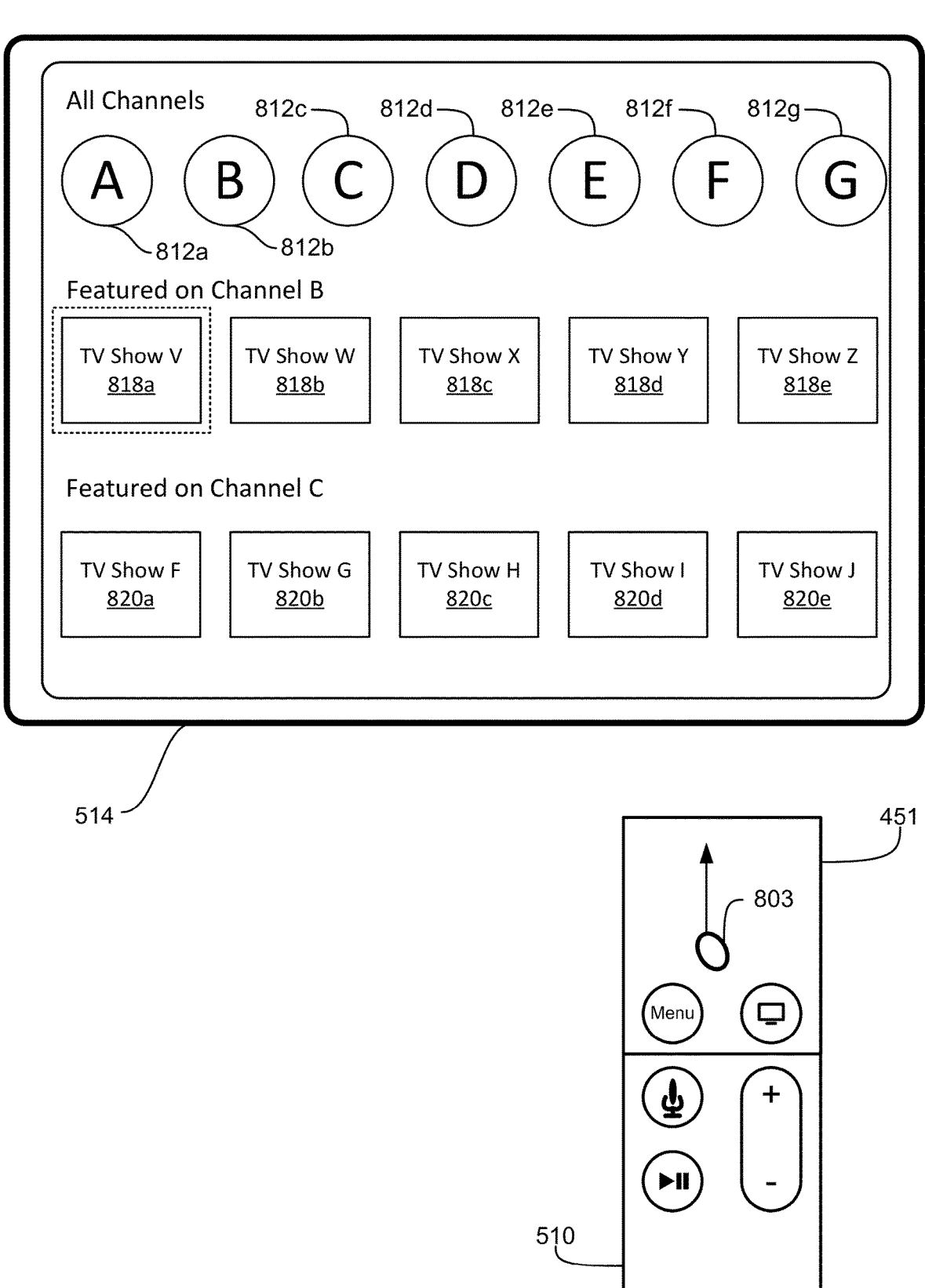

FIG. 8J illustrates the channels user interface after the user scrolls as shown in FIG. 8I. The channels user interface includes rows of representations of content available on channels the user is subscribed to. In this example, the user is subscribed to Channels B and C, so the channels user interface includes a row of representations 818*a*-*e* of content available on Channel B and a row of representations 820*a*-*e* of content available on Channel C. The representations 818 and 820 are selectable to present a product page user interface of the selected content item. As shown in FIG. 8J, the user scrolls (e.g., with contact 803) up. Although all of the scrolling steps are not illustrated here, the user scrolls all the way to the top of the channels user interface, as shown in FIG. 8K.

Figure 8K:
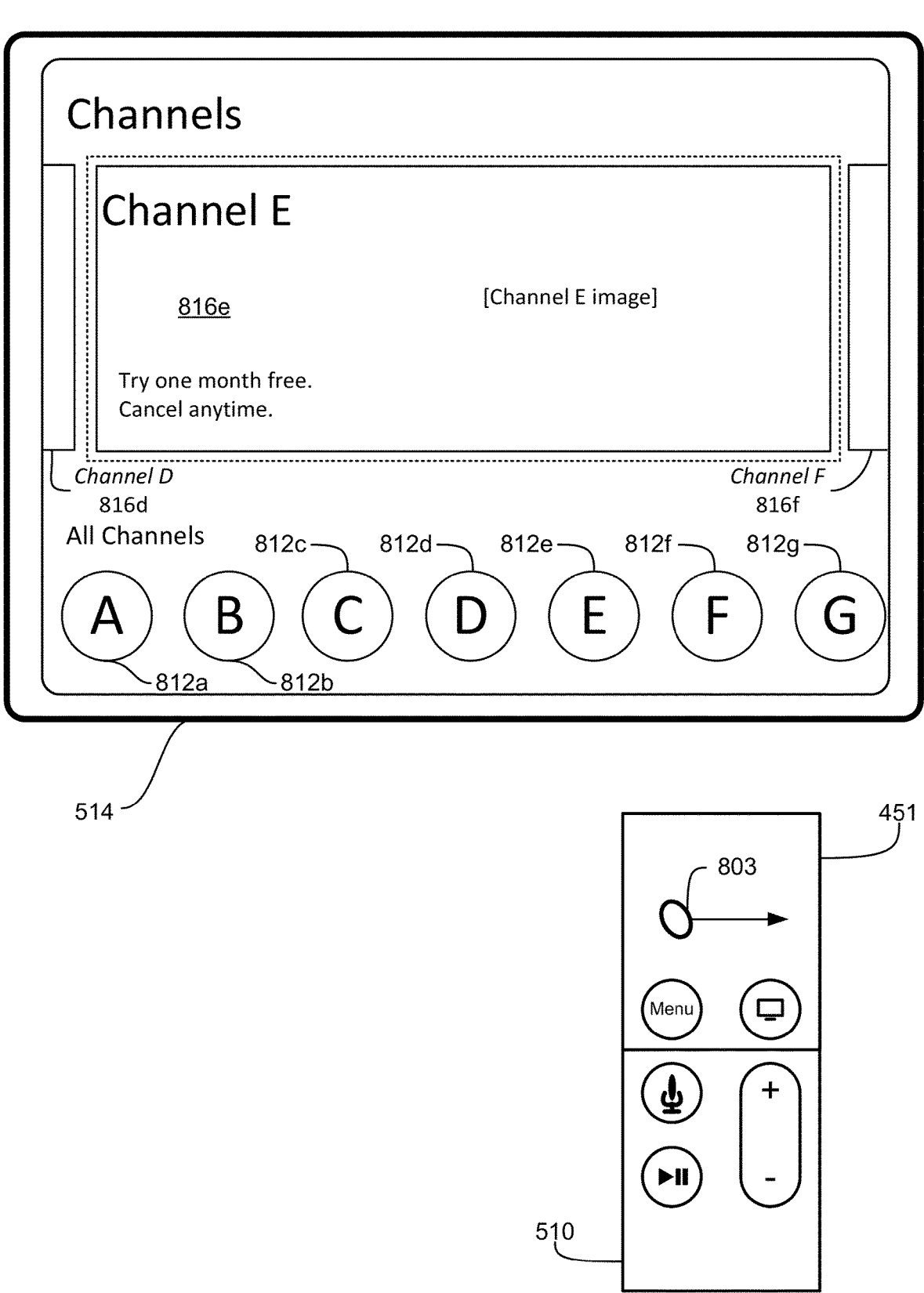

In FIG. 8K, the current focus is on the representation 816*e* of Channel E. The user scrolls (e.g., with contact 803) to the right. In response to the user's scrolling, the electronic device scrolls the representations 816*d*-*f,* as shown in FIG. 8K.

Figure 8L:
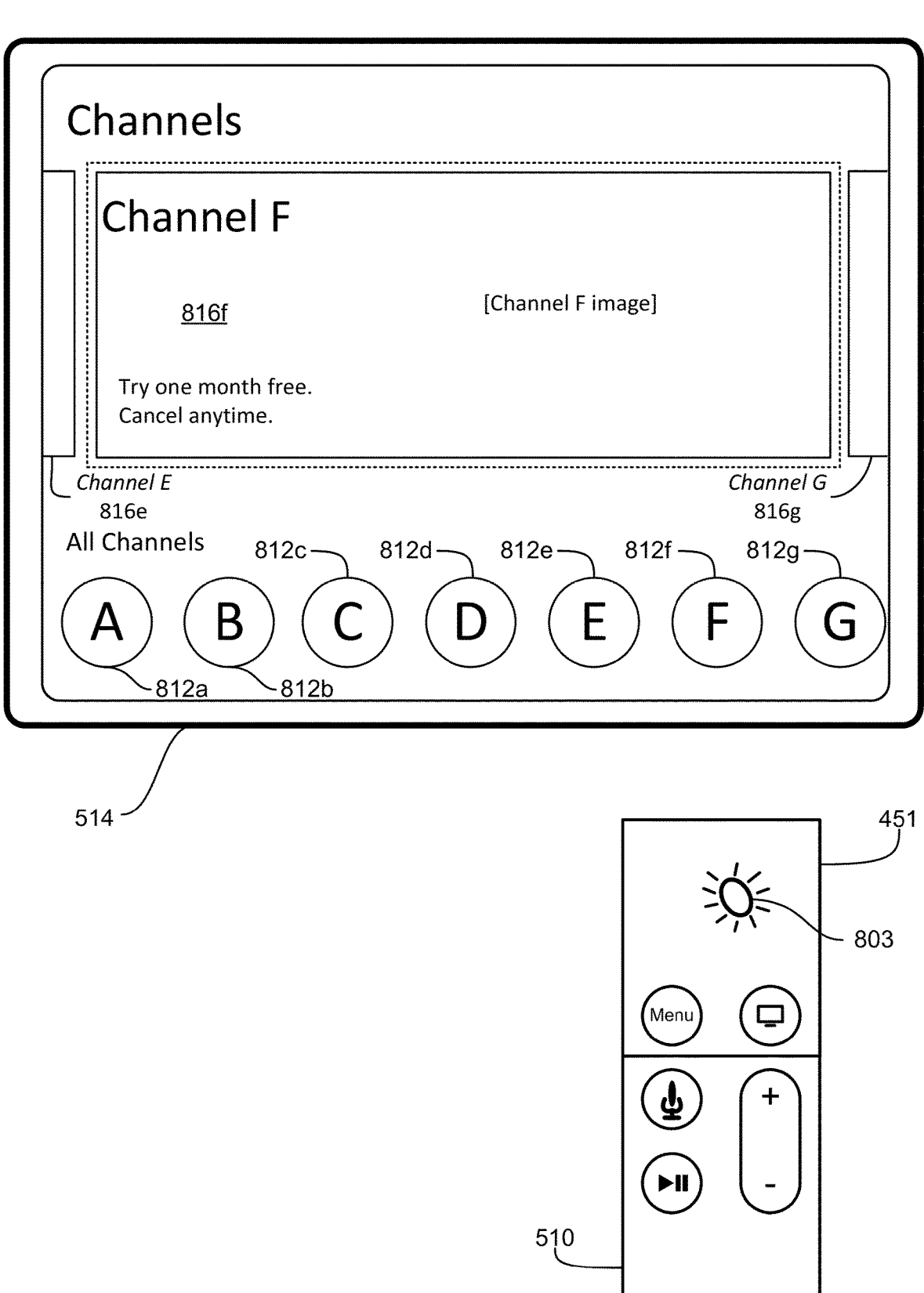

As shown in FIG. 8L, the electronic device presents a representation 816*f* of Channel F in the location in the user interface where the representation 816*e* of Channel E had been presented previously. The electronic device also presents portions of representations 816*e* and 816*g* of Channel E and Channel G. As shown in FIG. 8L, the user selects (e.g., with contact 803) the representation 816*f* of Channel F. In response to the user's selection, the electronic device 500 presents a user interface for subscribing to Channel F, as illustrated in FIG. 8M.

Figure 8M:
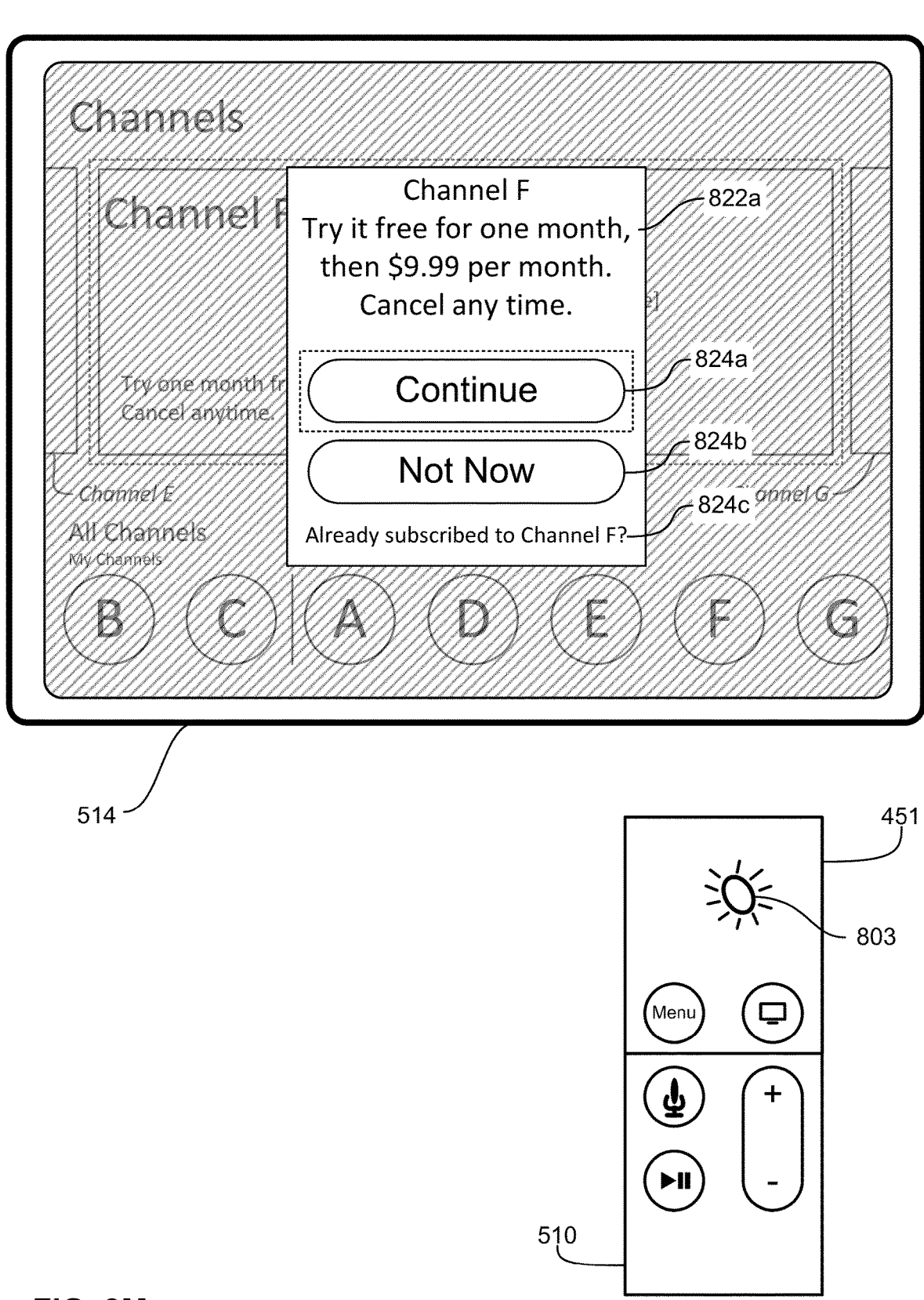

FIG. 8M illustrates a user interface for subscribing to Channel F. The user interface includes an indication 822*a* of the terms of the subscription to Channel F, a selectable option 824*a* to continue to subscribe to Channel F, a selectable option 824*b* to exit the user interface without subscribing to Channel F, and a selectable option 824*c* to access a subscription to Channel F through an existing user account (e.g., a user account with Channel F or a user account with another provider that provides access to Channel F, such as a television provider). As shown in FIG. 8M, the user selects (e.g., with contact 803) the option 824*a* to continue to subscribe to Channel F. In response to the user's selection, the electronic device 500 subscribes the Channel F and presents a user interface specific to Channel F, as shown in FIG. 8N.

Figure 8N:
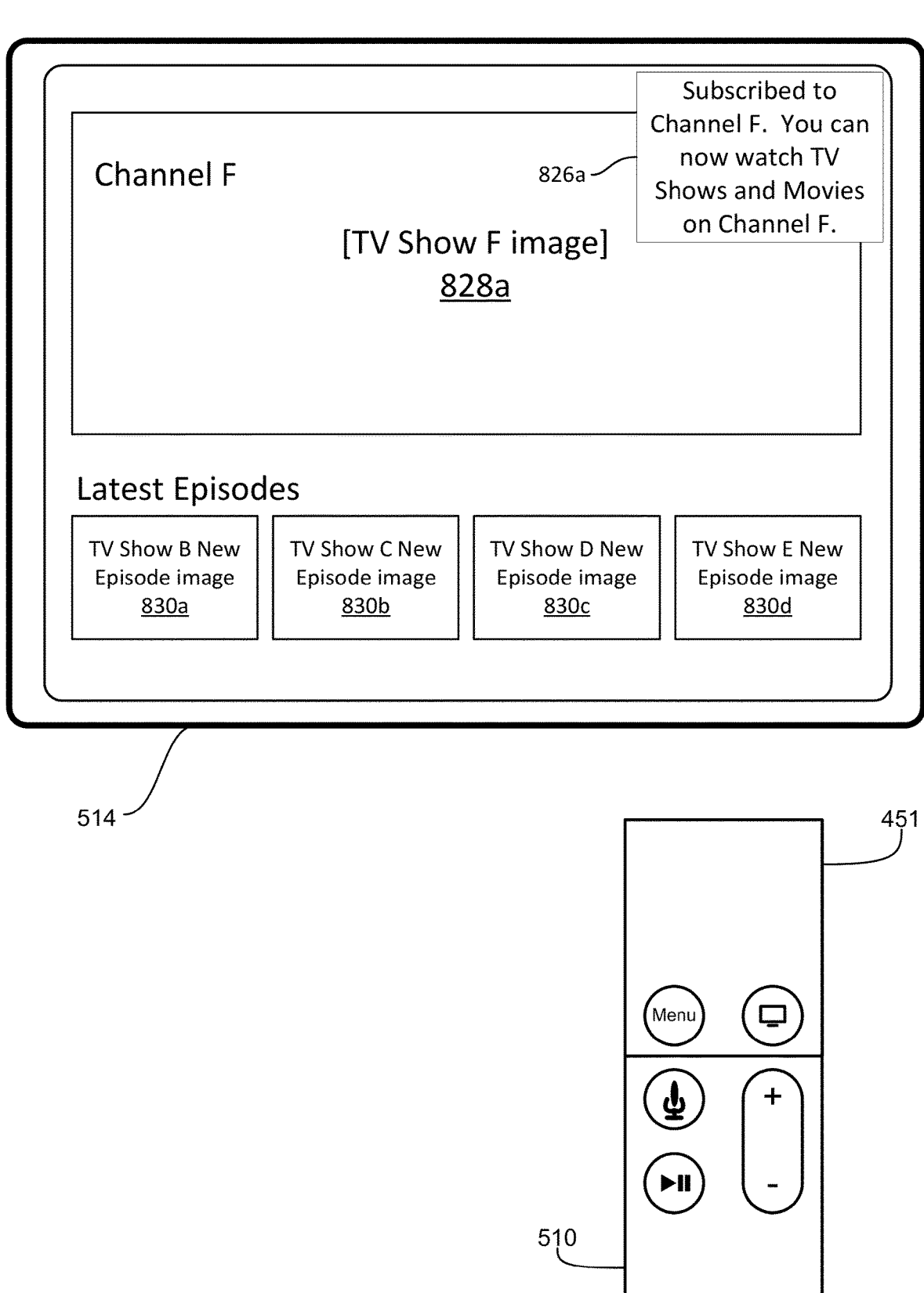

FIG. 8N illustrates the user interface specific to channel F to which the user is now subscribed. The user interface includes a large representation 828*a* of a featured series of content and a plurality of representations 830*a*-*d* of content episodes that were recently released that are accessible through Channel F to play in the media browsing application. The representation 828*a* is selectable to display the product page user interface specific to the item of content represented by representation 828*a* and representations 830*a*-*d* are selectable to play the respective episodes of content represented by representations 830*a*-*d*. The user interface also includes 826*a* an indication of the subscription to Channel F that is presented for a predetermined amount of time (e.g., 1, 3, 5, 10 seconds, etc.) before auto-dismissing.

Figure 8O:
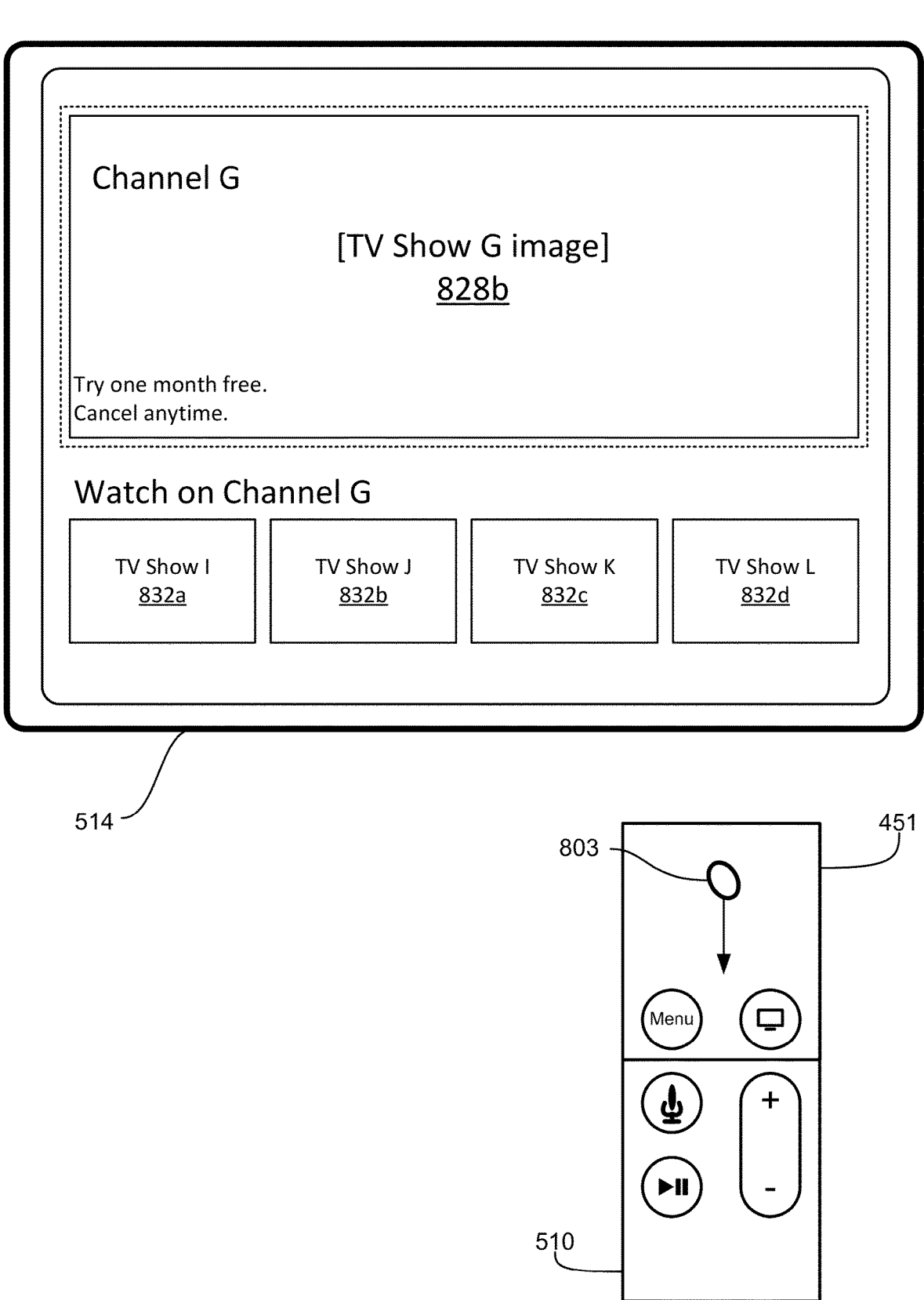

FIG. 8O illustrates a user interface specific to a channel to which the user is not subscribed, such as Channel G. The user interface includes a selectable option 828*b* that is selectable to subscribe to Channel G and a plurality of representations 832*a*-832*d* of items of content that are available through Channel G to play in the media browsing application. As shown in FIG. 8O, the user scrolls (e.g., with contact 803) down. In response to the user's scrolling, the electronic device moves the current focus from the selectable option 828*b* to the representation 832*a* of an item of content that is available on Channel G.

Figure 8P:
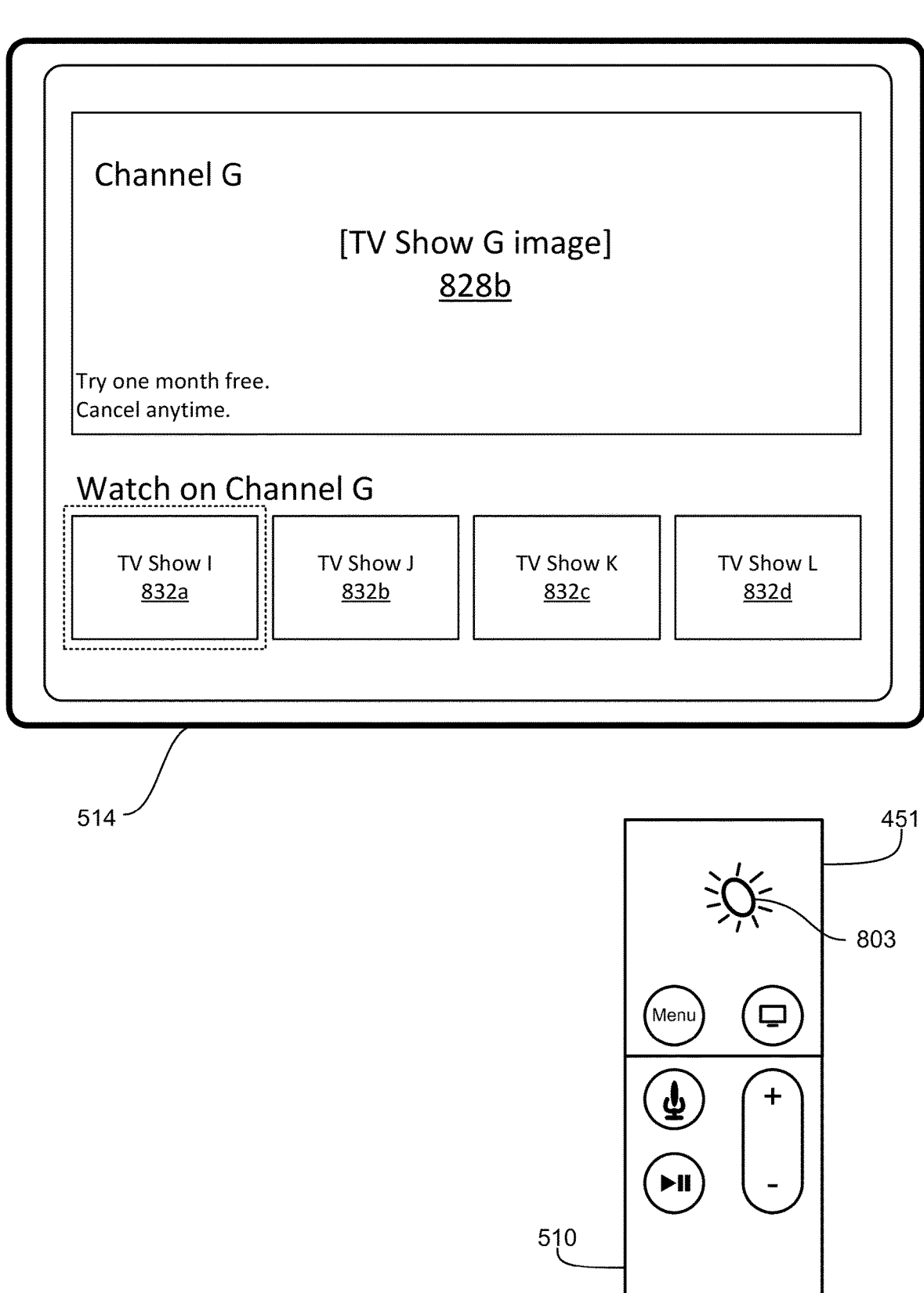

As shown in FIG. 8P, the current focus is moved to the representation 832*a* of the item of content that is available on Channel G. The user selects (e.g., with contact 803) the representation 832*a*. In response to the user's selection, the electronic device presents a product page user interface of the item of content, as will be described with reference to FIGS. 8Q-BAA.

Figure 8Q:
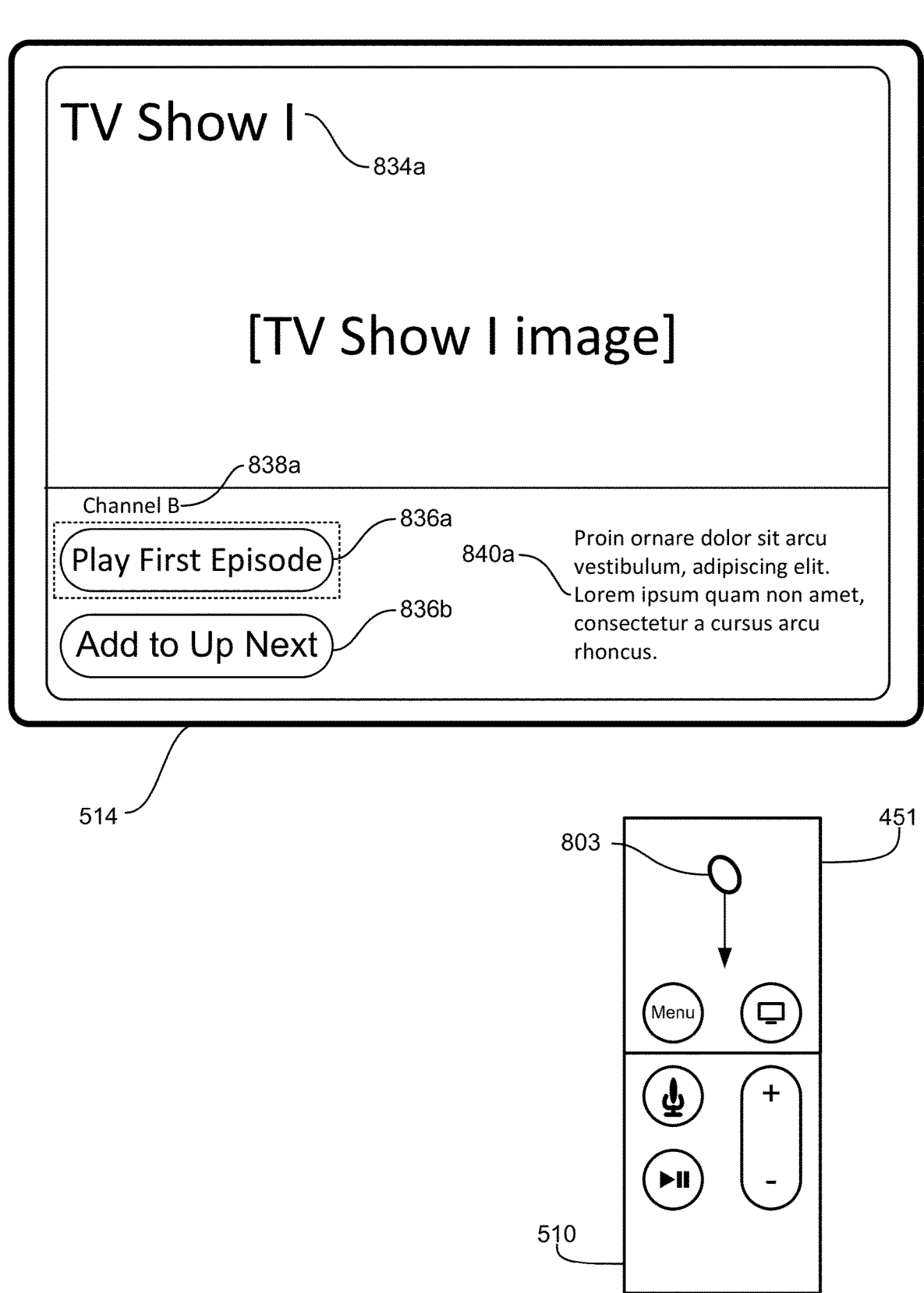

FIG. 8Q illustrates the product page user interface that is specific to the item of content. As an example, the item of content is available via Channel G, to which the user is not subscribed, or Channel B, to which the user is subscribed. The product page user interface includes an indication 834*a* of the item of content, a selectable option 836*a* to play the first episode of the content via Channel B (to which the user is subscribed), an indication 838*a* of the channel that provides the electronic device with access to the content, a selectable option 836*b* that is selectable to add the item of content to a content queue in the media browsing application, and a description 840*a* (e.g., a summary or synopsis) of the content. As shown in FIG. 8Q, the user scrolls (e.g., with contact 803) down. In response to the user's scrolling, the electronic device 500 scrolls the user interface, as shown in FIG. 8R.

Figure 8R:
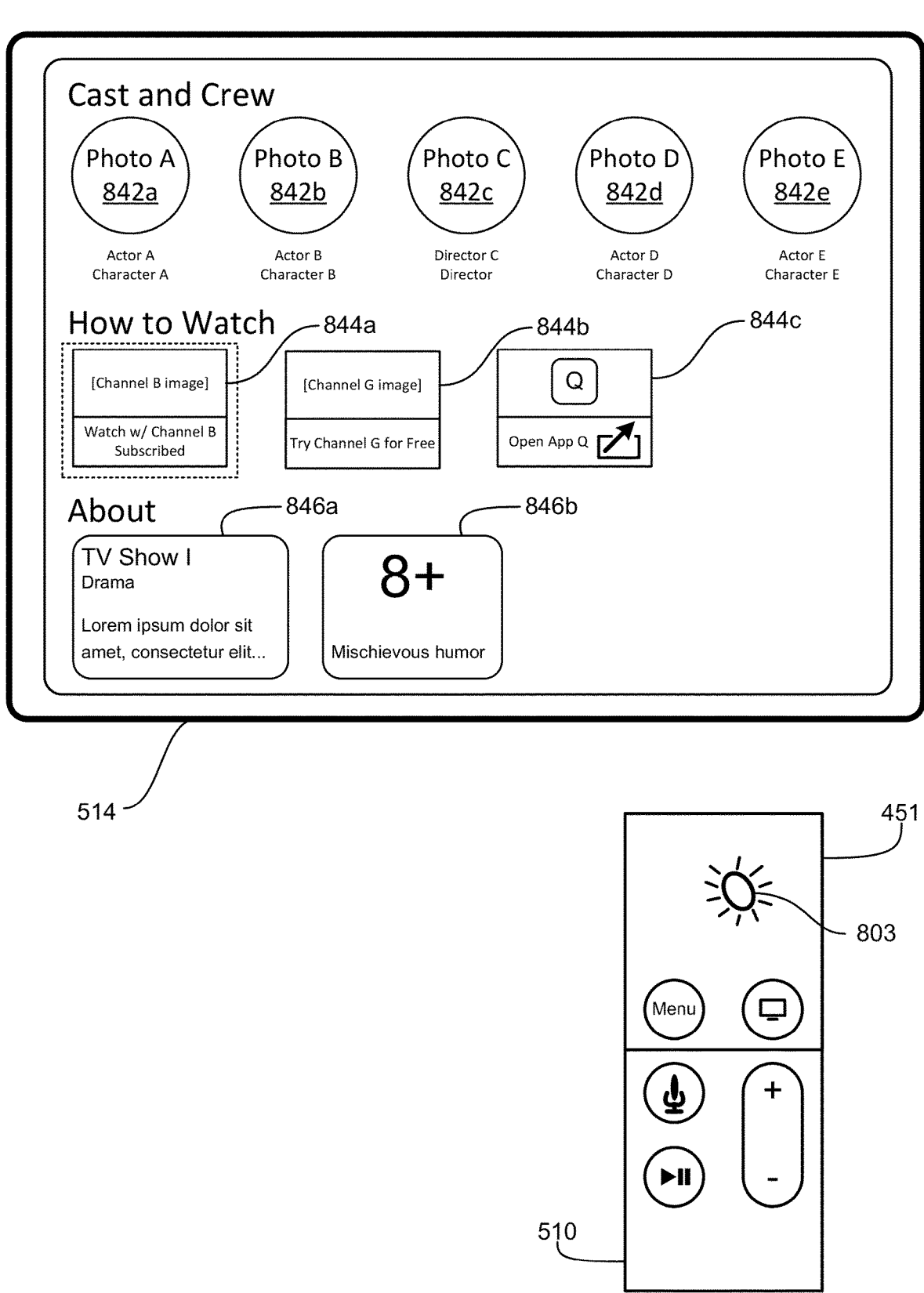
Figure 8S:
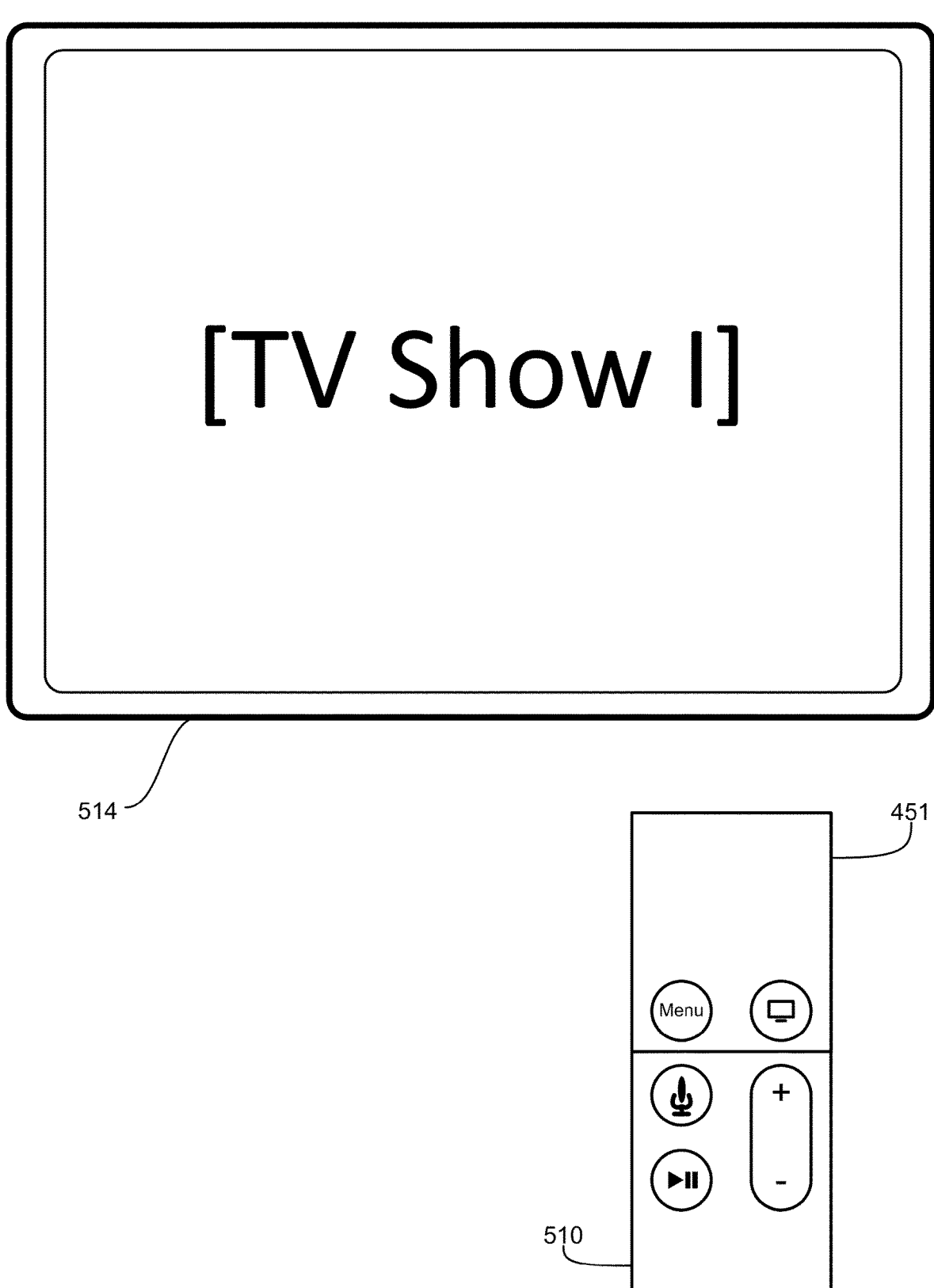

FIG. 8R illustrates another section of the product page user interface. The product page user interface includes representations 842*a*-842*e* of the cast and crew of the content, selectable options 844*a*-*c* for accessing the content through one of various channels that enable access to the content, and information 836*a*-*b* about the content. The representation 844*a* of accessing the content with Channel B, to which the user is subscribed, includes an indication that the user is subscribed to Channel B ("Subscribed") and the representation 844*b* of accessing the content with Channel G, to which the user is not subscribed, includes an indication that the user is not subscribed to Channel G ("Try Channel G for Free"). The representation 844*c* of accessing the content with application Q includes an icon that indicate that selection the option 844*c* will cause the electronic device to open a different application, such as opening application Q to play the content. As shown in FIG. 8R, the user selects (e.g., with contact 803) the option 844*a* to access the content with Channel B. In response to the user's selection, the electronic device plays the content in the media browsing application, as shown in FIG. 8S.

Figure 8T:
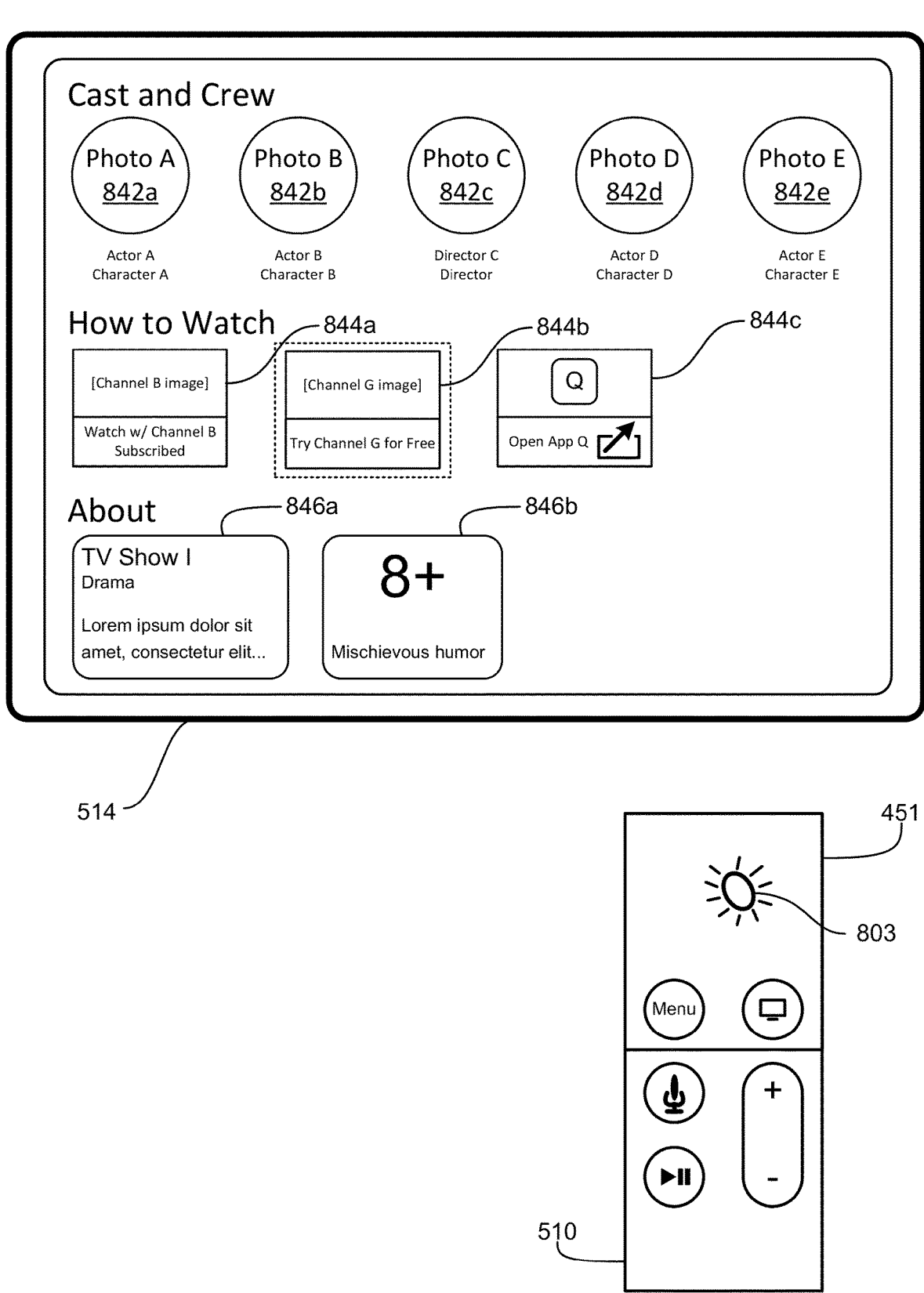
Figure 8U:
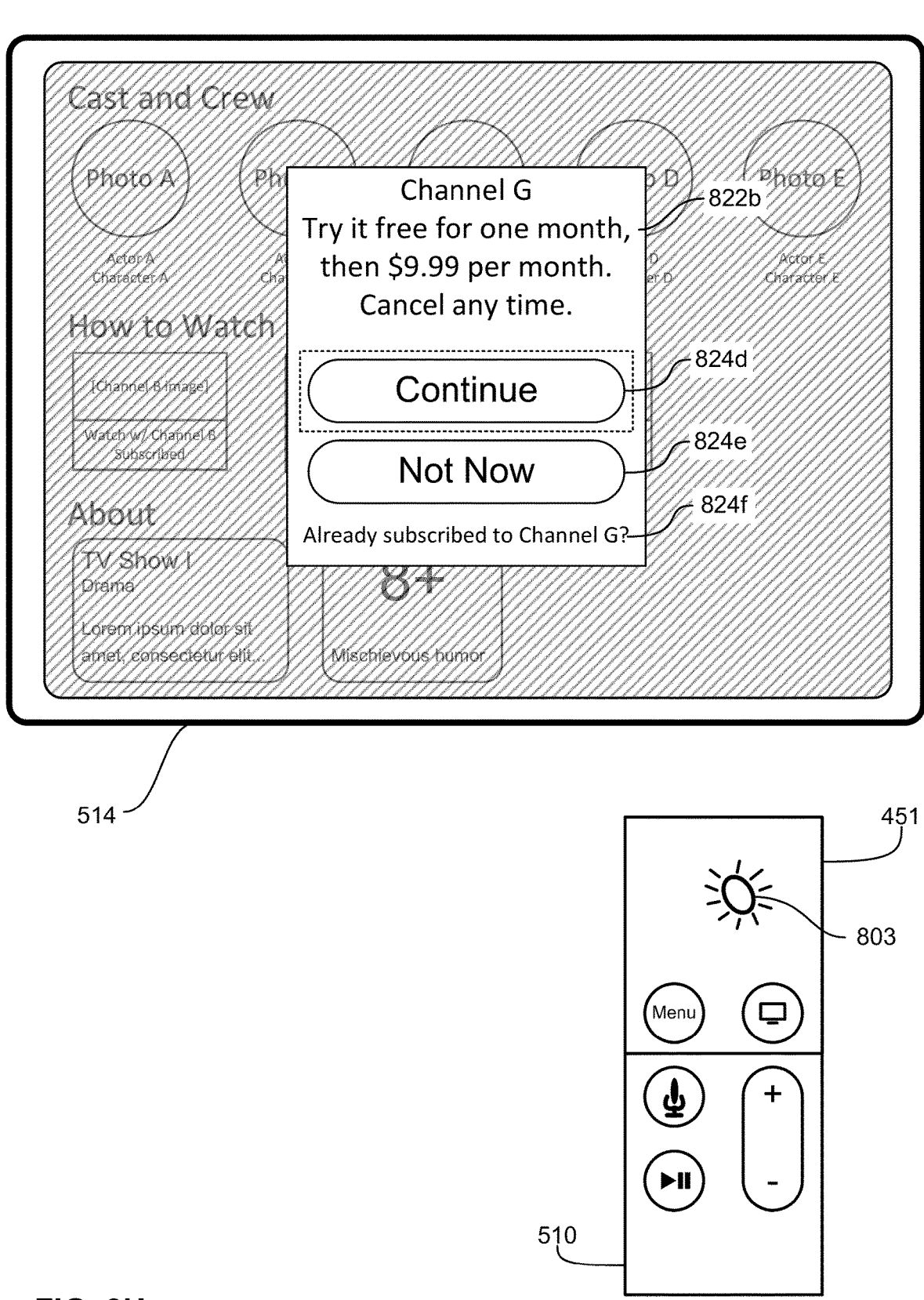
Figure 8V:
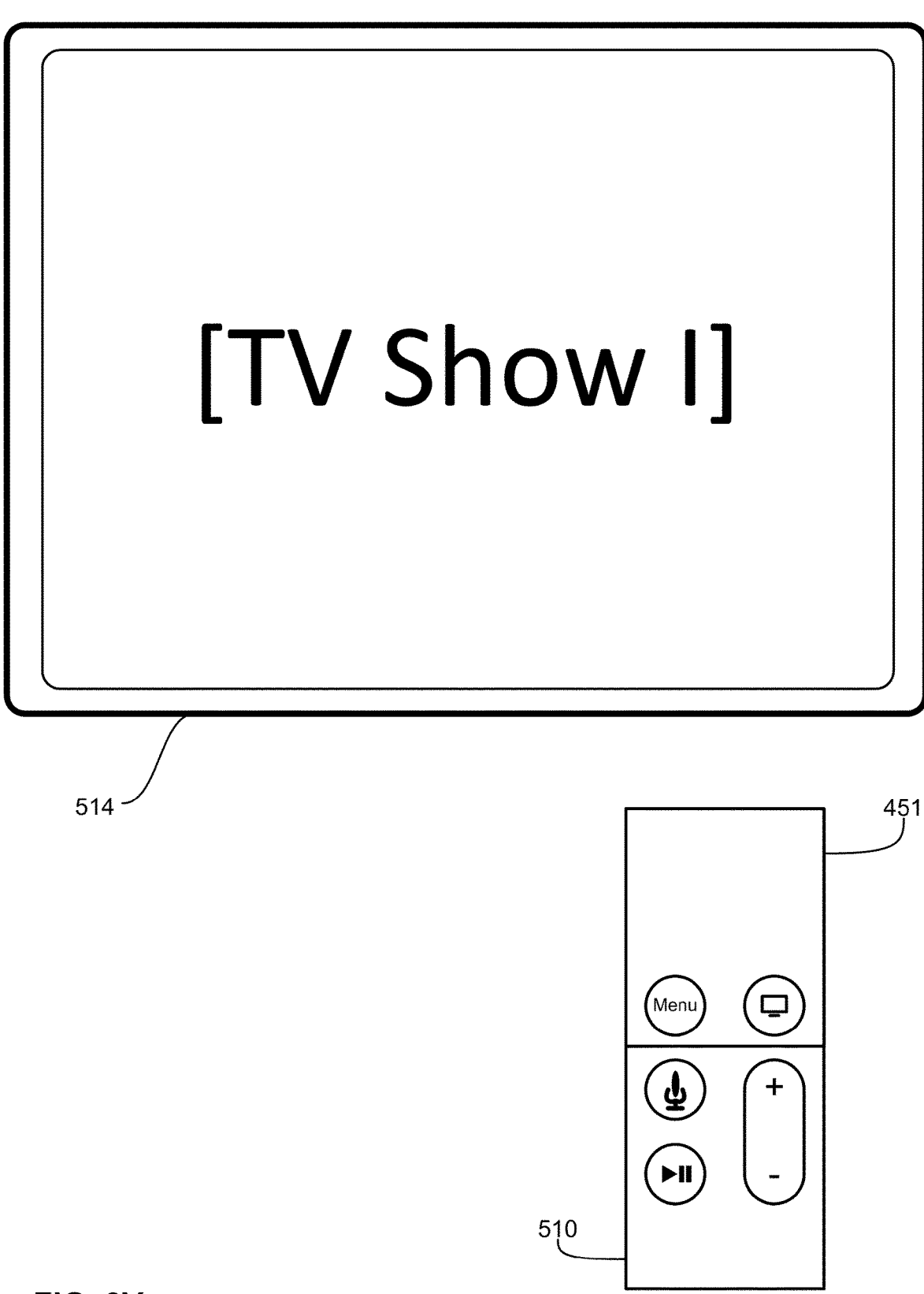

FIG. 8T illustrates the user selecting (e.g., with contact 803) the option 844*b* to access the content with Channel G. In response to the user's selection, the electronic device presents a user interface for subscribing to Channel G, as shown in FIG. 8T. As shown in FIG. 8T, the user interface for subscribing to Channel G includes an indication 822*b* of the terms of the subscription to Channel G, a selectable option 824*d* for subscribing to Channel G, a selectable option 824*e* for canceling the process of subscribing to Channel G, and a selectable option 824*f* for logging in to a user account the provides access to Channel G (e.g., a user account for Channel G or a user account for a provider that provides access to Channel G). As shown in FIG. 8U, the user selects (e.g., with contact 803) the selectable option 824*d* to subscribe to Channel G. As shown in FIG. 8V, in response to the successful subscription to Channel G, the electronic device presents the content.

Figure 8X:
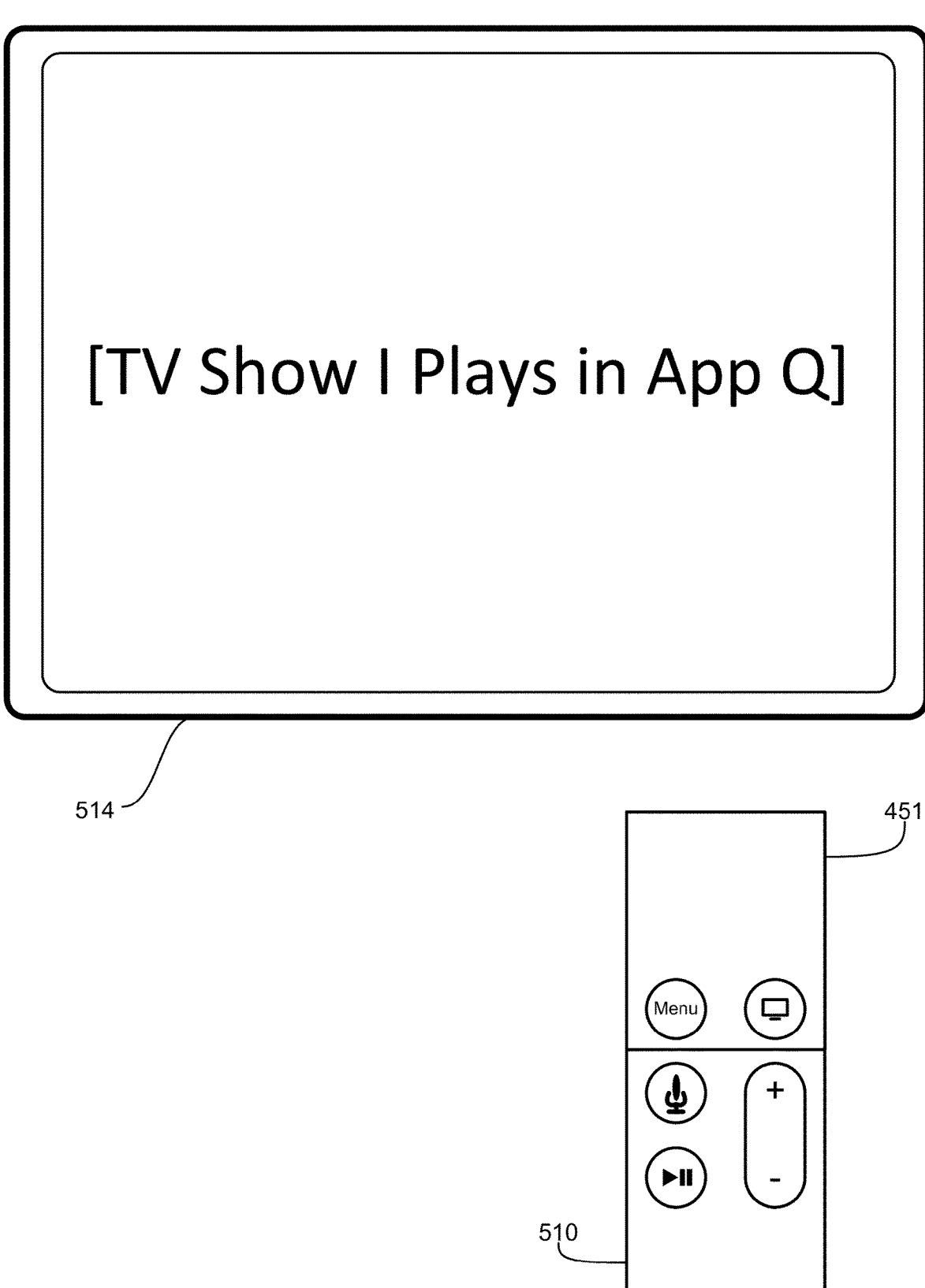

FIG. 8W illustrates the user selecting (e.g., with contact 803) the selectable option 844*c* to view the content using application Q. In response to the user's selection in FIG. 8W, the electronic device presents the content in application Q, as shown in FIG. 8X.

Figure 8Y:
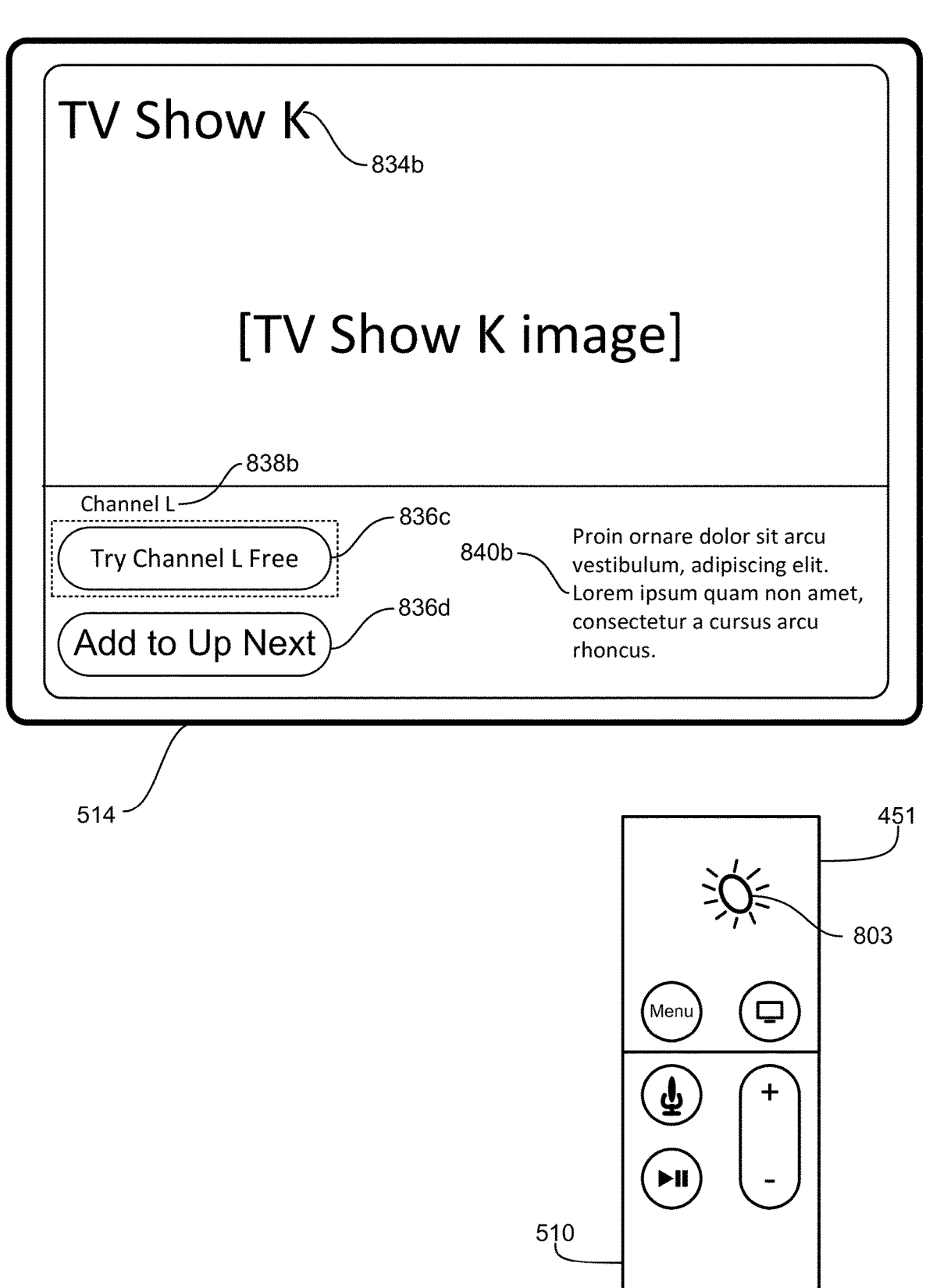

FIG. 8Y illustrates the product page user interface of a different item of content ("TV Show K"). The product page user interface includes an indication 834*b* of the item of content, a selectable option 836*c* to play the content, an indication 838*b* of how the electronic device is able to access the content, a selectable option 836*d* to add the content to a content queue of the media browsing application, and a description 840*b* of the content. As shown in FIG. 8Y, the selectable option 836*c* to access the content indicates that selecting the option 836*c* will cause the electronic device to initiate a process to subscribe to Channel L because the user is not subscribed to Channel L and the content is not available on a channel to which the user is already subscribed.

Figure 8Z:
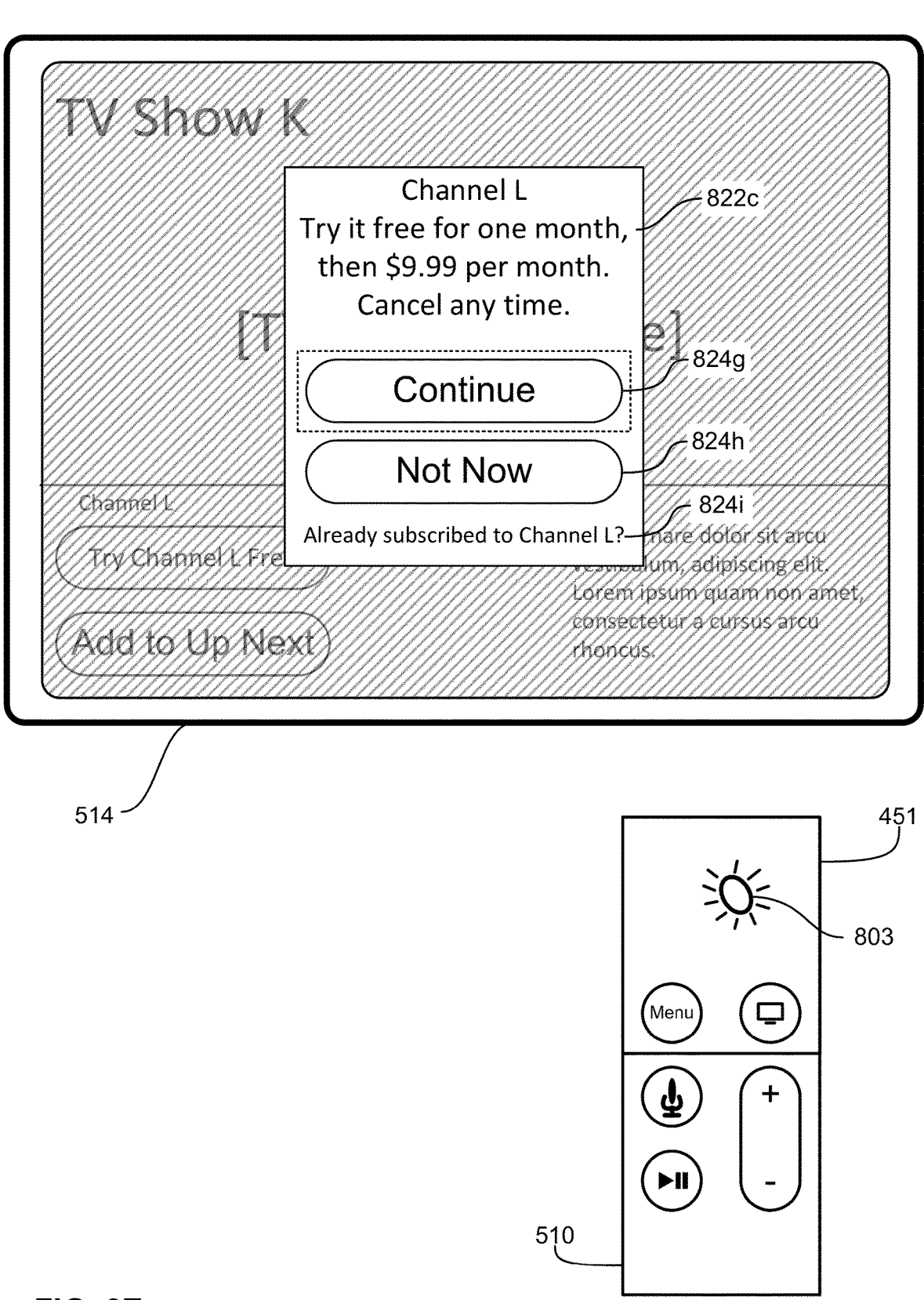
Figure 8A:
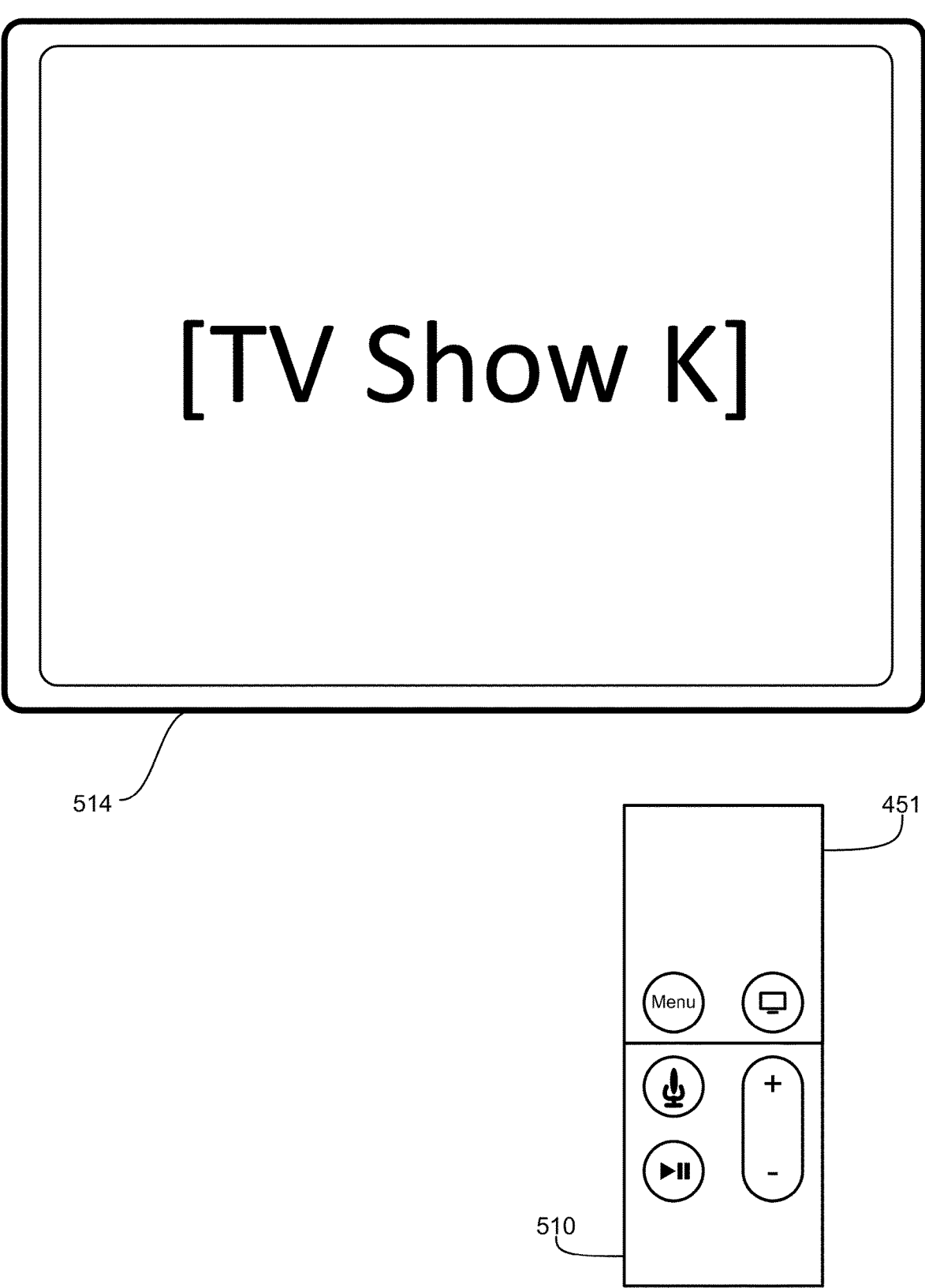
Figure 9B:
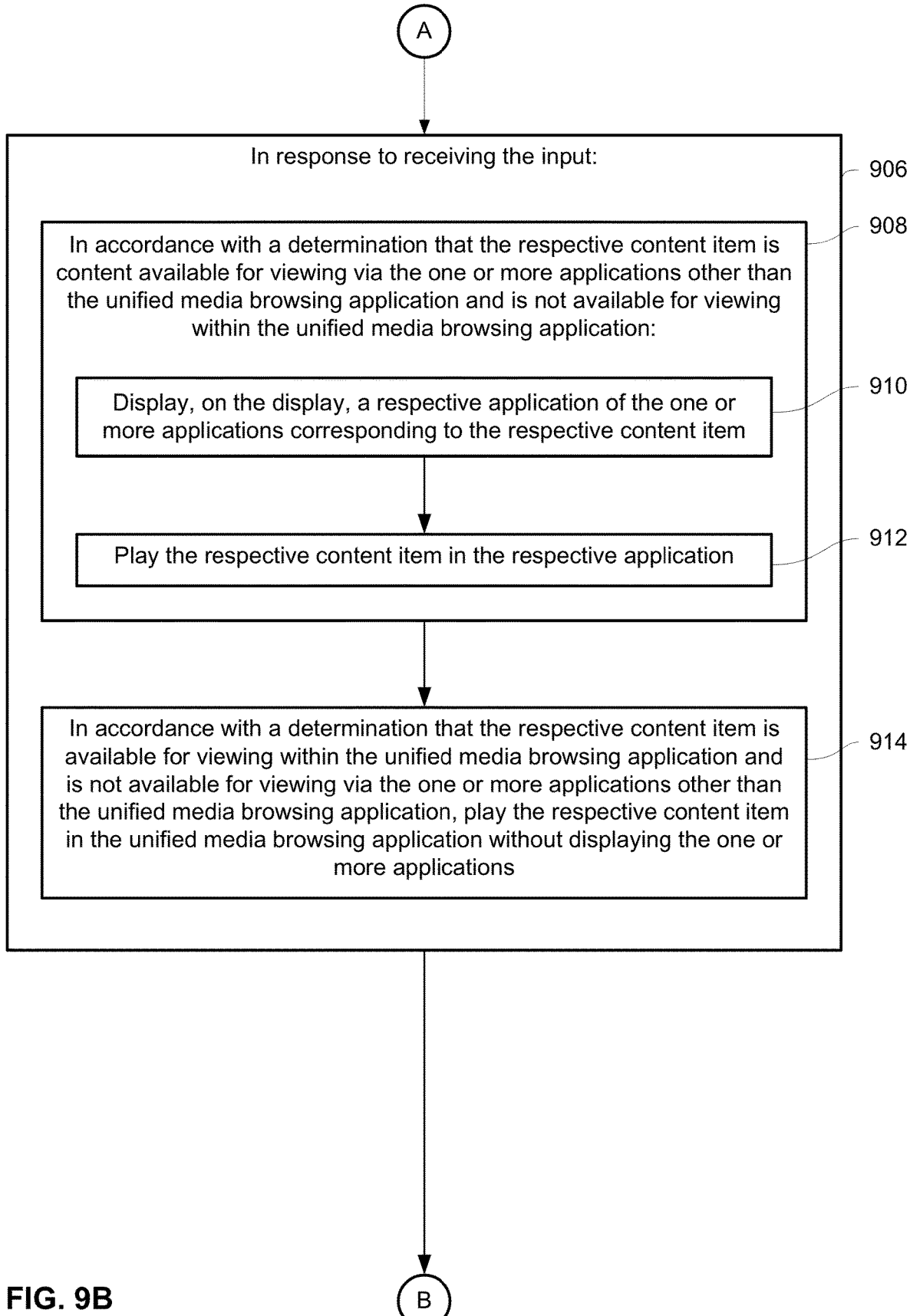
Figure 9D:
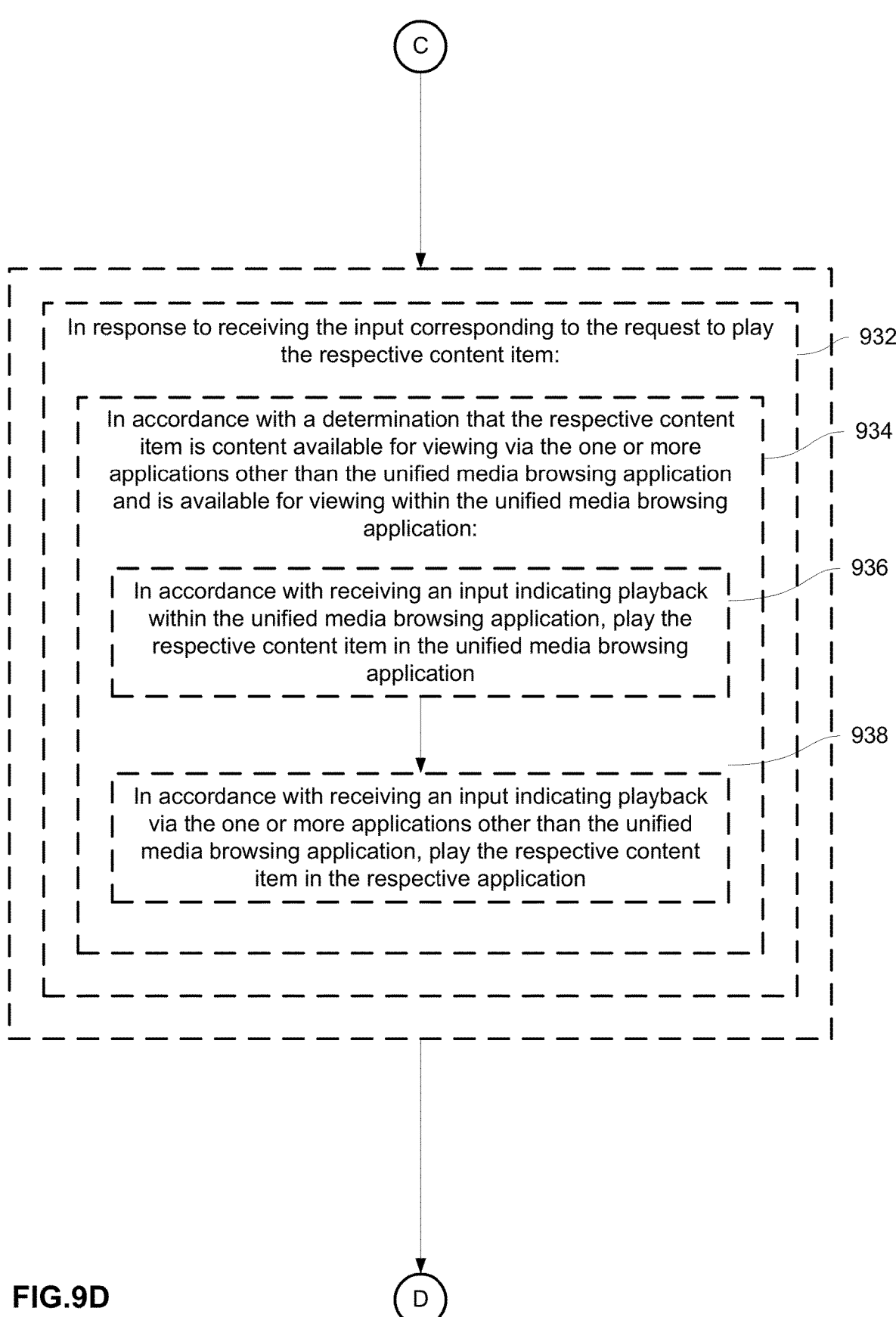
Figure 9I:
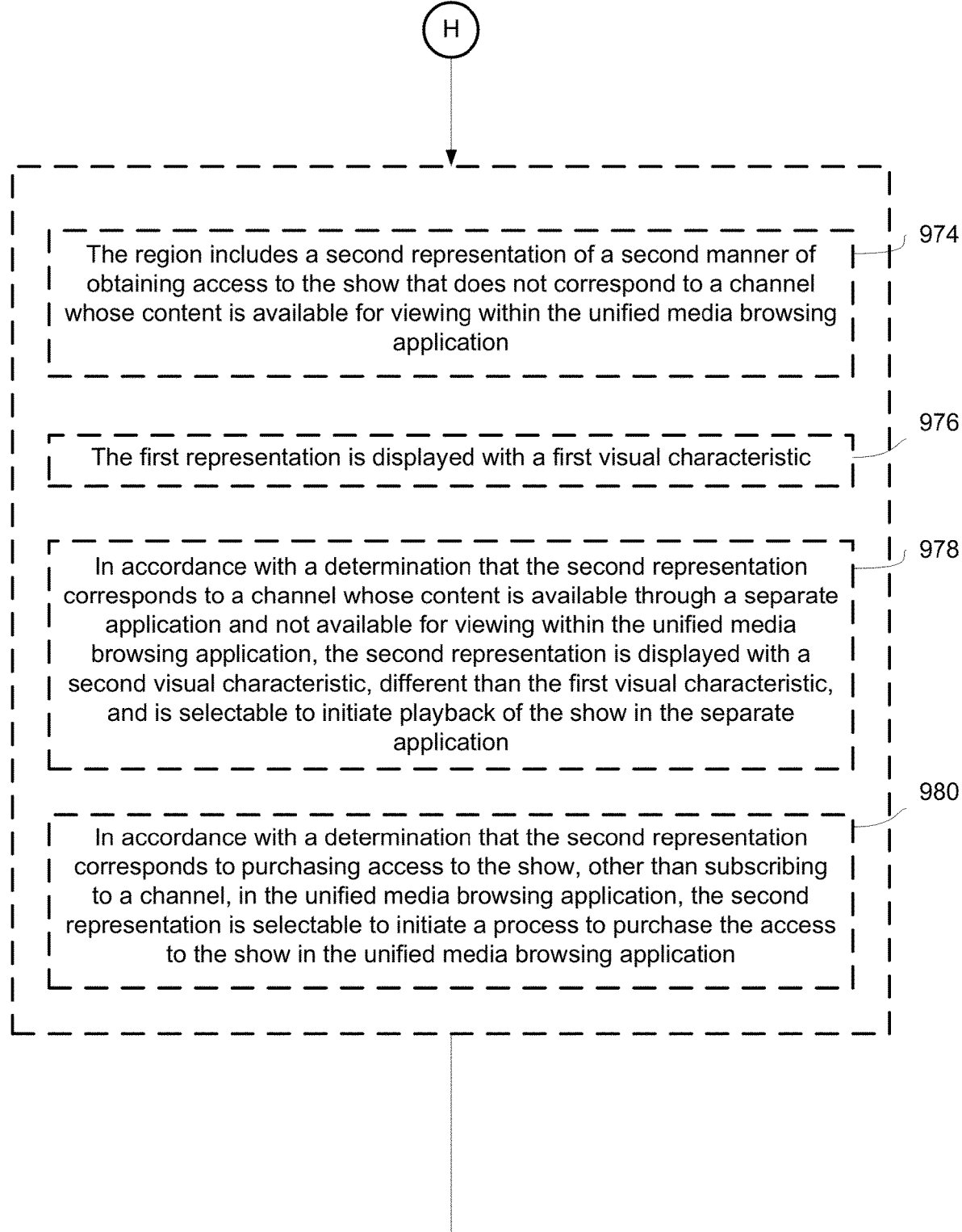

As shown in FIG. 8Y, the user selects (e.g., with contact 803) the selectable option 836*c* to access the content by subscribing to Channel L. In response to the user's selection, the electronic device 500 presents a user interface for subscribing to Channel L, as shown in FIG. 8Z. The user interface includes an indication 822*c* of the terms of the subscription to Channel L, a selectable option 824*g* to subscribe to Channel L, a selectable option 824*h* to cancel the process of subscribing to Channel L, and a selectable option 824*i* to access a subscription to Channel L by logging in to an existing account (e.g., a user account associated with Channel L or a user account associated with another provider that provides access to Channel L, such as a television provider). As shown in FIG. 8Z, the user selects (e.g., with contact 803) the selectable option 824*g* to continue to subscribe to Channel L.

In response to the user's selection in FIG. 8Z, the electronic device subscribes to Channel L and presents the content in the media browsing application, as shown in FIG. 8AA.

FIGS. 9A-9J are flow diagrams illustrating a method of playing content that is provided by a channel in a unified media browsing application in accordance with some embodiments of the disclosure. The method 900 is optionally performed at an electronic device such as device 100, device 300, device 500, device 501, device 510, and device 511 as described above with reference to FIGS. 1A-1B, 2-3, 4A-4B and 5A-5B. Some operations in method 900 are, optionally combined and/or order of some operations is, optionally, changed.

As described below, the method 900 provides ways to play content in a media browsing application that is provided by channel. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 8A, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display and one or more input devices displays (902), on the display 514, a user interface of a unified media browsing application on the electronic device 500, wherein the user interface includes one or more first representations 808*b* and 808*d* of content available for viewing via one or more applications other than the unified media browsing application, and one or more representations 808*a*, 808*c*, and 808*e* of content available for viewing from one or more channels within the unified media browsing application. In some embodiments, content represented by the first representations are items of content that play in the one or more applications other than the unified media browsing application in response to detecting a user input to initiate playback. In some embodiments, the entity that develops and provides the unified media browsing application is not the same as the one more entities that develop and provide the one or more applications other than the unified media browsing application and/or the content available for viewing from the one or more applications other than the unified media browsing application. In some embodiments, content represented by the second representations are items of content that play in the unified media browsing application in response to detecting a user input to initiate playback. In some embodiments, the entity that develops and provides the unified media browsing application is not the same as the one more entities that provide the content available for viewing from the one or more channels.

In some embodiments, such as in FIG. 8D, while displaying the user interface, the electronic device 500 receives (904), via the one or more input devices 510, an input (e.g., selection with contact 803) corresponding to a request to play a respective content item 808*b*. In some embodiments, the input includes selection of one of the representations of content.

In some embodiments, such as in FIG. 8D-8E, in response to receiving the input (906): in accordance with a determination that the respective content item 808*b* is content available for viewing via the one or more applications other than the unified media browsing application and is not available for viewing within the unified media browsing application (908): the electronic device 500 displays (910), on the display, a respective application of the one or more applications corresponding to the respective content item, as shown in FIG. 8E. In some embodiments, the determination is a determination that the respective content is not available for viewing inside the unified media browsing application, but rather must be played back outside of the unified media browsing application via a separate content application corresponding to the respective content item. In some embodiments, the electronic device closes the unified media browsing application, ceases displaying the unified media browsing application, and/or changes the current focus from the unified media browsing application to the respective application. In some embodiments, such as in FIG. 8E, the electronic device 500 plays (912) the respective content item in the respective application.

In some embodiments, such as in FIGS. 8A-8B, in accordance with a determination that the respective content item 808*a* is available for viewing within the unified media browsing application and is not available for viewing via the one or more applications other than the unified media browsing application, the electronic device 500 plays (914) the respective content item in the unified media browsing application without displaying the one or more applications, such as in FIG. 8B. In some embodiments, the electronic device updates the user interface of the unified media browsing application to present the content. In some embodiments, the media browsing application continues to run on the electronic device and maintains the current focus of the electronic device. For example, the user interface of the unified media browsing application includes a representation of a first item of content that plays in a second application and a representation of a second item of content that plays in the unified media browsing application. The first item of content is optionally provided by a first entity, the second item of content is optionally provided by a second entity, and the unified media browsing application is optionally provided by a third entity. In response to detecting selection of the representation of the first item of content, the electronic device optionally opens the second application and plays the first item of content in the second application. In response to detecting selection of the representation of the second item of content, the electronic device optionally plays the second item of content in the unified content browsing application.

The above-described manner of displaying representations of content available for viewing via one or more applications other than the unified media browsing application while displaying representations of content available for viewing via the unified media browsing application allows the electronic device to present more representations of available content than would be presented if the representations of content were not displayed together, which simplifies the interaction between the user and the electronic device and enhances the operability of the electronic device and makes the user-device interface more efficient (e.g., by allowing the user to view the representations of content available for viewing via the other applications without closing the unified media browsing application and opening the other applications), which additionally reduces power usage and improves battery life of the electronic device by enabling the user to use the electronic device more quickly and efficiency.

In some embodiments, such as in FIG. 8B or FIG. 8E, while playing the respective content item, the electronic device 500 receives (916), via the one or more input devices 510, an input corresponding to a request to exit playback of the respective content item, such as selection (e.g., with contact 803) of the "Menu" button. In some embodiments, the input includes selection of a "back" or "home" button on a remote control device. In some embodiments, such as in FIGS. 8E-8F, in response to receiving the input corresponding to the request to exit playback of the respective content item (918): in accordance with a determination that the respective content item was playing in the respective application (920): the electronic device 500 ceases (922) display of the respective content item and displays (924) a user interface of the respective application, as shown in FIG. 8F. In some embodiments, the respective application is an application other than the unified media browsing application. In some embodiments, the user interface is a user interface of the respective application other than a playback user interface. For example, if the user selected a representation of an item of content presented in the unified media browsing application that plays in a first application that is not the unified media browsing application, the item of content plays in the first application. In response to the input corresponding to the request to exit playback of the item of content, the electronic device optionally presents a user interface of the first application, and not a user interface of the unified media browsing application. In some embodiments, such as in FIGS. 8B-8C, in accordance with a determination that the respective content item was playing in the unified media browsing application (926), such as in FIG. 8B, the electronic device 500 ceases display of the respective content item (928) and displays (930) the user interface of the unified media browsing application from which the playback of the respective content item was initiated, such as in FIG. 8C. For example, if the user selected a representation of an item of content presented in the unified media browsing application that plays in the unified media browsing application, the item of content optionally plays in the unified media browsing. In response to the input corresponding to the request to exit playback of the item of content, the electronic device optionally presents the user interface of the unified media browsing application from which the item of content was selected.

The above-described manner of presenting the user interface of the application in which the content was playing in response to the request to exit the playback of the respective content item allows the electronic device to enable the user to continue browsing the unified media browsing application when exiting playback of content that plays in the unified media browsing application, which simplifies the interaction between the user and the electronic device and enhances the operability of the electronic device and makes the user-device interface more efficient (e.g., by reducing the need for inputs to navigate between different applications), which additionally reduces power usage and improves battery life of the electronic device by enabling the user to use the electronic device more quickly and efficiency.

In some embodiments, such as in FIGS. 8R-8X, in response to receiving the input corresponding to the request to play the respective content item (932): in accordance with a determination that the respective content item is content available for viewing via the one or more applications other than the unified media browsing application and is available for viewing within the unified media browsing application (934): in accordance with receiving an input indicating playback within the unified media browsing application, such as in FIG. 8R, the electronic device 500 plays (936) the respective content item in the unified media browsing application, such as in FIG. 8S. In some embodiments, the respective content item is available for viewing in either the unified media browsing application or in a different application. In some embodiments, if the input to play the content is received within the media browsing application, the electronic device plays the content in the media browsing application instead of playing the content in the respective application. For example, while displaying a user interface of the unified media browsing application, the electronic device detects an input in the unified media browsing application to play the respective content item. The respective item of content is optionally available for playback in either the media browsing application or a respective application. In some embodiments, in response to the input, the electronic device plays the content in the unified media browsing application. In some embodiments, such as in FIG. 8W, in accordance with receiving an input indicating playback via the one or more applications other than the unified media browsing application, the electronic device 500 plays (938) the respective content item in the respective application, such as in FIG. 8X. In some embodiments, if the input to play the content is received within the respective application, the electronic device plays the content in the respective application instead of playing the content in the unified media browsing application. For example, while displaying a user interface of the respective application, the electronic device detects an input in the respective application to play the respective content item. The respective item of content is optionally available for playback in either the media browsing application or a respective application. In some embodiments, in response to the input, the electronic device plays the content in the respective application.

The above-described manner of playing the respective item of content in the unified media browsing application instead of the respective application in response to an input to play the respective item of content that is detected in the unified media browsing application allows the electronic device to play the content without opening a different application when the content is available for playback in the unified media browsing application, which simplifies the interaction between the user and the electronic device and enhances the operability of the electronic device and makes the user-device interface more efficient (e.g., by reducing the number of inputs necessary to view the unified media browsing application after consuming the respective item of content), which additionally reduces power usage and improves battery life of the electronic device by enabling the user to use the electronic device more quickly and efficiency.

In some embodiments, such as in FIG. 8K, the unified media browsing application includes a channels user interface that includes information about a plurality of channels that provide content that is available for viewing within the unified media browsing application, the channels user interface includes (940) a first plurality of scrollable representations 816*d-f* of channels in the plurality of channels to which a user of the electronic device is not subscribed, wherein the first plurality of scrollable representations of channels are selectable to initiate respective processes to subscribe to the respective channels (942). In some embodiments, in response to detecting selection of one of the first plurality of scrollable representations of channels, the electronic device initiates a process to subscribe to the selected channel. In some embodiments, such as in FIG. 8K, the channels user interface includes: a second plurality of scrollable representations 812*a-812g* of channels in the plurality of channels to which the user of the electronic device 500 is subscribed or not subscribed (944). In some embodiments, the second plurality of scrollable representations of channels includes representations of channels to which the user is subscribed and representations of channels to which the user is not subscribed. In some embodiments, in response to detecting selection of one of the second plurality of scrollable representations of channels, the electronic device presents information about the selected channel, such as representations of items of content available via the selected channel.

The above-described manner of presenting representations of channels to which the user is not subscribed that are selectable to initiate a process to subscribe to the selected channel concurrently with representations of channels to which the user is subscribed or is not subscribed allows the electronic device to present options to subscribe to additional channels while presenting representations of channels to which the user is subscribed, which simplifies the interaction between the user and the electronic device and enhances the operability of the electronic device and makes the user-device interface more efficient (e.g., by allowing the user to view which channels they are subscribed to while deciding whether to subscribe to additional channel(s) without navigating to a different user interface), which additionally reduces power usage and improves battery life of the electronic device by enabling the user to use the electronic device more quickly and efficiency.

In some embodiments, such as in FIG. 8L, while displaying the channels user interface, the electronic device 500 receives (946), via the one or more input devices 510, an input corresponding to selection of a respective representation 816f of the first plurality of scrollable representations of channels that corresponds to a respective channel to which the user of the electronic device is not subscribed. For example, the user optionally selects a representation of a first channel that is presented among the first plurality of scrollable representations of channels. The user optionally is not subscribed to the first channel. In some embodiments, such as in FIG. 8M-8N, in response to receiving the input corresponding to the selection of the respective representation, the electronic device 500 initiates (948) a process to subscribe to the respective channel, including, in accordance with a determination that the subscription to the respective channel is successful, automatically displaying, on the display 514, a user interface specific to the respective channel that includes information 828a and 830a-d about content available for viewing within the unified media browsing application from the respective channel, such as in FIG. 8N. In some embodiments, after the user subscribes to the respective channel represented by the respective representation, the electronic device presents a user interface including information about the respective channel. The user interface optionally includes representations of items of content that are available from the respective channel. In some embodiments, the user interface includes a visual indication that the subscription was successful, such as text or an image. The visual indication that the subscription was successful is optionally presented for a predetermined amount of time (e.g., 1, 3, 5, or 10 seconds) before auto-dismissing. For example, the user subscribes to the channel that corresponds to the respective representation that was selected by the user. After the user subscribes to the channel, the electronic device presents a user interface including representations of items of content available from the channel.

The above-described manner of presenting a user interface with more information about a channel in response to successfully subscribing the user to the channel allows the electronic device to present the user with information they are likely to be interested in based on their action of subscribing to the channel, which simplifies the interaction between the user and the electronic device and enhances the operability of the electronic device and makes the user-device interface more efficient (e.g., by reducing the number of user inputs needed to view information about a channel after subscribing to that channel), which additionally reduces power usage and improves battery life of the electronic device by enabling the user to use the electronic device more quickly and efficiency.

In some embodiments, while displaying the channels user interface, the electronic device receives (950), via the one or more input devices, an input corresponding to selection of a respective representation of the second plurality of scrollable representations of channels that corresponds to a respective channel. For example, the user is able to select representation 812f of Channel F in the user interface illustrated in FIG. 8L. For example, the user optionally selects a representation of a first channel that is presented among the second plurality of scrollable representations of channels. In some embodiments, in response to receiving the input corresponding to the selection of the respective representation, the electronic device displays (952), on the display 514, a user interface specific to the respective channel that includes information 828a and 830a-d about content available for viewing within the unified media browsing application from the respective channel, such as the user interface illustrated in FIG. 8N. In some embodiments, the information includes a plurality of representations of items of content that are available for viewing within the unified media browsing application from the respective channel. In some embodiments, such as in FIG. 8N, in accordance with a determination that the user of the electronic device is subscribed to the respective channel, the user interface specific to the respective channel includes a large visual representation 828a of a show available for viewing on the respective channel that is selectable to display a user interface corresponding to the show, and a plurality of small representations 830a-d of recent episodes of a plurality of shows available for viewing on the respective channel that are selectable to initiate playback of the respective episodes within the unified media browsing application (954). In some embodiments, the user interface is a user interface including information about the show, such as a written description, representations of episodes of the show, information about the cast and crew of the show, parental guidance information, etc. In some embodiments, the recent episodes are latest released episodes, latest released episodes that the user has not watched, etc. from that channel. In some embodiments, in accordance with a determination that the user is subscribed to the respective channel, the user interface specific to the respective channel includes a visual indication (e.g., text or an image) that indicates that the user is subscribed to the respective channel. For example, the electronic device presents a user interface specific to a channel that the user is subscribed to. The user interface specific to the channel includes a large representation of a first series of content (e.g., a TV show) that is selectable to display information about that series of content, for example. The large representation optionally occupies all or substantially all of a row in the user interface. In some embodiments, the user interface specific to the channel further includes a plurality of small representations of other shows. For example, the user interface includes a row of representations of other shows. The row optionally includes a plurality of representations, such as 3, 5, or some other number of small representations of other shows. In some embodiments, in response to detecting selection of one of the small representations, the electronic device initiates playback of the selected show. The large representation is optionally a representation of an entire series or TV show and the small representations are optionally representations of individual episodes of TV shows (e.g., episodes that are up next based on the user's content consumption history, episodes that are newly released, episodes that were added to an up next watch queue of the user).

The above-described manner of presenting a large representation of a show and small representations of recent shows in the user interface specific to respective channel the allows the electronic device to present the option to view more information about a show while presenting selectable options to watch recent shows, which simplifies the interaction between the user and the electronic device and enhances the operability of the electronic device and makes the user-device interface more efficient (e.g., by enabling the user to decide whether to watch a recent show or to view information about a different show without navigation between different user interfaces), which additionally reduces power usage and improves battery life of the electronic device by enabling the user to use the electronic device more quickly and efficiency.

In some embodiments, such as in FIG. 8O, in accordance with the determination that the user of the electronic device 500 is not subscribed to the respective channel, the user interface specific to the respective channel includes a large representation 828b of information for subscribing to the respective channel and is selectable to initiate a process to subscribe to the respective channel, without including the large visual representation of the show available for viewing on the respective channel and the plurality of small representations of recent episodes of the plurality of shows available for viewing on the respective channel (956). In some embodiments, the recent episodes are latest released episodes, latest released episodes that the user has not watched, etc. For example, if the user is not subscribed to a first channel, the user interface specific to the first channel optionally includes a large image, such as an image representing an item of content available on the first channel with information about subscribing to the channel overlaid on the image (e.g., price and renewal period of the subscription, information about a free trial if one is available, etc.). The representation of information for subscribing to the channel is optionally selectable to initiate a process for subscribing to the channel. In some embodiments, the user interface specific to the respective channel includes representations of content, such as representations of entire television show series, in place of the representations of recent episodes, if the user is not subscribed to the respective channel. The representations of content are optionally selectable to present a user interface specific to the particular item of content.

The above-described manner of presenting information about subscribing to a channel in the user interface specific to the channel allows the electronic device to provide the user with a way to subscribe to a channel while viewing information specific to the channel, which simplifies the interaction between the user and the electronic device and enhances the operability of the electronic device and makes the user-device interface more efficient (e.g., by reducing the user inputs needed to navigate between a user interface specific to the channel and a user interface from which the user is able to subscribe to the channel), which additionally reduces power usage and improves battery life of the electronic device by enabling the user to use the electronic device more quickly and efficiency.

In some embodiments, such as in FIG. 8Q, the unified media browsing application includes a show user interface that includes information about a respective show that is available for viewing within the unified media browsing application from a respective channel that provides content for viewing within the unified media browsing application, the show user interface including a selectable option 836a for initiating playback of a respective episode of the show (958). The show user interface optionally includes information such as a description of the show, representations of seasons and episodes of the show, information about the cast and crew of the show, parental ratings guide, etc. In some embodiments, the selectable option includes text based on the user's content consumption history with respect to the show. For example, if the user has not yet watched the show, the selectable option includes text that says "play first episode." As another example, if the user has watched one or more episodes of the show, the option includes text that says "play next episode." In some embodiments, such as in FIG. 8Y, while displaying the show user interface, the electronic device 500 receives (960), via the one or more input devices 510, an input corresponding to selection of the selectable option 836a. In some embodiments, in response to receiving the input corresponding to the selection of the selectable option 836c (962), in accordance with a determination that a user of the electronic device 500 is not subscribed to the respective channel, the electronic device 500 initiates (964) a process to subscribe to the respective channel, such as in FIG. 8Z. In some embodiments, in response to detecting selection of the selectable option, the electronic device presents a user interface for subscribing to the respective channel (e.g., a user interface including pricing information and a selectable option to confirm the subscription, a payments user interface, etc.). If the subscription is successful, the electronic device optionally begins playing the respective show in response to the successful subscription. In some embodiments, in accordance with a determination that the user is not subscribed to the respective channel, the selectable option includes text indicating that selection of the option will initiate a process for subscribing to the respective channel (e.g., "try Channel A for free"). In some embodiments, in accordance with a determination that the user of the electronic device is subscribed to the respective channel, the electronic device plays (966) the respective episode within the unified media browsing application without initiating the process to subscribe to the respective channel, such as presenting the content as shown in FIG. 8AA without first presenting the user interface shown in FIG. 8Z. In some embodiments, the electronic device plays the next episode based on the user's content consumption history. For example, if the user has not watched the show before, the electronic device plays the first episode. As another example, if the user has watched the show, the electronic device plays the episode that follows the last episode played by the user.

The above-described manner of initiating a process to subscribe to the respective channel in response to selection of the selectable option on the show user interface if the user is not subscribed to the respective channel allows the electronic device to provide the user with access to a show that the user has decided to watch, which simplifies the interaction between the user and the electronic device and enhances the operability of the electronic device and makes the user-device interface more efficient (e.g., by reducing the number of inputs needed to navigate from the show user interface to a user interface from which the user is able to subscribe to the respective channel), which additionally reduces power usage and improves battery life of the electronic device by enabling the user to use the electronic device more quickly and efficiency.

In some embodiments, such as in FIG. 8R, the show user interface includes a region that includes one or more representations 844a-c of different manners of obtaining access to the show, including a first representation 844b of a first manner of obtaining access to the show, wherein the first representation is selectable to (968): in accordance with a determination that the user is not subscribed to the respective channel, initiate a process to subscribe to the respective channel (970), such as in FIG. 8U. In some embodiments, the different manners of obtaining access to the show include channels that provide content that play within the unified media browsing application, other applications that provide content that plays in the other applications, purchasing or renting the content from a content store that provides content that plays in the unified media browsing application, etc. In some embodiments, the process includes presenting a user interface including information (e.g., price, renewal period, cancelation period, etc.) about subscribing to the respective channel and a selectable option to confirm the subscription. In some embodiments, in response to determining that subscribing to the respective channel was successful, the electronic device plays the content. In some embodiments, such as in FIG. 8R-8S, in accordance with a determination that the user of the electronic device 500 is subscribed to the respective channel, the first representation 844a is selectable to: play the show within the unified media browsing application without initiating the process to subscribe to the respective channel, such as in FIG. 8S. In some embodiments, the electronic device plays the content in response to selection of the representation. For example, if the user selects a representation of a channel to which the user is not subscribed, the electronic device initiates a process for subscribing to the channel and in accordance with a determination that the subscription process was successful, the electronic device plays the content. As another example, if the user selects a representation of a channel to which the user is subscribed, the electronic device plays the content in response to the selection.

The above-described manner of initiating a process to subscribe to a channel if the user is not subscribed to the respective channel of the representation selected by the user and playing the content if the user selects a representation of a channel to which the user is already subscribed allows the electronic device to provide the user with a way to gain access to content the user wishes to view, which simplifies the interaction between the user and the electronic device and enhances the operability of the electronic device and makes the user-device interface more efficient (e.g., by reducing the inputs required to navigate between a user interface specific to an item of content including indications of manners of obtaining access to the content and a user interface for subscribing to a particular channel that provides access to the content), which additionally reduces power usage and improves battery life of the electronic device by enabling the user to use the electronic device more quickly and efficiency.

In some embodiments, such as in FIG. 8W, the region includes a second representation 844c of a second manner of obtaining access to the show that does not correspond to a channel whose content is available for viewing within the unified media browsing application (974). In some embodiments, the second representation corresponds to a content store through which access to content is purchased or rented, or to an application other than the unified media browsing application. In some embodiments, such as in FIG. 8W, the first representation 844a is displayed with a first visual characteristic (976). In some embodiments, the first representation includes an image representing a channel whose content is available for viewing within the unified media browsing application. For example, the image representing the channel fills the width of the first representation. In some embodiments, such as in FIGS. 8W-8X, in accordance with a determination that the second representation 844c corresponds to a channel whose content is available through a separate application and not available for viewing within the unified media browsing application, the second representation is displayed with a second visual characteristic, different than the first visual characteristic, and is selectable to initiate playback of the show in the separate application (978), such as in FIG. 8W. In some embodiments, the second representation includes an image indicating that a different application will be opened to play the content and/or presents an image related to the application that has a different size or other visual characteristic that is different from a visual characteristic of the first representation. For example, the second representation includes an image representing the application that is smaller than the width of the second representation and an icon that indicates that another application will be opened to view the content. In some embodiments, in response to detecting selection of the second option, the electronic device opens the separate application and plays the content. In some embodiments, in accordance with a determination that the second representation corresponds to purchasing access to the show, other than subscribing to a channel, in the unified media browsing application, the second representation is selectable to initiate a process to purchase the access to the show in the unified media browsing application (980). In some embodiments, rather than charging a re-occurring fee in exchange for access to a plurality of shows through a subscription to a channel, purchasing the show involves charging a one-time fee in exchange for access to the show. In some embodiments, the second representation corresponds to renting the show by charging a fee for limited-time access to the show.

The above-described manner of presenting a first visual characteristic on a representation corresponding to playing an item of content through a channel that provides access to content that plays in the unified media browsing application and presenting a second visual characteristic on a representation corresponding to an application that plays content in the application allows the electronic device to inform the user which application will be used to play the content, which simplifies the interaction between the user and the electronic device and enhances the operability of the electronic device and makes the user-device interface more efficient (e.g., by warning the user before the user navigates to a different application by playing content that plays in a different application), which additionally reduces power usage and improves battery life of the electronic device by enabling the user to use the electronic device more quickly and efficiency.

In some embodiments, such as in FIG. 8R, in accordance with a determination that the user of the electronic device 500 is subscribed to the respective channel, the first representation 844a is displayed with a first visual indication of the subscription status of the user (982). In some embodiments, the representation includes text and/or an image indicating that the user is subscribed to the respective channel. In some embodiments, such as in FIG. 8R, in accordance with a determination that the user of the electronic device 500 is not subscribed to the respective channel, the first representation 844b is displayed with a second visual indication of the subscription status of the user, different than the first visual indication (984). In some embodiments, the representation includes text and/or an image indicating that the user is not subscribed to the respective channel. In some embodiments, the representations include text describing the action the electronic device will perform in response to selection of the representation. For example, a representation associated with a channel to which the user is subscribed includes text such as "Watch on [channel name]". As another example, a representation associated with a channel to which the user is not subscribed includes text such as "Try [channel name] for free" or "Subscribe to [channel name]."

The above-described manner of presenting the representation with a visual indication that indicates the user's subscription status of the respective channel allows the electronic device to inform the user whether or not the user has access to a particular item of content before the user selects the representation to access the content, which simplifies the interaction between the user and the electronic device and enhances the operability of the electronic device and makes the user-device interface more efficient (e.g., by reducing the number of inputs needed to navigate to a user interface indicating the user's subscription status to the channel and navigating back to the user interface presenting the representations of ways of accessing the content), which additionally reduces power usage and improves battery life of the electronic device by enabling the user to use the electronic device more quickly and efficiency.

It should be understood that the particular order in which the operations in FIGS. 9A-9J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1100) are also applicable in an analogous manner to method 900 described above with respect to FIGS. 9A-9J. For example, the operation of the electronic device to play content in the unified media browsing application that is provided by one or more channels described above with reference to method 900 optionally has one or more of the characteristics of the presentation of representations of content items available on a recently subscribed-to channel and presentation of information about subscribing to a channel based on the user's content consumption history, etc., described herein with reference to other methods described herein (e.g., methods 700 and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5B) or application specific chips. Further, the operations described above with reference to FIGS. 9A-9J are, optionally, implemented by components depicted in FIGS. 1A-1B. For example, displaying operations 902, 904, 910, 914, 924, 928, 930, 946, 948, 950, 952, 954, 960, 976, 978, 982, and 984 receiving operations 904, 906, 916, 918, 932, 936, 938, 946, 948, 950, 952, and 962 and initiating operations 930, 942, 948, 954, 956, 958, 964, 966, 970, 972, 978, and 980 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Subscribing to a Channel Based on Content Consumption History Users interact with electronic devices in many different manners, including using an electronic device to consume content available on one or more channels for viewing in a unified media browsing application. In some embodiments, an electronic device is able to present information about available channels based on content consumption history of the user. The embodiments described below provide ways in which an electronic device presents information about and a selectable option to subscribe to a respective channel based on the user's previous content consumption. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 10A-10K illustrate exemplary ways in which an electronic device presents information about subscribing to a channel based on content consumption activity of the user on the electronic device in accordance with some embodiments of the disclosure. The embodiments in these figures are used to illustrate the processes described below, including the processes described with reference to FIGS. 11A-11D.

Figure 10A:
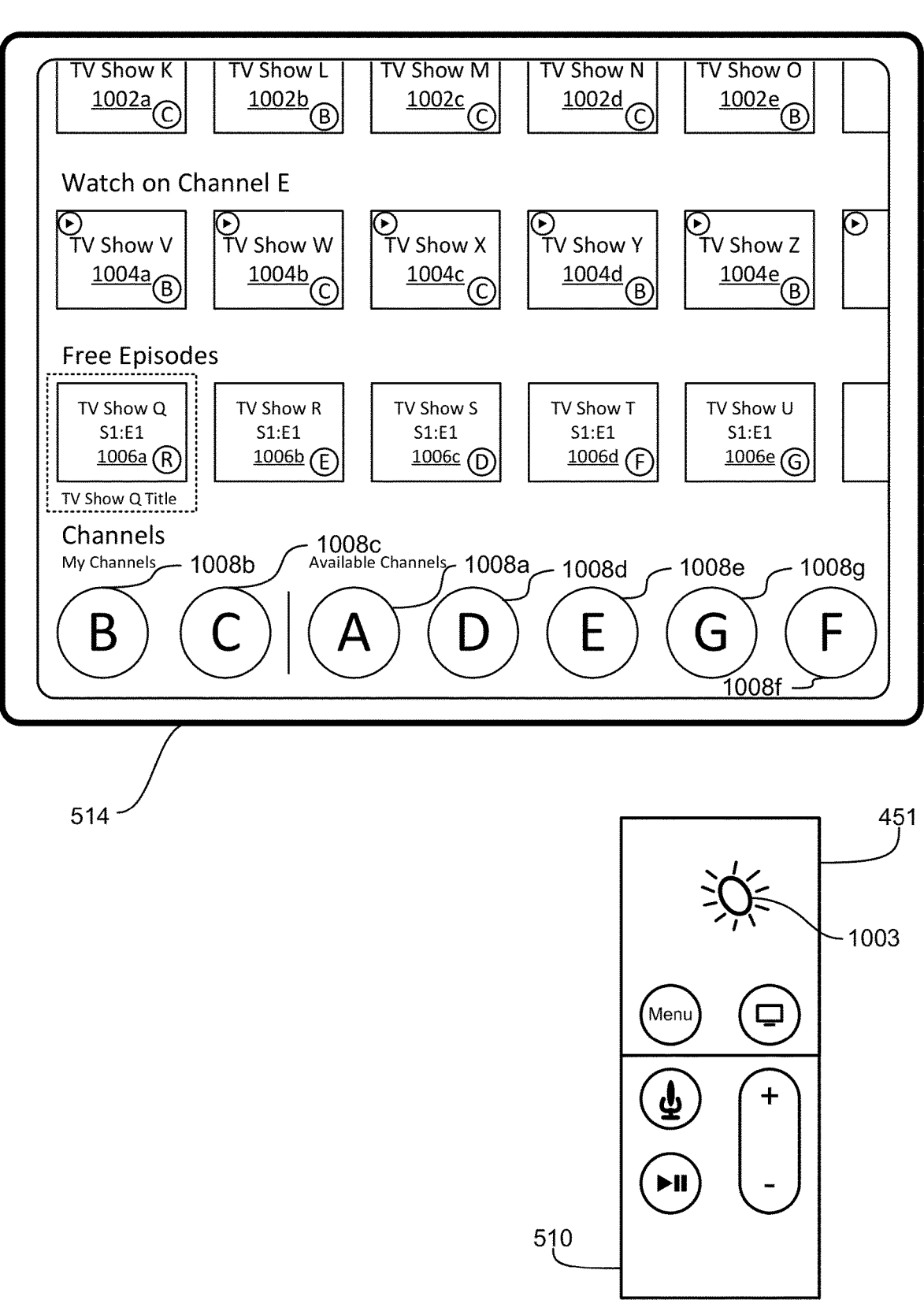
FIGS. 10A-10K illustrate exemplary ways in which an electronic device presents information about subscribing to a channel based on content consumption activity of the user on the electronic device in accordance with some embodiments of the disclosure.

FIGS. 10A-10F illustrate the presentation of information about subscribing to a channel in response to the user viewing a free trial episode of a series of content that is accessible via a channel to which the user is not currently subscribed. FIG. 10A illustrates a user interface of the media browsing application. The user interface includes a plurality of representations 1002a-1006e of items of content accessible to the media browsing application. As shown in FIG. 10A, the representations 1002a-1006e include indications of the channel that provides access to the respective item of content and, for items of content that are accessible through a channel to which the user is subscribed (e.g., Channels B and C), an indication that the user has access to the content. Although not all of the user interfaces illustrated herein illustrate metadata icons on the representations of content items, it should be understood that the scope of the disclosure encompasses including any and all of the metadata icons illustrated in FIG. 10A or elsewhere in any of the other user interfaces illustrated herein as including representations of content items.

The user interface illustrated in FIG. 10A further includes representations 1008a-g of channels that provide content that is played in the media browsing application. The representations of channels include representations 1008b and 1008c of channels to which the user is subscribed under a heading "My Channels" and representations 1008a and 1008d-g of channels to which the user is not subscribed under the heading "Available Channels".

Figure 10B:
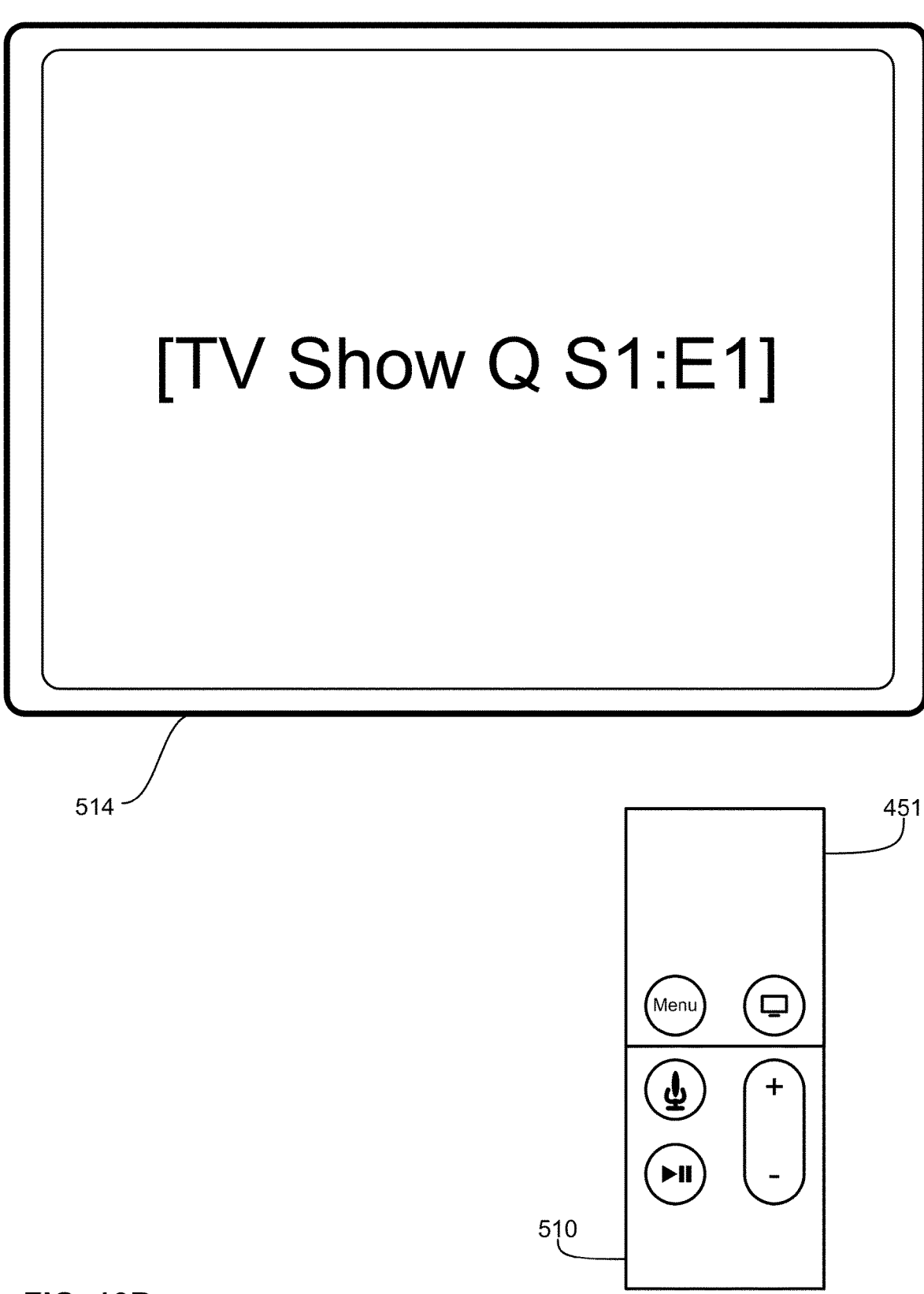

As shown in FIG. 10A, the user selects (e.g., with contact 1003) the representation 1006a of an item content that is accessible for free. The content is provided by a channel to which the user is not subscribed, but the media browsing application is able to access the first episode of the content because it is a free episode. In response to the user's selection in FIG. 10A, the electronic device presents the first episode of the content in the media browsing application, as shown in FIG. 10B.

Figure 10C:
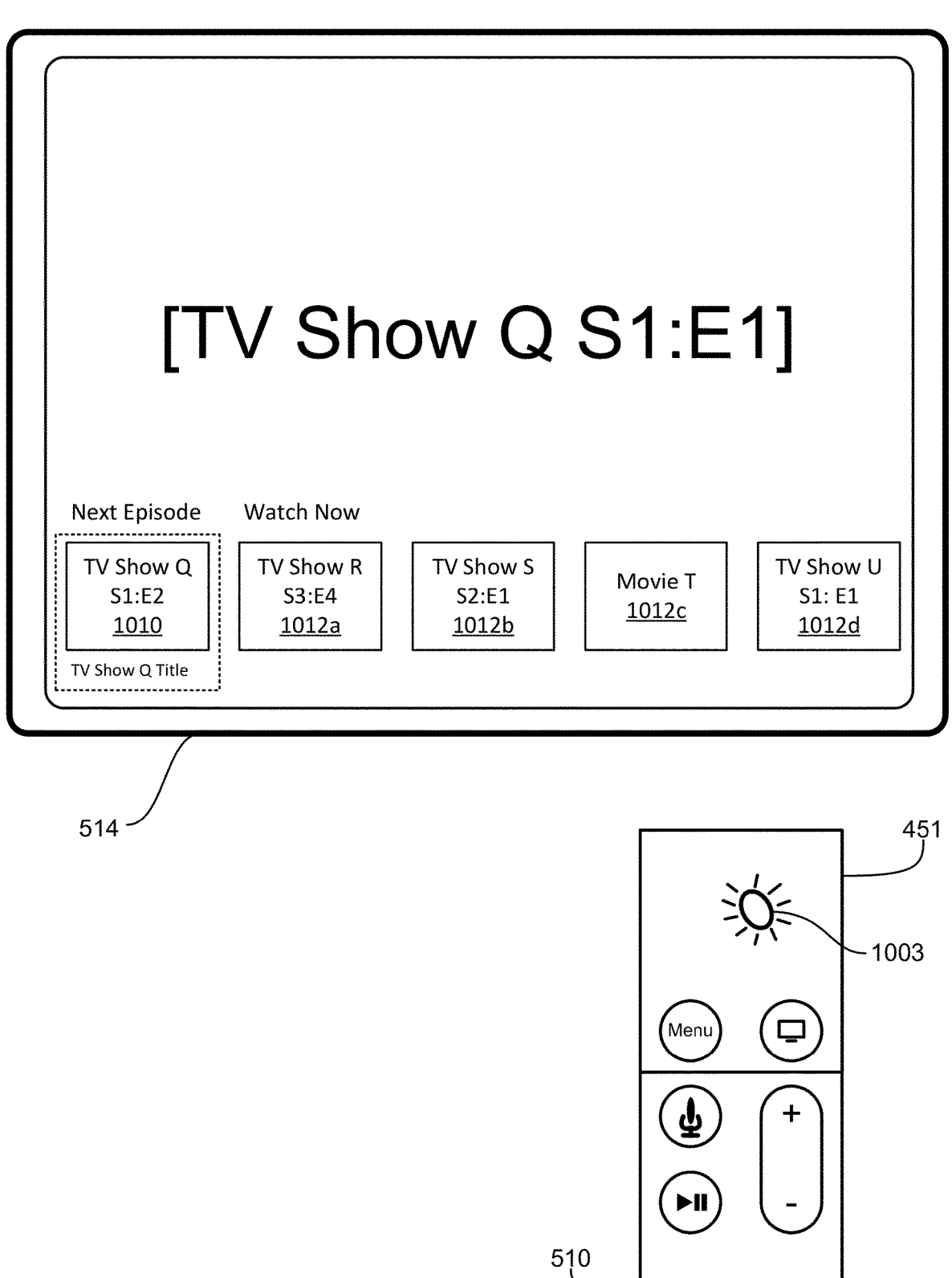

In FIG. 10C, the electronic device has played the content to a predetermined playback position in the content that is near the end of the content (e.g., a predetermined amount of time before the end of the content, a predetermined amount of time from the start of the content, at a point in the content where the credits or other end content is presented, or a predetermined time after the credits or other portion of the content commenced). In response to reaching the predetermined playback position in the content, the electronic device 500 presents a representation 1010 of the next episode in the series and a plurality of representations 1012a-1012d of other items of content that the user is able to access with the media browsing application overlaid over the playing content item. As shown in FIG. 10C, the user selects (e.g., with contact 1003) the representation 1010 of the next episode in the series.

Figure 10D:
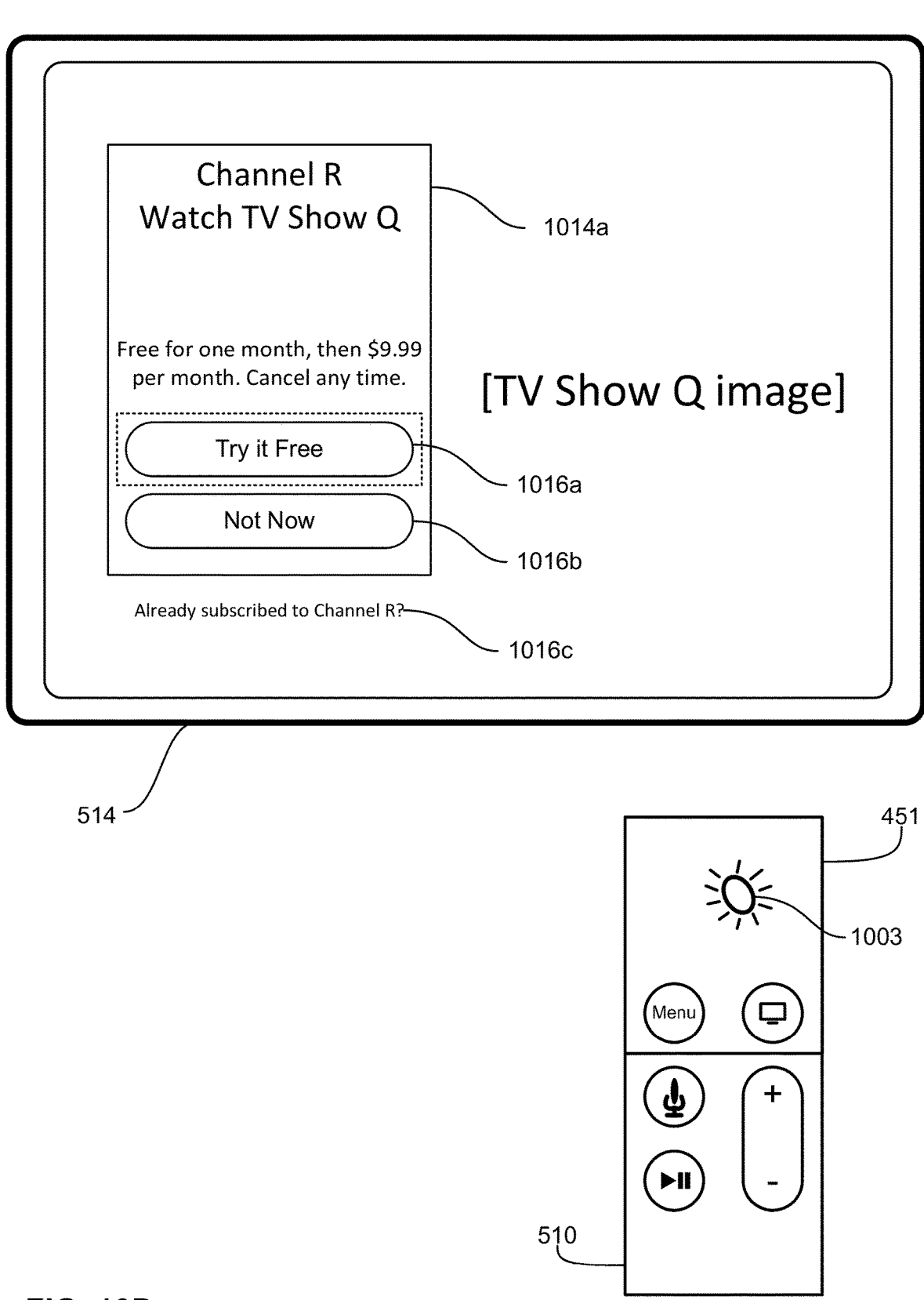

In response to the user's selection in FIG. 10C, the electronic device presents a user interface that includes information about subscribing to Channel R, as shown in FIG. 10D. Channel R is the channel that provides access to the content series the user watched the free trial episode from. The information about subscribing to Channel R includes an indication 1014a of the terms of the subscription to Channel R, a selectable option 1016a that is selectable to start a free trial subscription to Channel R, a selectable option 1016b to exit the user interface without subscribing to Channel R, and a selectable option 1016c to access a subscription to Channel R via a user account that provides access to Channel R (e.g., a user account associated with Channel R or a user account associated with another provider that provides access to Channel R). The indication 1014a and options 1016a-c are overlaid on an image that is related to the series of content the user just watched because the user just watched the an episode from the series. As shown in FIG. 10D, the user selects (e.g., with contact 1003) the option 1016a to initiate the free trial subscription of Channel R.

Figure 10E:
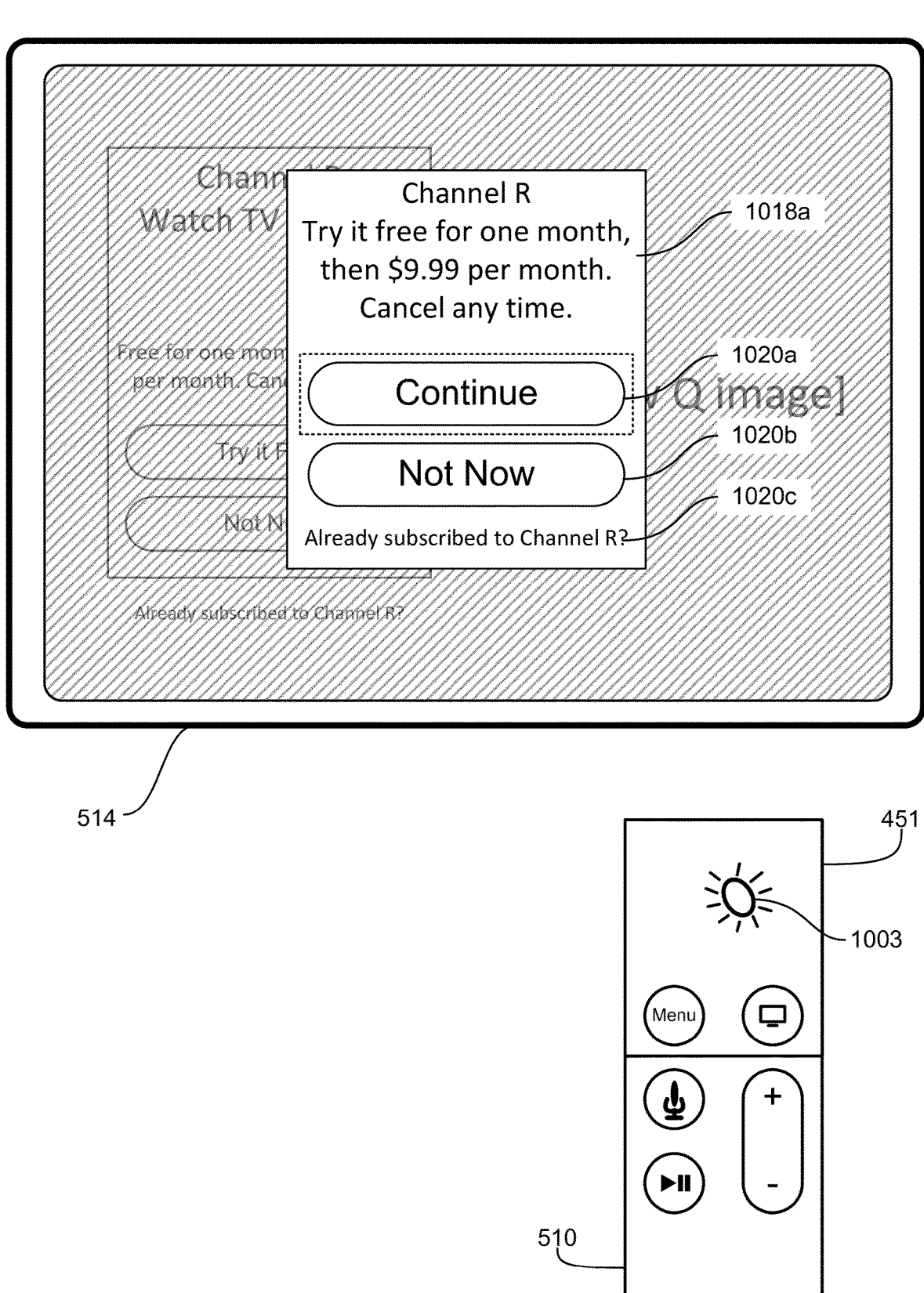
Figure 10F:
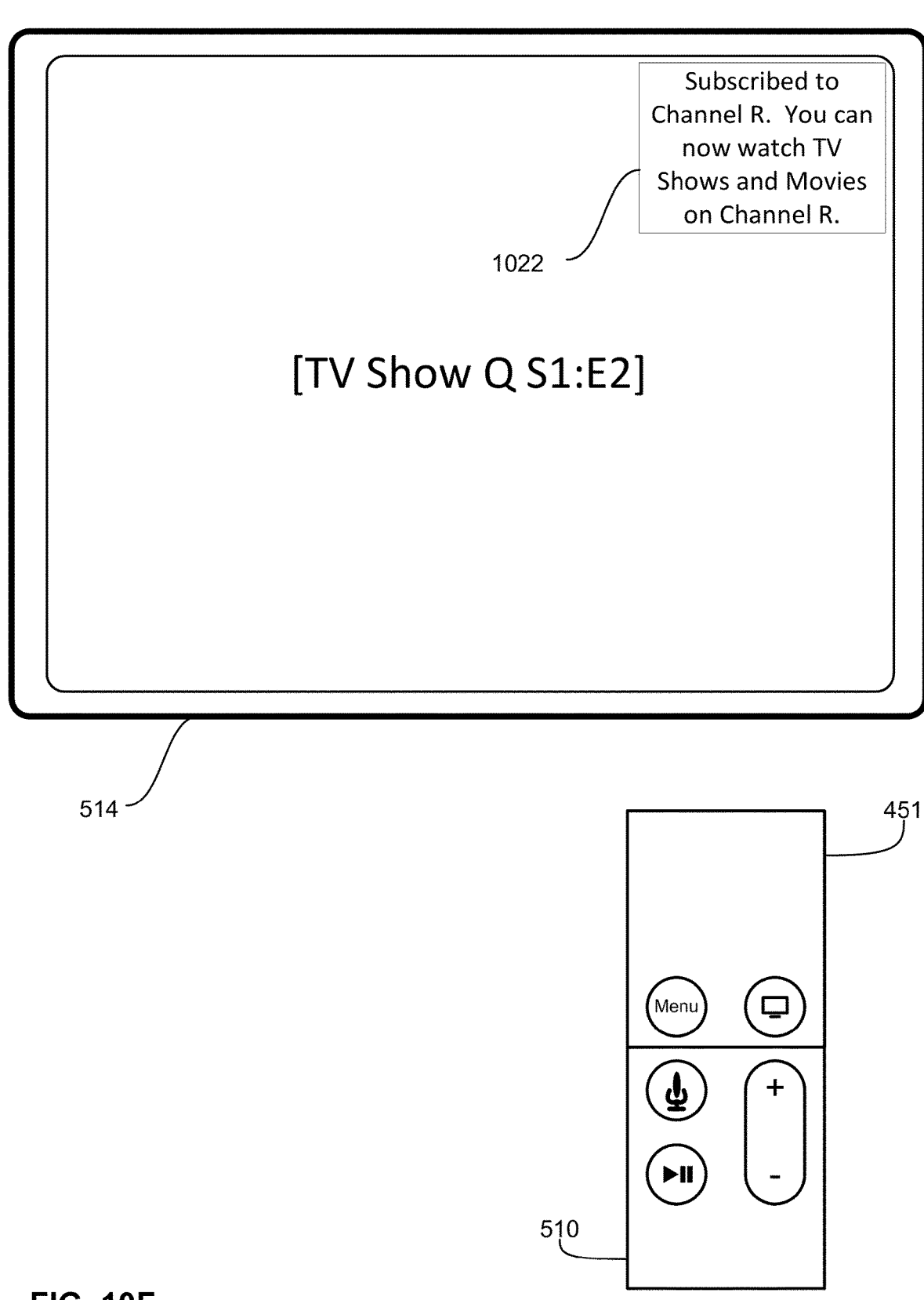

In response to the user's selection, the electronic device presents a user interface that confirms the user's subscription to Channel R. The user interface includes an indication 1018a of the terms of the subscription to Channel R, a selectable option 1020a to continue to subscribe to Channel R, a selectable option 1020b to cancel the process of subscribing the Channel R, and a selectable option 1020c to access a subscription to Channel R from a user account. As shown in FIG. 10E, the user selects (e.g., with contact 1003) the selectable option 1020a to confirm the subscription to Channel R. In response to the user's selection, the electronic device presents the next episode of the content series, as shown in FIG. 10F. In some embodiments, the user interface illustrated in FIG. 10E is not presented. Instead, in some embodiments the next episode of the content series is presented in response to the selection illustrated in FIG. 10D.

As shown in FIG. 10F, the electronic device presents the next episode in the content series in response to confirming the user's subscription to Channel R. The electronic device also presents a visual indication that confirms the user's subscription to Channel R. In some embodiments, however, the visual indication 1022 is not presented.

Figure 10G:
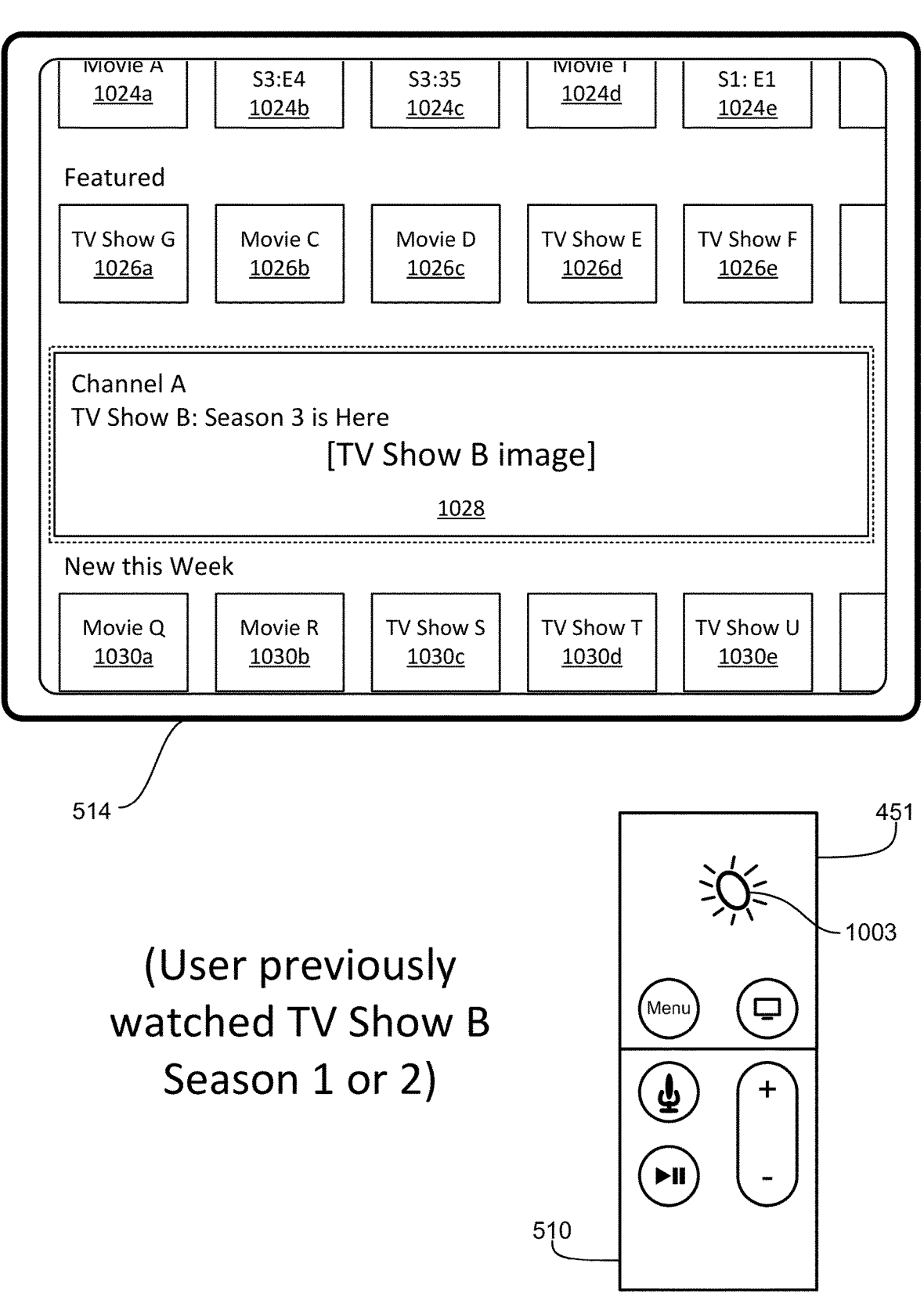

FIGS. 10G-10K illustrate the presentation of information about subscribing to a channel in response to selection of an indication that a new season of a series of content the user has watched previously that is available via a channel to which the user is not currently subscribed. FIG. 10G illustrates a media browsing application user interface that includes an indication 1028 of a new season of a series of content. The user has previously watched a previous season of the series of content but is currently not subscribed to the channel that provides access to the series of content. As shown in FIG. 10G, the user selects (e.g., with contact 1003) the indication 1028.

Figure 10H:
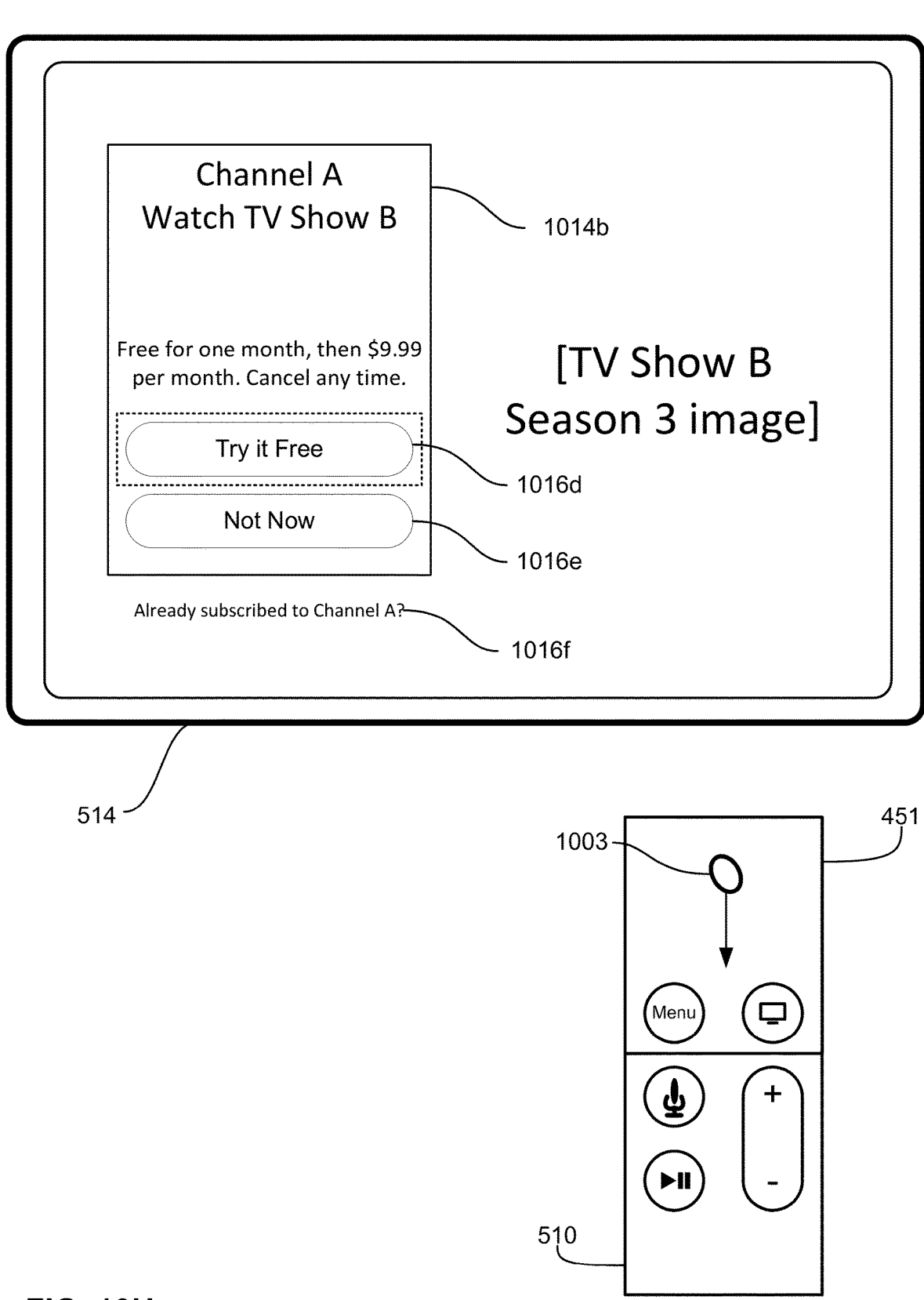

In response to the user's selection in FIG. 10G, the electronic device presents information about subscribing to Channel A, which is the channel that provides access to the series of content indicated by the indication 1028, as shown in FIG. 10H. As shown in FIG. 10H, the information includes an indication 1014b of the terms of the subscription to Channel A, a selectable option 1016d for initiating a free trial subscription to Channel B, a selectable option 1016e to forgo initiating the free trial subscription to Channel A, and a selectable option 1016f to access a subscription to Channel A through an existing user account. The indication 1014b and options 1016d-f are overlaid on an image that is related to the content series indicated in the indication 1028 because the content series was indicated in the indication 1028 selected by the user.

Figure 10I:
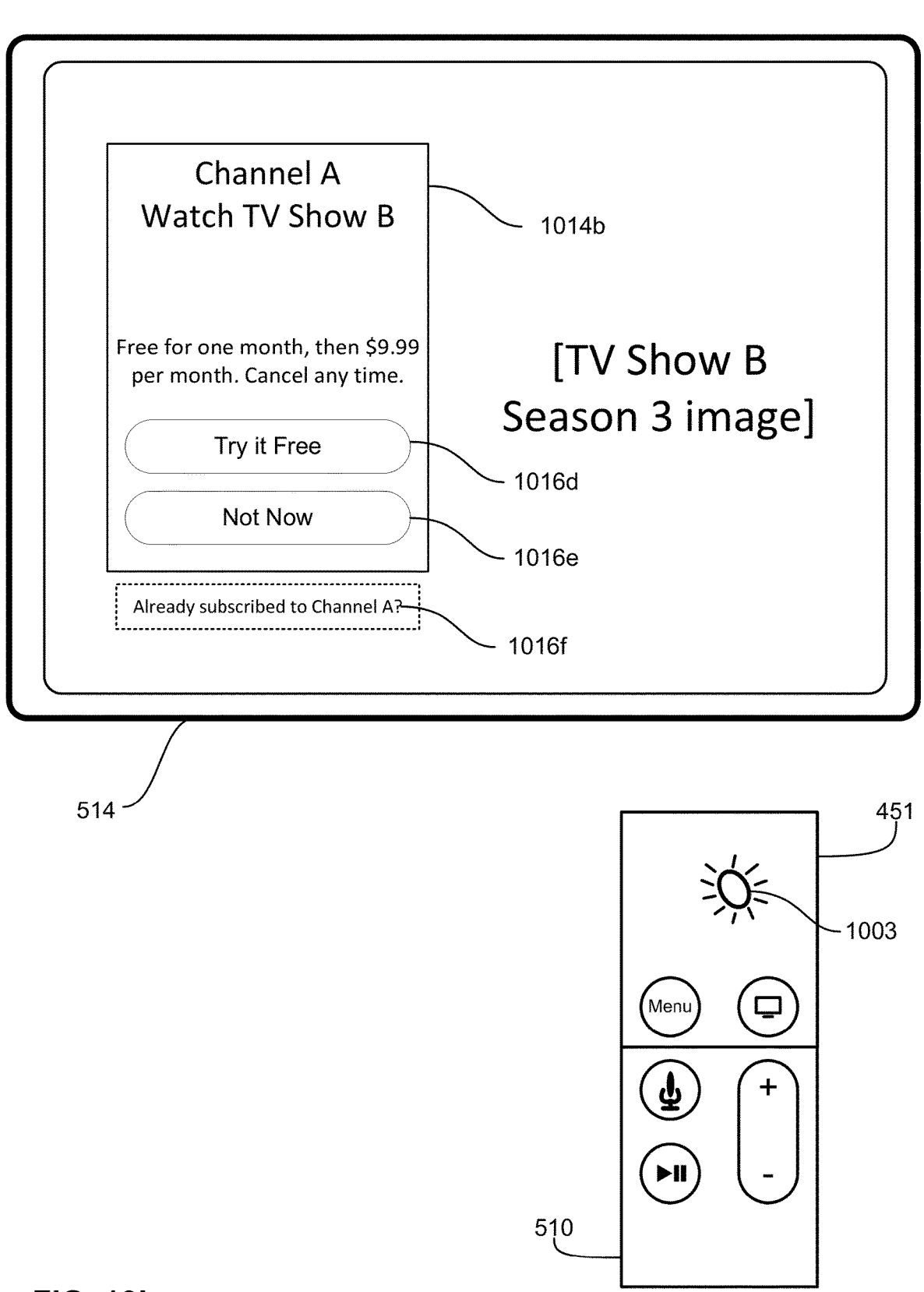

As shown in FIG. 10H, the user scrolls (e.g., with contact 1003) down. As shown in FIG. 10I, in response to the user's scrolling, the electronic device 500 moves the current focus to the selectable option 1016f to access the subscription to Channel A through an existing user account. The user selects (e.g., with contact 1003) the selectable option 1016f to access the subscription to Channel A through an existing user account. In response to the user's selection, the electronic device presents a user interface for logging in to a user account, as shown in FIG. 10J.

Figure 10J:
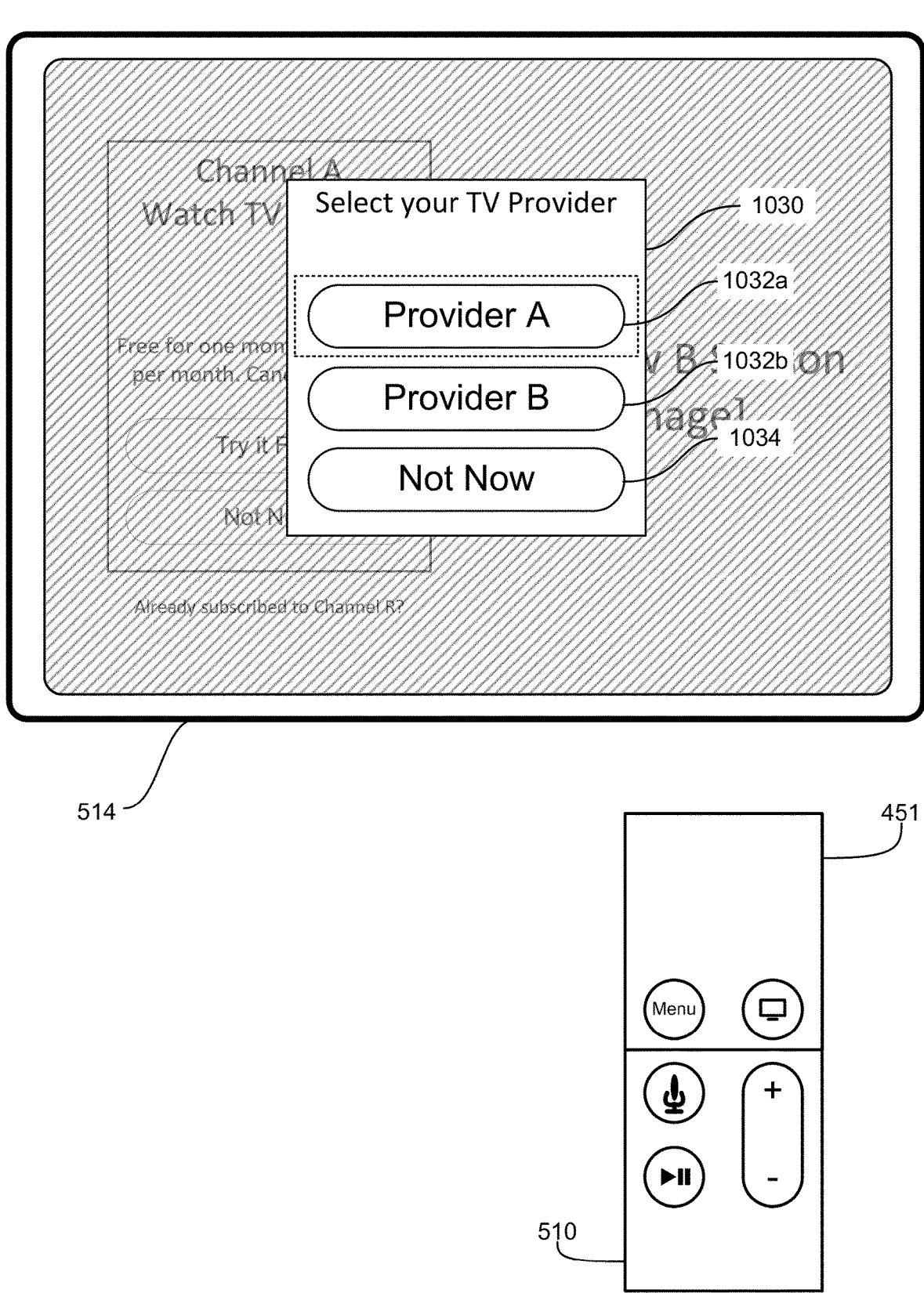

As shown in FIG. 10J, the user interface for logging in to the user account includes an indication 1030 to select the service that the user account is with, such as a user account to a provider (e.g., a television provider) that provides access to Channel A or an account with Channel A directly. The user interface further includes a plurality of selectable options 1032a-1032b selectable to select the service with which the user has an account and a selectable option 1034 to exit the user interface. As shown in FIG. 10J, the user selects (e.g., with contact 1003) the option 1032a associated with Provider A. In response to the user's selection, the electronic device presents a user interface (not shown) from which the user is able to enter their account credentials (e.g., user name and password).

Figure 10K:
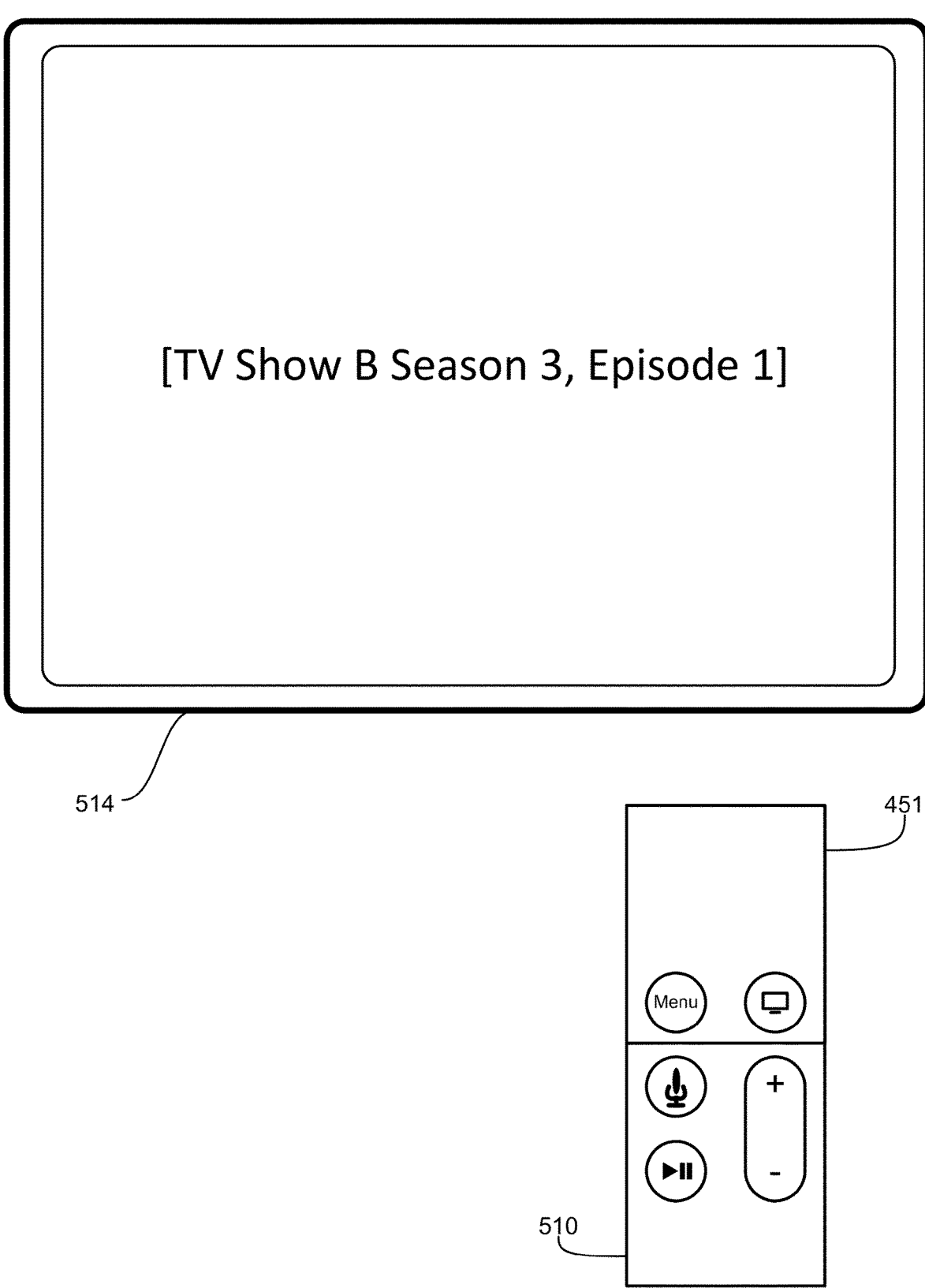
Figure 11D:
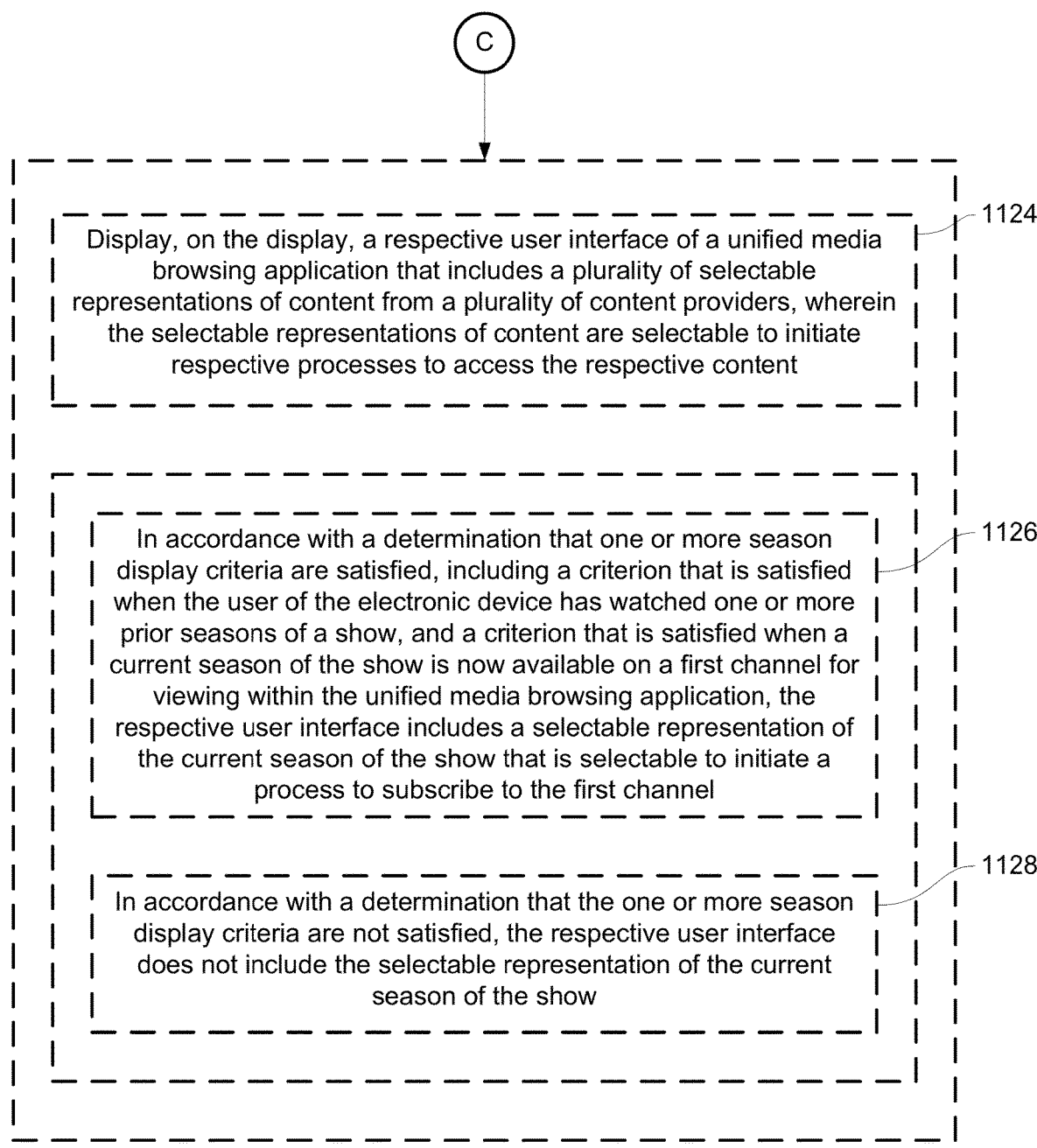

Upon successful log in to the user account, the electronic device activates the subscription to Channel A and presents the next season of the series of content, as shown in FIG. 10K.

FIGS. 11A-11D are flow diagrams illustrating a method 1100 of presenting information about subscribing to a channel based on content consumption activity of the user on the electronic device in accordance with some embodiments of the disclosure. The method 1100 is optionally performed at an electronic device such as device 100, device 300, device 500, device 501, device 510, and device 511 as described above with reference to FIGS. 1A-1B, 2-3, 4A-4B and 5A-5B. Some operations in method 1100 are, optionally, combined and/or order of some operations is, optionally, changed.

As described below, the method 1100 provides ways to present information about subscribing to a channel based on the user's content consumption history. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 10D, an electronic device (e.g., electronic device 500, a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices determines (1102) that one or more channel subscription-display criteria have been satisfied. In some embodiments, the determination is one of detecting selection of an option that, when selected, causes the electronic device to present information about subscribing to a respective channel, detecting completion of playback of trial content for a respective channel, detecting availability of a newly-available item of content in a series of content the user has previously consumed that is available via a respective channel, etc.

In some embodiments, such as in FIG. 10D, in response to determining that the one or more channel subscription-display criteria have been satisfied, the electronic device 500 displays (1104), on the display, a user interface that includes information 1014a about subscribing to a respective channel available on the electronic device, including a selectable option 1016a for initiating a process to subscribe to the respective channel on the electronic device 500. In some embodiments, the information includes the cost of the subscription, a selectable option for ceasing the display of the information about subscribing to the respective channel without subscribing to the respective channel, a selectable option to link an existing user account with the respective channel to a unified media browsing application in which the information is presented, and a representation of an item of content that is available on via the channel.

In some embodiments, such as in FIG. 10D, in accordance with a determination that a content consumption activity of a user of the electronic device is a first content consumption activity, the user interface includes a representation of first content available on the respective channel (1106), such as "TV Show Q image" illustrated in FIG. 10D. In some embodiments, in response to determining that the electronic device completed playback of a free trial item of content (e.g., the first episode of a series, such as a TV show) on the respective channel, the user interface includes a representation of the free trial item of content. In some embodiments, in response to determining that the electronic device previously played an item of content from a series that has recently been updated that is available on the respective channel, the user interface includes a representation of the series.

In some embodiments, such as in FIG. 10I, in accordance with a determination that the content consumption activity of the user of the electronic device is a second content consumption activity, different than the first content consumption activity, the user interface includes a representation of second content, different than the first content, available on the respective channel (1108), such as "TV Show B Season 3 image" in FIG. 10I. For example, in accordance with a determination that the user has just watched a free trial episode of a first TV show that is available on a first channel, the electronic device optionally presents information about the first channel including a representation of the first TV show. As another example, in accordance with a determination that the user has previously watched a second TV show that is available on a second channel but is currently not subscribed to the second channel, the electronic device optionally presents information about the second channel including information about the second TV show. In some embodiments, the information about the second TV show is information about a specific episode of the TV show based on the content consumption history of the user at the electronic device. For example, the information about the second TV show includes an image representing the next episode of the TV show based on which episodes the user has watched. If the user has not yet watched the TV show, the information is optionally related to the TV show in general, rather than related to a specific episode of the TV show.

The above-described manner of presenting the information about subscribing to a respective channel with a representation of content that is based on the content consumption history of the user of the electronic device allows the electronic device to present a representation of content that is available via the respective channel and relevant to the user, which simplifies the interaction between the user and the electronic device and enhances the operability of the electronic device and makes the user-device interface more efficient (e.g., by communicating to the user that the content related to their content consumption history is accessible via the respective channel while presenting the subscription information), which additionally reduces power usage and improves battery life of the electronic device by enabling the user to use the electronic device more quickly and efficiency, by reducing the likelihood of erroneous subscription to the subscription service and by reducing the need for user inputs to find information about particular content available on the respective channel.

In some embodiments, such as in FIG. 10I, the process to subscribe to the respective channel is for subscribing to the respective channel within a media browsing application, and the user interface that includes information 1014b about subscribing to the respective channel includes a second selectable option 1016f for initiating a process for linking a subscription of the user to the respective channel from a separate application, separate from the media browsing application (1110). In some embodiments, the process includes creating a new subscription through the media browsing application. In some embodiments, the separate application is an application on the electronic device that is specific to the channel or an application associated with a content provider that provides content in ways other than the way in which the electronic device provides content (e.g., a cable provider that provides content on television channels). For example, the process enables the electronic device to stream content provided by the channel by entering account information for a cable subscription that generally provides access to television channels, including accessing the respective channel on television.

The above-described manner of presenting an option for initiating a process for linking a subscription of the user to the respective channel allows the electronic device to access content the user is authorized to access, which simplifies the interaction between the user and the electronic device and enhances the operability of the electronic device and makes the user-device interface more efficient (e.g., by enabling the user to access the content by linking their user account, rather than requiring additional inputs for creating a new account with or without cancelling the existing account), which additionally reduces power usage and improves battery life of the electronic device by enabling the user to use the electronic device more quickly and efficiency.

In some embodiments, such as in FIG. 10C, before the one or more channel subscription-display criteria have been satisfied, the electronic device 500 detects (1112) the end of playback of a free trial episode of a content series from the respective channel, such as TV Show Q, S1:E1 illustrated in FIG. 10C. In some embodiments, the free trial episode is an episode that is available for consumption without a subscription to the respective channel. For example, the respective channel enables users to view the first episode of a season of a television show without a subscription to entice users to subscribe to the respective channel. In some embodiments, such as in FIGS. 10C, in response to detecting the end of the playback of the free trial episode, the electronic device 500 displays (1114), on the display 514, a representation 1010 of a next episode of the content series and one or more representations 1012a-d of content items a user of the electronic device has previously shown interest in. In some embodiments, the representations are selectable to play the respective items of content, thereby enabling the user to select an item of content to view after finishing the free trial episode without navigating to a content browsing user interface. In some embodiments, such as in FIGS. 10C-10D, the one or more channel subscription-display criteria have been satisfied in response to detecting selection (e.g., with contact 1003) of the representation 1010 of the next episode of the content series (1116). In some embodiments, in response to detecting selection of the next episode of the content series, the electronic device presents the information about subscribing to the respective channel. In some embodiments, the electronic device will not play the next episode of the content series unless the user is subscribed to the respective channel. For example, the user is not subscribed to the respective channel and views the free trial episode. After viewing the free trial episode, the user selects the next episode and in response to the user's selection, the electronic device optionally presents the information about subscribing to the respective channel. In some embodiments, the information about subscribing to the respective channel includes an image related to the series that includes the free trial episode.

The above-described manner of presenting the information about subscribing to the respective channel in response to the user's selection of an episode of content that is after a free trial episode allows the electronic device to enable the user to continue watching the series without navigating to a different user interface to subscribe to the respective channel, which simplifies the interaction between the user and the electronic device and enhances the operability of the electronic device and makes the user-device interface more efficient (e.g., by reducing the number of inputs needed to subscribe to the respective channel to gain access to the content series), which additionally reduces power usage and improves battery life of the electronic device by enabling the user to use the electronic device more quickly and efficiency.

In some embodiments, such as in FIG. 10D, the user interface that includes the information 1014*a* about subscribing to the respective channel includes a background image that corresponds to the free trial episode of the content series (1118), such as "TV Show Q image". For example, the user finishes watching a free trial episode of a first TV show and the electronic device optionally presents information about subscribing to the respective channel including an image related to the TV show.

The above-described manner of presenting an image related to the content series the user just watched while presenting the information about subscribing to the respective channel allows the electronic device to indicate to the user that the content series is accessible through the respective channel, which simplifies the interaction between the user and the electronic device and enhances the operability of the electronic device and makes the user-device interface more efficient (e.g., by indicating to the user that subscribing to the respective channel will enable the user to continue to watch the series without requiring the user to enter further inputs), which additionally reduces power usage and improves battery life of the electronic device by enabling the user to use the electronic device more quickly and efficiency.

In some embodiments, such as in FIG. 10H, the user interface includes a representation of content from a show that the user has watched on the respective channel (1120), such as "TV Show B Season 3 image". In some embodiments, the user watched the show through a different channel or watched the show in the past while subscribed to the respective channel, which the user has since unsubscribed from. For example, the user interface includes an image of or related to the show that the user has watched.

The above-described manner of including a representation of content the user has watched on the respective channel with the information about subscribing to the respective channel allows the electronic device to inform the user that the content is available through the respective channel without requiring the user to navigate away from the user interface, which simplifies the interaction between the user and the electronic device and enhances the operability of the electronic device and makes the user-device interface more efficient (e.g., by reducing the inputs needed to navigate between a user interface that indicates that the content is available through the respective channel and the user interface including the information about subscribing to the respective channel), which additionally reduces power usage and improves battery life of the electronic device by enabling the user to use the electronic device more quickly and efficiency.

In some embodiments, such as FIG. 10H, the user interface includes a representation of content from a next season of a show that the user has watched on the respective channel (1122), such as "TV Show B Season 3 image". In some embodiments, the user watched the show through a different channel or watched the show in the past while subscribed to the respective channel, which the user has since unsubscribed from. For example, the user previously watched season 1 of a television show and the representation includes a representation of season 2 of the television show.

The above-described manner of including a representation of the next season of content the user has watched on the respective channel with the information about subscribing to the respective channel allows the electronic device to inform the user that the next season of the content is available through the respective channel without requiring the user to navigate away from the user interface, which simplifies the interaction between the user and the electronic device and enhances the operability of the electronic device and makes the user-device interface more efficient (e.g., by reducing the inputs needed to navigate between a user interface that indicates that the next season of the content is available through the respective channel and the user interface including the information about subscribing to the respective channel), which additionally reduces power usage and improves battery life of the electronic device by enabling the user to use the electronic device more quickly and efficiency.

In some embodiments, such as in FIG. 10G, the electronic device 500 displays (1124), on the display 514, a respective user interface of a unified media browsing application that includes a plurality of selectable representations 1024*a-e*, 1026*a*-3, and 1030*a-e* of content from a plurality of content providers, wherein the selectable representations 1024*a-e*, 1026*a*-3, and 1030*a-e* of content are selectable to initiate respective processes to access the respective content. In some embodiments, a content browsing user interface of the unified content browsing application includes selectable representations of items of content that, when selected, play the content or present a user interface including information about the content including a selectable option to play the content. In some embodiments, such as in FIG. 10G, in accordance with a determination that one or more season display criteria are satisfied, including a criterion that is satisfied when the user of the electronic device 500 has watched one or more prior seasons of a show, and a criterion that is satisfied when a current season of the show is now available on a first channel for viewing within the unified media browsing application, the respective user interface includes a selectable representation 1028 of the current season of the show that is selectable to initiate a process to subscribe to the first channel (1126). In some embodiments, in accordance with a determination that the user has watched a season of content that is directly before the current season of the content, the electronic device presents a selectable representation of the current season of the content. The representation optionally includes information about the respective channel that provides access to the content in the unified media browsing application. For example, the user has watched a previous season of a television show and the next season is newly available. The electronic device optionally presents an indication that the next season of the television show is available. In some embodiments, in response to detecting selection of the indication, the electronic device presents the information about subscribing to the respective channel. The information about subscribing to the respective channel optionally includes an image of or related to the new season of the content. In some embodiments, in accordance with a determination that the one or more season display criteria are not satisfied, the respective user interface does not include the selectable representation of the current season of the show (1128). In some embodiments, the user has not watched the season directly before the current season or the user is already subscribed to the respective channel.

The above-described manner of presenting the representation of the current season that is selectable to initiate the process to subscribe to the first channel allows the electronic device to inform the user that a series they previously watched has new episodes available while also informing the user how to access the new episodes, which simplifies the interaction between the user and the electronic device and enhances the operability of the electronic device and makes the user-device interface more efficient (e.g., by reducing the inputs needed to navigate between a user interface that indicates that the new season is available and a user interface to subscribe to the respective channel), which additionally reduces power usage and improves battery life of the electronic device by enabling the user to use the electronic device more quickly and efficiency.

It should be understood that the particular order in which the operations in FIGS. 11A-11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 1100 described above with respect to FIGS. 11A-11D. For example, the operation of the electronic device to present an indication of a number of available updates described above with reference to method 1100 optionally has one or more of the characteristics of the presentation of representations of content items available on channels and content provided by a channel, etc., described herein with reference to other methods described herein (e.g., methods 700 and 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5B) or application specific chips. Further, the operations described above with reference to FIGS. 11A-11D are, optionally, implemented by components depicted in FIGS. 1A-1B. For example, displaying operations 1104, 1114, and 1124 and initiating operations 1104, 1110, 1124, and 1126 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In another example, users can select not to provide content taste data, for targeted content delivery services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
displaying, on the display, a user interface of a unified media browsing application on the electronic device, wherein the user interface includes one or more first representations of content available for viewing via one or more applications other than the unified media browsing application, and one or more representations of content available for viewing from one or more channels within the unified media browsing application, wherein the user interface includes a representation of a respective content item that does not have a current focus;
while displaying the user interface, receiving, via the one or more input devices, a first input corresponding to a request to move a current focus to the representation of the respective content item;
in response to receiving the first input:
moving the current focus to the representation of the respective content item; and
displaying, via the display, an icon that is included in the representation of the respective content item that indicates whether the respective content item is available for viewing via the unified media browsing application or the one or more applications other than the unified media browsing application; and
while displaying the user interface including the representation of the respective content item with the current focus and that includes the icon, receiving, via the one or more input devices, a second input corresponding to a request to play the respective content item; and
in response to receiving the second input:
in accordance with a determination that the respective content item is content available for viewing via the one or more applications other than the unified media browsing application and is not available for viewing within the unified media browsing application:
displaying, on the display, a respective application of the one or more applications corresponding to the respective content item; and
playing the respective content item in the respective application; and
in accordance with a determination that the respective content item is available for viewing within the unified media browsing application and is not available for viewing via the one or more applications other than the unified media browsing application, playing the respective content item in the unified media browsing application without displaying the one or more applications; and
in accordance with a determination that the respective content item is available for viewing within the unified media browsing application and for viewing via the one or more applications other than the unified media browsing application, playing the respective content item in the unified media browsing application or the respective application.

2. The method of claim 1, further comprising:
while playing the respective content item, receiving, via the one or more input devices, an input corresponding to a request to exit playback of the respective content item; and
in response to receiving the input corresponding to the request to exit playback of the respective content item:
in accordance with a determination that the respective content item was playing in the respective application:
ceasing display of the respective content item; and
displaying a user interface of the respective application; and in accordance with a determination that the respective content item was playing in the unified media browsing application:

ceasing display of the respective content item; and displaying the user interface of the unified media browsing application from which the playback of the respective content item was initiated.

3. The method of claim 1, further comprising:

in response to receiving the second input corresponding to the request to play the respective content item:

in accordance with a determination that the respective content item is content available for viewing via the one or more applications other than the unified media browsing application and is available for viewing within the unified media browsing application:

in accordance with receiving an input indicating playback within the unified media browsing application, playing the respective content item in the unified media browsing application; and in accordance with receiving an input indicating playback via the one or more applications other than the unified media browsing application, playing the respective content item in the respective application.

4. The method of claim 1, wherein the unified media browsing application includes a channels user interface that includes information about a plurality of channels that provide content that is available for viewing within the unified media browsing application, the channels user interface including:

a first plurality of scrollable representations of channels in the plurality of channels to which a user of the electronic device is not subscribed, wherein the first plurality of scrollable representations of channels are selectable to initiate respective processes to subscribe to the channels; and a second plurality of scrollable representations of channels in the plurality of channels to which the user of the electronic device is subscribed or not subscribed.

5. The method of claim 4, further comprising:

while displaying the channels user interface, receiving, via the one or more input devices, an input corresponding to selection of a respective representation of the first plurality of scrollable representations of channels that corresponds to a respective channel to which the user of the electronic device is not subscribed; and in response to receiving the input corresponding to the selection of the respective representation, initiating a process to subscribe to the respective channel, including, in accordance with a determination that a subscription to the respective channel is successful, automatically displaying, on the display, a user interface specific to the respective channel that includes information about content available for viewing within the unified media browsing application from the respective channel.

6. The method of claim 4, further comprising:

while displaying the channels user interface, receiving, via the one or more input devices, an input corresponding to selection of a respective representation of the second plurality of scrollable representations of channels that corresponds to a respective channel; and in response to receiving the input corresponding to the selection of the respective representation, displaying, on the display, a user interface specific to the respective channel that includes information about content available for viewing within the unified media browsing application from the respective channel, wherein:

in accordance with a determination that the user of the electronic device is subscribed to the respective channel, the user interface specific to the respective channel includes a large visual representation of a show available for viewing on the respective channel that is selectable to display a user interface corresponding to the show, and a plurality of small representations of recent episodes of a plurality of shows available for viewing on the respective channel that are selectable to initiate playback of the respective episodes within the unified media browsing application.

7. The method of claim 6, wherein in accordance with a determination that the user of the electronic device is not subscribed to the respective channel, the user interface specific to the respective channel includes a large representation of information for subscribing to the respective channel and is selectable to initiate a process to subscribe to the respective channel, without including the large visual representation of the show available for viewing on the respective channel and the plurality of small representations of recent episodes of the plurality of shows available for viewing on the respective channel.

8. The method of claim 1, wherein the unified media browsing application includes a show user interface that includes information about a show that is available for viewing within the unified media browsing application from a respective channel that provides content for viewing within the unified media browsing application, the show user interface including a selectable option for initiating playback of a respective episode of the show, the method further comprising:

while displaying the show user interface, receiving, via the one or more input devices, an input corresponding to selection of the selectable option; and in response to receiving the input corresponding to the selection of the selectable option:

in accordance with a determination that a user of the electronic device is not subscribed to the respective channel, initiating a process to subscribe to the respective channel; and in accordance with a determination that the user of the electronic device is subscribed to the respective channel, playing the respective episode within the unified media browsing application without initiating the process to subscribe to the respective channel.

9. The method of claim 8, wherein the show user interface includes a region that includes one or more representations of different manners of obtaining access to the show, including a first representation of a first manner of obtaining access to the show, wherein the first representation is selectable to:

in accordance with a determination that the user is not subscribed to the respective channel, initiate a process to subscribe to the respective channel; and in accordance with a determination that the user of the electronic device is subscribed to the respective channel, play the show within the unified media browsing application without initiating the process to subscribe to the respective channel.

10. The method of claim 9, wherein:

the region includes a second representation of a second manner of obtaining access to the show that does not correspond to a channel whose content is available for viewing within the unified media browsing application, the first representation is displayed with a first visual characteristic, in accordance with a determination that the second representation corresponds to a channel whose content is available through a separate application and not available for viewing within the unified media browsing application, the second representation is displayed with a second visual characteristic, different than the first visual characteristic, and is selectable to initiate playback of the show in the separate application, and in accordance with a determination that the second representation corresponds to purchasing access to the show, other than subscribing to a channel, in the unified media browsing application, the second representation is selectable to initiate a process to purchase the access to the show in the unified media browsing application.

11. The method of claim 9, wherein:

in accordance with a determination that the user of the electronic device is subscribed to the respective channel, the first representation is displayed with a first visual indication of a subscription status of the user, and in accordance with a determination that the user of the electronic device is not subscribed to the respective channel, the first representation is displayed with a second visual indication of the subscription status of the user, different than the first visual indication.

12. The method of claim 1, wherein playing the respective content item in the unified media browsing application or the respective application comprises playing the respective content item in the unified media browsing application without playing the respective content item in the respective application.

13. An electronic device in communication with a display and one or more input devices, comprising:

one or more processors;

memory; and one or more programs, wherein the one or more programs are stored in the memory and configured to be executed by the one or more processors, the one or more programs including instructions for:

displaying, on the display, a user interface of a unified media browsing application on the electronic device, wherein the user interface includes one or more first representations of content available for viewing via one or more applications other than the unified media browsing application, and one or more representations of content available for viewing from one or more channels within the unified media browsing application, wherein the user interface includes a representation of a respective content item that does not have a current focus;

while displaying the user interface, receiving, via the one or more input devices, a first input corresponding to a request to move a current focus to the representation of the respective content item;

in response to receiving the first input:

moving the current focus to the representation of the respective content item; and displaying, via the display, an icon that is included in the representation of the respective content item that indicates whether the respective content item is available for viewing via the unified media browsing application or the one or more applications other than the unified media browsing application; and while displaying the user interface including the representation of the respective content item with the current focus and that includes the icon, receiving, via the one or more input devices, a second input corresponding to a request to play the respective content item; and in response to receiving the second input:

in accordance with a determination that the respective content item is content available for viewing via the one or more applications other than the unified media browsing application and is not available for viewing within the unified media browsing application:

displaying, on the display, a respective application of the one or more applications corresponding to the respective content item; and playing the respective content item in the respective application; and in accordance with a determination that the respective content item is available for viewing within the unified media browsing application and is not available for viewing via the one or more applications other than the unified media browsing application, playing the respective content item in the unified media browsing application without displaying the one or more applications; and in accordance with a determination that the respective content item is available for viewing within the unified media browsing application and for viewing via the one or more applications other than the unified media browsing application, playing the respective content item in the unified media browsing application or the respective application.

14. The electronic device of claim 13, the one of more programs further including instructions for:

while playing the respective content item, receiving, via the one or more input devices, an input corresponding to a request to exit playback of the respective content item; and in response to receiving the input corresponding to the request to exit playback of the respective content item:

in accordance with a determination that the respective content item was playing in the respective application:

ceasing display of the respective content item; and displaying a user interface of the respective application; and in accordance with a determination that the respective content item was playing in the unified media browsing application:

ceasing display of the respective content item; and displaying the user interface of the unified media browsing application from which the playback of the respective content item was initiated.

15. The electronic device of claim 13, the one of more programs further including instructions for:

in response to receiving the second input corresponding to the request to play the respective content item:

in accordance with a determination that the respective content item is content available for viewing via the one or more applications other than the unified media browsing application and is available for viewing within the unified media browsing application:

in accordance with receiving an input indicating playback within the unified media browsing application, playing the respective content item in the unified media browsing application; and in accordance with receiving an input indicating playback via the one or more applications other than the unified media browsing application, playing the respective content item in the respective application.

16. The electronic device of claim 13, wherein the unified media browsing application includes a channels user interface that includes information about a plurality of channels that provide content that is available for viewing within the unified media browsing application, the channels user interface including:

a first plurality of scrollable representations of channels in the plurality of channels to which a user of the electronic device is not subscribed, wherein the first plurality of scrollable representations of channels are selectable to initiate respective processes to subscribe to the channels; and a second plurality of scrollable representations of channels in the plurality of channels to which the user of the electronic device is subscribed or not subscribed.

17. The electronic device of claim 16, the one or more programs further including instructions for:

while displaying the channels user interface, receiving, via the one or more input devices, an input corresponding to selection of a respective representation of the first plurality of scrollable representations of channels that corresponds to a respective channel to which the user of the electronic device is not subscribed; and in response to receiving the input corresponding to the selection of the respective representation, initiating a process to subscribe to the respective channel, including, in accordance with a determination that a subscription to the respective channel is successful, automatically displaying, on the display, a user interface specific to the respective channel that includes information about content available for viewing within the unified media browsing application from the respective channel.

18. The electronic device of claim 16, the one or more programs further including instructions for:

while displaying the channels user interface, receiving, via the one or more input devices, an input corresponding to selection of a respective representation of the second plurality of scrollable representations of channels that corresponds to a respective channel; and in response to receiving the input corresponding to the selection of the respective representation, displaying, on the display, a user interface specific to the respective channel that includes information about content available for viewing within the unified media browsing application from the respective channel, wherein:

in accordance with a determination that the user of the electronic device is subscribed to the respective channel, the user interface specific to the respective channel includes a large visual representation of a show available for viewing on the respective channel that is selectable to display a user interface corresponding to the show, and a plurality of small representations of recent episodes of a plurality of shows available for viewing on the respective channel that are selectable to initiate playback of the respective episodes within the unified media browsing application.

19. The electronic device of claim 18, wherein in accordance with a determination that the user of the electronic device is not subscribed to the respective channel, the user interface specific to the respective channel includes a large representation of information for subscribing to the respective channel and is selectable to initiate a process to subscribe to the respective channel, without including the large visual representation of the show available for viewing on the respective channel and the plurality of small representations of recent episodes of the plurality of shows available for viewing on the respective channel.

20. The electronic device of claim 13, wherein the unified media browsing application includes a show user interface that includes information about a show that is available for viewing within the unified media browsing application from a respective channel that provides content for viewing within the unified media browsing application, the show user interface including a selectable option for initiating playback of a respective episode of the show, the one or more programs further including instructions for:

while displaying the show user interface, receiving, via the one or more input devices, an input corresponding to selection of the selectable option; and in response to receiving the input corresponding to the selection of the selectable option:

in accordance with a determination that a user of the electronic device is not subscribed to the respective channel, initiating a process to subscribe to the respective channel; and in accordance with a determination that the user of the electronic device is subscribed to the respective channel, playing the respective episode within the unified media browsing application without initiating the process to subscribe to the respective channel.

21. The electronic device of claim 20, wherein the show user interface includes a region that includes one or more representations of different manners of obtaining access to the show, including a first representation of a first manner of obtaining access to the show, wherein the first representation is selectable to:

in accordance with a determination that the user is not subscribed to the respective channel, initiate a process to subscribe to the respective channel; and in accordance with a determination that the user of the electronic device is subscribed to the respective channel, play the show within the unified media browsing application without initiating the process to subscribe to the respective channel.

22. The electronic device of claim 21, wherein:

the region includes a second representation of a second manner of obtaining access to the show that does not correspond to a channel whose content is available for viewing within the unified media browsing application, the first representation is displayed with a first visual characteristic, in accordance with a determination that the second representation corresponds to a channel whose content is available through a separate application and not available for viewing within the unified media browsing application, the second representation is displayed with a second visual characteristic, different than the first visual characteristic, and is selectable to initiate playback of the show in the separate application, and in accordance with a determination that the second representation corresponds to purchasing access to the show, other than subscribing to a channel, in the unified media browsing application, the second representation is selectable to initiate a process to purchase the access to the show in the unified media browsing application.

23. The electronic device of claim 21, wherein:

in accordance with a determination that the user of the electronic device is subscribed to the respective channel, the first representation is displayed with a first visual indication of a subscription status of the user, and in accordance with a determination that the user of the electronic device is not subscribed to the respective channel, the first representation is displayed with a second visual indication of the subscription status of the user, different than the first visual indication.

24. The electronic device of claim 13, wherein playing the respective content item in the unified media browsing application or the respective application comprises playing the respective content item in the unified media browsing application without playing the respective content item in the respective application.

25. A non-transitory computer readable storage medium storing one or more programs, the one or more programs comprising instructions, which when executed by one or more processors of an electronic device in communication with a display and one or more input devices, cause the electronic device to:

display, on the display, a user interface of a unified media browsing application on the electronic device, wherein the user interface includes one or more first representations of content available for viewing via one or more applications other than the unified media browsing application, and one or more representations of content available for viewing from one or more channels within the unified media browsing application, wherein the user interface includes a representation of a respective content item that does not have a current focus;

while displaying the user interface, receive, via the one or more input devices, a first input corresponding to a request to move a current focus to the representation of the respective content item;

in response to receiving the first input:

move the current focus to the representation of the respective content item; and display, via the display, an icon that is included in the representation of the respective content item that indicates whether the respective content item is available for viewing via the unified media browsing application or the one or more applications other than the unified media browsing application; and while displaying the user interface including the representation of the respective content item with the current focus and that includes the icon, receive, via the one or more input devices, a second input corresponding to a request to play the respective content item; and in response to receiving the second input:

in accordance with a determination that the respective content item is content available for viewing via the one or more applications other than the unified media browsing application and is not available for viewing within the unified media browsing application:

display, on the display, a respective application of the one or more applications corresponding to the respective content item; and play the respective content item in the respective application; and in accordance with a determination that the respective content item is available for viewing within the unified media browsing application and is not available for viewing via the one or more applications other than the unified media browsing application, play the respective content item in the unified media browsing application without displaying the one or more applications; and in accordance with a determination that the respective content item is available for viewing within the unified media browsing application and for viewing via the one or more applications other than the unified media browsing application, play the respective content item in the unified media browsing application or the respective application.

26. The non-transitory computer readable storage medium of claim 25, the one or more programs further including instructions for:

while playing the respective content item, receiving, via the one or more input devices, an input corresponding to a request to exit playback of the respective content item; and in response to receiving the input corresponding to the request to exit playback of the respective content item:

in accordance with a determination that the respective content item was playing in the respective application:

ceasing display of the respective content item; and displaying a user interface of the respective application; and in accordance with a determination that the respective content item was playing in the unified media browsing application:

ceasing display of the respective content item; and displaying the user interface of the unified media browsing application from which the playback of the respective content item was initiated.

27. The non-transitory computer readable storage medium of claim 25, the one or more programs further including instructions for:

in response to receiving the second input corresponding to the request to play the respective content item:

in accordance with a determination that the respective content item is content available for viewing via the one or more applications other than the unified media browsing application and is available for viewing within the unified media browsing application:

in accordance with receiving an input indicating playback within the unified media browsing application, playing the respective content item in the unified media browsing application; and in accordance with receiving an input indicating playback via the one or more applications other than the unified media browsing application, playing the respective content item in the respective application.

28. The non-transitory computer readable storage medium of claim 25, wherein the unified media browsing application includes a channels user interface that includes information about a plurality of channels that provide content that is available for viewing within the unified media browsing application, the channels user interface including:

a first plurality of scrollable representations of channels in the plurality of channels to which a user of the electronic device is not subscribed, wherein the first plurality of scrollable representations of channels are selectable to initiate respective processes to subscribe to the channels; and a second plurality of scrollable representations of channels in the plurality of channels to which the user of the electronic device is subscribed or not subscribed.

29. The non-transitory computer readable storage medium of claim 28, the one or more programs further including instructions for:

while displaying the channels user interface, receiving, via the one or more input devices, an input corresponding to selection of a respective representation of the first plurality of scrollable representations of channels that corresponds to a respective channel to which the user of the electronic device is not subscribed; and in response to receiving the input corresponding to the selection of the respective representation, initiating a process to subscribe to the respective channel, including, in accordance with a determination that a subscription to the respective channel is successful, automatically displaying, on the display, a user interface specific to the respective channel that includes information about content available for viewing within the unified media browsing application from the respective channel.

30. The non-transitory computer readable storage medium of claim 28, the one or more programs further including instructions for:

while displaying the channels user interface, receiving, via the one or more input devices, an input corresponding to selection of a respective representation of the second plurality of scrollable representations of channels that corresponds to a respective channel; and in response to receiving the input corresponding to the selection of the respective representation, displaying, on the display, a user interface specific to the respective channel that includes information about content available for viewing within the unified media browsing application from the respective channel, wherein:

in accordance with a determination that the user of the electronic device is subscribed to the respective channel, the user interface specific to the respective channel includes a large visual representation of a show available for viewing on the respective channel that is selectable to display a user interface corresponding to the show, and a plurality of small representations of recent episodes of a plurality of shows available for viewing on the respective channel that are selectable to initiate playback of the respective episodes within the unified media browsing application.

31. The non-transitory computer readable storage medium of claim 30, wherein in accordance with a determination that the user of the electronic device is not subscribed to the respective channel, the user interface specific to the respective channel includes a large representation of information for subscribing to the respective channel and is selectable to initiate a process to subscribe to the respective channel, without including the large visual representation of the show available for viewing on the respective channel and the plurality of small representations of recent episodes of the plurality of shows available for viewing on the respective channel.

32. The non-transitory computer readable storage medium of claim 25, wherein the unified media browsing application includes a show user interface that includes information about a show that is available for viewing within the unified media browsing application from a respective channel that provides content for viewing within the unified media browsing application, the show user interface including a selectable option for initiating playback of a respective episode of the show, the one or more programs further including instructions for:

while displaying the show user interface, receiving, via the one or more input devices, an input corresponding to selection of the selectable option; and in response to receiving the input corresponding to the selection of the selectable option:

in accordance with a determination that a user of the electronic device is not subscribed to the respective channel, initiating a process to subscribe to the respective channel; and in accordance with a determination that the user of the electronic device is subscribed to the respective channel, playing the respective episode within the unified media browsing application without initiating the process to subscribe to the respective channel.

33. The non-transitory computer readable storage medium of claim 32, wherein the show user interface includes a region that includes one or more representations of different manners of obtaining access to the show, including a first representation of a first manner of obtaining access to the show, wherein the first representation is selectable to:

in accordance with a determination that the user is not subscribed to the respective channel, initiate a process to subscribe to the respective channel; and in accordance with a determination that the user of the electronic device is subscribed to the respective channel, play the show within the unified media browsing application without initiating the process to subscribe to the respective channel.

34. The non-transitory computer readable storage medium of claim 33, wherein:

the region includes a second representation of a second manner of obtaining access to the show that does not correspond to a channel whose content is available for viewing within the unified media browsing application, the first representation is displayed with a first visual characteristic, in accordance with a determination that the second representation corresponds to a channel whose content is available through a separate application and not available for viewing within the unified media browsing application, the second representation is displayed with a second visual characteristic, different than the first visual characteristic, and is selectable to initiate playback of the show in the separate application, and in accordance with a determination that the second representation corresponds to purchasing access to the show, other than subscribing to a channel, in the unified media browsing application, the second representation is selectable to initiate a process to purchase the access to the show in the unified media browsing application.

35. The non-transitory computer readable storage medium of claim 33, wherein:

in accordance with a determination that the user of the electronic device is subscribed to the respective channel, the first representation is displayed with a first visual indication of a subscription status of the user, and in accordance with a determination that the user of the electronic device is not subscribed to the respective channel, the first representation is displayed with a second visual indication of the subscription status of the user, different than the first visual indication.

36. The non-transitory computer readable storage medium of claim 25, wherein playing the respective content item in the unified media browsing application or the respective application comprises playing the respective content item in the unified media browsing application without playing the respective content item in the respective application.

* * * * *